(12) United States Patent
Van Cor

(10) Patent No.: US 6,543,305 B1
(45) Date of Patent: Apr. 8, 2003

(54) GEAR TRAIN AND TRANSMISSION SYSTEM UTILIZING THE SAME

(76) Inventor: Dale E. Van Cor, 201 S. Parrish Rd., Winchester, NH (US) 03470

( * ) Notice: Subject to any disclaimer, the term of this patent is extended or adjusted under 35 U.S.C. 154(b) by 0 days.

(21) Appl. No.: 09/734,407

(22) Filed: Dec. 11, 2000

Related U.S. Application Data

(60) Provisional application No. 60/172,522, filed on Dec. 17, 1999.

(51) Int. Cl.[7] ................................................. F16H 3/22
(52) U.S. Cl. ...................................................... 74/348
(58) Field of Search ........................... 74/341, 348, 349

(56) References Cited

U.S. PATENT DOCUMENTS

| | | | | |
|---|---|---|---|---|
| 1,159,463 A | * | 11/1915 | Barr et al. | |
| 1,484,197 A | * | 2/1924 | Stefani | |
| 2,208,148 A | * | 7/1940 | Schafer | |
| 2,234,653 A | * | 3/1941 | Rothfield | |
| 2,697,365 A | * | 12/1954 | Williams | |
| 2,875,628 A | * | 3/1959 | Walter | |
| 2,926,538 A | * | 3/1960 | Schafer | |
| 3,381,544 A | * | 5/1968 | Butler | |
| 4,630,495 A | * | 12/1986 | Smith | .......................... 74/191 |
| 5,425,685 A | * | 6/1995 | Park | ............................. 476/55 |
| 5,545,101 A | * | 8/1996 | Kawase et al. | ............. 475/193 |
| 5,601,509 A | * | 2/1997 | Munoz | ......................... 476/53 |

* cited by examiner

*Primary Examiner*—Dirk Wright
(74) *Attorney, Agent, or Firm*—Michael J. Persson; Lawson, Philpot & Persson, P.C.

(57) ABSTRACT

A gear train apparatus including a gear and a cone disposed in contact with the gear. The cone includes a plurality of conic teeth, between which are a first plurality of spaces, and a plurality of scaling teeth, between which are a second plurality of spaces. The conic teeth are arranged about the cone to form a plurality of conic rings, which disposed about a plurality of nascention circles. The rings are dimensioned to mate with the teeth of the gear such that the conic teeth neutralize a change in surface speed of the cone along the conic teeth. The scaling teeth form at least one acceleration channel and at least one deceleration channel extending from each of the conic rings and intercepting an adjacent conic ring, with each acceleration channel and the deceleration channel being disposed along a nascention offset line between nascention circles of adjacent conic rings.

43 Claims, 50 Drawing Sheets

FIG. 40

6000 Channel One Selected Acceleration and Deceleration Matrix

| 6001 Channels: Accel. + Decel. Teeth Degrees | 6002 Matrix Degrees | 6003 TOP Teeth | 6004 Landing Degrees | 6005 Matrix plus Top Landing Degrees | 6006 | 6007 BOTTOM Track Teeth | 6008 Degrees | 6009 THE ERROR Matix - Bottom | 6010 Remaining Space for BOTTOM Landing |
|---|---|---|---|---|---|---|---|---|---|
| | | | # x 10.90909 | | | | # x 12.413793 | | |
| Channel 1 6011 | | | | | | | | | |
| 4x11 91.4 + 81.8 | 173.192 | 8 | 87.2727 | 260.464 | | 21 | 260.690 | -0.2252 | 99.310 |
| 5x11 103.2 + 93.4 | 184.95 | 7 | 76.3636 | 261.313 | | 21 | 260.690 | 0.6235 | 99.310 |
| 4x12 91.4 + 93.4 | 184.827 | 7 | 76.3636 | 261.191 | | 21 | 260.690 | 0.5010 | 99.310 |
| 5x12 103.2 + 93.4 | 196.58 | 7 | 76.3636 | 272.948 | | 22 | 273.103 | -0.1550 | 86.897 |
| 4x13 91.4 + 104 | 196.459 | 7 | 76.3636 | 272.823 | | 22 | 273.103 | -0.2807 | 86.897 |
| 5x13 103.2 + 104 | 208.217 | 6 | 65.4545 | 273.671 | | 22 | 273.103 | 0.5680 | 86.897 |

Channel Two Selected Acceleration and Deceleration Matrix

| 6001 | 6002 | 6003 | 6004 | 6005 | 6006 | 6007 | 6008 | 6009 | 6010 |
|---|---|---|---|---|---|---|---|---|---|
| Channels: Accel. + Decel. Teeth Degrees | | Matrix Degrees | TOP Landing Teeth | TOP Landing Degrees | Matrix plus Top Landing Degrees | BOTTOM Track Teeth | BOTTOM Track Degrees | THE ERROR Matix - Bottom | Remaining Space for BOTTOM Landing |

Channel 2
6101

| | | | | # x 9.72973 | | | # x 10.90909 | | |
|---|---|---|---|---|---|---|---|---|---|
| 4x12 | 81.1 + 82.7 | 163.80 | 9 | 87.5676 | 251.369 | 23 | 250.909 | 0.4603 | 109.091 |
| 5x12 | 92.5 + 82.7 | 174.20 | 9 | 87.5676 | 261.769 | 24 | 261.818 | -0.0491 | 98.182 |
| 6x12 | 101.9 + 82.7 | 184.56 | 9 | 87.5676 | 272.131 | 25 | 272.727 | -0.5963 | 87.273 |
| 4x13 | 81.1 + 93 | 174.10 | 9 | 87.5676 | 261.670 | 24 | 261.818 | -0.1480 | 98.182 |
| 5x13 | 91.5 + 93 | 184.50 | 9 | 87.5676 | 272.070 | 25 | 272.727 | -0.6574 | 87.273 |
| 6x13 | 101.9 + 93 | 194.86 | 8 | 77.8378 | 272.702 | 25 | 272.727 | -0.0252 | 87.273 |
| 4x14 | 81.1 + 103.3 | 184.40 | 8 | 77.8378 | 262.239 | 24 | 261.818 | 0.4207 | 98.182 |
| 5x14 | 91.5 + 103.3 | 194.80 | 8 | 77.8378 | 272.639 | 25 | 272.727 | -0.0887 | 87.273 |
| 6x14 | 101.9 + 103.3 | 205.16 | 8 | 77.8378 | 283.000 | 26 | 283.636 | -0.6359 | 76.364 |

FIG. 42

Channel Three Selected Acceleration and Deceleration Matrix

6200

| 6001 | 6002 | 6003 | 6004 | 6005 | 6006 | 6007 | 6008 | 6009 | 6010 |
|---|---|---|---|---|---|---|---|---|---|
| Channels: Accel. + Decel. Teeth Degrees | | Matrix Degrees | TOP Landing Teeth | TOP Landing Degrees | Matrix plus Top Landing Degrees | BOTTOM Track Teeth | BOTTOM Track Degrees | THE ERROR Matix - Bottom | Remaining Space for BOTTOM Landing |

Channel 3

| | | | | # x 8.780488 | | | # x 9.72973 | | |
|---|---|---|---|---|---|---|---|---|---|
| 5x13 | 82.2 + 83.4 | 165.64 | 10 | 87.8049 | 253.442 | 26 | 252.973 | 0.4692 | 107.027 |
| 6x13 | 91.5 + 83.4 | 174.93 | 10 | 87.8049 | 262.734 | 27 | 262.703 | 0.0318 | 97.297 |
| 6201 | | | | | | | | | |
| 7x13 | 100.8 + 83.4 | 184.20 | 10 | 87.8049 | 272.009 | 28 | 272.432 | -0.4232 | 87.568 |
| 5x14 | 82.2 + 92.7 | 174.88 | 10 | 87.8049 | 262.683 | 27 | 262.703 | -0.0194 | 97.297 |
| 6x14 | 91.5 + 92.7 | 184.17 | 10 | 87.8049 | 271.976 | 28 | 272.432 | -0.4569 | 87.568 |
| 7x14 | 100.8 + 92.7 | 193.45 | 9 | 79.0244 | 272.470 | 28 | 272.432 | 0.0375 | 87.568 |
| 5x15 | 82.2 + 101.9 | 184.12 | 9 | 79.0244 | 263.143 | 27 | 262.703 | 0.4399 | 97.297 |
| 6x15 | 91.5 + 101.9 | 193.41 | 9 | 79.0244 | 272.435 | 28 | 272.432 | 0.0025 | 87.568 |
| 7x15 | 100.8 + 101.9 | 202.69 | 9 | 79.0244 | 281.710 | 29 | 282.162 | -0.4525 | 77.838 |

FIG. 52

Deceleration Channel Footprint Specifications

9700

9701 Top Boundary

| Channel | 9702 top right corner upper | lower | 9703 | 9704 net Theta | 9705 Rho | 9706 Boundary Coefficient | 9707 top ring | 9708 Plus 0.6 inch lower | 9709 bottom ring upper |
|---|---|---|---|---|---|---|---|---|---|
| 1 | 190.9572 | 16.5356 | | 174.4216 | 0.911 | 0.00522298 | 2.3251 | 2.9451 | 3.8364 |
| 2 | 107.9829 | 303.4608 | | 164.5221 | 0.911 | 0.00553725 | 4.4195 | 5.0395 | 5.9309 |
| 3 | 24.3397 | 227.8161 | | 156.5236 | 0.911 | 0.00582021 | 6.5139 | 7.1339 | 8.0250 |

9710 Bottom Boundary

| Channel | 9711 bottom left corner upper | lower | 9712 | 9713 net Theta | 9714 Rho | 9715 Boundary Coefficient | 9716 top ring lower | 9717 bottom ring bound. | 9718 Minus 0.6 inch upper |
|---|---|---|---|---|---|---|---|---|---|
| 1 | 263.9572 | 99.5356 | | 164.4216 | 0.911 | 0.00554063 | 2.3251 | 3.8364 | 3.2364 |
| 2 | 172.9829 | 16.4608 | | 156.5221 | 0.911 | 0.00582026 | 4.4195 | 5.9309 | 5.3109 |
| 3 | 83.3397 | 292.8161 | | 150.5236 | 0.911 | 0.00605221 | 6.5139 | 8.0250 | 7.4050 |

# GEAR TRAIN AND TRANSMISSION SYSTEM UTILIZING THE SAME

CLAIM OF PRIORITY

This patent application claims the benefit of priority of U.S. Provisional Application No. 60/172,522, filed on Dec. 17, 1999.

BACKGROUND OF THE INVENTION

Transmission devices are gear trains that convert and transmit the power generated by a power source to comply with the load placed on the output shaft. Many prior art transmission devices, such as those commonly utilized in automobiles, require manual shifting among various gear ratios of the transmission. However, such transmissions are inherently inefficient due both to the loss of momentum caused by the removal of the power in order to change gears, and the inherent difficulty in determining the most efficient response to a load placed upon the output shaft.

A vast array of automatic transmissions are currently available. These transmissions do not require a manual determination of the most efficient response to a load placed upon the output shaft. In addition, they will typically reduce the time required to shift gears and, consequently, reduce the loss of momentum caused by the removal of power. Nonetheless, this loss of momentum, which is inherent in traditional automatic transmissions utilizing a variety of gear ratios, still results in a significant loss of power. In addition, the limited number of gear ratios available prevents these transmissions from achieving maximum efficiency.

In order to avoid momentum losses and attain maximum efficiency, it is desirable for a transmission to have a continuous, infinite range of gear ratios. Such a transmission would not require power to be removed in order to change gears and would be capable of efficiently responding to the various loads placed on the output shaft.

A number of United States Patents disclose continuous, or near-continuous, variable speed transmission. However, each has significant drawbacks. For example, U.S. Pat. No. 1,484,197 discloses a "change-speed transmission" that includes two conical wheels having teeth of uniform pitch throughout extending along the length of the cone and covering substantially one half of each conical surface. The cones are arranged to mesh with an intermediate wheel and are simultaneously rotated so that the teeth of one conical wheel move out of mesh with the intermediate wheel as the teeth of the other conical wheel move into mesh with the intermediate wheel. The gear ratio is varied by varying the position of the intermediate wheel relatively to the large and small diameters of the conical wheels.

This arrangement is successful at varying the gear ratio without loss of momentum. However, such a system creates inherently high shear stresses that severely limit its useful life. These shear stresses are explained by the fact that the circumference of the cylinder at its front and rear edges is the same, but these circumferences are forced to frictionally and rotatably engage with different-sized same, but these circumferences are forced to frictionally and rotatably engage with different-sized circumferences on the conical surface. As the wider portions of the conical surface travel faster that the narrower portions, the equal circumference of the cylinder respectively engages different-sized circumferences on the conical surface necessarily traveling at different speeds. This causes some portions of the cylinder to slip and rub against the faster conical portions resulting in shear forces.

U.S. Pat. Nos. 2,208,148 and 2,926,538 each describe a "change speed gear" having a plurality of stepped gears arranged side by side on a cone drum and a cylindrical control gear displaceable disposed along a line of the surface of the cone of stepped gears on the driving shaft. Each stepped gear is diametrically subdivided and the two halves of the toothed rim of each step are displaced relative to each other. The spaces between steps are subdivided and staggered and the widths of the spaces is equal to half the width of the teeth of the control gear. The difference in the number of teeth from step to step is divided by two such that the opposite spaces between the points of bisection of the displaced rim halves of all steps are aligned. In operation, the control gear is caused to change its position relative to the cone drum in a synchronized manner such that it moves from one gear to the next in a stepped motion.

As this system utilizes the same cylindrical type control gear as described above, it suffers that same shear stress problems. In addition, the averaged tooth arrangement disclosed in these patents creates both wear and shock on the gears when changing from one set of teeth to another. For this reason, it is useful only at very low speeds.

U.S. Pat. No. 2,234,653 describes a variable transmission having two shafts around which series of teeth are wound. Each series of teeth forms a helix of decreasing diameter, with the teeth of one shaft being aligned with a space between teeth on the other. A spur gear is mounted between the shafts and is dimensioned to engage teeth on both shafts. The movement of the spur gear upward or downward causes it to engage teeth on both shafts, then teeth on only one shaft, and then teeth on both shafts again, with each movement causing an instantaneous change in the gear ratio.

This system does not require power to be removed from the transmission and provides the desired variability. However, the cylindrical nature of the spur gear of the compensation member causes it to suffer from the same shear stress problems described above. In addition, the use of substantially straight teeth causes discontinuous contact between teeth resulting in rapid increases and decreases in stress during gear changes.

U.S. Pat. No. 2,697,365, titled "Power Transmission Equipment", describes "a mechanism for producing positive infinitely variable speed changes in a power transmission system." The mechanism includes "at least two conical gear members having uniformly spaced teeth generated in a constant lead spiral path on the conical surface of each of said conical gear members." A compensation member, in the form of a spur gear, is interposed between, and engaged with, the conical members such that the axial position of the compensation member with respect to conical gear members determines the speed ratio obtained between the input and output members. In order to vary the speed ratio, the compensation member is disengaged from the conical members.

This system provides the desired variability. However, the cylindrical nature of the spur gear of the compensation member causes it to suffer from the same shear stress problems described above. In addition, the narrow tooth width required by this transmission decreases the overall strength of the teeth.

U.S. Pat. No. 2,875,628 describes a variable speed transmission that utilizes conical gears mounted in opposite relation to each other and each having sets of rigidly attached gear segments bounded by sets that are frictionally engaged with the rigidly attached segments. A spur gear is mounted between, and engaged with, the conical gears. The spur gear is adjustable upward and downward between the conical gears and shift gear ratios by moving from engagement with a rigidly attached gear segment to a frictionally engaged gear segment and then to the next rigidly attached gear segment.

This system is substantially continuous and provides an increased degree of variability. However, the cylindrical nature of the spur gear causes it to suffer from the same shear stress problems described above. Further, the lack of alignment between slopping and non-slipping teeth creates high stresses when going from a slipping portion to an adjacent non-slipping portion.

More recently, U.S. Pat. No. 5,407,399 describes a "variable speed friction transmission" A variable ratio friction transmission in which a straight sided cone and a roller are in frictional engagement. The roller moves over an element of the cone to change the speed ratio, and at all times stays parallel to itself and moves along a straight line axis. This axis passes through the apex of the cone at all times, but the cone is tilted about its apex to contact the roller or wheel as the ratio is changed.

This system is substantially continues and provides an increased degree of variability. In addition, the frictional engagement of the wheel with the cone eliminates the stress problems encountered with the meshing of spur gears with conical surfaces. However, the frictional engagement of this system severely limits it ability to operate under heavy loads. Further, frictional engagement is prone to wear and, consequently, the frictional surfaces on such a system would need to be replaced regularly.

U.S. Pat. No. 5,425,685 describes a "continuously variable-ratio transmission". This transmission includes a drive shaft having a series of curved teeth that are disposed in the same direction of the shaft and of such a shape that one end has a relatively small diameter and the other a relatively large diameter. A conical gear is engaged with the teeth and is flexibly attached to a splined shaft via a second gear and a universal joint. The splined shaft is attached to a second universal joint to allow it to maintain a constant angle relative to the surface of the shaft, allowing the conical gear to conform to the angle of the surface of the teeth formed on the shaft. In operation, the speed is changed by moving the conical gear up and back along the surface of the drive shaft.

This system is also substantially continues and provides an increased degree of variability. However, it also relies upon frictional engagement, severely limiting its ability to operate under heavy loads and making it prone to wear.

U.S. Pat. No. 5,545,101 describes a "friction type continuously variable transmission" in which a planetary gear unit is attached to a frictionally engaged continuously variable unit. The planetary gear unit has a drive shaft, a carrier fixed to the drive shaft, a plurality of planetary gears supported on the carrier, and an internal gear meshing with the planetary gears. The continuously variable transmission unit has an input shaft to which is fixed to a sun gear meshing with the planetary gear.

This system is substantially continuos and provides an increased degree of variability. In addition, the frictional engagement of the wheel with the cone eliminates the stress problems encountered with the meshing of spur gears with conical surfaces. Finally, the integration of the planetary system allows the impeller to be rotated at a high speed even if the speed ratio of the continuously variable transmission unit is low. However, it is not without its drawbacks. As with all frictional systems, the frictional engagement of this system severely limits it ability to operate under heavy loads. Further, frictional engagement is prone to wear and, consequently, the frictional surfaces on such a system would need to be replaced regularly.

U.S. Pat. No. 5,601,509 describes a "taper roller continuously variable transmission" that includes a set of power input cones tapered in a first direction and a set of power output cones tapered in a opposite direction. Each cone has an axis of rotation oriented such that a portion of a surface parallel to a portion of the surface of each of the other cones in the same set. A power transfer ring tractionally engages the sets of cones on the parallel portions to transfer power from the input to the output set of cones. The power transfer ring is movable axially along the parallel portions to vary the speed ratio from the power input cones to the power output cones.

This system is also substantially continues and provides an increased degree of variability. However, it again relies upon frictional engagement, severely limiting its ability to operate under heavy loads and making it prone to wear.

SUMMARY OF THE INVENTION

The present invention is a transmission apparatus, transmission system, and method for varying a speed of an output shaft. In its most basic form, the transmission apparatus includes a pinion gear having a plurality of helical teeth. A cone is disposed in contact with said pinion gear and includes a plurality of conic teeth and a plurality of scaling teeth. The conic teeth are arranged about the cone to form a plurality of conic rings disposed about a plurality of nascention circles on the cone. The conic teeth of the conic rings are dimensioned to mate with the helical teeth of the pinion gear such that the conic teeth neutralize a change in surface speed of the cone along the conic teeth. The scaling teeth form at least one acceleration channel and at least one deceleration channel extending from each of the conic rings and intercepting an adjacent conic ring. The acceleration channel and deceleration channel are disposed along a nascention offset line between nascention circles of adjacent conic rings.

In operation, the pinion gear moves about a given conic ring at a substantially constant speed until a higher or lower speed is desired. If a higher speed is desired, the pinion gear is moved into an acceleration channel, which allows the gear to move to a higher conic ring. If a lower speed is desired, the pinion gear is moved into a deceleration channel, which allows the gear to move to a lower conic ring.

In the preferred transmission apparatus, the acceleration channel includes an acceleration channel entrance, an acceleration tube, and an acceleration channel exit, and the deceleration channel includes a deceleration channel entrance, a deceleration tube, and a deceleration channel exit. In this preferred embodiment, the acceleration channel entrance of one acceleration channel and the deceleration channel exit of one deceleration channel overlap along a bottom landing made up of the conic teeth of one of the rings. Likewise The deceleration channel entrance of one deceleration channel and the acceleration channel exit of one acceleration channel overlap along a top landing, the top landing comprising conic teeth of another of the rings. In embodiments utilizing stepped scaling teeth, a plurality of tapered spaces are disposed between the scaling teeth and a pitch line of each scaling tooth is varied dependent upon a migration of nascention coordinates of the scaling teeth on the nascention-offset line. However, in the preferred embodiment, the scaling teeth are substantially continuous, and the pitch line is based upon a migration of the nascention coefficients between conic rings. Finally, the conic teeth of the preferred apparatus are dimensioned to form a plurality of spaces having an involute profile.

The system of the present invention includes the apparatus of the present invention, a splined power output shaft attached to the pinion gear, a power input shaft attached to the cone, and a motion control device in communication with the pinion gear and dimensioned to move the pinion gear along said splined power output shaft. In the preferred system, the motion control device includes a control yoke movably attached to the threaded shaft, a control motor for rotating the threaded shaft, and a microprocessor for controlling the control motor. A rotational encoder is provided to determine a degree of rotation of said cone from a zero point, a lateral sensor is provided to encode a lateral location of said pinion gear, and a load sensor is provided for sensing an amount of torque on the system. Finally, the microprocessor includes an algorithm for accepting inputs from the rotational encoder, the lateral sensor and the load sensor and calculating a translocation speed based upon said inputs.

Therefore, it is an aspect of the invention to provide a transmission that avoids momentum losses by not requiring power to be removed in order to change speed.

It is an aspect of the invention to provide a transmission that has an infinite range of gear ratios.

It is an aspect of the invention to provide a transmission that is capable of efficiently responding to the various loads placed on the output shaft.

It is an aspect of the invention to provide a transmission that avoids the shear stress problem attendant to the use of cylindrical spur gears in contact with conical gears.

It is an aspect of the invention to provide a transmission in which the arrangement of rings prevents excessive sliding within the gears.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 40 is a table showing selected acceleration and decelerations matrixes for channel one.

FIG. 41 is a table showing selected acceleration and decelerations matrixes for channel two.

FIG. 42 is a table showing selected acceleration and decelerations matrixes for channel three.

FIG. 52 is a table showing specifications for a footprint of one deceleration tube.

DEFINITIONS OF KEY TERMS

Figure 1:
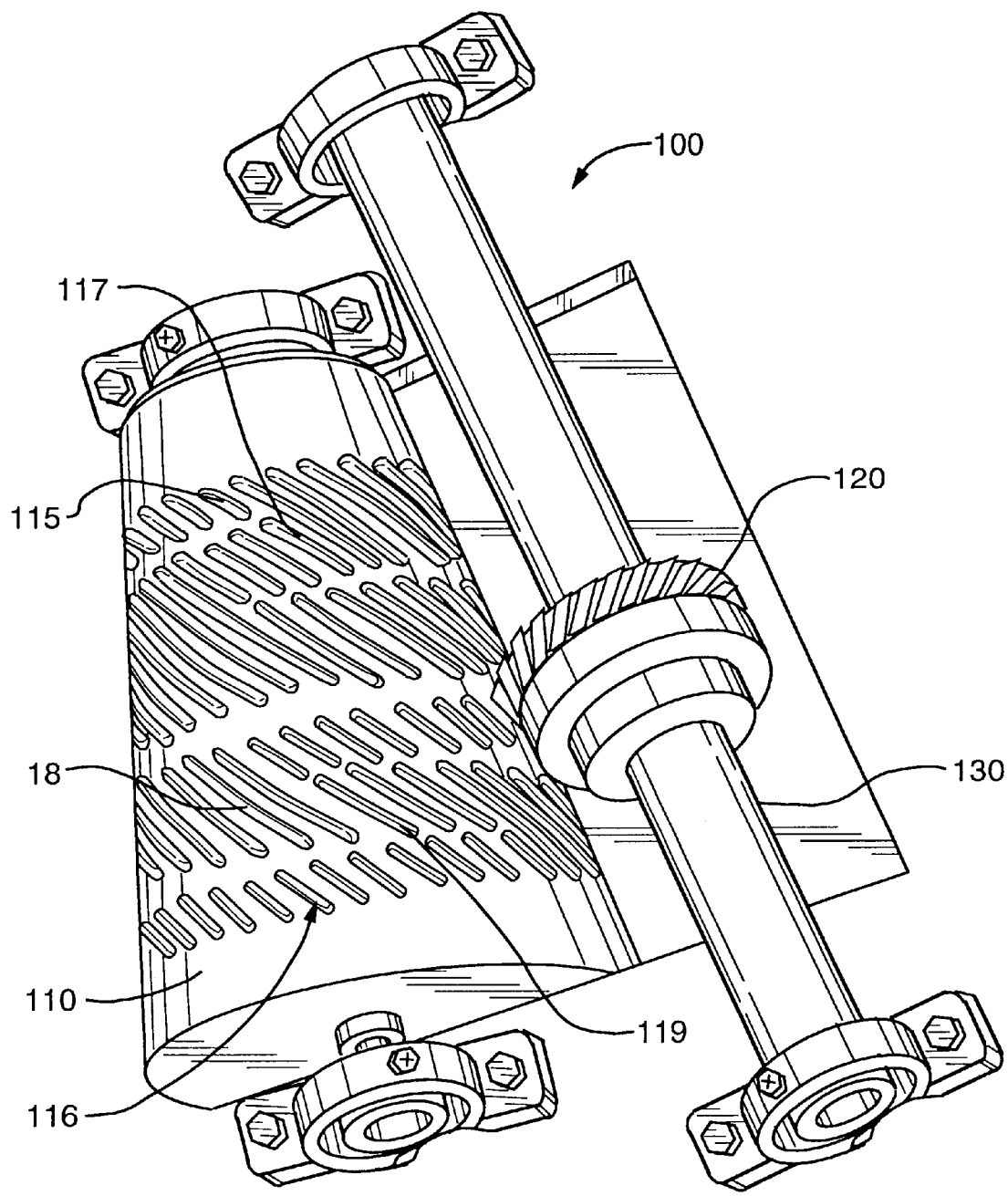
FIG. 1 is an isometric view of one embodiment of the gear train of the present invention.

As used in herein, the following terms shall have the following specific meanings. These meanings are intended to clarify, and not be repugnant to, the commonly used meaning accorded to each term.

Acceleration Channel: A channel that accelerates the pinion gear while it is moving up the cone.

Acceleration Channel Entrance: Ring teeth that are extended upwards into the acceleration channel. The extensions of the tooth pitchline are the ascending spirals that intersect with the channel's top boundary.

Acceleration Channel Exit: Ring teeth that are extended downwards to the tubes' bottom boundary.

Acceleration Channel Tube: The part of the Acceleration Channel that contain the scaling teeth and where the acceleration in speed occurs.

Ascending Spiral: The plotting of the tooth's edge above the nascention circle. This has accumulative sliding between the surfaces.

Boundaries: There are two types, ring and channel. The channel boundaries are top and bottom and represent the spirals on the pitch line that intercept them. The actual plot of the boundary is a function of the path of the footprint. The ring boundaries are top and bottom and their plot is the fixed width from the rings' nascention circle.

Bottom Landing: The angular displacement contained in three hundred and sixty degrees minus the bottom track. The space for the overlapping deceleration channel exit and acceleration channel entrance. It is a segment of a ring, with the other segment being the bottom track.

Bottom Ring Boundary: The conic teeth that are extended in a descending direction stop at this boundary.

Bottom Tube Boundary: The scaling teeth that are extended in a descending direction stop at this boundary.

Bottom Track: The teeth between the acceleration tube beginning and deceleration tubes end. The bottom track has an angular displacement equal to the number of teeth times the circular pitch of the these teeth. This is compared to the combined acceleration top landing and deceleration for the smallest error.

Conix: The angle of the cone that is determined by the helix angle.

Conix Coefficient: This is used for plotting a line across the face of the cone. It is the facial distance (rho divided by the rotation of the cone (theta to yield a unit in Face per Degree (F/D).

Channel: The channel is a toothed passage that the pinion gear rotates through while it is concurrently sliding laterally. It consists of an entrance, tube and exit.

Channel Boundaries: The trace of the footprints' outer corners from one ring to another define the channel boundaries.

Deceleration Channel: A channel that decelerates the pinion gear while it is moving down the cone.

Deceleration Channel Entrance: Ring teeth extended downwards from the ring to the descending boundary.

Deceleration Channel Exit: Ring teeth that are extended upwards, where the extension of the tooth pitch line is an ascending spiral that stops at the ascending boundary.

Deceleration Tube: The portion of the deceleration channel where the gear ratio is fractionally reduced.

Descending Spiral: The tooth pitch line that extends from the nascention coordinate down to the boundary.

Footprint: When the pinion gear is meshed with a ring, its' outline forms a box having a width equal to that of the pinion gear plus clearance and a length long enough to include the meshing gears plus clearance. This footprint is used to determine the boundaries of the channels.

Landing Error: The angular displacement of the combined Acceleration Tube, Top Landing including overlapping exits and entrance, and Deceleration Channel Tube, minus the length of the bottom track. The is a comparison of the number of teeth in the bottom track times the circular pitch with the angular displace from the beginning of the acceleration tube and the end of the deceleration tube.

Nascention Coordinate: The coordinate from which a tooth's' ascending and descending spirals are extended to form the pitchline.

Nascention Circle: Every circle on the pitch surface of a cone that is divisible by the tooth circular pitch.

Nascention Coefficient: The coefficient used for plotting the pitch line of the conic teeth on the cones pitch surface. When a distance rho is divided by it, an angle theta is produced. When an angle theta is multiplied by it, a distance rho is produced.

Nascention Offset-Line: A migratory line from one ring to another that has a specific number of scaling teeth disposed upon it.

Nascention Offset-Line Angle: The angle between the nascention offset line and the nascention circle it originated on. This angle is on the surface of the cone.

Nascention Offset-Line Coefficient: A type of conix coefficient determined by the ring pitch divided by Nascention Offset-Line Theta.

Nascention Offset-Line Rho: The difference in height between beginning and end of the Nascention Offset-Line.

Nascention Offset-Line Theta: The angular rotation of the cone from the beginning and end of the Nascention Offset-Line.

Pitchline: the calculated edge of the tooth that is comprised of ascending and/or descending spirals. It is on the pitch surface of the cone.

Pitch Surface: A pitch surface is analogous to the pitch circle on a gear.

Ring: The ring is made of teeth with pitchlines from a specific nascention circle. It has an upper and lower ring boundary that is the width of the gear plus clearance.

Ring Boundaries: Top and Bottom; the width of the ring is the width of the pinion gear plus clearance. A specific distance from the rings' nascention circle defines the top and bottom boundaries of the ring.

Top Landing: The teeth on the upper ring between the acceleration tubes end and the deceleration tubes beginning. It encompasses overlapping entrance and exits.

Top Ring Boundary: The conic teeth that are extended in an ascending direction stop at this boundary.

Top Tube Boundary: The scaling teeth that are extended in an ascending direction stop at this boundary.

Translocation: The term used for movement of the gear from one ring to another, such as the gear translocates to ring three. There are many types of movements; this term differentiates the lateral movement of the gear.

DETAILED DESCRIPTION OF THE INVENTION

The present invention will be described in four specific portions. First, the basic concepts behind the invention will be presented. Second, an example of how a prototype was engineered is presented. Third, a control system for the present invention is discusses. Finally, a number of specific embodiments of the invention are described.

A. Basic Concepts

Referring first to FIG. 1 an isometric view of one embodiment of the gear train 100 of the present invention is shown. The gear train 110 includes a cone 110 with teeth 115 cut onto its surface forming a series of rings 116 bounded by acceleration channels 117 and deceleration channels 118. A pinion gear 120 is disposed on a shaft 130 and is dimensioned to mesh with the teeth 115 on the cone 110. The pinion gear 120 can be slid to different positions on its shaft 130 in order to change the gear ratios of the gear train 100.

The concept of the gear train 110 of the present invention, which is referred to as the Van Cor Transmission or VCT, is based on solving two problems: First, to develop toothed rings 116 on a conic surface that would mesh with a standard helical gear 120. Second, to create toothed channels 117, 118 between these rings 116 that fractionally change their speeds when moving the helical gear 120 from one ring 116 to another.

The teeth 115 in the rings 116 are called conic teeth. What is unusual about them is that the surface speed of the cone 110 changes with every change in the diameter of the cone 110. The conic teeth neutralize the change in the surface speed. How this is done is very unique and complex, but its application is simple and elegant.

Current engineering dogma states that fractional gear ratios are impossible. However, the specialized teeth 119 within the channels 117, 118 of the cone 110, referred to herein as scaling teeth, allow the gear ratio of the train to fractionally change while the gear 120 translocates from one ring 116 to another.

The gear train 100 shown in FIG. 1 is but a single example of the present invention. As will be explained in detail herein, there are as many variations in embodiments as there are tooth sizes. Further, for each tooth size, there is a huge range of cone designs with various lengths, number of gear ratios and channel specifications that can be built. Although many of the embodiments disclosed herein are examples of gear trains utilizing external cones, it is recognized that an internal cone may be designed utilizing the same process, albeit a process utilizing different tooling and machining techniques than are described herein.

Gear technology is one of the oldest sciences and the gear industry is heavily standardized. The type of gear used in the present invention is a helical gear. To find them in a catalog, the specific transverse diametral pitch, pressure angle and helix are the top headings of gear catalogs with tables for different number of teeth, pitch diameters and right or left handedness. The helix angle of forty-five degrees is the most common, with pressure angle choices being between 14½ and 20 degrees.

The terminology of the present invention is similar to gears. Referencing FIG. 2, the pitch circle 207 of a gear 200 is used in calculating the meshing with other gears. The circular pitch of a gear tooth is the circular thickness 202 of the tooth and tooth space 201 on the pitch circle. The pitch circle divided by the number of gear teeth is also the circular pitch.

The addendum 204 of a tooth is the distance from the pitch circle to the top circle 203. The top circle 203 is also the outside diameter of the gear. The dedendum 205 is the distance from the pitch circle 207 to the base circle 208. The base circle is used for calculating the involute profile of the tooth. These two distances equal the tooth's' working depth 211. The root circle 209 is the base circle minus the clearance 210. The calculations of the cone are on the "pitch surface" that mate with a gear's pitch circle 207. Adding the profile of the teeth causes the cone to have an addendum added to its pitch surface, creating the "outside surface", or "top surface" of the cone.

Figure 3:
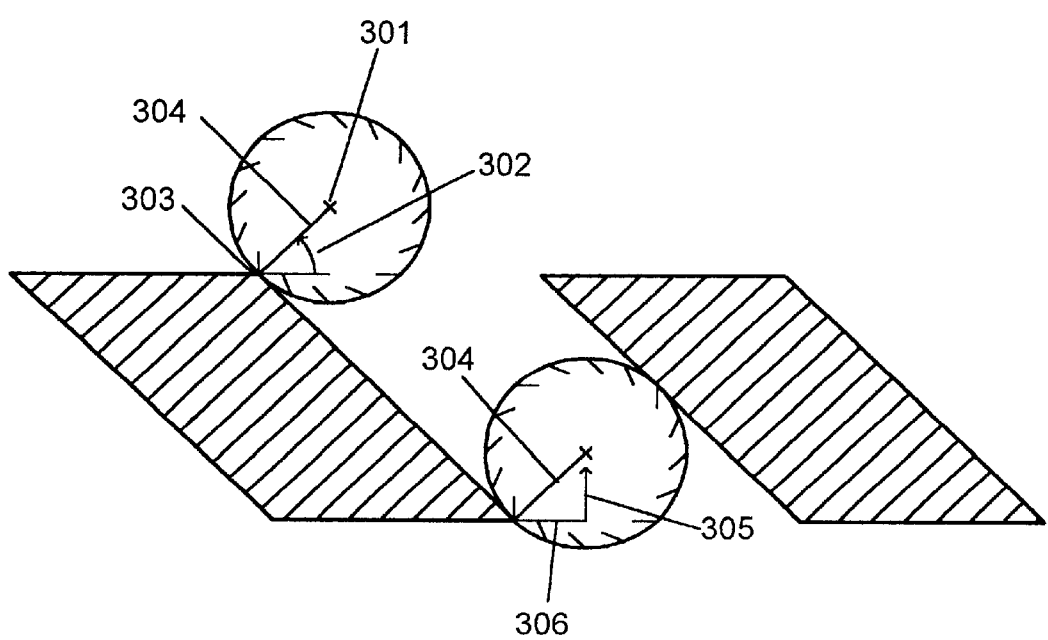
FIG. 3 is a diagrammatic view of a circular cutting tool and a pair of teeth.

In the preferred embodiment, the specifications for the pinion gears' cutting tool for shaping the teeth is the same for the cone's teeth, and requires it to produce a tooth space 201 with an involute profile on each side. FIG. 3 is a diagram of a circular cutting tool between the teeth. The center of the cutting tool 301 is tangent to the edge of the tooth 303. The angle 302 of the tangent is ninety degrees minus the helix angle and the vector 304 is the radius of the cutting tool at the pitch circle of a gear. This vector 304 has a specific Rho 305 and Theta 306 component that will be used in positioning the center of the cutting tool on the cone. All calculations will be based on the gears pitch diameter which will mate with the cones pitch surface such that every pitch circle on the cone is on the pitch surface.

Figure 5:
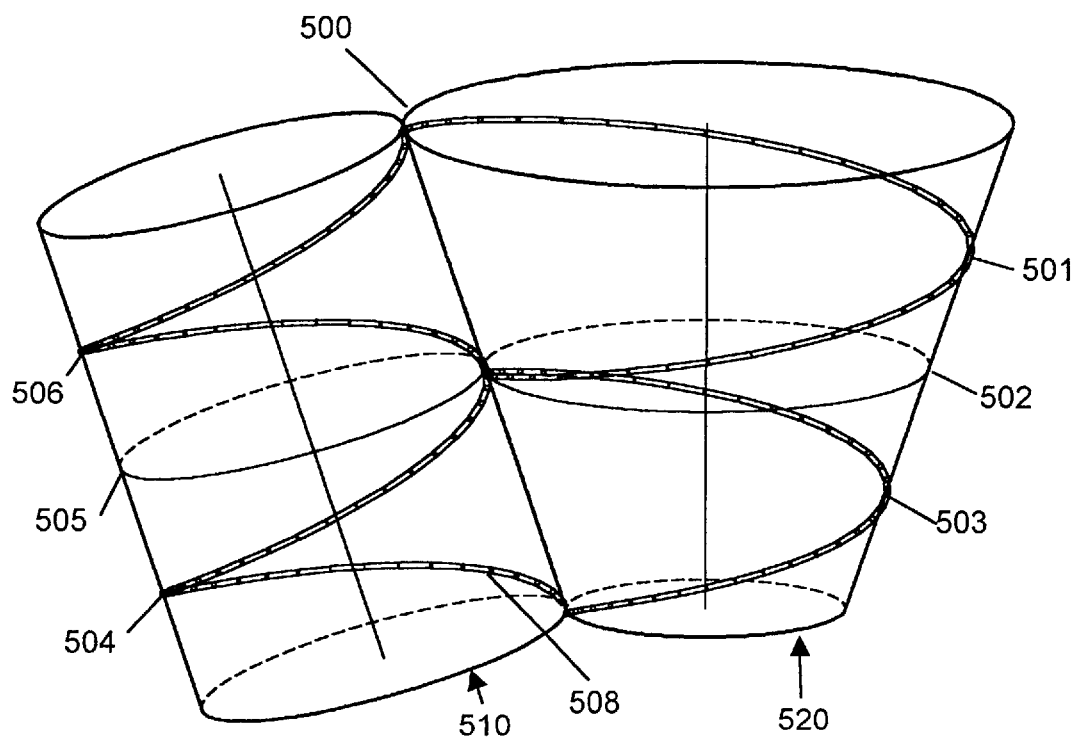
FIG. 5 is a diagrammatic view of matching cylinder helixes and cone spirals.

The concept of matching a cone surface with a cylinder surface is the basis for the present invention. Referring now to FIG. 5 a cone 520 is shown mated to a cylinder 510. There is a circle 502 in the middle of the cone 520 that is equal to the circle 505 in the middle of the cylinder 510. On the cone 520, this circle 502 is called a nascention circle. On the cylinder 510, this circle 505 is the pitch circle. The cylinder 510 has a helix that wraps around it twice 506,504. On the cone 520, the corresponding matching curves are spirals 501,503. When nascention 502 and pitch circles 505 turn at the same rate, all points on the helix 506,504 and the spirals 501,503 intercept.

The spiral above the nascention circle 502 is called the ascending spiral 501. When the helix 506 intercepts the ascending spiral 501, there are more points of contact on the cones' spiral. This is called conic sliding. There is no sliding at the nascention circle 502 and the pitch circle 505. The conic sliding increases the further up the ascending spiral 501 and away from the nascention circle 502.

The spiral below the nascention circle 502 is called the descending spiral 503. The helix 504 interception results in fewer points of contact on the cone 520 and more on the helix. This is "pinion sliding". The pinion sliding increases with the distance away from the nascention circle 502 down the descending spiral 503.

The amount of sliding increases with the length of the spirals such that more sliding occurs the further a gear moves up and down the cone 520 from the nascention circle 502.

Figure 6:
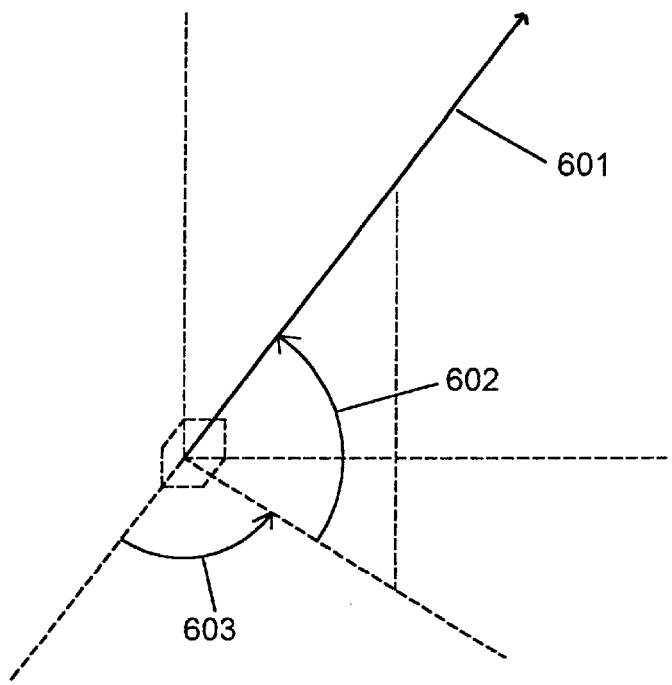
FIG. 6 is a diagrammatic view explaining the spherical coordinate system.
Figure 7:
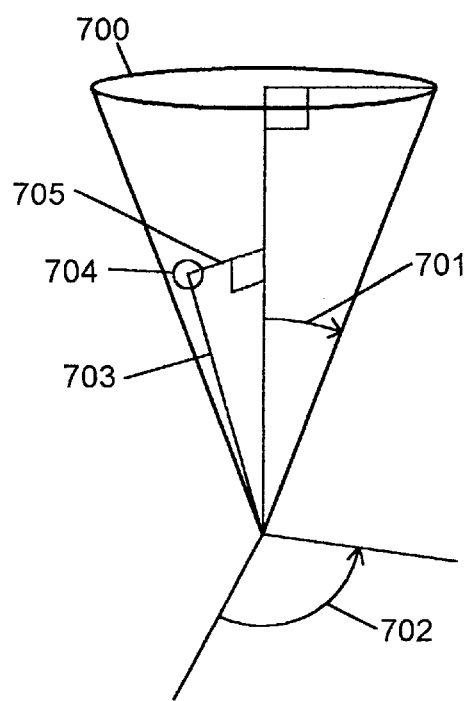
FIG. 7 is a diagrammatic view explaining the application of the spherical coordinate system to a cone.

In order to properly explain the calculation performed in order to design a gear train in accordance with the present invention, the basis for the coordinate system must be explained. First, FIG. 6 shows a three-dimensional spherical coordinate system. Such a system includes an angle Phi 602, angle Theta 603 and a vector Rho 601. FIG. 7 shows a conical coordinate system. In such a system, the fixed angle of the cone 700 is the conix 701, which is 90 degrees minus Phi angle 602 referenced in FIG. 6. The angle theta 702 is the rotation of the cone, and Rho 703 is the distance a point 704 is up the face of the cone from the apex. The radius 705 of any point 704 on the cone is trigonomic sine of the Conix angle 701 times Rho 703.

The conix angle 701 is the angle of the cone, as determined by a formula based on the pinion gears helix. The characteristic of this formula is that it produces the least amount of sliding along the spiral-helix intercepting lines.

Conix angle=arc sine((1/(2×pi×tan 90-degrees-helix))

For example, the angle of the cone is 9.15784951 degrees for a 45-degree helix. This angle is called the conix angle because it is derived from the gears' helix.

Figure 8:
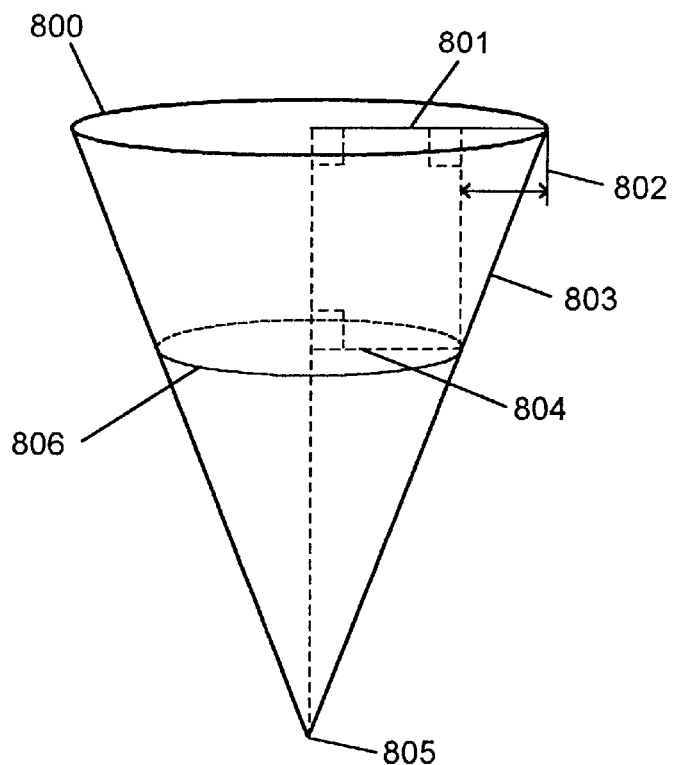
FIG. 8 is a diagrammatic view explaining the conic coordinate system.

Referencing FIG. 8, a base 806 for the cone 800 is assigned a fixed distance from the apex 805. This has a fixed base radius 804. From this base, relative values of Rho 803 are used. All values of Rho 803 used from this fixed base 804 have a relative radius 802 that has to be added to the fixed base radius 801,804 for the absolute radius. The term relative will be used in reference to local coordinates on the cone and the term absolute will be used in reference to the entire cone.

For example, given a cone with a conix angle 701 of 9.1578 degrees, a fixed base radius of two inches and a coordinate with a Rho of 1.5 inches and a Theta of 12.4 degrees, the 1.5-inch Rho is up the face of the cone from the base, the 12.4-degree Theta is the rotation of the cone from a zero reference point, and The relative radius is the sine of 9.1578 degrees times the 1.5-inch rho. This value is equal to 0.2387 inches. Adding this to the fixed base radius of 2 inches yields 2.2387 inches. This result is the radius of that coordinate. It is noted that the base of the cone is used for calculation purposes, while the fabricated bottom of the cone may be of a different radius.

The measure of any coordinate on the pitch surface will be in terms of Rho and Theta, where Rho is the distance up the face of the cone from the base and Theta is the rotation of the cone from a zero position. Further, any point on the cone is a point on a circle around the cone. The position on that circle is Theta. The circle is a specific distance from the apex of the cone. The base of the cone is a specific distance up the cone. All Rho values start with zero at the base; therefore, Rho is the distance from the base to the point.

There will be lines across the face of the cone. These will be determined by a conix coefficient and the unit is "Face per Degree" or F/D. That is Rho in inches divided by a Theta in degrees. There are several coefficients of this type. They are classed as conix coefficients because their values can only be true for a cone of this specific conix angle.

The conversion using the "Face per Degree" units is a distance Rho divided by the conix coefficient yields the Theta in degrees. For example, a Rho of 0.25 inches divided by a conix coefficient of 0.0449 will yield a Theta of 5.566689 degrees. Conversely, a Theta angle, multiplied by the conix coefficient will produce the Rho. Accordingly, in the above example, a Theta of 5.566689 times 0.04491 is equal to a Rho of 0.25 inches.

The Conix coefficients are used to draw lines across the surface of the cone. They have a left and right handedness and a direction that determines its sign. A positive coefficient is ascending left-handed or descending right-handed. A negative coefficient is descending left-handed or ascending right-handed.

Figure 9:
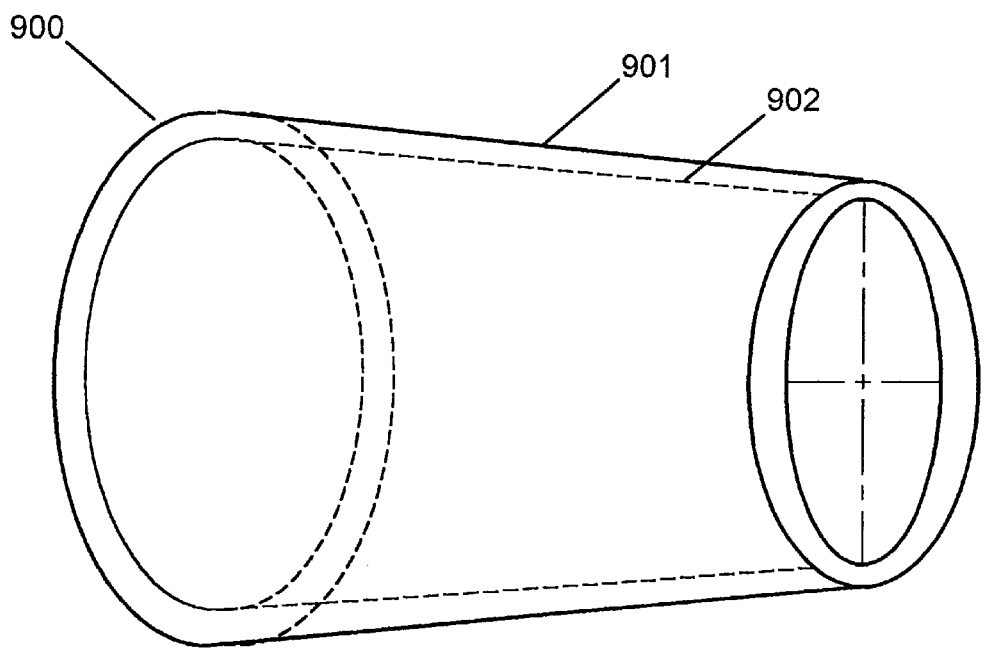
FIG. 9. is a cut away isometric view of a cone showing outside and pitch surfaces.

Referencing FIG. 9, the cone 900 has two surfaces, the pitch surface 902 and the outside surface 901. These correspond with a gears pitch circle and outside circle. The pitch surface 902 is used for all calculations. The outside surface 901 becomes the top of the conic teeth and is the outside dimension used for fabrication.

Figure 2:
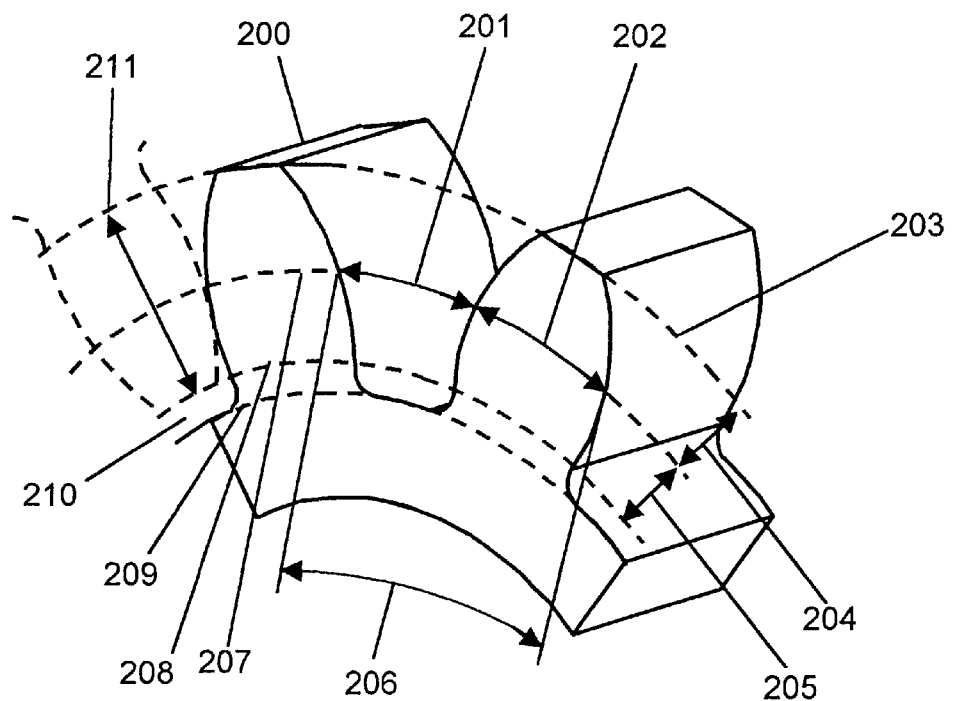
FIG. 2 is a cut away isometric view of a the teeth of a pinion gear utilized in one embodiment of the gear train of the present invention.

As noted in connection with FIG. 2, the standard measure of a gear tooth is its circular pitch 206. This pitch is the distance from one tooth to another along a gears pitch circle. On a cone, a circle composed of a fixed number of circular pitches is a nascention circle. Such a circle has a radius and Rho on the cone.

Figure 10:
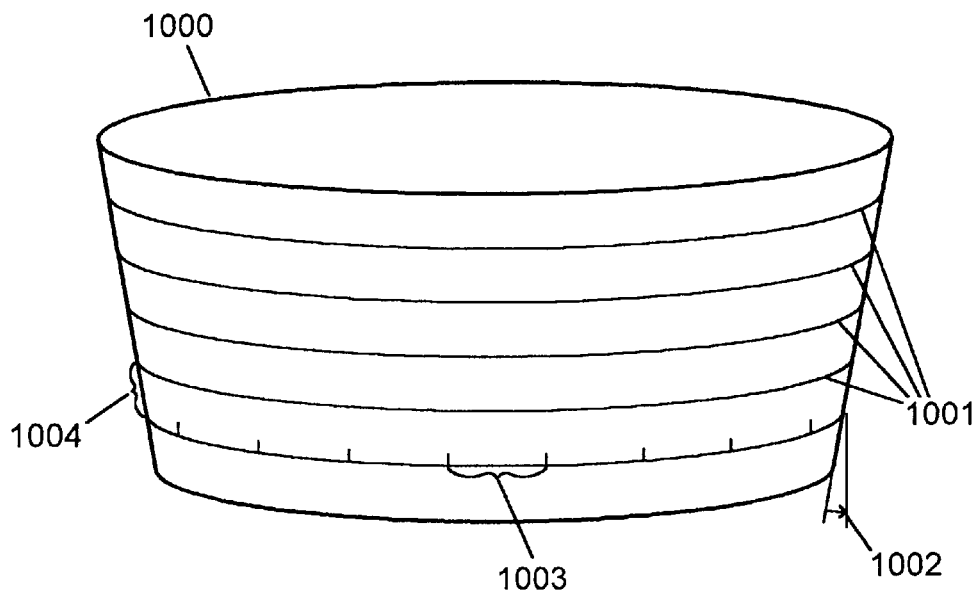
FIG. 10. is an isometric view of a cone showing nascention circles on the cone.

FIG. 10 shows a cone 1000 with nascention circles 1001. The distance between the nascention circles is a function of one circular pitch. For a circular pitch 1003 of 0.523599 inches, 25 teeth would have a circumference of 13.08998 inches. This, divided by 2*pi, is a radius of 2.08333. The next nascention circle is the circular pitch 0.523599 times 26 teeth equaling a circumference of 13.61357 inches. That divided by 2*pi yields a radius of 2.16667 inches. Each additional tooth adds another circle around the cone. The difference between the radii of the nascention circles is 0.08334 inches. This is a fixed difference and is called the radius pitch 1002.

Another difference between the nascention circles is a fixed face distance. The radius pitch of 0.08334 inches divided by the sine of the conix of 9.1578 degrees is 0.523634 inches. This is called the facial pitch 1004. The facial pitch is equal to the circular pitch because the helix is a 45-degree angle and its height, the facial pitch, is equal to its width, the circular pitch.

Figure 4:
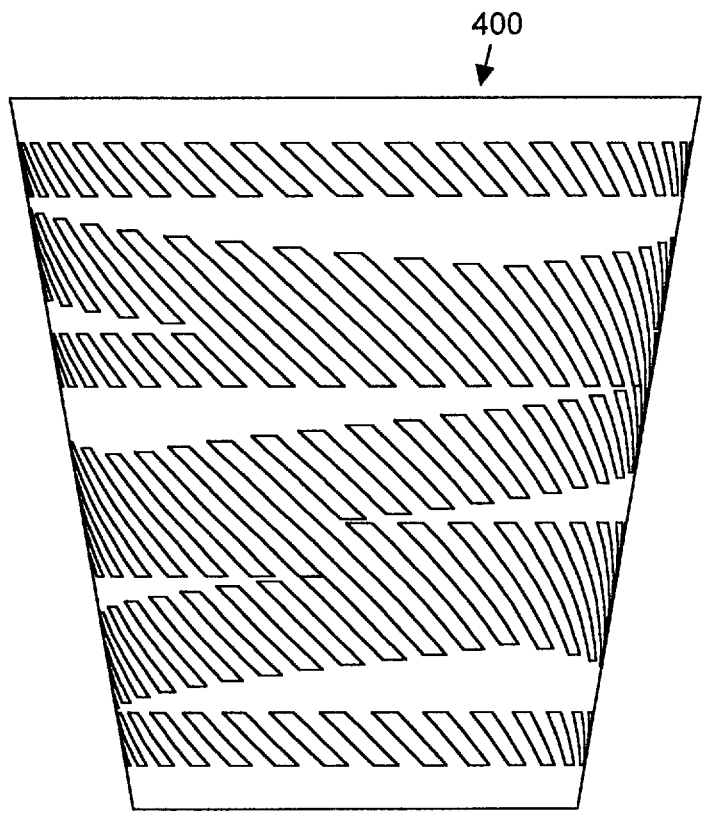
FIG. 4 is a side view of the pitch surface of one embodiment of the cone.
Figure 11:
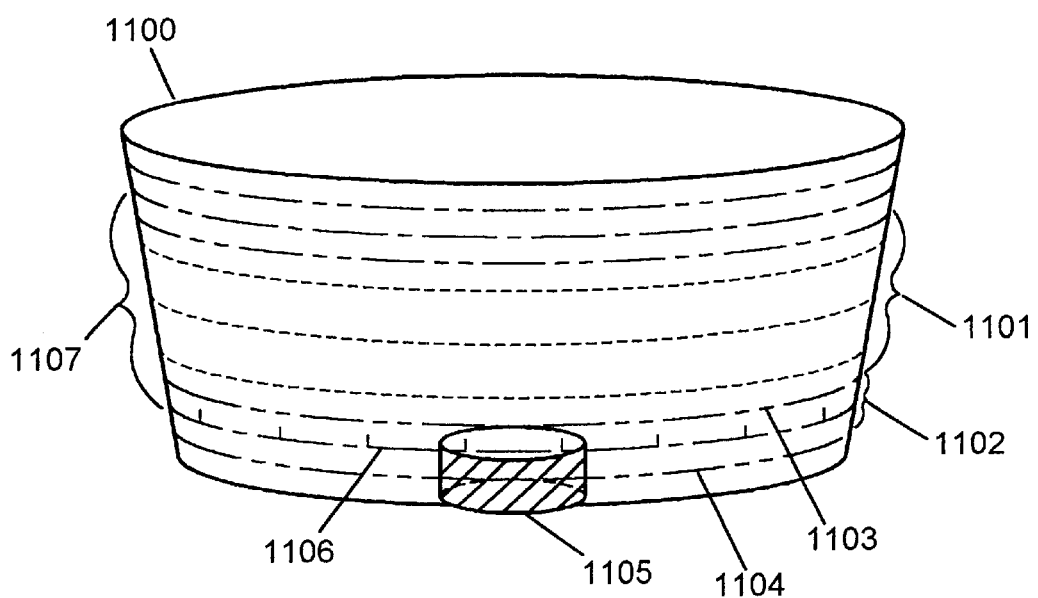
FIG. 11. is an isometric view of a cone showing nascention circles and rings on the cone.
Figure 12:
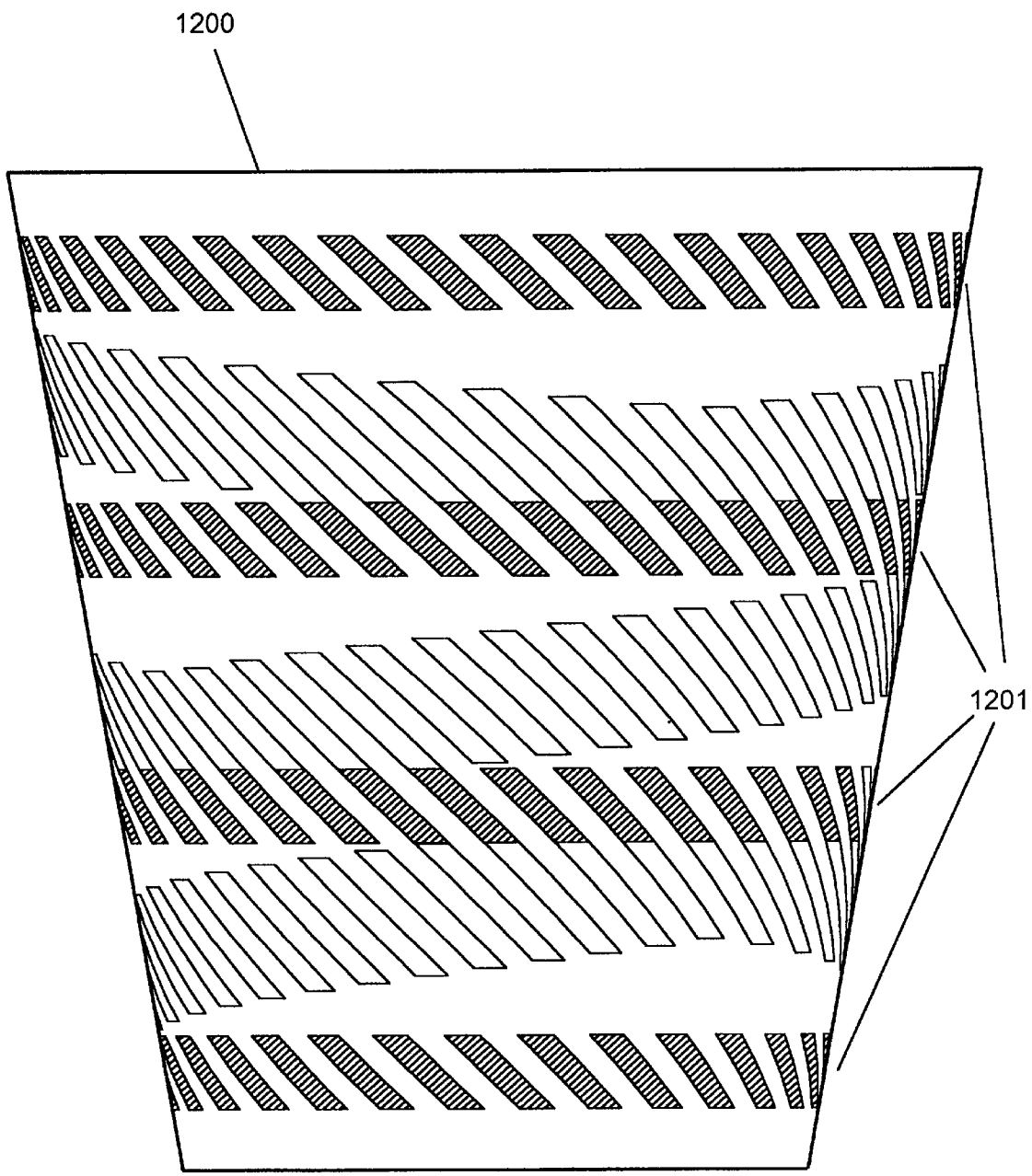
FIG. 12 is a side view of the pitch surface of one embodiment of the cone with the rings highlighted.

The nascention circle is a multiple of the gears' circular pitches 1002. Referencing FIG. 11, the width of this gears 1105 face and its orientation on the nascention circle 1106 determine the conic ring 1102. The orientation of the gear 1105 is where it intersects the nascention circle 1106. If it is to be in the middle of the gear, then 50% of the gear extends above the nascention circle and 50% extend below. This determines the rings' upper 1103 and lower 1104 boundaries. The actual ring will have a top and bottom clearance added to this width. For calculation purposes, the gear width will be used 1105. FIG. 4 shows one embodiment of the cone 400, which was used to create a prototype. FIG. 12 highlights the rings 1201 on a cone 1200.

Each ring 1201 is a specific number of facial pitches apart as measured from the rings' nascention circle. It does not have to be a fixed number but it can be. This distance is called a ring pitch 1107. If the number of facial pitches 1102 between the rings nascention circles 1106 are fixed, then the ring pitches are equal. The multiple of facial pitches between rings has to be in multiples of two, as the rings are linked by the acceleration and deceleration channels.

The distance between the rings is the ring space 1101. This space is where the pinion gear will change its speed. The width of the gear is one of the factors. The gear has to move out of the ring completely before it can go into another ring, so the space has to be wide enough for the gear. If the rings have the nascention circles in their center or the same position on the gear, then the width of the ring spaces 1101 will be the ring pitches 1107 minus the width of the gear 1105.

Figure 13:
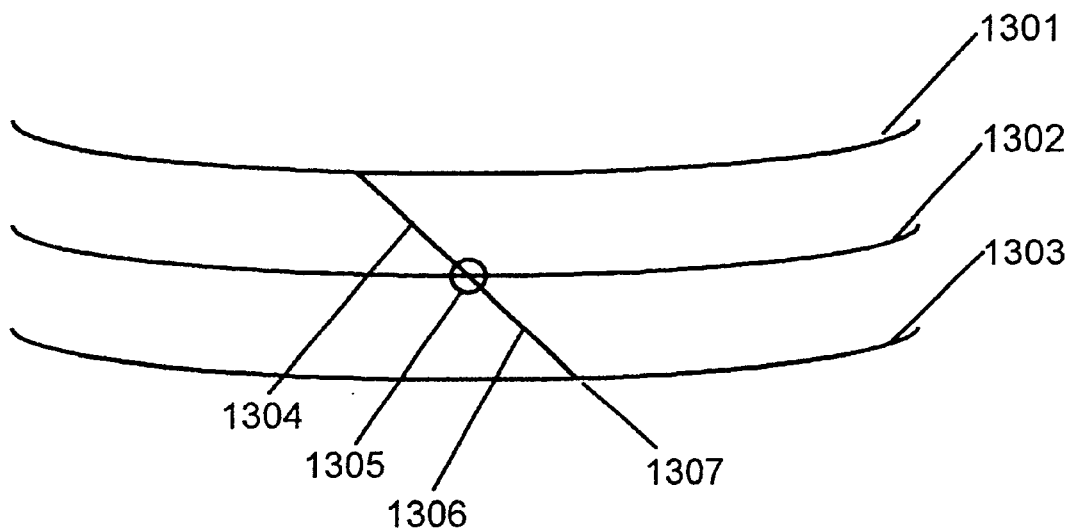
FIG. 13 is a diagrammatic view showing a ring and a pitchline.

Referencing FIG. 13, the teeth in each ring originate from the rings' nascention circle 1302. The plots of the teeth are mathematical spirals. From the nascention coordinate 1305, an ascending spiral 1304 is plotted to the upper boundary 1301 of the ring. The descending spiral 1306 plots to the lower boundary 1303 of the ring. Combined, these spirals form the pitch line 1307 of a tooth. The rings' nascention coefficient is used to plot these spirals by dividing each incremental distance Rho up the cone by the nascention coefficient to get the Theta angle of rotation of the cone. From the nascention coordinate, the distance rho and the angle theta are relative.

A nascention coordinate has an absolute conix coordinate of Rho and Theta. The relative Rho and theta derived from the coefficient calculations have to be added into these absolute values for the absolute location of the pitch line coordinates.

The nascention coefficient is unique to the each ring's nascention circle. First, 360 degrees is divided by the circumference of the nascention circle for an inch per degree rotational unit. Next, the tangent to the helix angle is divided by this rotational unit to yield the nascention coefficient. This unit equates the rho distance on the face of the cone with the cones' rotation in terms of "Face/Degree", the number of inches on the cones' face per degree of rotation.

For example, a ring of 25 teeth times a circular pitch of 0.523599 inches is a circumference of 13.089975 inches. The 360 degrees divided by this circumference is 27.50196 inches per degree. The tangent of the 45-degree helix is 1. One divided by the 27.50196 is a nascention coefficient of 0.03636104 F/D. The ascending spiral extends 0.25 inches above the nascention coordinate and the 0.25 inches divided by the nascention coefficient of 0.03636104 is 6.8754906 degrees. Thus, for a Rho of 0.25 inches up the cone, Theta is 6.875 degrees. This is the distance "up" and the number of degrees "over" for the end of that spiral. A negative Rho would yield a negative Theta and is extended downwards.

The handedness and direction determine the sign. If the conic teeth are left-handed, then the ascending spirals will be in the positive clockwise direction, adding to the angular rotation. If the conic teeth were right-handed, then their ascendancy would be in a counter-clockwise direction, subtracting from the angle. For example, the pitch line 1304 in FIG. 13 is left-handed as it extends upward to the left.

The descending spiral is the opposite sign of the ascending spiral. For a Rho value of −0.25 inches, Theta is −6.875 degrees. These are relative values that are added to the nascention coordinates absolute values for absolute value. If the absolute value of the nascention coordinate is 1.5 inches and 12.4 degrees, then the relative value of the descending spiral of −0.25 inches and −6.875 degrees will yield an absolute value of 1.25 inches and 5.528 degrees. For an ascending spiral with a positive 0.25-inch Rho and 6.875-degree Theta, the absolute value of Rho is 1.75 inches and Theta is 19.275 degrees.

Figure 14:
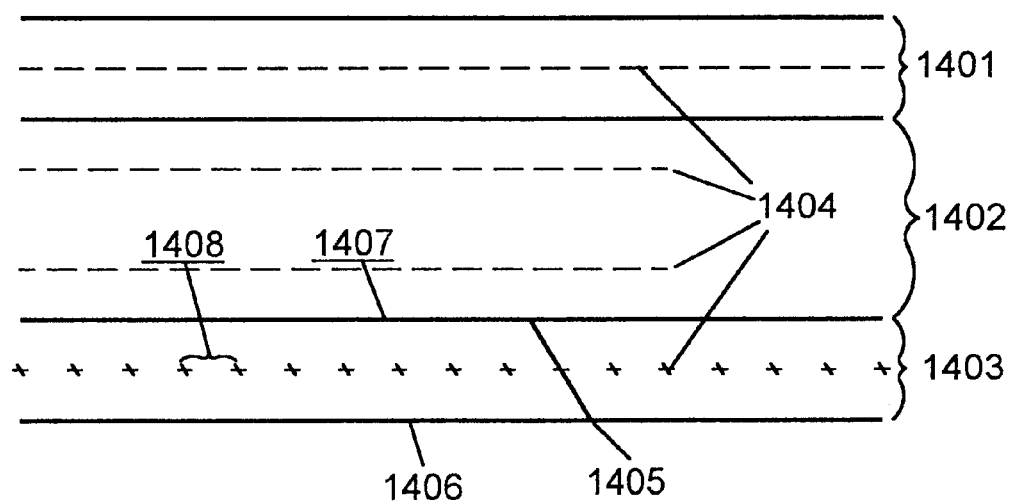
FIG. 14 is a diagrammatic view showing rings and ring space.
Figure 15:
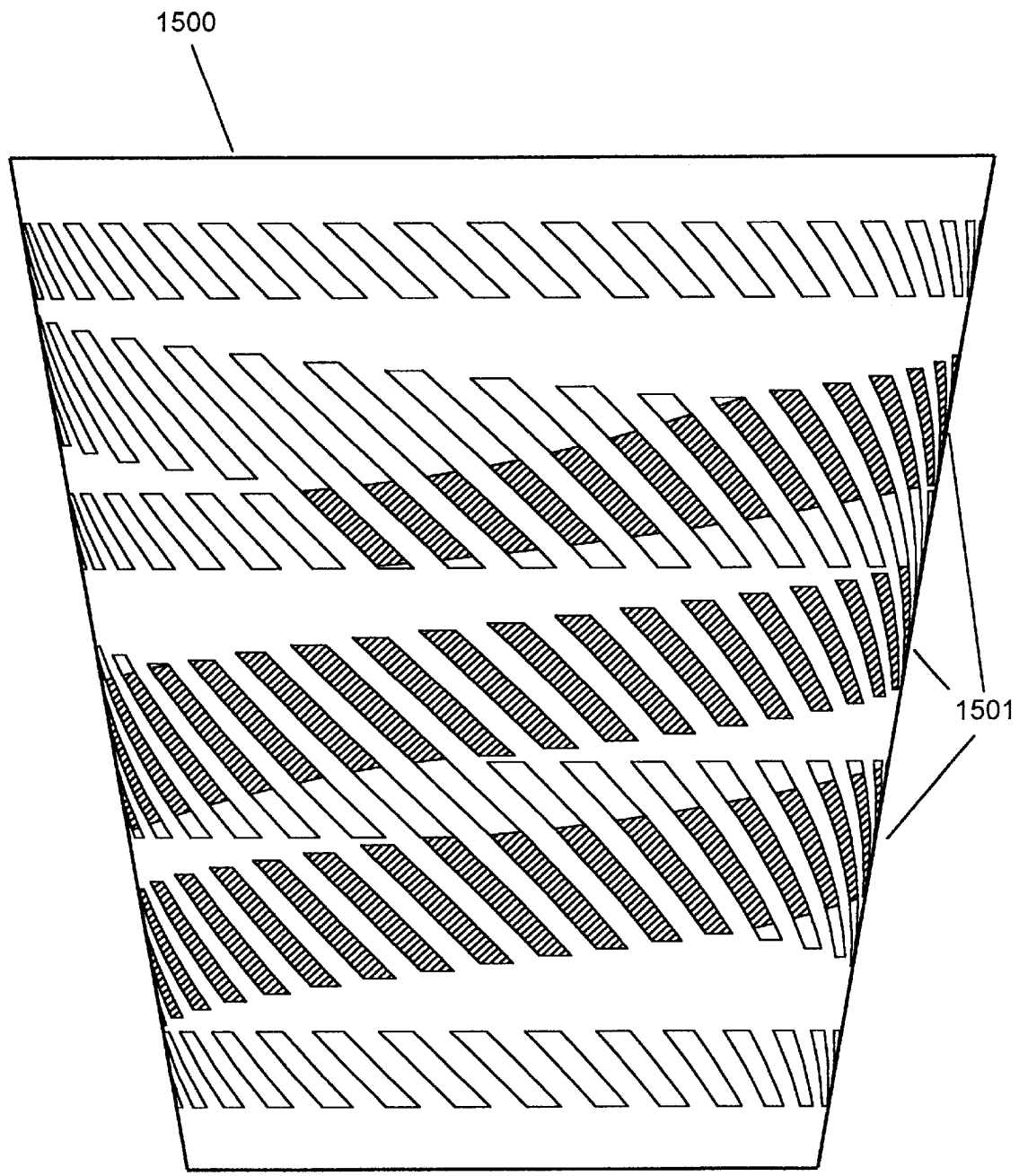
FIG. 15 is a side view of the pitch surface of one embodiment of the cone with an acceleration channel highlighted.
Figure 16:
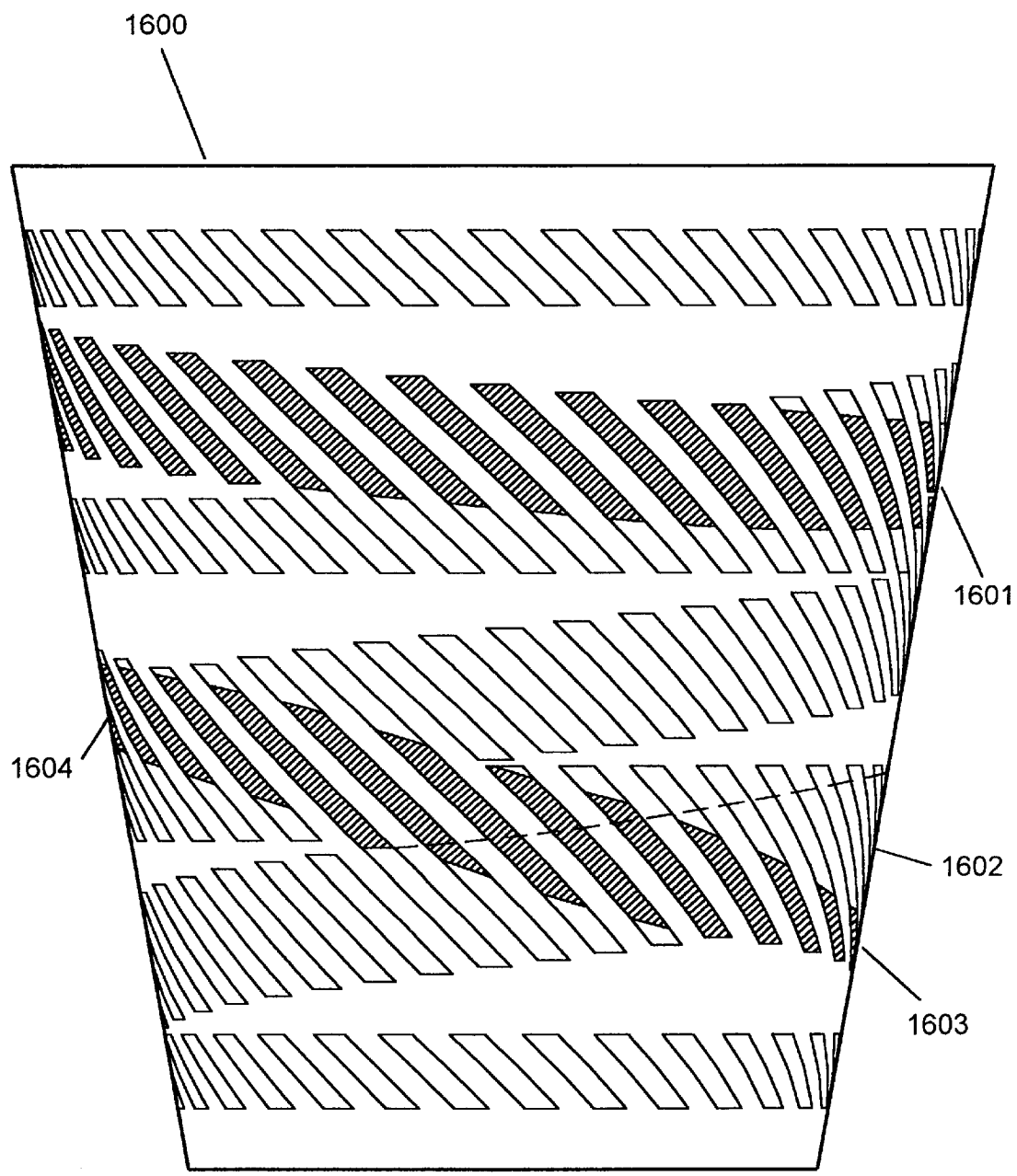
FIG. 16 is a side view of the pitch surface of one embodiment of the cone with a deceleration channel highlighted.

In order to simplify the understanding of the gear train, the rings 1401, 1403 in FIG. 14 are shown as flat. There are two rings, an upper ring 1401 and a lower 1403 with a ring space 1402 between them. The nascention circles are 1404. In the lower ring, the upper boundary is 1407 and the lower boundary is 1406. A tooth's pitch line is 1405 and the circular pitches are 1408. The Acceleration and deceleration channels are the areas where the pinion gear will change its speed. The gear maintains continuous mesh while it is engaged with the teeth in the rings and the channels. In FIG. 15, the acceleration channels 1501 are highlighted. In FIG. 16, the deceleration channels 1601,1603,1604 are highlighted. It is noted that, in FIG. 16, the two lower deceleration channels 1603,1604 appear as one. However, the first 1603 and second 1604 have an overlapping channel entrance and exit on the second ring 1602.

Figure 17:
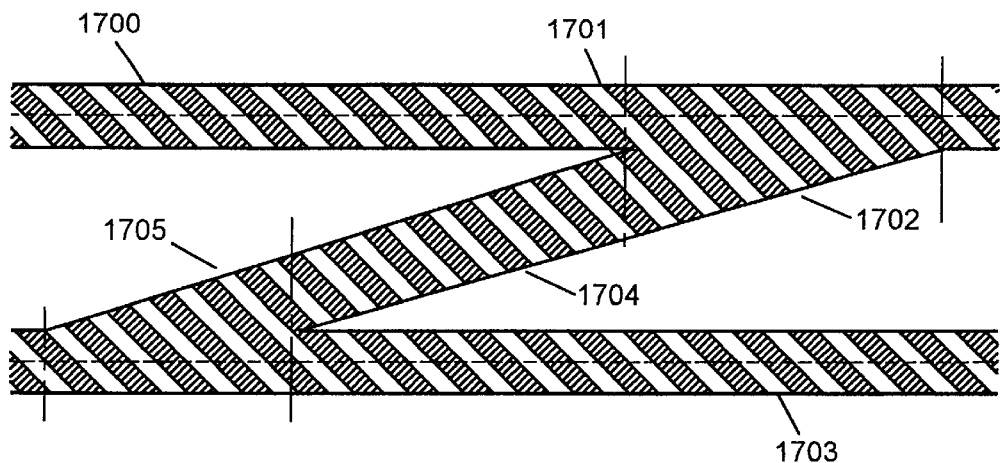
FIG. 17 is a diagrammatic view showing an acceleration channel entrance, tube and exit.
Figure 18:
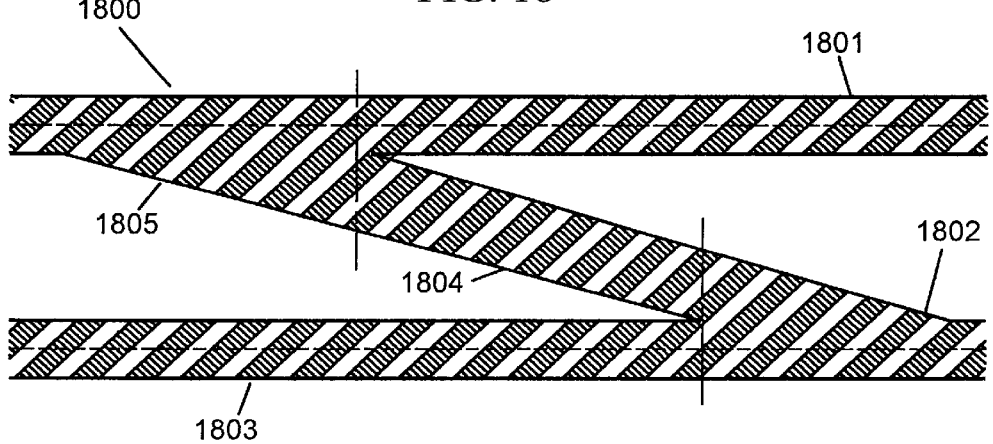
FIG. 18 is a diagrammatic view showing an deceleration channel entrance, tube and exit.

The pinion gear moves from one ring to the next through the acceleration and deceleration channels. As shown in FIG. 17, the acceleration channel 1705, 1704, 1702 moves the gear from the lower, smaller diameter ring 1703 to the upper, larger diameter ring 1701. The channel has three parts, an entrance 1705, an acceleration tube 1704 and an exit 1702. As shown in FIG. 18, The deceleration channel 1805, 1804, 1802 moves the gear from the upper, larger diameter ring 1801 to the lower, smaller diameter ring 1803. The channel entrance 1805 is on the upper ring while the tube 1804 is descending to the channel exit 1802 on the bottom ring 1803. Each channel should be paired with another such that an ascending acceleration channel is provided to the next larger diameter ring and a descending deceleration channel is provided to return to the next smaller ring.

The first tooth on the first ring determines the first channel. The first tooth is located at a point on the first ring, denoted as zero degrees, and the first channel is a specific number of teeth from this beginning. The first channel determines the location of the first tooth in the next ring as the channel intercepts the next ring. This interception will be on a specific tooth, which is called the first tooth for that ring. This progression continues to all rings and determines the numbering of all of their teeth.

The first nascention coordinate on the first rings nascention circle starts at zero degrees. All teeth on the cone are referenced from that point. As noted above, the degree of rotation per tooth on a nascention circle is 360 degrees divided by the number of teeth on the ring. Thus, for a ring with 25 teeth, 360 degrees divided by the 25 teeth is 14.4 degrees per tooth. That is the degrees of rotation to travel 0.524599" of the cones' pitch surface.

As also noted above, the acceleration and deceleration channels have three components: The entrance, tube, and exit. The entrance of both types of channels is for moving the gear out of the ring and into the ring space. Once it is in the ring space, it is in the domain of the channel tube. The tube is where the speed of rotation of the pinion gear is changed. At the end of the tube, the rotational speed of the gear has changed to match that of the next ring and the gear passes into the channel exit and onto the next ring.

When the cone is rotated at constant speed, each ring is also rotated at constant speed. Thus, within the acceleration channel tube the speed is changed from the slower constant speed on the lower ring to the faster, constant speed of the upper ring. The deceleration channel tube is the opposite, with speed being changed from the faster upper ring to the slower, lower ring. The teeth on the rings are called conic teeth. The teeth in the channel tubes 1704, 1804 are called scaling teeth. They are different in shape and type of origin than the conic teeth.

The channel entrance is an extension of the rings' conic teeth to the channel boundaries. The important characteristic of the entrance is that the gear is still rotating at the same speed as the ring it is moving out of. The purpose of the entrance is a transition area to move the gear out of the ring, then into the channel tube. The channel entrance keeps the tubes scaling teeth separate from the rings conic teeth.

The channel exit is similar to the entrance as it is at the speed of the ring it is moving into and provides a transition from the scaling teeth in the tube to the conic teeth in the ring.

The acceleration and deceleration tubes are in the ring space. The tooth and tooth space of the scaling teeth are slightly tapered compared to the conic teeth. Unlike the ring teeth, the nascention coordinates for these teeth are not on a nascention circle. Each tooth has its own unique nascention coordinate for its' pitch line. These nascention coordinates are on a migratory path from one ring to another. This path is called the nascention-offset line. For an acceleration tube, this path begins on the lower rings' nascention circle and ends on the upper rings' nascention circle. For a deceleration tube, it begins on the upper ring and ends on the lower ring.

Figure 19:
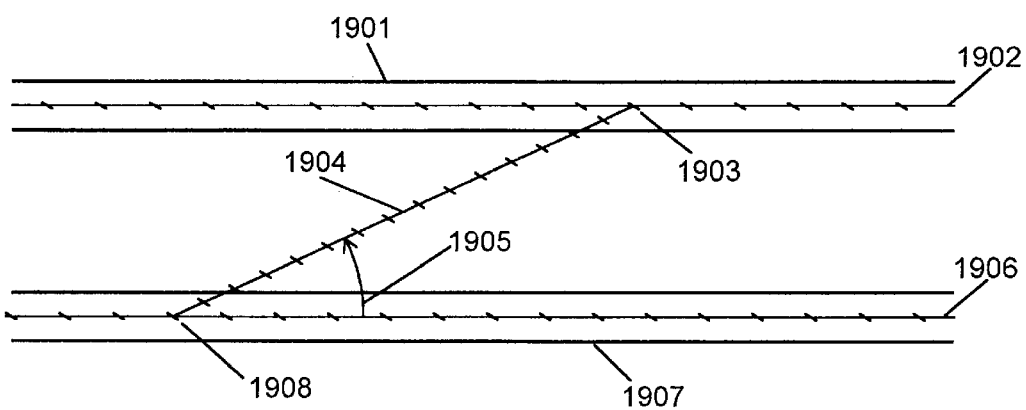
FIG. 19 is a diagrammatic view showing an acceleration tube nascention-offset line.

FIG. 19 shows an acceleration tubes' nascention-offset line 1904. The coordinates on the nascention circle 1906 in the lower ring are already determined. The interception of the nascention-offset line 1904 with the upper rings' nascention circle 1902 is the first nascention coordinate 1903 for the upper ring. All the other coordinates on the upper rings' nascention circle are referenced from that one. The nascention-offset line angle 1905 is between the offset line 1904 and the originating nascention circle 1906.

The nascention-offset line 1904 is between the rings' nascention circles 1902, 1906. There is an ascending nascention-offset line 1904 for the acceleration tube and a descending nascention-offset line for the deceleration tube. For an acceleration tube, it begins on a specific conic tooth 1908 and ends on the first tooth of the next ring 1903.

The beginning and ending of the nascention-offset line 1904 has a rotational angle called the nascention-offset theta. The distance between the rings' nascention circles is the ring pitch. The ring pitch divided by the nascention-offset theta yields the nascention-offset coefficient. This is a type of conix coefficient. The nascention-offset theta is not to be confused with the nascention-offset angle 1905. Theta is the measure of the rotation of the cone on its axis. The angle is between the offset line 1904 and the nascention circle it originated on. This angle is on the surface of the cone.

The nascention-offset line 1904 has a left and right handedness and is ascending or descending on the cone. Left-handed ascending is clockwise, therefore a positive direction of rotation. Its' angle is added to the starting position of the nascention offset angle. The left-handed descending is counter-clockwise and a negative direction, thus subtracted from the starting position of the nascention offset angle. The positive or negative sign is applied to the nascention-offset coefficient. The opposite is true for the right-handed, with the ring-handed ascending 1904 having a negative nascention-offset coefficient and the descending having a positive nascention-offset coefficient. The nascention-offset coefficients for all acceleration channels are upwards, from a lower to a higher ring, while all nascention-offset coefficients for all deceleration channels are downwards from a higher to a lower ring.

The nascention-offset line 1904 is intercepted at regularly spaced intervals by the nascention coordinates of the scaling teeth. The process for determining the intercept points involves the geometric manipulation of a triangle, with one side being the nascention-offset line 1904, another being the circular pitch, and the third being a tooths' pitch line.

Figure 20:
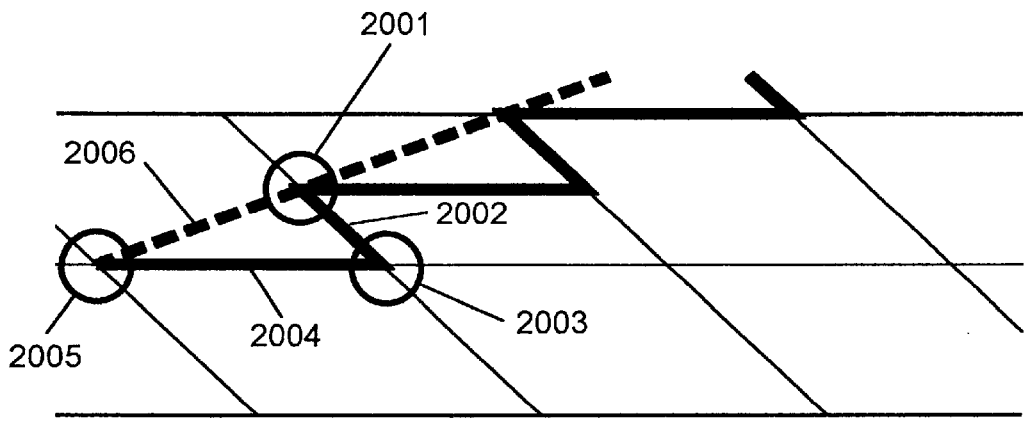
FIG. 20. is a diagrammatic view showing an acceleration tube nascention-offset line and scaling tooth.

FIG. 20 shows a right-handed ascending nascention-offset line 2006 of an acceleration channel. The bottom of the triangle is a circular pitch 2004. The left side is the nascention-offset line 2006. The right side is the ascending spiral of a pitch line 2002. The circular pitch is between two nascention coordinates 2005, 2003. The left coordinate 2005 is the point of origin for the nascention-offset line 2006. The right coordinate 2003 is the distance of the circular pitch 2004 from the right ascending coordinate. From the right coordinate 2003, an ascending spiral 2002 is extended until it intercepts the nascention-offset line 2001. This intercept point 2001 is the nascention coordinate for the next scaling tooth. This interception formula is based on an ascending nascention-offset line coefficient and a nascention coefficient for the ascending spiral of the tooth's pitch line. The nascention-offset line coefficient is the ring pitch divided by degree of rotational of the cone.

Figure 21:
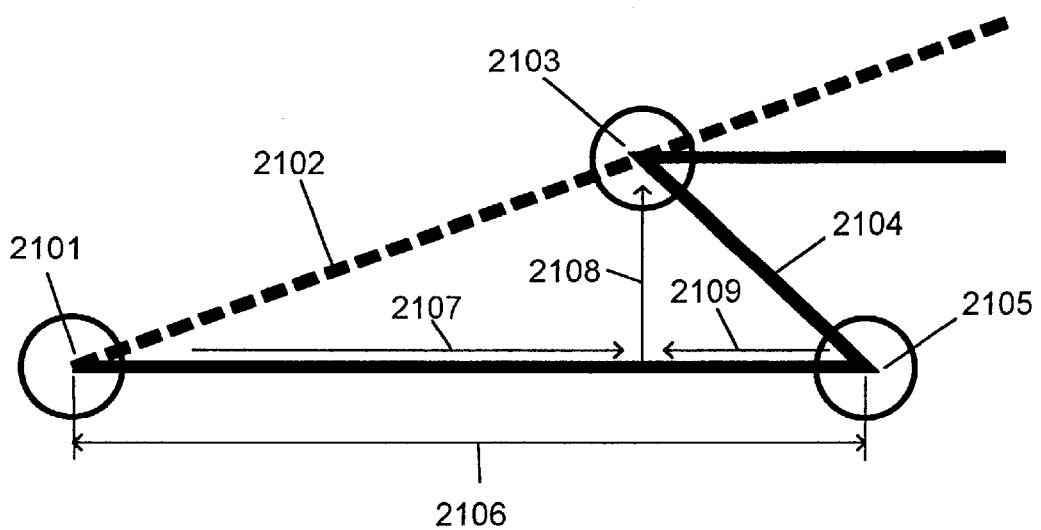
FIG. 21 is a diagrammatic view explaining the acceleration tube scaling tooth calculation.

FIG. 21 shows the right-handed nascention-offset line 2102 for an acceleration tube. From the beginning nascention coordinate 2101, the circular pitch width 2106 determines the offset of the second nascention coordinate 2105. From the offset coordinate 2105, a tooth's ascending spiral 2104 is extended to intercept point 2103 on the nascention-offset line 2102.

A nascention coefficient is then calculated for the ascending 2104 spiral. This nascention coefficient is calculated by finding the circumference of the cone for that nascention coordinate, dividing that circumference by 360 degrees to determine the circumferences' inches per degree, and taking the circumferences' inches per degree tangent and dividing it by of the gears' helix. This is the nascention coefficient that is used for determining the ascending spiral 2104 for the second nascention coordinate 2105.

The circumference is found from the radius of the cone for that point. This point has a distance Rho from the base of the cone. Multiplying Rho by the sign of the conix will yield the change in the radius from the base of the cone to that point. This change, added to the radius of the base of the cone and multiplied by two pi, is the circumference.

A perpendicular line R-rho 2108 splits the triangle from the intercept point 2103 to the circular pitch line. This forms two other triangles with a common R-rho 2108. The original circular pitch base 2106 is split into a first distance 2107, referred to as "S", and a second distance 2109, referred to as T. The base of the parent triangle is the circular pitch 2106. The rotational angle is the circumferences' inch per degree times the circular pitch 2106. It is called H-theta and is the angular displacement of the circular pitch 2106 at that diameter of the cone. Of the other two subdivisions, the first distance 2107 has an S-theta displacement, and second distance 2109 has a T-theta component. The R-rho, S-theta and T-theta are unknown. However, an R-rho divided by a conix coefficient will produce the respective S-theta or T-theta.

H-theta=S-theta+T-theta

S-theta=H-theta−T-theta

T-theta=H-theta−S-theta

R-rho=S-theta×*NOL F/D* Nascention offset-line coefficient

R-rho=T-theta×*N F/D* Nascention coefficient

The solution for the S-theta is:

S-theta=(H-theta×*N F/D*)/(*N F/D*+*NOL F/D*)

R-rho=S-theta×*N F/D*

Given the two coefficients, and the theta angle of the circular pitch, the R- rho can be found. This R-rho and S-theta are relative to the first nascention coordinates 2101 and are added to it for absolute values.

This process is repeated until the nascention circle of the next ring is intercepted. The first interception will not be exactly on the next rings' nascention circle. The nascention-offset angle used in the nascention-offset line coefficient has to be modified until its does. This is an iteration process that is preferably carried to four decimal places of the theta angle. This interception point is on the nascention circle on the next ring. This point becomes the nascention coordinate for the first tooth on the next ring. Using an iteration process to home in on the nascention-offset angle is directly related to the preferred nascention-offset theta.

Figure 22:
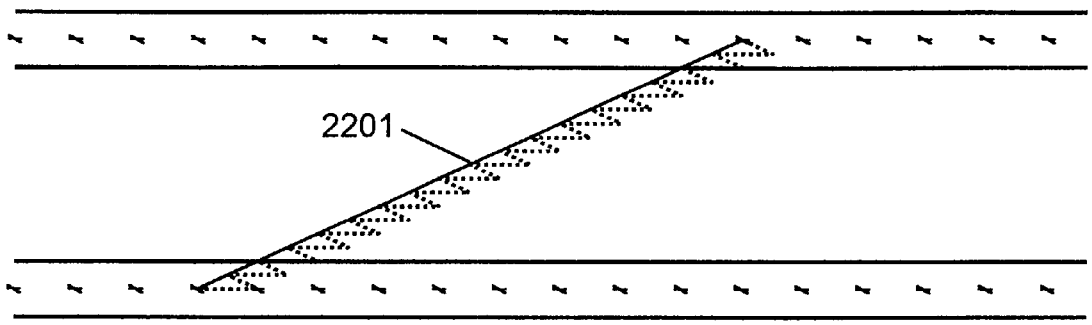
FIG. 22 is a diagrammatic view showing an acceleration tube nascention-offset line for an embodiment having thirteen scaling teeth.
Figure 23:
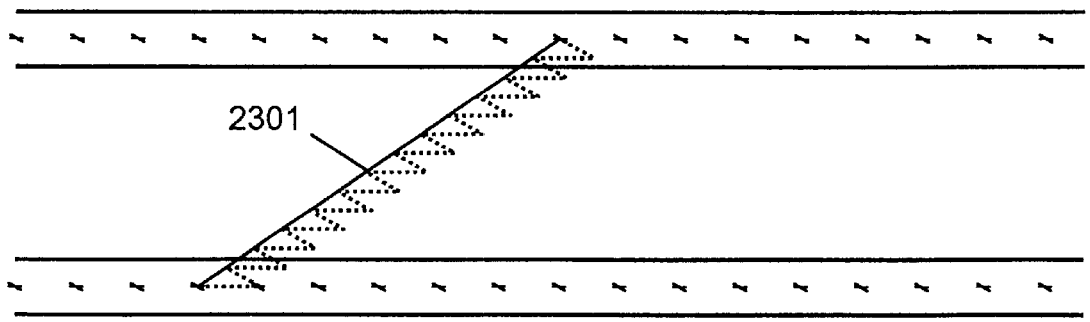
FIG. 23 is a diagrammatic view showing an acceleration tube nascention-offset line for an embodiment having ten scaling teeth.

FIGS. 22 & 23 show nascention-offset lines 2201, 2301 calculated with a different number of scaling teeth. These are examples of several candidates that should be discovered, one of which will be selected for the acceleration tube.

Figure 24:
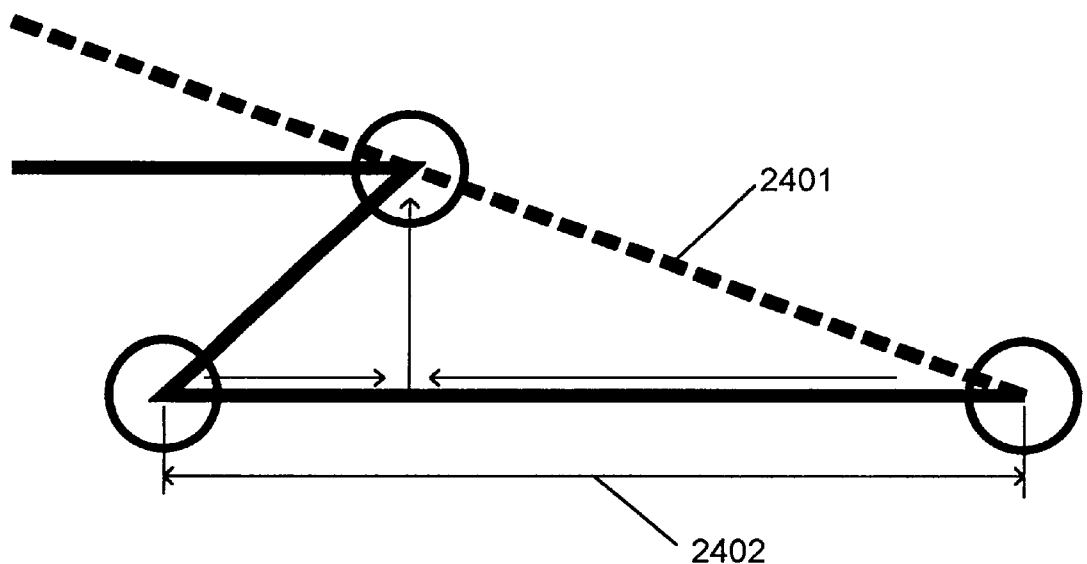
FIG. 24 is a diagrammatic view showing an deceleration tube nascention-offset line and scaling tooth.

In FIG. 24 the nascention-offset line 2401 is left-handed and is a mirror image of FIG. 21; i.e. the circular pitch 2106, 2402 is the same. It should be noted that right-handed coefficients are positive. The upward direction of the Nascention-offset line is counter-clockwise. A left-handed coefficient would be negative.

Figure 25:
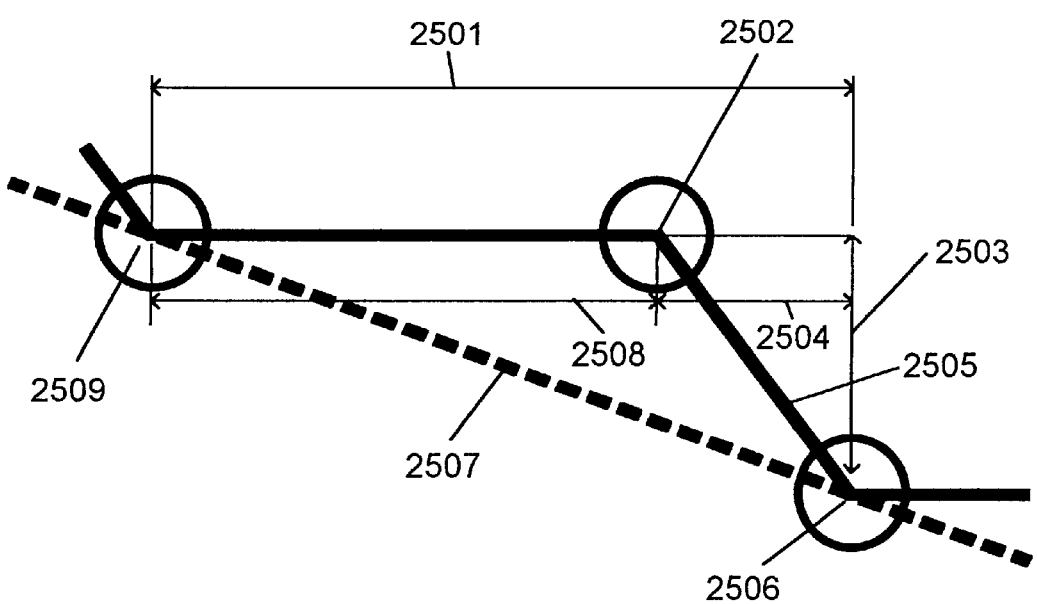
FIG. 25 is a diagrammatic view explaining the deceleration tube scaling tooth calculation.

In FIG. 25 the nascention-offset line 2507 is left-handed for a deceleration channel. The direction of the offset line 2507 is downwards. The circular pitch 2508 is between the first nascention coordinate 2509 to the second 2502. A descending spiral 2505 is extended downwards until it intercepts 2506 the nascention-offset line 2507. The relative theta component of the first nascention coordinate 2509 and the interception 2506 is S-theta 2501. The R-rho component 2503 is the side of a triangle. The S-theta is H-theta of the circular pitch 2508 plus a T-theta 2504, which is an extension to the angle of the intercept coordinate 2506.

H-theta=S-theta−T-theta

S-theta=H-theta+T-theta

T-theta=S-theta−H-theta

R-rho=S-theta×*NOL F/D* Nascention offset-line coefficient

R-rho=T-theta×*N F/D* Nascention coefficient

The R-rho, S-theta and T-theta are unknown. An R-rho divided by a conix coefficient will produce the respective T-theta or S-theta.
The solution for the S-theta is:

S-theta=(H-theta×*N F/D*)/(*N F/D*−*NOL F/D*)

R-rho=S-theta×*N F/D*

The S-theta and R-rho are relative to the first nascention coordinate. They are added to the nascention coordinate for an absolute coordinate. The intercept point is the nascention coordinate for the next scaling tooth. In this example, the R-rho 2503 is expressed as a negative number because of its downward direction. The nascention-offset line coefficient is positive because it is in a counter-clockwise direction on the cone.

This process is repeated until the nascention circle of the lower ring is intercepted. Again, this is preferably done through an iteration process that is carried to four decimal places of the theta angle. All the calculations have to be relative to starting coordinate of the upper ring. The starting theta on the upper ring is zero. Where it ends on the lower ring is not a new nascention coordinate. They were already determined. Another process will match these beginning and ending teeth.

The deceleration channel is calculated in a different manner. The cone has left-handed teeth and the descending channel is left-handed relatively speaking. The intercept points of these descending pitch lines and nascention-offset lines can be as much as twice the relative distance when compared with the acceleration channels. The result is almost half the number of scaling teeth.

There should be several nascention-offset lines calculated for different numbers of scaling teeth. As was the case with the acceleration tubes, one of these candidates will be selected for the deceleration tube.

Each scaling tooth has its own nascention coordinate and it intercepts the next scaling tooth. The effect of translocating from one tooth to the next is that the rolling contact point with the pinion gear is shifted. It is lifted away from the contact of the previous tooth, thus reducing the contact ratio. When fabricating a scaling tooth, both the front and backsides have to be milled. The difference is when a conic tooth is milled; cutting the front of one also cuts the back of the next tooth. Not so with the scaling teeth, each side has to be milled. This gives the scaling tooth space a slight taper.

A nascention-offset line has a specific angle and number of scaling teeth. There is a range of these offset lines that has to be calculated for the acceleration and deceleration channels, between all the rings. The acceleration channels determine the location of the teeth in the next ring. The corresponding deceleration channel has to begin at a specific number of teeth away from the end of this acceleration channel.

Figure 26:
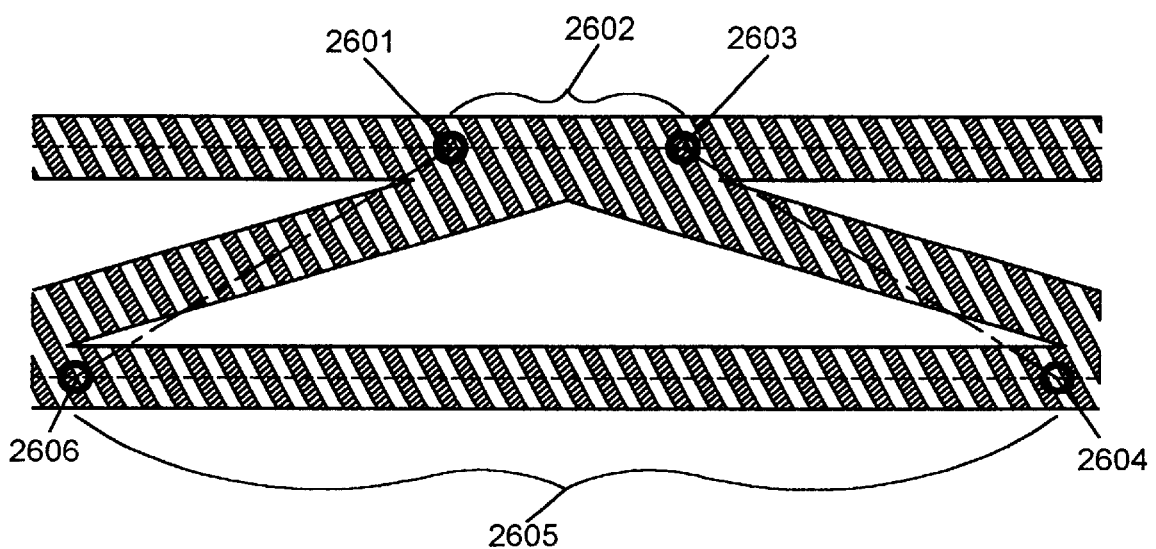
FIG. 26 is a diagrammatic view showing a pair of rings, an acceleration tube, a deceleration tube, with top and bottom landing teeth circled.

Referencing FIG. 26, the number of teeth between the end of the acceleration channel 2601 and the beginning of the deceleration channel 2602 are called the top landing teeth 2602. The deceleration channel has to end on the lower ring 2604 a specific number of teeth away from the beginning 2606 of the acceleration channel. These teeth are called the bottom track 2605. This is analogous to a railroad track with a siding. There are a specific number of railroad ties going onto the siding, a specific number following the main track in parallel and a specific number coming back on the main track. This return to the main line has to be a specific number of railroad ties from the beginning.

The matrix is a three-dimensional array with the number of acceleration teeth, deceleration teeth and connecting top landing teeth as the dimensions. It has the number of teeth and their angles totaled, then compared with the closest bottom tooth upon which it lands. The difference is called the landing error and determines the candidates, which do not have to be a perfect match because of the alignment of the nascention-offset lines. The impact of this imperfect match is that the change in speed of the deceleration channels last tooth will not be the equal step that the other teeth had, but this can be minimal.

In the preferred embodiment, each combination of acceleration and deceleration channels is examined and the number of top teeth that yields the least difference with the bottom tooth it lands upon is chosen and used for the matrix. It is noted that, between the first and second ring, the number of top landing teeth and the degree of rotation are the limit of how big the combined acceleration exit and deceleration entrance can be. These are the smallest rings, therefore the smallest theta for the top landing teeth.

The next step in the design process involves choosing an overall strategy for the channel placements. This is a strategy because decisions have to be made starting with the speed with which the pinion gear is to move through the channel. This is a lateral movement and is tied to the rotation of the cone. The greatest distance for lateral movement is the tube that occupies the ring space. For example, in an embodiment with a ring pitch of 2.0945 inches, the gear has to move 0.5 inches, the width of the entrance, to be out of the ring. The exit channel on the next ring is also the width of the gear or 0.5 inches. The ring pitch minus the combined entrance and exit of 1.0 inches leaves a net movement in the tube of 1.0945 inches.

The strategy starts with moving the pinion gear from one ring to another. There are three phases it must pass through, the entrance, tube and exit, and two variables that must be taken into account. These variables are the lateral movement of the gear and the rotation of the cone during this movement. The lateral distance, and hence the lateral movement, is a constant. The time it takes to cross this distance is not a constant and has to be in synchronized with the rotation of the cone because each channel has a unique angular displacement.

In determining which channel combination to select, it must be noted that the smallest channel determines where to start. The bottleneck is in the number of teeth on the top landing in the second ring. For example, in one prototype developed by the inventor, the largest top landing choice had 8 teeth. With a 0.523634-inch tooth pitch this means that the acceleration channel exit and deceleration channel entrance must overlap in a 4.19-inch space. It also had the largest degree of rotation: 87.27 degrees. Its' acceleration channel was 91.42 degrees and its deceleration channel, 81.77 degrees. In this prototype, candidate combinations in the other two channels with acceleration, deceleration and top angular displacements similar to the first channel also had some of the smallest landing errors. The acceleration tubes averaged approximately ninety-two degrees, the deceleration tube eight-two degrees and the top landing approximately eighty-seven degrees. These total to two hundred and sixty-one degrees leaving one hundred and nine out of three hundred and sixty degrees for the combined acceleration channel entrance and deceleration channel exit.

It is noted that this selection is simply the landscape, and is not the actual channel or motion control path. These are to be determined by the boundaries, which are determined by the gears' footprint.

Figure 27:
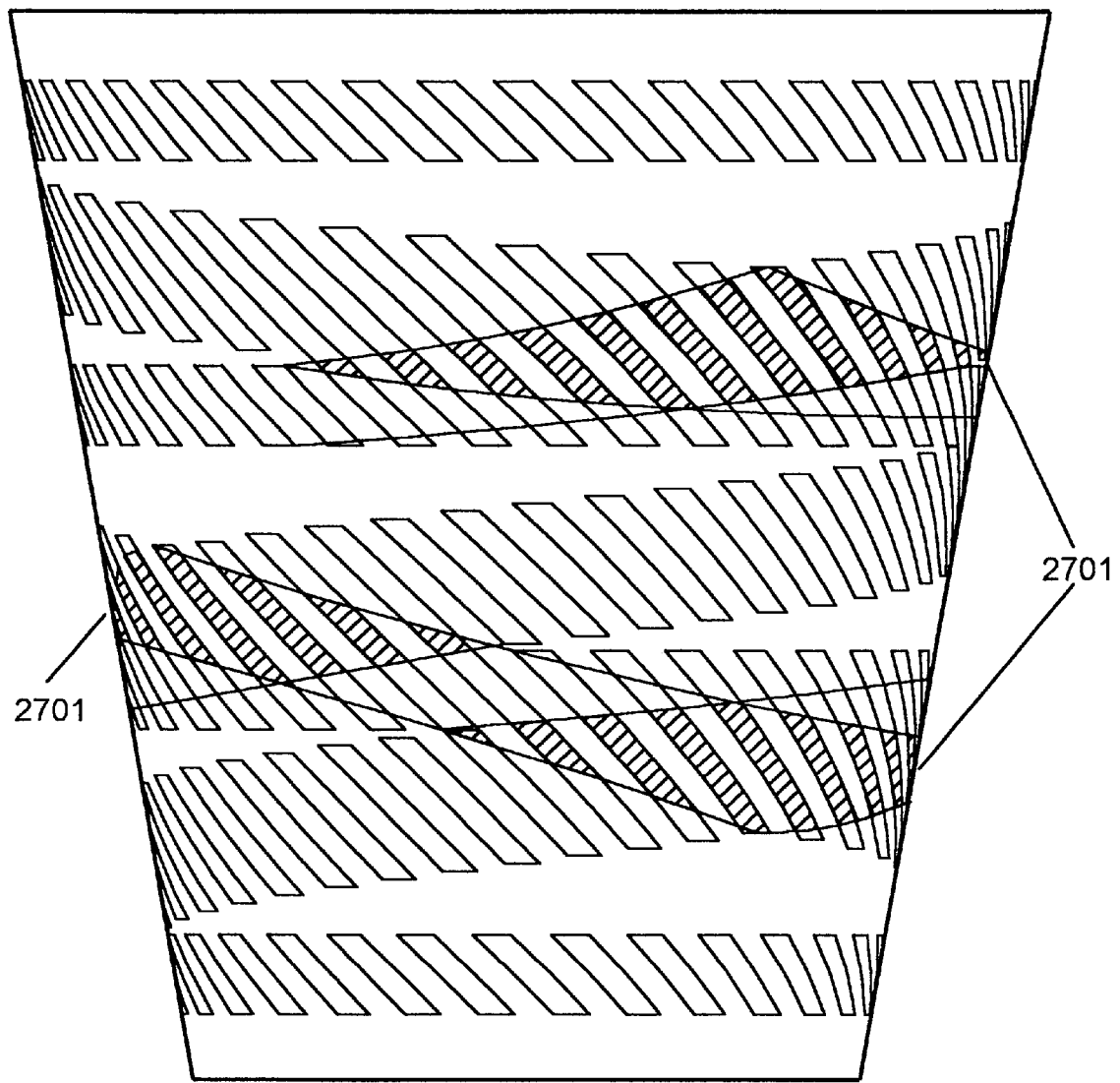
FIG. 27 is a side view of the pitch surface of one embodiment of the cone with a channel overlap highlighted.
Figure 28:
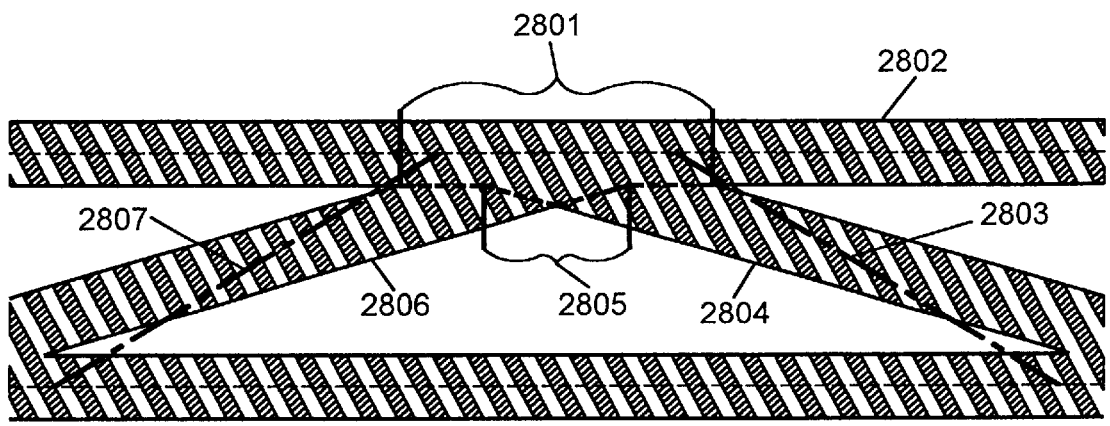
FIG. 28 is a diagrammatic view showing a pair of rings, an acceleration tube, a deceleration tube, with top landing teeth overlap bracketed.
Figure 29:
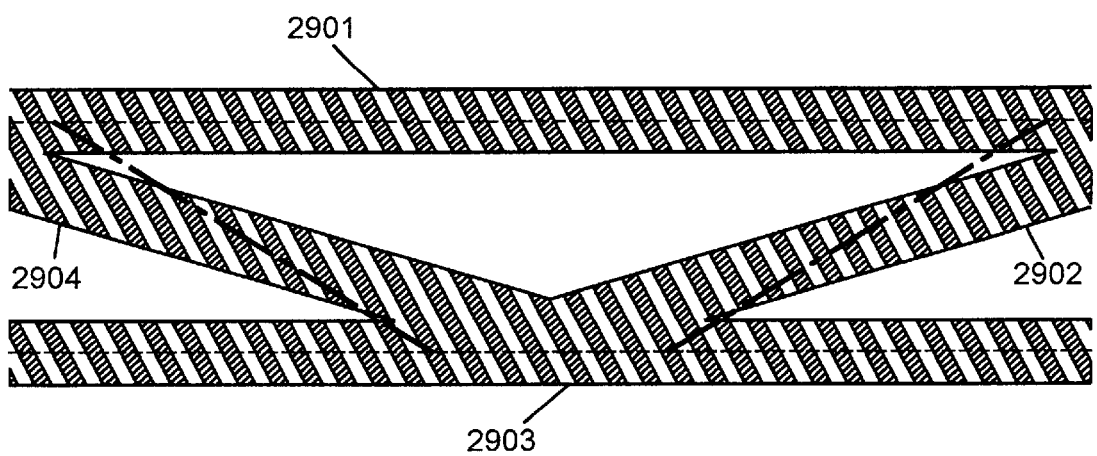
FIG. 29 is a diagrammatic view showing a pair of rings, an acceleration tube, a deceleration tube, and bottom landing teeth overlap.

The entrance and exit of the channels are an extension of the conic teeth that can overlap. FIG. 27 highlights these overlaps 2701 on the surface of a cone. FIG. 28 shows the overlap between an acceleration channel 2806 exit and a deceleration channel 2804 entrance on the upper ring 2802. The nascention-offset lines of the respective acceleration 2807 and deceleration 2803 channels determine the top landing 2801. The overlap 2805 within the top landing is sharing the conic teeth extended from the upper ring 2802. FIG. 29 shows the overlap of the deceleration exit 2904 and acceleration channel entrance 2902 on the lower ring 2903.

Figure 30:
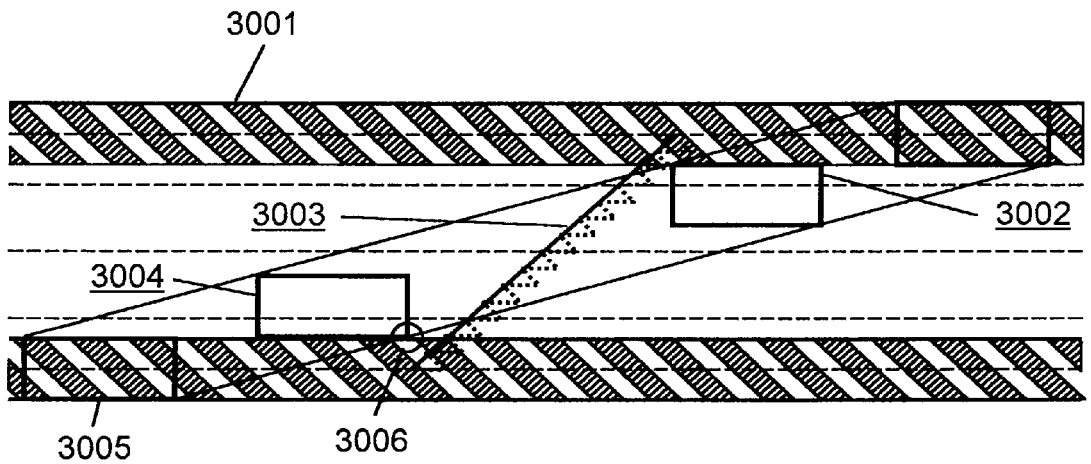
FIG. 30 is a diagrammatic view showing a pair of rings and footprint positions for a gear accelerating between rings.

The pinion gear has to have enough room to move up and down the channels while it is meshing with the teeth. This is determined by a box called the footprint. FIG. 30 is a representation of this box at different locations in an acceleration channel. The width of the box is the width of the pinion gear. The length of the box is the room the gear needs to mesh with the teeth on the cone plus additional clearance on the side. The diagonal corners of this box plot the boundaries of the acceleration and deceleration channels.

The starting position 3005 on the ring is the beginning of the channel entrance. The footprint is moved to the top of the ring 3006 and aligned with the beginning corner of the nascention-offset line 3004. This is the end of the entrance and the beginning of the acceleration tube. At the end of the tube 3002 and the beginning to the exit, the corner is aligned with the nascention-offset line ending point. The end of the exit is positioned in the ring 3001. The significance of the corners of the footprint aligning with the nascention-offset line 3003 is that this is the tightest path for that size footprint. A longer, broader path is possible, but unnecessary.

Figure 31:
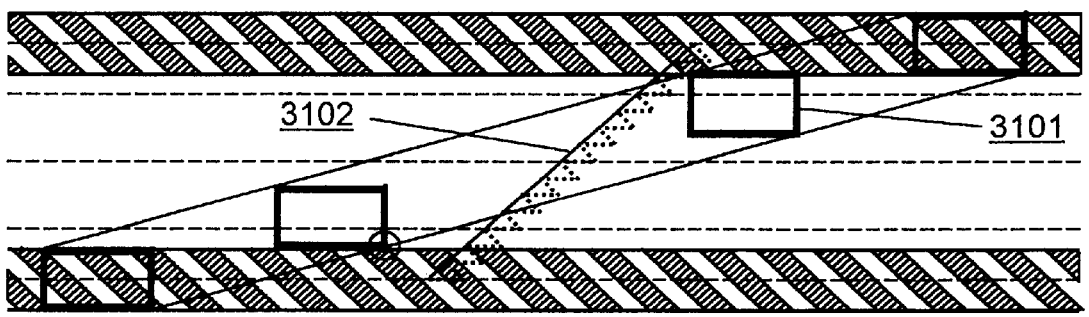
FIG. 31 is a diagrammatic view showing a pair of rings and footprint paths for a gear accelerating between rings.

The size of the footprint determines the size and location of the path. As shown in FIG. 31, the footprint 3101 is one third smaller than FIG. 30, but the nascention-offset line 3102, 3003 is identical. It should be noted that the width of the gear is one of the determinants of the footprint. The other is length. The length is two parts, the amount allowed for gear meshing and transfer clearance. Transfer clearance is the variability allowed when the gear transfers from one ring to another along its footprint path. It is the allowance for imprecision on this path.

The prescribed path of the footprint is a linear movement coupled with the rotation of the cone. Its movement is in inches traveled per degree of rotation. There are constraints to this path that are characterized by the tube and, therefore, the tubes must be calculated first. The movement along this path is calculated by the footprint path coefficient. This coefficient is a conix coefficient. The center of the footprint is the reference point for plotting the footprint. The size of the footprint and the proximity of its' corners to the nascention-offset line at the beginning and ending of the tube dictate this path. The top of the ring has a circumference and inches per degree of rotation. The assigned length of the footprint divided by the inches per degree is the number of degrees the bottom of the footprint is registering. This is the ring pitch divided by the rotation of the cone.

This nascention-offset line is not the tube, but the location of the nascention coordinates for each tooth inside the tube. The path the footprint takes determined the boundaries of the tube. A straight-line path from a center point of the footprint will produce a simple formula for calculating the boundaries. The distance up the cone of the path is the ring pitch. For example, in a prototype having a ring pitch of 2.0945 inches, if 210 degrees of rotation of the cone is selected, then the rate of change is 0.00997 inches per degree of rotation. Note that 210 degrees exceeds 180. The channel entrances and exits can overlap allowing two channels greater range. The longer the channel, the more the time it has to translocate per rotation of the cone.

The boundaries start at the footprint box on one ring and end at the footprint box on the other ring. They are from two diagonal corners of the box. Each boundary has a boundary coefficient for a straight line. These boundaries are for the extended conic teeth and the scaling teeth to intercept and represents their boundaries.

It was mentioned earlier that the scaling teeth inside the tube were slightly tapered. The conic teeth in the rings all have the same pitchline rising from a common nascention circle. This means that the corresponding points between the teeth are the normal pitch apart. However, the lateral distance between the scaling teeth does not remain constant. This is due to the nascention coordinates not being on the same circle.

Figure 32:
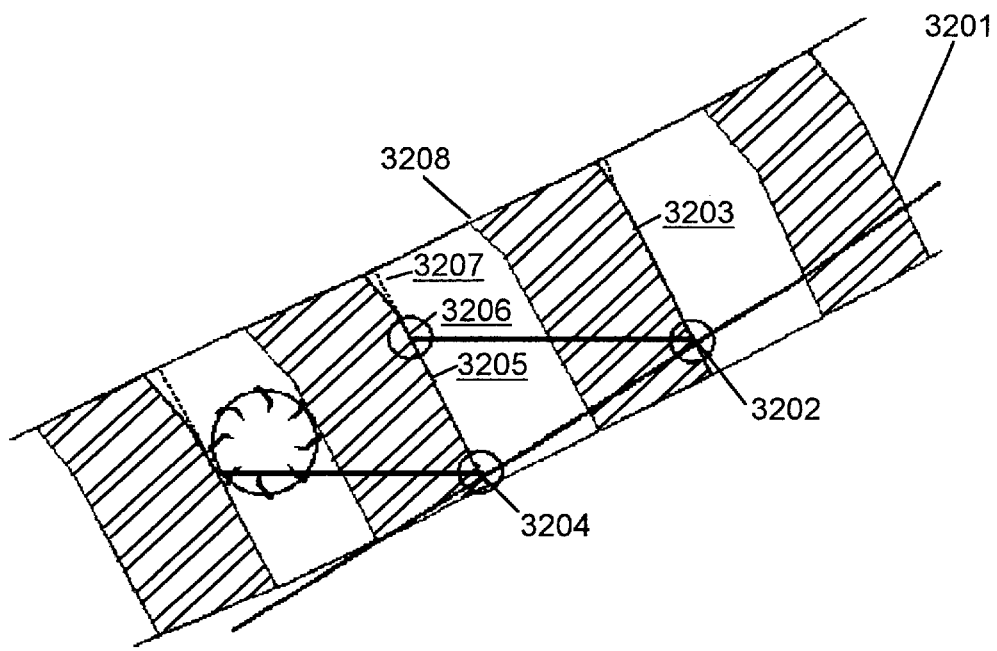
FIG. 32 is a diagrammatic view showing an acceleration tube scaling teeth offset.

FIG. 32 shows one embodiment of an acceleration channel. The effect of the ascending spirals starting at different heights is that the teeth are too wide and have to be adjusted. Accordingly, the backside of the tooth must be shaved to maintain the circular pitch width. The nascention coordinates 3202, 3204 on the Nascention-offset line 3201 each have an ascending spirals 3203, 3205 that comprise the pitch line of their teeth. The teeth are cut following the pitch line.

The nascention coordinate on the nascention-offset line is a function of an ascending spiral. Therefore, a lateral interception line from the nascention coordinate 3202 to the previous tooth's ascending spiral 3206 is equal to the circular pitch. From this interception, another ascending spiral 3207 traces the edge that the cutting tool has to follow to cut the backside of the tooth. This uses the same nascention coefficient as the front of the tooth 3203. The result is the offset backside is cut to a matching spiral 3208. This is repeated for each ascending tooth until the nascention coordinates are outside of the tooth.

Figure 33:
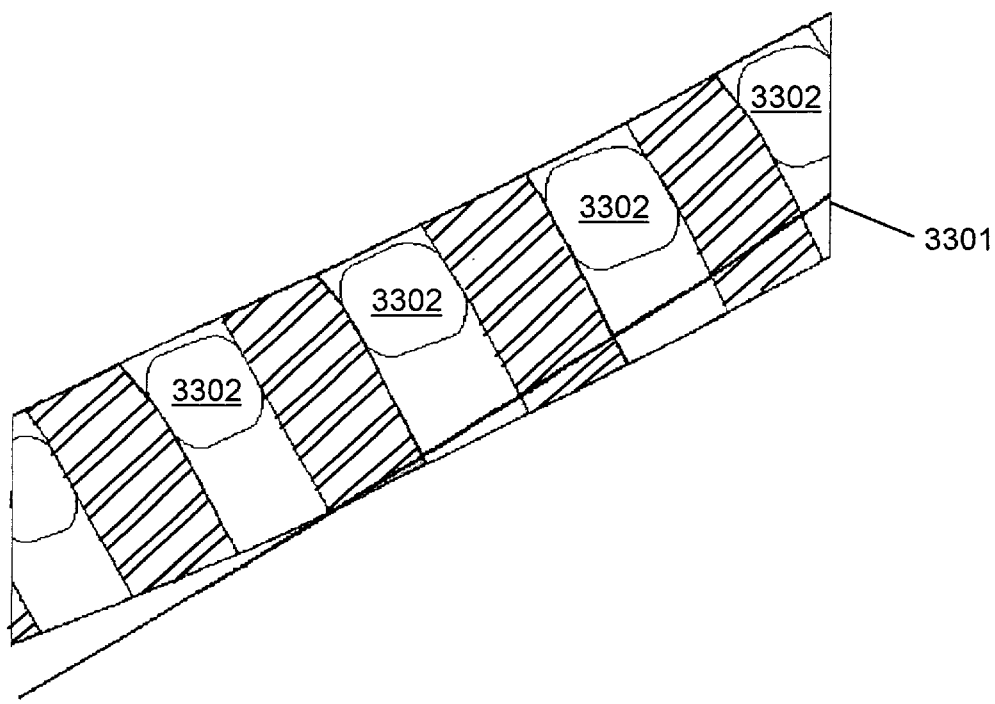
FIG. 33 is a diagrammatic view showing an acceleration tube scaling teeth contact ratio.

In this preferred embodiment, the actual contact of the scaling teeth is reduced as compared with the conic teeth. This is due to the fact that the pitchlines of one tooth are lifting the teeth away from their previous tooth. The effect as demonstrated in FIG. 33. Only a portion of the teeth, shown as the ovals 3302, is used to transmit the energy, while the remainder is clearance for gear teeth. In FIG. 33 the nascention-offset line 3301 is shown as a reference.

Figure 34:
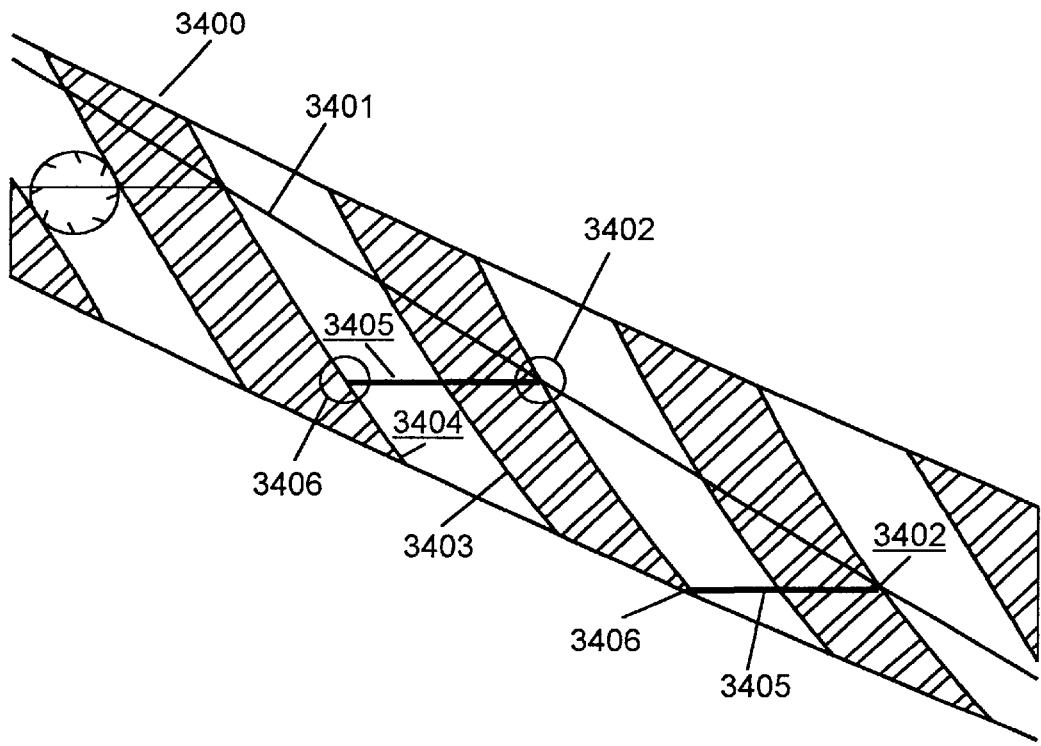
FIG. 34 is a diagrammatic view showing a deceleration tube scaling teeth offset.

As shown in FIG. 34, the deceleration tube 3400 is very similar. From the nascention-offset line 3401, a lateral line 3405 from the nascention coordinate 3402 intersects the previous tooth's pitchline 3406. From this intersection, another descending spiral 3404 is extended using the nascention coefficient of the current tooth. This is the edge for the cutting tool to follow. It will cut the current tooth's offset backside 3403.

Figure 35:
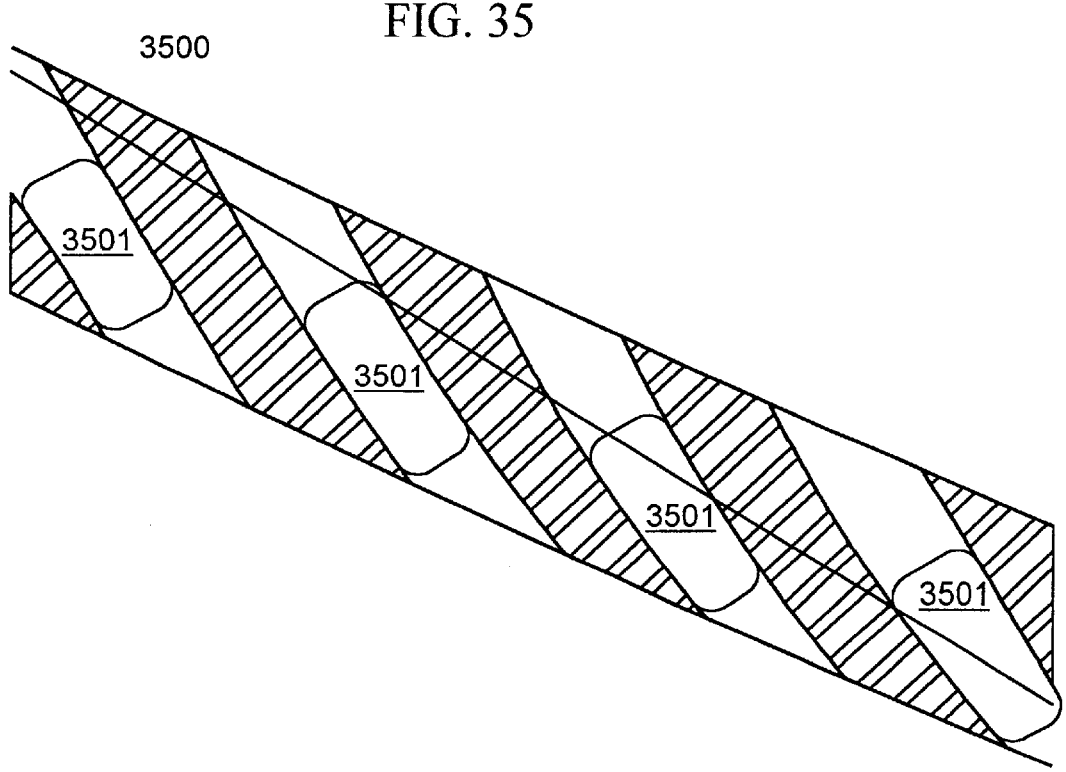
FIG. 35 is a diagrammatic view showing a deceleration tube scaling teeth contact ratio.

The actual contact of teeth is reduced because the current tooth lifts the previous tooth away where it would still have had some contact. Referencing FIG. 35, the net effect is the energy is transmitted along the lower portion of the channel 3500, as demonstrated in the ovals 3501, while the other part of the teeth allows clearance of the gear teeth.

It should be noted that the deceleration channels have fewer, longer teeth so the portion of the teeth that transmit of energy is longer compared to the acceleration channel. In addition, the width of the tooth at the nascention coordinate is the circular pitch and the ascending and descending spirals reduce the tooth width very slightly.

B. Process Utilized for Creating a Prototype

The following is an example of a process utilized to create a prototype gear train 100. First the location of the nascention circles for the desired rings was determined, and then nascention-offset lines were resolved. From the nascention-offset lines the absolute values of all nascention coordinates on the rings and channels were determined.

The selected helical gear is right-handed with a 45-degree helix, transverse diametral pitch of six 6, a width of one half 0.5 inch, twenty-four 24 teeth and a pressure angle of fourteen and one half 14½ degrees. Pi (3.14159) divided by the transverse diametral pitch of six 6 yields a circular pitch of 0.5236 inches.

Figure 36:
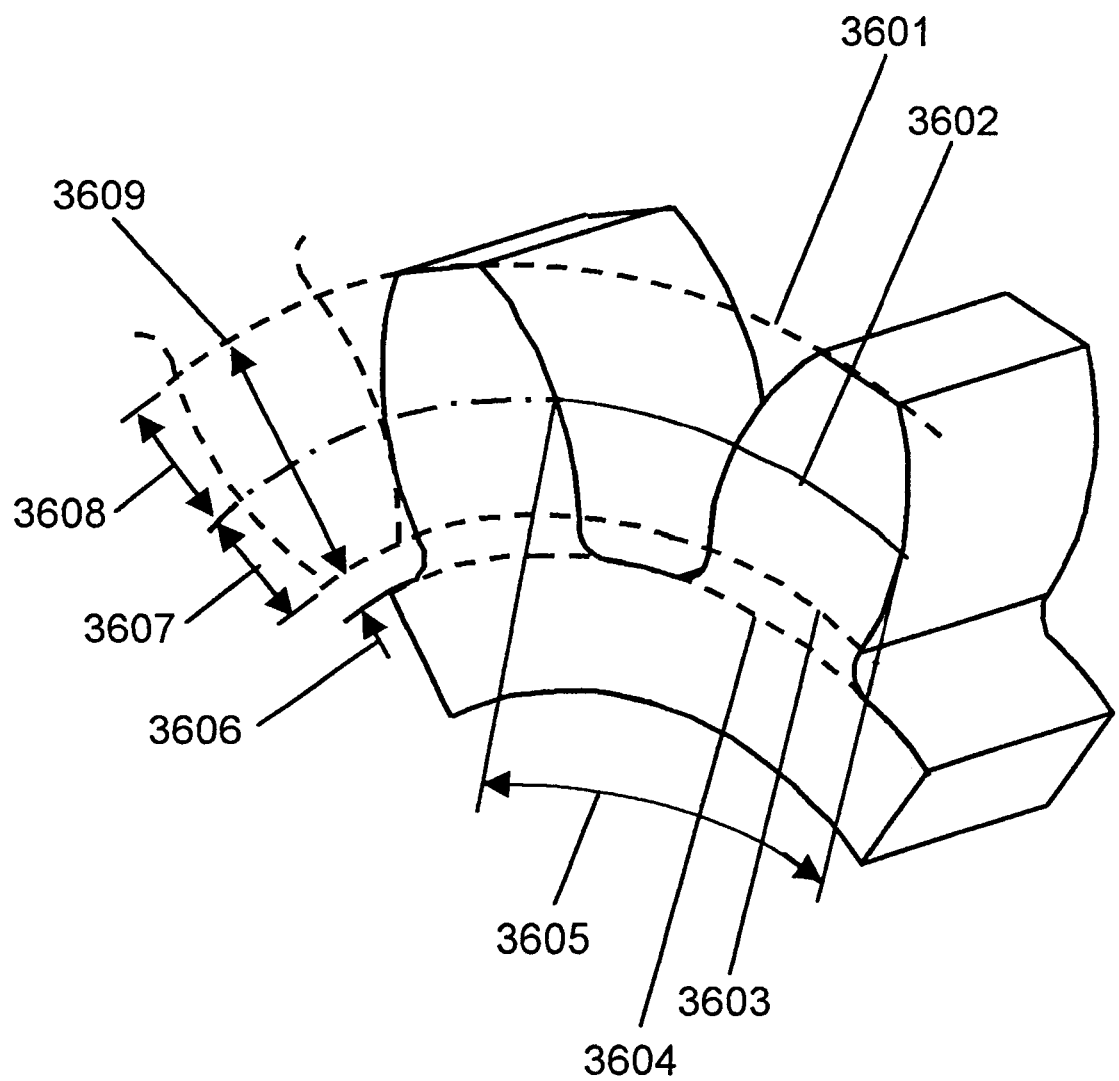
FIG. 36 is a cut away isometric view of a the teeth of a pinion gear utilized in one embodiment of the gear train of the present invention.

Referring to FIG. 36, the diameters are: four 4.0 inches for the pitch circle 3602; 4.314 inches for the top circle 3601; 3.826 inches for the base circle 3603 and the root circle is 3604 3.7326 inches. The circular pitch 3605 is 0.5236 inches. The addendum 3607 is 0.1570 inches, the dedendum 3608 is 0.1187 inches and clearance 3606 is 0.055 inches. The working depth 3609 is 0.2757 inches.

Figure 37:
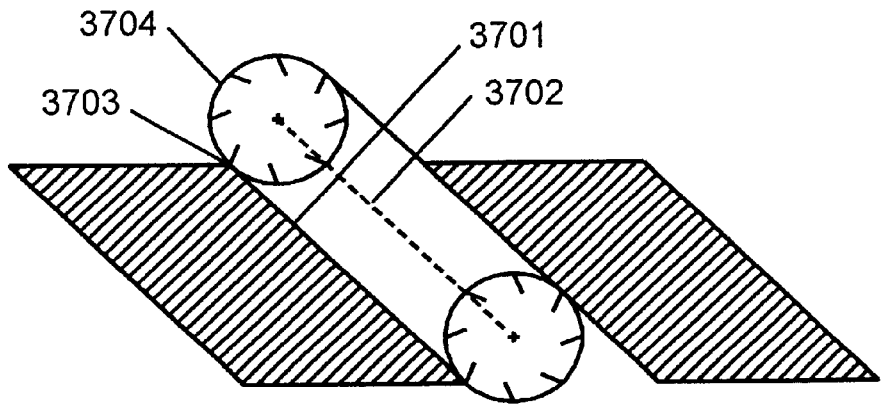
FIG. 37 is a diagrammatic view showing a cutting tool orientation below a tooth.
Figure 38:
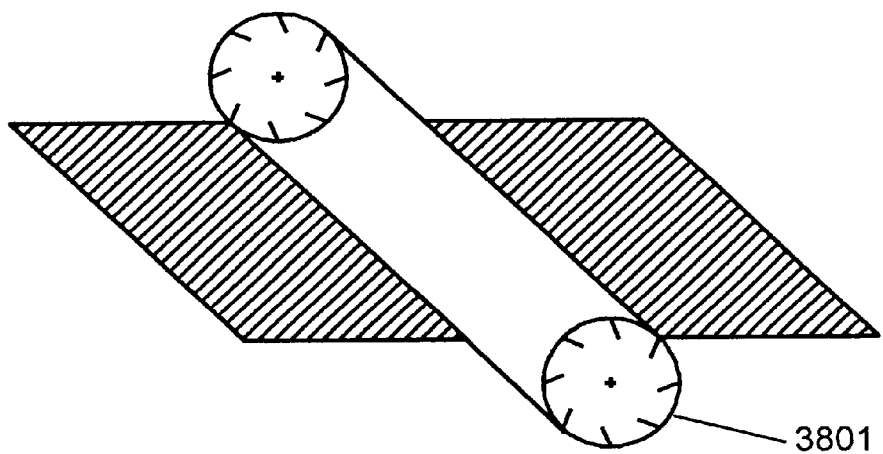
FIG. 38 is a diagrammatic view explaining the cutting tool placement calculations.

As shown in FIG. 37, the coordinates of the teeth are based on the pitchline 3701. To cut the teeth out, a path 3702 for the center of the cutting tool 3704 relative to this pitchline has to be determined. The position of the cutting tool 3704 is tangent 3703 to the corresponding point of the pitchline. The tool has to be extended lower than the gear in order that the backside of the next tooth is properly cut. Referencing FIG. 38, this extension of the cutting tool 3801 path is demonstrated.

Figure 39:
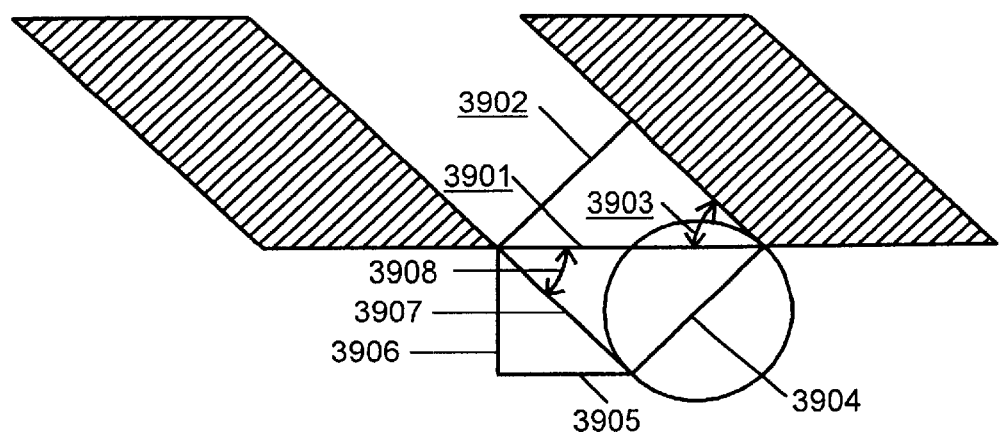
FIG. 39 is a diagrammatic view explaining the acceleration Tube Scaling Tooth Calculation Diagram.

Referencing FIG. 39, the calculations for this extension will yield is an X 3905 and Y 3906 component. The lateral width of the tooth space 3901 is the circular pitch of 0.5236 inches. The diameter of the tool 3902, 3904 is the sine of the helix angle 3903 of 45-degrees times the circular pitch of 0.5236 inches equals 0.3702 inches.

The extension of the pitchline 3907 is the tool diameter 3904 of 0.3702 inches divided by tangent of the helix 3903 equaling 0.3702 inches. This is the X component 3905 of the extension of the pitchline. The Y 3906 component of the pitchline extension 3907 is tool diameter 3904 of 0.3702 inches times the sine of the 45-degree helix angle 3908 equals 0.2618 inches.

The pinion gears' orientation will be in the middle of the nascention circle. For a gear 0.5 inches in width, 0.25 inches will be above and 0.25 inches below the nascention coordinate. The Y component added to this extension 0.25 inches+0.2618 inches is 0.5118 inches Table 1 is a table of the specifications for the rings and there relative relationship. Originally, the first ring had 25 teeth, but that proved to be to small, so 29 teeth was the next ring in line.

The table has the ring number and the number of teeth in each ring. The degree per tooth in each ring is 360 degrees divided by the number of teeth. This is the angle of the cones' rotation for a ring's tooth. Each ring has a nascention circle with a specific radius. The accumulative working face starts at the base and increments 2.0944 inches per ring. This is the height of the rings' nascention circle on the cone. The nascention coefficient is used to plot the ascending and descending spirals of the pitchline.

TABLE 1

Ring Specifications

| Ring | Number of Teeth | 360 degrees divided by # of teeth | Pitch Radius | Nascention Circle | Accumulative Working Face | Nascention Coefficient |
|---|---|---|---|---|---|---|
| 1 | 29 | 12.4137931 | 2.416667 | 15.18437 | 2.0751 | 0.0449100 |
| 2 | 33 | 10.90909091 | 2.750000 | 17.27876 | 4.1695 | 0.0507300 |
| 3 | 37 | 9.72972973 | 3.083333 | 19.37315 | 6.2639 | 0.0565500 |
| 4 | 41 | 8.780487805 | 3.416667 | 21.46755 | 8.3583 | 0.0623700 |

TABLE 2

Relative Nascention Coordinate, Conic Teeth 1–14

| Ring 1 29 Teeth 12.4138 Deg/tooth | | Ring 2 33 Teeth 10.9091 Deg/tooth | | Ring 3 37 Teeth 9.7297 Deg/tooth | | Ring 4 41 Teeth 8.7805 Deg/tooth | |
|---|---|---|---|---|---|---|---|
| Tooth | Angle | Tooth | Angle | Tooth | Angle | Tooth | Angle |
| 1 | 0.000 | 1 | 0.000 | 1 | 0.000 | 1 | 0.000 |
| 2 | 12.414 | 2 | 10.909 | 2 | 9.730 | 2 | 8.780 |
| 3 | 24.828 | 3 | 21.818 | 3 | 19.459 | 3 | 17.561 |
| 4 | 37.241 | 4 | 32.727 | 4 | 29.189 | 4 | 26.341 |
| 5 | 49.655 | 5 | 43.636 | 5 | 38.919 | 5 | 35.122 |
| 6 | 62.069 | 6 | 54.545 | 6 | 48.649 | 6 | 43.902 |
| 7 | 74.483 | 7 | 65.455 | 7 | 58.378 | 7 | 52.683 |
| 8 | 86.897 | 8 | 76.364 | 8 | 68.108 | 8 | 61.463 |
| 9 | 99.310 | 9 | 87.273 | 9 | 77.838 | 9 | 70.243 |
| 10 | 111.724 | 10 | 98.182 | 10 | 87.568 | 10 | 79.024 |
| 11 | 124.138 | 11 | 109.091 | 11 | 97.297 | 11 | 87.805 |
| 12 | 136.552 | 12 | 120.000 | 12 | 107.027 | 12 | 96.585 |
| 13 | 148.966 | 13 | 130.909 | 13 | 116.757 | 13 | 105.366 |
| 14 | 161.379 | 14 | 141.818 | 14 | 126.486 | 14 | 114.146 |

TABLE 3

Relative Nascention Coordinate, Conic Teeth 15–28

| Ring 1 29 Teeth 12.4138 Deg/tooth | | Ring 2 33 Teeth 10.9091 Deg/tooth | | Ring 3 37 Teeth 9.7290 Deg/tooth | | Ring 4 41 Teeth 8.7805 Deg/tooth | |
|---|---|---|---|---|---|---|---|
| Tooth | Angle | Tooth | Angle | Tooth | Angle | Tooth | Angle |
| 15 | 173.793 | 15 | 152.727 | 15 | 136.216 | 15 | 122.927 |
| 16 | 186.207 | 16 | 163.636 | 16 | 145.946 | 16 | 131.707 |

TABLE 3-continued

Relative Nascention Coordinate, Conic Teeth 15–28

| Ring 1 29 Teeth 12.4138 Deg/tooth | | Ring 2 33 Teeth 10.9091 Deg/tooth | | Ring 3 37 Teeth 9.7290 Deg/tooth | | Ring 4 41 Teeth 8.7805 Deg/tooth | |
|---|---|---|---|---|---|---|---|
| Tooth | Angle | Tooth | Angle | Tooth | Angle | Tooth | Angle |
| 17 | 198.621 | 17 | 174.545 | 17 | 155.676 | 17 | 140.488 |
| 18 | 211.034 | 18 | 185.455 | 18 | 165.405 | 18 | 149.268 |
| 19 | 223.448 | 19 | 196.364 | 19 | 175.135 | 19 | 158.049 |
| 20 | 235.862 | 20 | 207.273 | 20 | 184.865 | 20 | 166.829 |
| 21 | 248.276 | 21 | 218.182 | 21 | 194.595 | 21 | 175.610 |
| 22 | 260.690 | 22 | 229.091 | 22 | 204.324 | 22 | 184.390 |
| 23 | 273.103 | 23 | 240.000 | 23 | 214.054 | 23 | 193.171 |
| 24 | 285.517 | 24 | 250.909 | 24 | 223.784 | 24 | 201.951 |
| 25 | 297.931 | 25 | 261.818 | 25 | 233.514 | 25 | 210.732 |
| 26 | 310.345 | 26 | 272.727 | 26 | 243.243 | 26 | 219.512 |
| 27 | 322.759 | 27 | 283.636 | 27 | 252.973 | 27 | 228.293 |
| 28 | 335.172 | 28 | 294.545 | 28 | 262.703 | 28 | 237.073 |

TABLE 4

Relative Nascention Coordinate, Conic Teeth 28–41

| Ring 1 29 Teeth 12.4138 Deg/tooth | | Ring 2 33 Teeth 10.9091 Deg/tooth | | Ring 3 37 Teeth 9.7290 Deg/tooth | | Ring 4 41 Teeth 8.7805 Deg/tooth | |
|---|---|---|---|---|---|---|---|
| Tooth | Angle | Tooth | Angle | Tooth | Angle | Tooth | Angle |
| 29 | 347.586 | 29 | 347.586 | 29 | 347.586 | 29 | 347.586 |
|  |  | 30 | 316.364 | 30 | 282.162 | 30 | 254.634 |
|  |  | 31 | 327.273 | 31 | 291.892 | 31 | 263.415 |
|  |  | 32 | 338.182 | 32 | 301.622 | 32 | 272.195 |
|  |  | 33 | 349.091 | 33 | 311.351 | 33 | 280.976 |
|  |  |  |  | 34 | 321.081 | 34 | 289.756 |
|  |  |  |  | 35 | 330.811 | 35 | 298.537 |
|  |  |  |  | 36 | 340.541 | 36 | 307.317 |
|  |  |  |  | 37 | 350.270 | 37 | 316.098 |
|  |  |  |  |  |  | 38 | 324.878 |
|  |  |  |  |  |  | 39 | 333.659 |
|  |  |  |  |  |  | 40 | 342.439 |
|  |  |  |  |  |  | 41 | 351.220 |

Tables 2–4 show the angular position of each nascention coordinate of the teeth in the four rings. All three tables have the same column headings, which are four sets of the tooth number and its' angular position . The four sets are for each of the four rings. The column headings have the have the ring number, number of teeth in the ring and the degree of rotation of the teeth in that ring. The first ring will be the absolute angular values. The other rings are relative values, not related to the absolute values yet. This is done when the acceleration channels are determined. Note that the first tooth of each ring starts at zero degrees.

Each ring is incremented by four additional teeth per ring; therefore they are four nascention circles apart. The facial pitch of a nascention circle, the Rho value between these circles, is 0.5236 inches. The ring pitch is a combined four facial pitches totaling 2.0944 inches. For calculation purposes, the width of the ring is the 0.5 inches. Since all rings have the gear centered on their nascention circles, then the ring space is the ring pitch of 2.0944 minus the ring width of 0.5 inches equaling 1.5944 inches. This is the width of the acceleration and deceleration tubes.

The nascention-offset line determines the teeth inside the acceleration tube. The ring pitch of 2.0944 inches is the distance the nascention-offset line must translocate. The first calculation will use an nascention-offset theta of 90-degrees. The ring pitch of 2.0944 inches divided by 90 degrees results in an nascention-offset coefficient of 0.0232711 F/D.

Next, the nascention-offset line needs intercept points that are the nascention coordinates of the scaling teeth. Referring again to FIG. 21, the nascention-offset line 2102 is intercepted 2103 by an ascending spiral 2104 from an offset nascention coordinated 2105. This nascention coordinate 2105 is offset a circular pitch 2106 from the starting nascention coordinate 2101. The intercept point needs an R-rho 2108 and an angular S-theta for the S value 2107. The circular pitch 2106 has an angular displacement H-theta. The H-theta minus the S-theta 2107 results in T-theta 2109. The R-rho 2108 is the S-theta times the nascention-offset coefficient. The T-theta times the nascention coefficient of the offset nascention coordinate is also R-rho 2108.

H-theta=S-theta+T-theta

S-theta=H-theta−T-theta

T-theta=H-theta−S-theta

R-rho=S-theta×*NOL F/D* nascention-offset coefficient

R-rho=T-theta×*N F/D* nascention coefficient

The solution for S-theta is:

S-theta=H-theta×*N F/D/N F/D+NOL F/D*

Find the nascention coefficient N F/D:

First determine the circumference. The starting point is on the first nascention circle with 29 teeth; therefore 29 times the circular pitch of 0.5236 inches is 15.1844 inches. Another way is the radius times 2×pi will equal the circumference. Next, divide 15.1844 inches by 360 degrees to get the circumferences inches per degree of 0.042178889. Finally, divide the circumference inches per degree of 0.042178889 by the tangent of the 45-degree helix, which is 1.0. This yields the same 0.042178889 F/D. For a 45-degree angle, the rise and stride are equal.

The H-theta is the angular displacement of the circular pitch of 0.5236 inches; divided by the circumference inches per degree is 12.41379 degrees. Plug these into the S-theta formula:

S-theta=12.41379 H-theta×0.042178889 *N F/D*=8.0 Deg,0.0232711 *NOL F/D*+0.042178889 *N F/D*

R-rho=8.0 S-theta×0.0232711 *NOL F/D*=0.1862 inches

The first intercept point on the nascention-offset line is 8 degrees over and 0.1862 inches up from the first nascention coordinate. The change in the radius of the cone is R-rho times the sine of the conix angle 9.15784951 degrees which is 0.1862 times 0.159154943 equaling 0.029635 inches. This is the relative change in the radius of the cone from the nascention coordinate to the intercept point. This intercept is the nascention coordinate for the next scaling tooth. It is also used as the nascention coordinate to calculate the next intercept point.

The succeeding intercepts will accumulate the change in the radius for each intercept to determine the circumference of the nascention coordinate.

The 90-degree nascention-offset theta did not end on the next rings' nascention circle. An iteration process was used to calculate a 93.4054-degree theta with 12 scaling teeth. Theta of 81.7701 degrees had 11 teeth and theta of 104.0375 degrees had 13 teeth. Through an iteration process of adding and subtracting smaller changes to the angle of the nascention-offset line to hit the next rings' nascention circle within 1/1000ths of an inch.

Tables 5, 6 & 7 are tables for the three acceleration tubes, one for each pair of rings. Channel 1 is between ring 1 and 2, has 11 teeth and an accumulative angular displacement of 81.770 degrees. Channel 2 is between ring 2 and 3, has 12 teeth and an accumulative angular displacement of 82.680 degrees. Channel 3 is between ring 3 and 4, has 13 teeth and an accumulative angular displacement of 83.406 degrees. Note that all the accumulative angular displacements are from 81 to 83 degrees.

TABLE 5

Channel One Acceleration Tube Scaling Teeth Calculations

| Tooth no. | H Theta | S Theta | T Theta | Rho | Radius Change | Accum. Theta | Accum. Rho | Accum. Radius | Intercept Coefficient |
|---|---|---|---|---|---|---|---|---|---|
| Channel 1: Ring 1 & 2 | | | | Offset Coefficient .0256132 | | | | | |
| 1 | 12.414 | 7.724 | 4.690 | 0.198 | 0.031 | 7.724 | 0.198 | 2.448 | 0.04218 |
| 2 | 12.254 | 7.662 | 4.593 | 0.196 | 0.031 | 15.385 | 0.394 | 2.479 | 0.04273 |
| 3 | 12.100 | 7.601 | 4.499 | 0.195 | 0.031 | 22.986 | 0.589 | 2.510 | 0.04327 |
| 4 | 11.950 | 7.542 | 4.409 | 0.193 | 0.031 | 30.528 | 0.782 | 2.541 | 0.04381 |
| 5 | 11.806 | 7.484 | 4.322 | 0.192 | 0.031 | 38.011 | 0.974 | 2.572 | 0.04435 |
| 6 | 11.666 | 7.427 | 4.238 | 0.190 | 0.030 | 45.439 | 1.164 | 2.602 | 0.04488 |
| 7 | 11.530 | 7.372 | 4.158 | 0.189 | 0.030 | 52.811 | 1.353 | 2.632 | 0.04541 |
| 8 | 11.398 | 7.318 | 4.080 | 0.187 | 0.030 | 60.129 | 1.540 | 2.662 | 0.04594 |
| 9 | 11.271 | 7.265 | 4.006 | 0.186 | 0.030 | 67.394 | 1.726 | 2.691 | 0.04646 |
| 10 | 11.147 | 7.213 | 3.933 | 0.185 | 0.029 | 74.607 | 1.911 | 2.721 | 0.04697 |
| 11 | 11.026 | 7.163 | 3.863 | 0.183 | 0.029 | 81.770 | 2.094 | 2.750 | 0.04749 |

TABLE 6

Channel Two Acceleration Tube Scaling Teeth Calculations

| Tooth no. | H Theta | S Theta | T Theta | Rho | Radius Change | Accum. Theta | Accum. Rho | Accum. Radius | Intercept Coefficient |
|---|---|---|---|---|---|---|---|---|---|
| Channel 2: Ring 2 & 3 | | | | Offset Coefficient .0253315 | | | | | |
| 1 | 10.909 | 7.140 | 3.769 | 0.181 | 0.029 | 7.140 | 0.181 | 2.779 | 0.04800 |
| 2 | 10.796 | 7.092 | 3.704 | 0.180 | 0.029 | 14.232 | 0.361 | 2.807 | 0.04850 |
| 3 | 10.686 | 7.044 | 3.642 | 0.178 | 0.028 | 21.277 | 0.539 | 2.836 | 0.04900 |
| 4 | 10.579 | 6.998 | 3.581 | 0.177 | 0.028 | 28.274 | 0.716 | 2.864 | 0.04949 |
| 5 | 10.475 | 6.952 | 3.523 | 0.176 | 0.028 | 35.226 | 0.892 | 2.892 | 0.04999 |
| 6 | 10.373 | 6.907 | 3.466 | 0.175 | 0.028 | 42.133 | 1.067 | 2.920 | 0.05048 |
| 7 | 10.274 | 6.863 | 3.411 | 0.174 | 0.028 | 48.996 | 1.241 | 2.948 | 0.05096 |
| 8 | 10.178 | 6.820 | 3.358 | 0.173 | 0.027 | 55.816 | 1.414 | 2.975 | 0.05144 |
| 9 | 10.084 | 6.777 | 3.306 | 0.172 | 0.027 | 62.594 | 1.586 | 3.002 | 0.05192 |
| 10 | 9.992 | 6.736 | 3.256 | 0.171 | 0.027 | 69.329 | 1.756 | 3.030 | 0.05240 |
| 11 | 9.903 | 6.695 | 3.208 | 0.170 | 0.027 | 76.025 | 1.926 | 3.057 | 0.05287 |
| 12 | 9.815 | 6.655 | 3.160 | 0.169 | 0.027 | 82.680 | 2.094 | 3.083 | 0.05335 |

TABLE 7

Channel Three Acceleration Tube Scaling Teeth Calculations

| Tooth no. | H Theta | S Theta | T Theta | Rho | Radius Change | Accum. Theta | Accum. Rho | Accum. Radius | Intercept Coeff. |
|---|---|---|---|---|---|---|---|---|---|
| Channel 3: Ring 3 & 4 | | | | Offset Coefficient .0251108 | | | | | |
| 1 | 9.73 | 6.634 | 3.0956 | 0.167 | 0.0265 | 6.6341 | 0.1666 | 3.11 | 0.05 |
| 2 | 9.6468 | 6.595 | 3.0513 | 0.166 | 0.0264 | 13.23 | 0.3322 | 3.1362 | 0.05 |
| 3 | 9.5657 | 6.557 | 3.0083 | 0.165 | 0.0262 | 19.787 | 0.4969 | 3.1624 | 0.05 |
| 4 | 9.4864 | 6.52 | 2.9663 | 0.164 | 0.026 | 26.307 | 0.6606 | 3.1885 | 0.06 |
| 5 | 9.4089 | 6.483 | 2.9255 | 0.163 | 0.0259 | 32.79 | 0.8234 | 3.2144 | 0.06 |
| 6 | 9.3331 | 6.447 | 2.8858 | 0.162 | 0.0258 | 39.238 | 0.9853 | 3.24 | 0.06 |
| 7 | 9.2588 | 6.412 | 2.8471 | 0.161 | 0.0256 | 45.65 | 1.1463 | 3.2658 | 0.06 |
| 8 | 9.1862 | 6.377 | 2.8093 | 0.16 | 0.0255 | 52.026 | 1.3064 | 3.2913 | 0.06 |
| 9 | 9.1151 | 6.342 | 2.7726 | 0.159 | 0.0253 | 58.369 | 1.4657 | 3.3166 | 0.06 |
| 10 | 9.0454 | 6.309 | 2.7367 | 0.158 | 0.0252 | 64.678 | 1.6241 | 3.3418 | 0.06 |
| 11 | 8.9771 | 6.275 | 2.7017 | 0.158 | 0.0251 | 70.953 | 1.7817 | 3.3669 | 0.06 |
| 12 | 8.91 | 6.243 | 2.6676 | 0.157 | 0.0249 | 77.196 | 1.9384 | 3.3918 | 0.06 |
| 13 | 8.8447 | 6.21 | 2.6343 | 0.156 | 0.0248 | 83.406 | 2.0944 | 3.4167 | 0.06 |

These tables have values for each tooth: the angular H-Theta, S-Theta and T-theta, the rho and the change in the cones' radius for each tooth. These values are accumulated into a total theta displacement, total rho and total change in the radius. The ending accumulated rho is the distance between the rings. The Intercept coefficients are for calculating each tooth's ascending spirals. The nascention-offset coefficients were used for all the teeth in their channels.

Referring again to FIG. 16, the deceleration tubes 1601 are highlighted. The deceleration tube also has the ring pitch of 2.0944 inches to translocate, but in a downward, direction. The first deceleration tube starts on the second ring and descends to the first ring. The nascention-offset line has a different geometry, as shown in FIG. 25. The Nascention-offset line 2507 has the nascention coordinate 2509 and the intercept point 2506. The intercept point 2506 has a descending spiral 2505 from the nascention offset coordinate 2502. The nascention-offset coordinate is a circular pitch 2508 away from the nascention coordinate 2509. The H-theta is the angular displacement of the circular pitch 2508. The S-theta 2501 is the angular displacement of the intercept point 2506. The difference between them is the T-theta 2504. The R-rho 2503 is the vector component.

H-theta=S-theta−T-theta

T-theta=S-theta−H-theta

S-theta=H-theta+T-theta

R-rho=S-theta×NOL F/D nascention-offset coefficient

R-rho=T-theta×N F/D nascention coefficient

The solution for T-theta:

T-theta=H-theta×NOL F/D/N F/D−S NOL F/D

H-theta is the angular displacement of the circular pitch. The radius of ring 2 is 2.75 inches; therefore the circumference is 17.2787596. That, divided by 360 degrees is 0.047996554 inches per degree of the circumference. The inches per degree times the circular pitch of 0.5236 inches is the H-theta angular displacement 10.909 degrees.

The nascention coefficient N F/D is the inches per degree of circumference divided by the tangent of the 45-degree helix is 0.047996554 F/D.

The nascention-offset coefficient is the ring pitch of 2.0944 inches divided by an nascention-offset theta of 90-degrees. The result is an nascention-offset coefficient NOL of 0.0232711 F/D. The 90-degrees is a place to start. There will be smaller and larger angles.

T-theta=(H-theta×NOL F/D)/(N F/D−S NOL F/D)

$$\text{T-theta} = (\text{H-theta} \times \text{NOL F/D}) / (\text{N F/D} - \text{S NOL F/D})$$

$$\text{T-theta} = \frac{(10.909\ D \times 0.0232711\ F/D}{0.047996554\ F/D - 0.0232711\ F/D} = 10.2673\ \text{Degrees}$$

R-rho = T-theta × N F/D nascention coefficent

= 10.2673 degrees × 0.047996554 = 0.4928 inches

It is noted that Rho is a negative vector because it is descending.

This process is repeated until the lower ring is reached. The 90 degrees did not hit the ring. It took an iteration process of adding and subtracting smaller changes to the angle of the nascention-offset line to hit the next rings' nascention circle within 1/1000ths of an inch.

Tables 8, 9 & 10 are tables for the three deceleration tubes. Their structure is the same as the acceleration channel tables.

TABLE 8

Channel One Deceleration Tube Scaling Teeth Calculations

| Teeth | H Theta | S Theta | T Theta | Rho | Radius Change | Accum. Theta | Accum. Rho | Accum. Radius | Intercept Coefficient |
|---|---|---|---|---|---|---|---|---|---|
| Channel 1, Ring 1 & 2 | | | | | Offset Coefficient .02291 | | | | |
| | | | | | | | | 2.750 | |
| 1 | 10.909 | 20.871 | 9.9619 | 0.4781 | 0.0761 | 20.871 | 0.4781 | 2.6739 | 0.04800 |
| 2 | 11.220 | 22.038 | 10.818 | 0.5049 | 0.0804 | 42.909 | 0.983 | 2.5935 | 0.04667 |
| 3 | 11.567 | 23.420 | 11.853 | 0.5365 | 0.0854 | 66.329 | 1.520 | 2.5082 | 0.04527 |
| 4 | 11.961 | 25.093 | 13.132 | 0.5749 | 0.0915 | 91.422 | 2.0944 | 2.4167 | 0.04378 |

TABLE 9

Channel Two Deceleration Tube Scaling Teeth Calculations

| Teeth | H Theta | S Theta | T Theta | Rho | Radius Change | Accum. Theta | Accum. Rho | Accum. Radius | Intercept Coefficient |
|---|---|---|---|---|---|---|---|---|---|
| 5003 Channel 2 | | | | | 5004 Offset Coefficient .0228840 | | | | |
| | | | | | | | | 3.0833 | |
| 1 | 9.730 | 16.928 | 7.1986 | 0.3874 | 0.062 | 16.928 | 0.3874 | 3.0217 | 0.05381 |
| 2 | 9.9283 | 17.539 | 7.610 | 0.4014 | 0.064 | 34.467 | 0.7887 | 2.9578 | 0.05274 |
| 3 | 10.143 | 18.219 | 8.0762 | 0.4169 | 0.066 | 52.686 | 1.2057 | 2.8914 | 0.05162 |
| 4 | 10.375 | 18.984 | 8.6085 | 0.4344 | 0.069 | 71.670 | 1.640 | 2.8223 | 0.05047 |
| 5 | 10.630 | 19.852 | 9.2229 | 0.4543 | 0.072 | 91.522 | 2.0944 | 2.750 | 0.04926 |

TABLE 10

Channel Three Deceleration Tube Scaling Teeth Calculations

| Teeth | H Theta | S Theta | T Theta | Rho | Radius Change | Accum. Theta | Accum. Rho | Accum. Radius | Intercept Coefficient |
|---|---|---|---|---|---|---|---|---|---|
| Channel 3 | | | | | | | Offset Coefficient .0228837 | | |
| | | | | | | | | 3.4167 | |
| 1 | 8.780 | 14.248 | 5.4677 | 0.3261 | 0.0519 | 14.248 | 0.3261 | 3.3648 | 0.05963 |
| 2 | 8.9159 | 14.608 | 5.6923 | 0.3343 | 0.0532 | 28.856 | 0.660 | 3.3116 | 0.05873 |
| 3 | 9.0591 | 14.997 | 5.9376 | 0.3432 | 0.0546 | 43.853 | 1.0035 | 3.257 | 0.05780 |
| 4 | 9.2111 | 15.418 | 6.2066 | 0.3528 | 0.0562 | 59.271 | 1.3563 | 3.2008 | 0.05684 |
| 5 | 9.3727 | 15.876 | 6.5032 | 0.3633 | 0.0578 | 75.147 | 1.720 | 3.143 | 0.05586 |
| 6 | 9.5451 | 16.377 | 6.8319 | 0.3748 | 0.060 | 91.524 | 2.0944 | 3.0833 | 0.05486 |

Channel 1 is between ring 2 and 1 and has 4 teeth and angular displacement of 91.422 degrees. Channel 2 is between ring 3 and 2, has 5 teeth and an angular displacement of 91.522 degrees. Channel 3 is between ring 4 and 3, has 6 teeth and an angular displacement of 91.524 degrees. Note that all are clustered around 90 degrees.

These tables have values for each tooth: the angular H-Theta, S-Theta and T-theta, the rho and the change in the cones' radius for each tooth. These values are accumulated into a total theta displacement, total rho and total change in the radius. The ending accumulated rho is the distance between the rings. The Intercept coefficients are for calculating each tooth's ascending spirals. The nascention-offset coefficients were used for all the teeth in their channels.

The Matrix is-the combination of the channels added to the closest top landing teeth that yield the closest interception with the bottom track teeth. Tables 11 & 12 are matrices for the first channel.

A selection of acceleration and deceleration candidates are added together with their respective degree of rotation. The deceleration channel with four teeth and 91.442 degrees of rotation. The acceleration channel had eleven teeth and 81.770 degrees. The combination is 173.192 degrees.

TABLE 11

Channel 1 Matrix

| Teeth | Combined Ac. & Dec. | TOP Landing Teeth × 10.90909 | | Matrix | BOTTOM Track Teeth × 12.41379 | | Difference |
|---|---|---|---|---|---|---|---|
| 4 × 11 | 173.192 | 6 | 65.455 | 238.646 | 19 | 235.862 | 2.7842 |
| | 173.192 | 7 | 7.000 | 249.555 | 20 | 248.276 | 1.2795 |
| | 173.192 | 8 | 87.273 | 269.464 | 21 | 260.690 | -0.2252 |
| | 173.192 | 9 | 98.182 | 271.374 | 22 | 273.103 | -1.7299 |
| 5 × 11 | 184.950 | 6 | 65.455 | 250.404 | 20 | 248.276 | 2.1282 |
| | 184.950 | 7 | 76.364 | 261.313 | 21 | 260.690 | 0.6235 |
| | 184.950 | 8 | 87.273 | 272.222 | 22 | 273.103 | -0.8812 |
| | 184.950 | 9 | 98.182 | 283.131 | 23 | 285.517 | -2.3859 |
| 4 × 12 | 184.827 | 6 | 65.455 | 250.282 | 20 | 248.276 | 2.0057 |
| | 184.827 | 7 | 76.364 | 261.191 | 21 | 260.690 | 0.5010 |
| | 184.827 | 8 | 87.273 | 272.100 | 22 | 273.103 | -1.0037 |
| | 184.827 | 9 | 98.182 | 283.009 | 23 | 285.517 | -2.5084 |

TABLE 12

Channel 1 Matrix

| Teeth | Combined Ac. & Dec. | TOP Landing Teeth × 10.90909 | | Matrix | BOTTOM Track Teeth × 12.41379 | | Difference |
|---|---|---|---|---|---|---|---|
| 5 × 12 | 196.585 | 6 | 65.45454 | 262.039 | 21 | 260.690 | 1.3497 |
| | 196.585 | 7 | 76.36363 | 272.948 | 22 | 273.103 | -0.1550 |
| | 196.585 | 8 | 87.27272 | 283.858 | 23 | 285.517 | -1.6597 |
| | 196.585 | 9 | 98.18181 | 294.767 | 24 | 297.931 | -3.1644 |
| 4 × 13 | 196.459 | 6 | 65.4545 | 261.914 | 21 | 260.690 | 1.2240 |
| | 196.459 | 7 | 76.36363 | 272.823 | 22 | 273.103 | -0.2807 |
| | 196.459 | 8 | 87.27272 | 283.732 | 23 | 285.517 | -1.7854 |
| | 196.459 | 9 | 98.18181 | 294.641 | 24 | 297.931 | -3.2901 |
| 5 × 13 | 208.217 | 6 | 65.45454 | 273.671 | 22 | 273.103 | 0.5680 |
| | 208.217 | 7 | 76.36363 | 284.581 | 23 | 285.517 | -0.9367 |
| | 208.217 | 8 | 87.27272 | 295.490 | 24 | 297.931 | -2.4414 |
| | 208.217 | 9 | 98.18181 | 306.399 | 25 | 310.345 | -3.9461 |

The next step is to add a variety of top landing teeth and their angular displacement to get the matrix. The top landing teeth are on the second ring and its degree per tooth is 10.9091. This means that 6 teeth will be around 60 degrees and 9 teeth, 90 degrees, so the range of teeth is between 6 and 9. They are multiplied by the degree per tooth and added with acceleration and deceleration values to the matrix.

Next, the bottom track has to be determined. The bottom track is the number of teeth between the acceleration tube beginning and the deceleration ending. This is determined by an iteration process of multiplying a number of teeth by the first rings' degree per tooth and comparing it with the matrix to find the closest value. Once found, the bottom track is subtracted from the matrix to find the difference. For the range of top landing teeth, the smallest difference is found.

This is repeated with the combination of two deceleration channels and three acceleration channels. The deceleration channels have 4 and 5 teeth. The acceleration channels have 11, 12 and 13 teeth. There are a total of 6 combinations. Each combination has 4 different top landing teeth added to it. The results are compared to the closest bottom track teeth. The difference is the error that has to be kept to a minimal. It does not hit precisely.

Tables 13–15 are the matrixes for channel 2. This has deceleration tube candidates with 4, 5 and 6 teeth. The acceleration tube candidates with 12, 13 and 14 teeth. The total number of matrixes is 9.

TABLE 13

Channel 2 Matrix

| Teeth | Combined Ac. & Dec. | Top landing Teeth × 9.72973 | | Matrix | BOTTOM Track Teeth × 10.90909 | | Difference |
|---|---|---|---|---|---|---|---|
| 4 × 12 | 163.802 | 6 | 58.378 | 58.378 | 20 | 218.182 | 218.1818 |
| | 163.802 | 7 | 7.000 | 231.910 | 21 | 21.000 | 2.8190 |
| | 163.802 | 8 | 77.838 | 241.640 | 22 | 240.000 | 1.6397 |
| | 163.802 | 9 | 87.568 | 251.369 | 23 | 250.909 | 0.4603 |
| 5 × 12 | 174.202 | 6 | 58.378 | 232.580 | 21 | 229.091 | 3.4890 |
| | 174.202 | 7 | 68.108 | 242.310 | 22 | 240.000 | 2.3096 |
| | 174.202 | 8 | 77.838 | 252.039 | 23 | 250.909 | 1.1303 |
| | 174.202 | 9 | 87.568 | 261.769 | 24 | 261.818 | -0.0491 |

TABLE 13-continued

Channel 2 Matrix

| Teeth | Combined Ac. & Dec.. | Top landing Teeth × 9.72973 | | Matrix | BOTTOM Track Teeth × 10.90909 | | Difference |
|---|---|---|---|---|---|---|---|
| 6 × 12 | 184.563 | 6 | 58.378 | 242.942 | 22 | 240.000 | 2.9418 |
| | 184.563 | 7 | 68.108 | 252.672 | 23 | 250.909 | 1.7624 |
| | 184.563 | 8 | 77.838 | 262.401 | 24 | 261.818 | 0.5831 |
| | 184.563 | 9 | 87.568 | 272.131 | 25 | 272.727 | −0.5963 |

TABLE 14

Channel 2 Matrix

| Teeth | Combined Ac. & Dec.. | Top landing Teeth × 9.72973 | | Matrix | BOTTOM Track Teeth × 10.90909 | | Difference |
|---|---|---|---|---|---|---|---|
| 4 × 13 | 174.103 | 6 | 58.3784 | 232.481 | 21 | 229.091 | 3.3901 |
| | 174.103 | 7 | 68.1081 | 242.211 | 22 | 240.000 | 2.2107 |
| | 174.103 | 8 | 77.8378 | 251.940 | 23 | 250.909 | 1.0314 |
| | 174.103 | 9 | 87.5676 | 261.670 | 24 | 261.818 | −0.1480 |
| 5 × 13 | 184.502 | 6 | 58.3784 | 242.881 | 22 | 240.000 | 2.8807 |
| | 184.502 | 7 | 68.1081 | 252.610 | 23 | 250.909 | 1.7013 |
| | 184.502 | 8 | 77.8378 | 262.340 | 24 | 261.818 | 0.5220 |
| | 184.502 | 9 | 87.5676 | 272.070 | 25 | 272.727 | −0.6574 |
| 6 × 13 | 194.864 | 6 | 58.3784 | 253.243 | 23 | 250.909 | 2.3335 |
| | 194.864 | 7 | 68.1081 | 262.972 | 24 | 261.818 | 1.1541 |
| | 194.864 | 8 | 77.8378 | 272.702 | 25 | 272.727 | −0.0252 |
| | 194.864 | 9 | 87.5676 | 282.432 | 26 | 283.636 | −1.2046 |

TABLE 15

Channel 2 Matrix

| Teeth | Combined Ac. & Dec.. | Top landing Teeth × 9.72973 | | Matrix | BOTTOM Track Teeth × 10.90909 | | Difference |
|---|---|---|---|---|---|---|---|
| 4 × 14 | 184.401 | 6 | 58.3784 | 242.779 | 22 | 240.000 | 2.7794 |
| | 184.401 | 7 | 68.1081 | 252.509 | 23 | 250.909 | 1.6000 |
| | 184.401 | 8 | 77.8378 | 262.239 | 24 | 261.818 | 0.4207 |
| | 184.401 | 9 | 87.5676 | 271.969 | 25 | 272.727 | −0.7587 |
| 5 × 14 | 194.801 | 6 | 58.3784 | 253.179 | 23 | 250.909 | 2.2700 |
| | 194.801 | 7 | 68.1081 | 262.909 | 24 | 261.818 | 1.0906 |
| | 194.801 | 8 | 77.8378 | 272.639 | 25 | 272.727 | −0.0887 |
| | 194.801 | 9 | 87.5676 | 282.368 | 26 | 283.636 | −1.2681 |
| 6 × 14 | 205.163 | 6 | 58.3784 | 263.541 | 24 | 261.818 | 1.7228 |
| | 205.163 | 7 | 68.1081 | 273.271 | 25 | 272.727 | 0.5435 |
| | 205.163 | 8 | 77.8378 | 283.000 | 26 | 283.636 | −0.6359 |
| | 205.163 | 9 | 87.5676 | 292.730 | 27 | 294.545 | −1.8153 |

Tables 16–18 are the matrixes for channel 3. The deceleration tube candidates have 5, 6 and 7 teeth. The acceleration tube candidates have 13, 14, and 15 teeth.

TABLE 16

Channel 3 Matrix

| Teeth | Combined Ac. & Dec.. | Top landing Teeth × 9.72973 | | Matrix | BOTTOM Track Teeth × 10.90909 | | Difference |
|---|---|---|---|---|---|---|---|
| 5 × 13 | 165.637 | 8 | 70.244 | 235.881 | 24 | 233.514 | 2.3677 |
| | 165.637 | 9 | 79.024 | 244.662 | 25 | 243.243 | 1.4184 |
| | 165.637 | 10 | 87.805 | 253.442 | 26 | 252.973 | 0.4692 |
| | 165.637 | 11 | 96.585 | 262.223 | 27 | 262.703 | −0.4800 |
| 6 × 13 | 174.930 | 8 | 70.244 | 245.174 | 25 | 243.243 | 1.9303 |
| | 174.930 | 9 | 79.024 | 253.954 | 26 | 252.973 | 0.9810 |
| | 174.930 | 10 | 87.805 | 262.734 | 27 | 262.703 | 0.0318 |
| | 174.930 | 11 | 96.585 | 271.515 | 28 | 272.432 | −0.9175 |

TABLE 16-continued

Channel 3 Matrix

| Teeth | Combined Ac. & Dec.. | Top landing Teeth × 9.72973 | | Matrix | BOTTOM Track Teeth × 10.90909 | | Difference |
|---|---|---|---|---|---|---|---|
| 7 × 13 | 184.204 | 8 | 70.244 | 254.448 | 26 | 252.973 | 1.4753 |
|  | 184.204 | 9 | 79.024 | 263.229 | 27 | 262.703 | 0.5261 |
|  | 184.204 | 10 | 87.805 | 272.009 | 28 | 272.432 | −0.4232 |
|  | 184.204 | 11 | 96.585 | 280.790 | 29 | 282.162 | −1.3724 |

TABLE 17

Channel 3 Matrix

| Teeth | Combined Ac. & Dec.. | Top landing Teeth × 9.72973 | | Matrix | BOTTOM Track Teeth × 10.90909 | | Difference |
|---|---|---|---|---|---|---|---|
| 5 × 14 | 174.878 | 8 | 70.2439 | 245.122 | 25 | 243.243 | 1.879 |
|  | 174.878 | 9 | 79.02439 | 253.903 | 26 | 252.973 | 0.930 |
|  | 174.878 | 10 | 87.80488 | 262.683 | 27 | 262.703 | −0.019 |
|  | 174.878 | 11 | 96.58537 | 271.464 | 28 | 272.432 | −0.969 |
| 6 × 14 | 184.171 | 8 | 70.2439 | 254.415 | 26 | 252.973 | 1.442 |
|  | 184.171 | 9 | 79.02439 | 263.195 | 27 | 262.703 | 0.492 |
|  | 184.171 | 12 | 87.80488 | 271.976 | 28 | 272.432 | −0.457 |
|  | 184.171 | 11 | 96.58537 | 280.756 | 29 | 282.162 | −1.406 |
| 7 × 14 | 193.446 | 8 | 70.2439 | 263.689 | 27 | 262.703 | 0.987 |
|  | 193.446 | 9 | 79.02439 | 272.470 | 28 | 272.432 | 0.037 |
|  | 193.446 | 10 | 87.80488 | 281.250 | 29 | 282.162 | −0.912 |
|  | 193.446 | 11 | 96.58537 | 290.031 | 30 | 291.892 | −1.861 |

TABLE 18

Channel 3 Matrix

| Teeth | Combined Ac. & Dec.. | Top landing Teeth × 9.72973 | | Matrix | BOTTOM Track Teeth × 10.90909 | | Difference |
|---|---|---|---|---|---|---|---|
| 5 × 15 | 184.118 | 8 | 70.243904 | 254.362 | 26 | 252.973 | 1.389 |
|  | 184.118 | 9 | 79.024392 | 263.143 | 27 | 262.703 | 0.440 |
|  | 184.118 | 10 | 87.80488 | 271.923 | 28 | 272.432 | −0.509 |
|  | 184.118 | 11 | 96.585368 | 280.704 | 29 | 282.162 | −1.459 |
| 6 × 15 | 193.410 | 8 | 70.243904 | 263.654 | 27 | 262.703 | 0.952 |
|  | 193.410 | 9 | 79.024392 | 272.435 | 28 | 272.432 | 0.002 |
|  | 193.410 | 10 | 87.80488 | 281.215 | 29 | 282.162 | −0.947 |
|  | 193.410 | 11 | 96.585368 | 289.996 | 30 | 291.892 | −1.896 |
| 7 × 15 | 202.685 | 8 | 70.243904 | 272.929 | 28 | 272.432 | 0.497 |
|  | 202.685 | 9 | 79.024392 | 281.710 | 29 | 282.162 | −0.452 |
|  | 202.685 | 10 | 87.80488 | 290.490 | 30 | 291.892 | −1.402 |
|  | 202.685 | 11 | 96.585368 | 299.271 | 31 | 301.622 | −2.351 |

FIGS. 40, 41 and 42, are a compilation of the channel matrixes with the smallest errors 6009. The first column is the combination of deceleration teeth and acceleration teeth 6001. The next column has the angular displacements 6002 for the two channels totaling in the third column 6003. The number of top landing teeth 6004 and their angular displacement 6005 are added to the matrix total 6006. The bottom track teeth 6007 and angular displacement 6008 are subtracted from the matrix for the error 6009 between them.

The bottom track is subtracted from 360 degrees for the bottom landing 6009. The bottom landing is the space used by the deceleration exit and acceleration entrance. This is actually the displacement limit that the bottom landing can be. The actual displacement can be less.

The strategy for selecting the combined channels has many criteria. The first is the small end of the cone. There has to be enough room for the overlapping channels to fit the boundaries of the footprint path.

The 4×11 6000 combination for channel one 6001 has the largest number of degrees on the top landing 6005. The acceleration channel exit and deceleration channel entrance has to fit. The Bottom landing 6010 is 12 degrees larger, but on a smaller diameter of the cone. The angular displacement for the channels, top landing and bottom landing that are similar are the combination of 5×12 6100 in channel two and 6×13 6200 in channel three.

Figure 43:
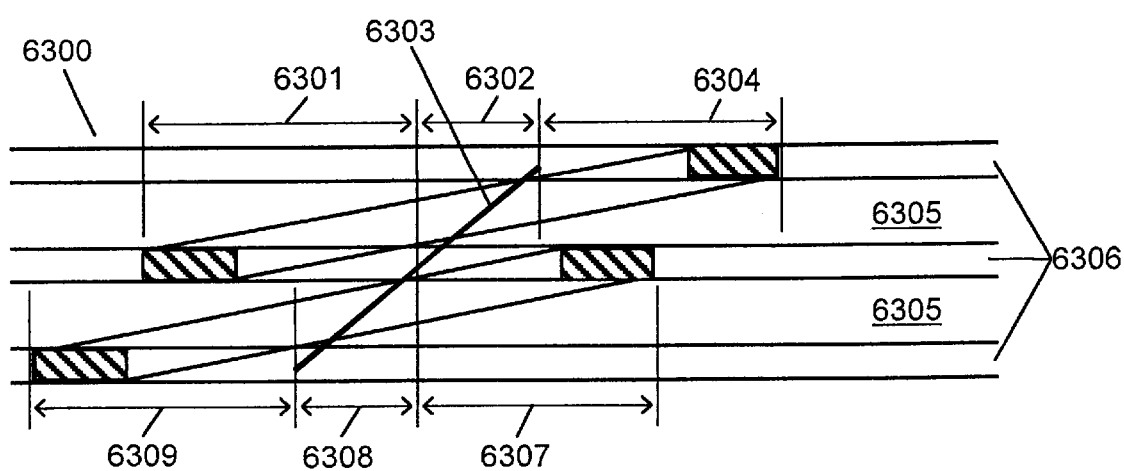
FIG. 43 is a diagrammatic view explaining one strategy for aligned nascention-offset lines.

The second strategic question is how the channels will be aligned. Referring again to FIG. 43, are three rings 6306 with two ring spaces 6305 that have two acceleration channels. These channels have their entrances 6301,6309; acceleration tubes 6302,6308 and exits 6304,6307. Their nascention-offset line 6303 is continuous for the lower channel acceleration tube 6308 to the upper one 6302.

The effect of this is that the first channel exit 6307 is at least half a turn from the second channels' entrance 6301. The prototype was build this way, but it is not necessarily advantageous.

Figure 44:
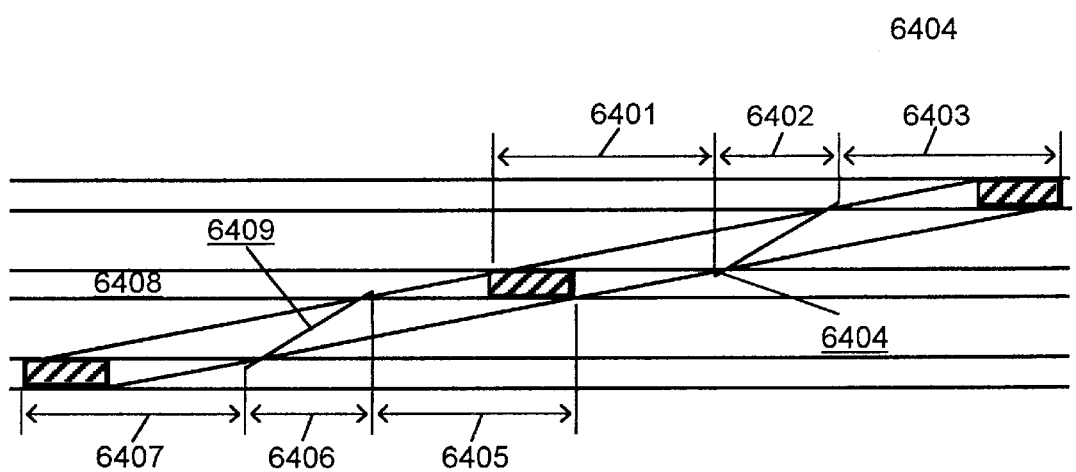
FIG. 44 is a diagrammatic view explaining one strategy for aligned acceleration channels.

Referencing to FIG. 44, another way to design the acceleration channels is to align the footprint paths. This would have allowed the acceleration from one ring to another in the shortest rotation of the cone. The channel entrance 6407, tube 6406 and exit 6405 on the lower ring line up with the entrance 6401, tube 6402 and exit 6403 of the upper ring. The speed only changes in the tube portion of the channels. The nascention-offset line 6409 in the lower channel is a considerable distance away from the nascention-offset line 6404 in the upper channel.

A specific number of teeth have to be determined for this separation. The lower channel determines the location of the teeth on the middle ring 6408. Where that ends and the next channel begins is a specific number of teeth.

The strategy is what channels to use and where they are located relative to each other. The prototype had one continuous nascention-offset line 6300 so that determined the relative positions of the channels.

There are four components that have to be considered: the acceleration and deceleration channels, and the top and bottom landings. For the prototype, it was desired to have all four be close to 90 degrees of displacement. The top landing 6005 of the first channel 6000 was the bottleneck. The largest choice 6011 had one of the smallest errors. It had a top landing of 87 degrees, bottom landing of 99 degrees, an acceleration channel of 91 degrees and a deceleration of 82 degrees. These were the degree ranges that would be used in determining the channels. Channel two 6101 and channel three 6201 with similar specifications also tended to have smaller errors.

Table 19 shows the Channel Tube Specifications by orienting the desired acceleration and deceleration channel tube positions. For each channel there is its' starting position and angular displacement. Because the channel tube direction on the cone is counter clockwise, their displacement is subtracted from the starting position to produce the ending angle. From that, the angle of the top landing teeth is subtracted to yield the starting angle of the deceleration channel tube. The deceleration angle is subtracted from its beginning to yield the ending angle.

The acceleration channel one tube calculations has Accumulative Theta and Accumulative Rho for the relative values of the teeth. The calculations for channel two and channel three have the relative rho and theta. The deceleration channel one tube calculation also has an Accumulative Theta and Accumulative Rho that are the relative values of the

TABLE 19

Channel Tube Specifications

| Chnl. No. | Acceleration Channel Tube | | | Top Landing Angle | Deceleration Channel Tube | | | Bottom Track Angle | Bottom Landing Angle |
|---|---|---|---|---|---|---|---|---|---|
| | Starting Angle | Angular Length | Ending Angle | | Starting Angle | Angular Length | Ending Angle | | |
| 1 | 0.000 | 81.770 | −81.770 | 87.273 | −169.043 | 91.422 | −260.4644 | 260.69 | 99.3100 |
| 2 | −81.770 | 82.679 | −164.450 | 87.568 | −252.017 | 91.522 | −343.5392 | 261.82 | 98.1820 |
| 3 | −164.450 | 83.406 | −247.856 | 87.805 | −335.660 | 91.524 | −427.1839 | 262.70 | 97.2970 |

| | Convert angles to positive #'s | | | | Top Landing Tooth 1 to: | | | Bottom Track Tooth 1 to: | |
|---|---|---|---|---|---|---|---|---|---|
| 1 | 0.0000 | 81.770 | 278.2299 | 9 | 190.9572 | 91.422 | 99.5356 | 22 | 99.3100 |
| 2 | 278.2299 | 82.679 | 195.5505 | 10 | 107.9829 | 91.522 | 16.4608 | 25 | 98.1820 |
| 3 | 195.5505 | 83.406 | 112.1445 | 11 | 24.3397 | 91.524 | 292.8161 | 28 | 97.2970 |

The conic teeth at the beginning of the channels start on the rings first tooth. Where the acceleration channel ends on the next ring is where the next acceleration channel begins. This is due to the fact that the nascention-offset line is continuous from one ring to the next. The result is that the acceleration channel begins on each rings first tooth.

The deceleration channel ends a specific number of teeth from that tooth one. This is called the bottom track teeth. The acceleration channel, top landing and deceleration channel has a specific angular displacement that is associated with a bottom track tooth. This is the ending conic tooth for the deceleration channel.

The first channel starts on the first ring at zero. This channel is already in absolute coordinates. Because the acceleration channel nascention-offset lines are aligned, where the acceleration channel ends is where the next acceleration channel begins. Channel one ended on −81.770 degrees. In channel two that is where it is starting. Where channel two ends is where channel three begins. This completes the orientation that determines the absolute values for all the teeth. The negative angles are converted to positive angular positions.

The Bottom Track Angle is the total angular displacement on the originating ring from the start of the acceleration channel tube to the end of the deceleration channel tube. The Bottom Landing Angle is space between the deceleration tube end and the acceleration tube beginning. It is 360 degrees minus the Bottom Track Angle. This is the area that the deceleration channel exit and acceleration tube entrance most likely share. The Top Landing Tooth is the tooth number that the top landing ends on in the upper ring. It begins on tooth one.

Using the Bottom Track Angle, the Bottom Track Tooth can be found. The angle is in relative terms on a ring. Using the Relative Nascention Coordinates of Table 2, there is a specific tooth that matches the bottom track angle. Ring 1 has a bottom track angle of 260.69 which matches tooth 22.

The angular locations of the beginning and end of channel tubes are the same for the nascention-offset lines. On these lines are the nascention coordinates of the scaling teeth. There relative positions were determined in the acceleration tube scaling teeth calculations of Tables 5–7 and the deceleration tube scaling teeth calculations of Tables 8–10.

scaling teeth nascention coordinates. Channel two and channel three also have relative rho and theta. Tables 20 & 21 are the Acceleration Tube Scaling Teeth Absolute Coordinates tables for the three channels. This has the channels, which tooth and the relative nascention coordinates theta and rho. For the relative coordinates to be absolute, they have to be added to the end of the nascention-offset line. These are found in the Channel Tube Specifications column as the Acceleration Starting Angle. For Channel One, that value is 0.00 degrees. The nascention-offset line begins on the lower ring and ends on the upper ring. The height is up the face of the cone and is found in the Ring Specifications column as the Accumulative Working Face. For channel one, ring one, the face is 2.0944 inches. The relative accumulative values are added to these beginning values for an absolute theta and rho.

TABLE 20

Acceleration Tube Scaling Teeth Absolute Coordinates

| Channel | Tooth | Relative Theta | Rho | Begin Channel Theta | Lower Ring Rho | Absolute Theta | Rho |
|---|---|---|---|---|---|---|---|
| | | | Ring One | | | | |
| 1 | 1 | 7.7236 | 0.1978 | 0.000 | 2.0944 | 7.7236 | 2.2922 |
| | 2 | 15.3851 | 0.3941 | | | 15.3851 | 2.4885 |
| | 3 | 22.9860 | 0.5887 | | | 22.9860 | 2.6831 |
| | 4 | 30.5277 | 0.7819 | | | 30.5277 | 2.8763 |
| | 5 | 38.0115 | 0.9736 | | | 38.0115 | 3.0680 |
| | 6 | 45.4388 | 1.1638 | | | 45.4388 | 3.2582 |
| | 7 | 52.8108 | 1.3527 | | | 52.8108 | 3.4471 |
| | 8 | 60.1289 | 1.5401 | | | 60.1289 | 3.6345 |
| | 9 | 67.3940 | 1.7262 | | | 67.3940 | 3.8206 |
| | 10 | 74.6074 | 1.9109 | | | 74.6074 | 4.0053 |
| | 11 | 81.7702 | 2.0944 | | | 81.7702 | 4.1888 |
| | | | Ring Two | | | | |
| 2 | 1 | 7.1405 | 0.1809 | 278.230 | 2.7500 | 271.0895 | 2.9309 |
| | 2 | 14.2324 | 0.3605 | | | 263.9976 | 3.1105 |
| | 3 | 21.2767 | 0.5390 | | | 256.9533 | 3.2890 |
| | 4 | 28.2743 | 0.7162 | | | 249.9557 | 3.4662 |
| | 5 | 35.2262 | 0.8923 | | | 243.0038 | 3.6423 |
| | 6 | 42.1332 | 1.0673 | | | 236.0968 | 3.8173 |

TABLE 20-continued

Acceleration Tube Scaling Teeth Absolute Coordinates

| Channel | Tooth | Relative Theta | Rho | Begin Channel Theta | Lower Ring Rho | Absolute Theta | Rho |
|---|---|---|---|---|---|---|---|
| | 7 | 48.9962 | 1.2411 | | | 229.2338 | 3.9911 |
| | 8 | 55.8161 | 1.4139 | | | 222.4139 | 4.1639 |
| | 9 | 62.5936 | 1.5856 | | | 215.6364 | 4.3356 |
| | 10 | 69.3295 | 1.7562 | | | 208.9005 | 4.5062 |
| | 11 | 76.0245 | 1.9258 | | | 202.2055 | 4.6758 |
| | 12 | 82.6795 | 2.0944 | | | 195.5505 | 4.8444 |

TABLE 21

Acceleration Tube Scaling Teeth Absolute Coordinates

| Channel | Tooth | Relative Theta | Rho | Begin Channel Theta | Lower Ring Rho | Absolute Theta | Rho |
|---|---|---|---|---|---|---|---|
| | | | | Ring 3 | | | |
| 3 | 1 | 6.6341 | 0.1666 | 195.551 | 6.2832 | 188.9169 | 6.449788284 |
| | 2 | 13.2296 | 0.3322 | | | 182.3214 | 6.615405539 |
| | 3 | 19.7870 | 0.4969 | | | 175.7640 | 6.780068582 |
| | 4 | 26.3071 | 0.6606 | | | 169.2439 | 6.943793749 |
| | 5 | 32.7905 | 0.8234 | | | 162.7605 | 7.106596916 |
| | 6 | 39.2378 | 0.9853 | | | 156.3132 | 7.268493513 |
| | 7 | 45.6495 | 1.1463 | | | 149.9015 | 7.429498547 |
| | 8 | 52.0264 | 1.3064 | | | 143.5246 | 7.589626612 |
| | 9 | 58.3689 | 1.4657 | | | 137.1821 | 7.74889191 |
| | 10 | 64.6776 | 1.6241 | | | 130.8734 | 7.907308262 |
| | 11 | 70.9530 | 1.7817 | | | 124.5980 | 8.064889125 |
| | 12 | 77.1956 | 1.9384 | | | 118.3554 | 8.221647602 |
| | 13 | 83.4061 | 2.0944 | | | 112.1449 | 8.37759645 |

Table 22 is the Deceleration Tube Scaling Teeth Absolute Coordinates. The nascention-offset line begins on the upper ring and ends on the lower ring. In the Channel Tube Specifications of Table 19, the Deceleration Starting Angle has the angular position, which for channel one is 190.957 degrees. The Accumulative Working Face has the starting height. The first deceleration channel is between ring two and one. The upper ring is ring two with an accumulative face of 4.1888.

Deceleration channel two starts on ring three and deceleration channel three starts on ring four.

Tables 23–25 are the angular placement of the conic teeth in relative terms converted to absolute terms. The numbering of the teeth is in a counter-clockwise direction, so the relative values have to be subtracted from the starting coordinates. The first tooth on the first ring starts at zero. From there the relative angles are subtracted to yield the absolute terms. The ending of the first acceleration channel is 278.230 degrees. All the relative angles of that ring are subtracted from this angle to produce all the absolute theta coordinates of the teeth.

TABLE 22

Deceleration Tube Scaling Teeth Absolute Coordinates

| Channel | Tooth | Relative Theta | Rho | Begin Channel Theta | Upper Ring Rho | Absolute Theta | Rho |
|---|---|---|---|---|---|---|---|
| | | | | Ring Two | | | |
| 1 | 1 | 20.8710 | 0.4781 | 190.957 | 4.1888 | 170.0860 | 3.7107 |
| | 2 | 42.9087 | 0.9830 | | | 148.0483 | 3.2058 |
| | 3 | 66.3289 | 1.5195 | | | 124.6281 | 2.6693 |
| | 4 | 91.4218 | 2.0944 | | | 99.5352 | 2.0944 |

TABLE 22-continued

Deceleration Tube Scaling Teeth Absolute Coordinates

| Channel | Tooth | Relative Theta | Rho | Begin Channel Theta | Upper Ring Rho | Absolute Theta | Rho |
|---|---|---|---|---|---|---|---|
| | | | | Ring Three | | | |
| 2 | 1 | 16.9284 | 0.3874 | 107.983 | 6.2832 | 174.0286 | 3.8014 |
| | 2 | 34.4669 | 0.7887 | | | 156.4901 | 3.4001 |
| | 3 | 52.6858 | 1.2057 | | | 138.2712 | 2.9831 |
| | 4 | 71.6697 | 1.6401 | | | 119.2873 | 2.5487 |
| | 5 | 91.5221 | 2.0944 | | | 99.4349 | 2.0944 |
| | | | | Ring Four | | | |
| 3 | 1 | 14.2482 | 0.3261 | 24.340 | 8.3776 | 176.7088 | 3.8627 |
| | 2 | 28.8564 | 0.6603 | | | 162.1006 | 3.5285 |
| | 3 | 43.8532 | 1.0035 | | | 147.1038 | 3.1853 |
| | 4 | 59.2709 | 1.3563 | | | 131.6861 | 2.8325 |
| | 5 | 75.1467 | 1.7196 | | | 115.8103 | 2.4692 |
| | 6 | 91.5237 | 2.0944 | | | 99.4333 | 2.0944 |

The table has the relative and absolute theta values for ring one, ring two, ring three and ring four. Similarly, the nascention coordinates are expressed in absolute values for the conic and scaling teeth.

The first ring on the cone has its nascention circle. There is only one place on the cone that this circle can be and it is a specific distance from the base of the cone. The cone has a base radius of 2.0864 inches and a top summit radius of 3.5793 inches. The axis is 9.2606 inches and the cones' face is 9.3802 inches. Since the first ring has 29 teeth in it, that circumference is 0.5236 inches×29=15.1844 inches. This rings' nascention circle has a Rho of 2.07508 inches from the base of the cone.

inches on both sides, except when cutting a helix angle. More has to be cut for the backside of the next tooth. See reference FIG. 38. The length of the cutter path has to be extended 0.3702 inches. This resulted in 0.2618 inches added to the tooth width for a total of 0.7618 inches. Due to an error in calculations, the model was extended 0.0830 inches. The error resulted in a total cutting width of 0.583 inches instead of 0.7618 inches. The result is the effective gear width would have to be 0.3212 inches.

TABLE 23

Conic Tooth Absolute Nascention Theta Coordinates, Tooth 1–4

| Tooth | Ring 1 12.4140 Start at: 0.000 Relative Angle | 29 Teeth D./tooth Absolute Angle | Ring 2 10.9090 Start at: 278.730 Relative Angle | 33 Teeth D./tooth Absolute Angle | Ring 3 9.7300 Start at: 195.550 Relative Angle | 37 Teeth D./tooth Absolute Angle | Ring 4 8.7810 Start at: 112.144 Relative Angle | 41 Teeth D./tooth Absolute Angle |
|---|---|---|---|---|---|---|---|---|
| 1 | 0.000 | Angle | 0.000 | 278.730 | 0.000 | 195.550 | 0.000 | 112.144 |
| 2 | 12.414 | 347.586 | 10.909 | 267.821 | 9.730 | 185.821 | 8.780 | 103.364 |
| 3 | 24.828 | 335.172 | 21.818 | 256.912 | 19.459 | 176.091 | 17.561 | 94.584 |
| 4 | 37.241 | 322.759 | 32.727 | 246.003 | 29.189 | 166.361 | 26.341 | 85.803 |
| 5 | 49.655 | 310.345 | 43.636 | 235.094 | 38.919 | 156.632 | 35.122 | 77.023 |
| 6 | 62.069 | 297.931 | 54.545 | 224.184 | 48.649 | 146.902 | 43.902 | 68.242 |
| 7 | 74.483 | 285.517 | 65.455 | 213.275 | 58.378 | 137.172 | 52.683 | 59.462 |
| 8 | 86.897 | 273.103 | 76.364 | 202.366 | 68.108 | 127.442 | 61.463 | 50.681 |
| 9 | 99.310 | 260.690 | 87.273 | 191.457 | 77.838 | 117.713 | 70.244 | 41.901 |
| 10 | 111.724 | 248.276 | 98.182 | 180.548 | 87.568 | 107.983 | 79.024 | 33.120 |
| 11 | 124.138 | 235.862 | 109.091 | 169.639 | 97.297 | 98.253 | 87.805 | 24.340 |
| 12 | 136.552 | 223.448 | 120.000 | 158.730 | 107.027 | 88.523 | 96.585 | 15.559 |
| 13 | 148.966 | 211.034 | 130.909 | 147.821 | 116.757 | 78.794 | 105.366 | 6.779 |
| 14 | 161.379 | 198.621 | 141.818 | 136.912 | 126.486 | 69.064 | 114.146 | 357.998 |

When making teeth, the tooth space is cut out leaving the tooth. The boundaries are the beginning and end of the slot that is the tooth space. This transforms the nascention calculations into actual teeth.

The gear is 0.5 inches wide and the nascention circle is going through the middle of the gear, so the boundary is 0.25

To recap, the top boundary is 0.25 inches above the rings' nascention circle and the bottom boundary is 0.25 inches plus the 0.2618 inches extension, below the nascention coordinate. Due to an error, the extension is 0.0830 inches for a total of 0.333 inches below the nascention coordinate. From each tooth's nascention coordinate, the tooth's ascending spiral extends upwards 0.25 inches resulting in displacement that is different for each ring.

TABLE 24

Conic Tooth Absolute Nascention Theta Coordinates, Tooth 15–28

| Tooth | Ring 1 12.4140 Start at: 0.000 Relative Angle | 29 Teeth D./tooth Absolute Angle | Ring 2 10.9090 Start at: 278.730 Relative Angle | 33 Teeth D./tooth Absolute Angle | Ring 3 9.7300 Start at: 195.550 Relative Angle | 37 Teeth D./tooth Absolute Angle | Ring 4 8.7810 Start at: 112.144 Relative Angle | 41 Teeth D./tooth Absolute Angle |
|---|---|---|---|---|---|---|---|---|
| 15 | 173.793 | 186.207 | 152.727 | 125.503 | 136.216 | 59.334 | 122.927 | 349.218 |
| 16 | 186.207 | 173.793 | 163.636 | 114.594 | 145.946 | 49.604 | 131.707 | 340.438 |
| 17 | 198.621 | 161.379 | 174.545 | 103.685 | 155.676 | 39.875 | 140.488 | 331.657 |
| 18 | 211.034 | 148.966 | 185.455 | 92.776 | 165.405 | 30.145 | 149.268 | 322.877 |
| 19 | 223.448 | 136.552 | 196.364 | 81.867 | 175.135 | 20.415 | 158.049 | 314.096 |
| 20 | 235.862 | 124.138 | 207.273 | 70.958 | 184.865 | 10.685 | 166.829 | 305.316 |
| 21 | 248.276 | 111.724 | 218.182 | 60.048 | 194.595 | 0.956 | 175.610 | 296.535 |
| 22 | 260.690 | 99.310 | 229.091 | 49.139 | 204.324 | 351.226 | 184.390 | 287.755 |
| 23 | 273.103 | 86.897 | 240.000 | 38.230 | 214.054 | 341.496 | 193.171 | 278.974 |
| 24 | 285.517 | 74.483 | 250.909 | 27.321 | 223.784 | 331.766 | 201.951 | 270.194 |
| 25 | 297.931 | 62.069 | 261.818 | 16.412 | 233.514 | 322.037 | 210.732 | 261.413 |
| 26 | 310.345 | 49.655 | 272.727 | 5.503 | 243.243 | 312.307 | 219.512 | 252.633 |
| 27 | 322.759 | 37.241 | 283.636 | 354.594 | 252.973 | 302.577 | 228.293 | 243.852 |
| 28 | 335.172 | 24.828 | 294.545 | 343.685 | 262.703 | 292.848 | 237.073 | 235.072 |

TABLE 25

Conic Tooth Absolute Nascention Theta Coordinates, Tooth 29–41

| Tooth | Ring 1 12.4140 Add: 0.000 Relative Angle | 29 Teeth D./tooth Absolute Angle | Ring 2 10.9090 Add: 278.730 Relative Angle | 33 Teeth D./tooth Absolute Angle | Ring 3 9.7300 Add: 195.550 Relative Angle | 37 Teeth D./tooth Absolute Angle | Ring 4 8.7810 Add: 112.144 Relative Angle | 41 Teeth D./tooth Absolute Angle |
|---|---|---|---|---|---|---|---|---|
| 29 | 347.586 | 12.414 | 305.455 | 332.775 | 272.432 | 283.118 | 245.854 | 226.291 |
| 30 | | | 316.364 | 321.866 | 282.162 | 273.388 | 254.634 | 217.511 |
| 31 | | | 327.273 | 310.957 | 291.892 | 263.659 | 263.415 | 208.730 |
| 32 | | | 338.182 | 300.048 | 301.622 | 253.929 | 272.195 | 199.950 |
| 33 | | | 349.091 | 289.139 | 311.351 | 244.199 | 280.976 | 191.169 |
| 34 | | | | | 321.081 | 234.469 | 289.756 | 182.389 |
| 35 | | | | | 330.811 | 224.740 | 298.537 | 173.608 |
| 36 | | | | | 340.541 | 215.010 | 307.317 | 164.828 |
| 37 | | | | | 350.270 | 205.280 | 316.098 | 156.047 |
| 38 | | | | | | | 324.878 | 147.267 |
| 39 | | | | | | | 333.659 | 138.486 |
| 40 | | | | | | | 342.439 | 129.706 |
| 41 | | | | | | | 351.220 | 120.925 |

Table 26 shows top and bottom ring boundaries. Each ring has its' nascention coefficient and distance above the base of the cone, or its' face. This is also the nascention coordinates' Rho value for the rings. The top boundary extension is added to the face to yield the top boundary in inches above the base of the cone. The boundary extension divided by the nascention coefficient is the relative angular displacement. The bottom boundary extension is negative because it is below the nascention coordinates, therefore has to be subtracted to yield the Bottom Boundary. The bottom boundary extension divided by the nascention coefficient is the angular displacement of the bottom boundary.

TABLE 26

Ring Boundaries

Top Ring Boundary

| Ring | Nascention Coefficient | Circle Accum. Face | Boundary Extension | Top Boundary | Extension Divided by Coefficient |
|---|---|---|---|---|---|
| 1 | 0.04491 | 2.07508 | 0.25 | 2.32508 | 5.5667 |
| 2 | 0.05073 | 4.16947 | 0.25 | 4.41947 | 4.9281 |
| 3 | 0.05655 | 6.26387 | 0.25 | 6.51387 | 4.4209 |
| 4 | 0.06237 | 8.35826 | 0.25 | 8.60826 | 4.0083 |

Bottom Ring Boundary

| Ring | Nascention Coefficient | Circle Accum. Face | Boundary Extension | Bottom Boundary | Extension Divided by Coefficient |
|---|---|---|---|---|---|
| 1 | 0.04491 | 2.07508 | −0.33302 | 1.74206 | −7.415274994 |
| 2 | 0.05073 | 4.16947 | −0.33302 | 3.83645 | −6.564557461 |
| 3 | 0.05655 | 6.26387 | −0.33302 | 5.93085 | −5.888947834 |
| 4 | 0.06237 | 8.35826 | −0.33302 | 8.02524 | −5.339426006 |

The calculations of all the teeth are referenced in Tables 27–34. Ring one has the teeth listed and the top height, the nascention height and the bottom height. These height values are the same for all teeth on the rings. What sets the teeth apart is its angular location or nascention coordinate. The top boundary, nascention and bottom boundary angular position on the cone are listed. For the second, third and forth rings, the structure is the same. Each ring has its specific distance up the face of the cone. These are the distances to the top boundary, nascention coordinate rho and the bottom boundary. Each tooth has its angular position for its interception with the top boundary, its nascention coordinate theta and its interception with the bottom boundary.

TABLE 27

Ring One Nascention Coordinates and Boundaries Teeth 1–26
Teeth 1–26

| | Heights | | | Angles | | |
|---|---|---|---|---|---|---|
| Tooth | Top | Nascnt. | Bottom | Top | Nascnt. | Bottom |
| 1 | 2.325 | 2.075 | 1.742 | 5.5656 | 0.000 | −7.414 |
| 2 | | | | 353.1518 | 347.5862 | 340.1725 |
| 3 | | | | 340.7380 | 335.1724 | 237.7588 |
| 4 | | | | 328.3242 | 322.7586 | 315.3450 |
| 5 | | | | 315.9104 | 310.3448 | 302.9312 |
| 6 | | | | 303.4966 | 297.9310 | 290.5174 |
| 7 | | | | 291.0828 | 285.5172 | 278.1036 |
| 8 | | | | 278.6690 | 273.1034 | 265.6898 |
| 9 | | | | 266.2552 | 260.6897 | 253.2760 |
| 10 | | | | 253.8414 | 248.2759 | 240.8622 |
| 11 | | | | 241.4276 | 235.8621 | 228.4484 |
| 12 | | | | 229.0139 | 223.4483 | 216.0346 |
| 13 | | | | 216.6001 | 211.0345 | 203.6208 |
| 14 | | | | 204.1863 | 198.6207 | 191.2070 |
| 15 | | | | 191.7725 | 186.2069 | 178.7932 |
| 16 | | | | 179.3587 | 173.7931 | 166.3794 |
| 17 | | | | 166.9449 | 161.3793 | 153.9656 |
| 18 | | | | 154.5311 | 148.9655 | 141.5519 |
| 19 | | | | 142.1173 | 136.5517 | 129.1381 |
| 20 | | | | 129.7035 | 124.1379 | 116.7243 |
| 21 | 7308 | | | 117.3897 | 111.7241 | 104.3105 |
| 22 | | | | 104.8759 | 99.3103 | 91.8967 |
| 23 | | | | 92.4621 | 86.8966 | 79.4829 |
| 24 | | | | 80.0483 | 74.4828 | 67.0691 |
| 25 | | | | 67.6345 | 62.0690 | 54.6553 |
| 26 | | | | 55.2208 | 49.6552 | 42.2415 |

TABLE 28

Ring One Nascention Coordinates and Boundaries Teeth 27–29

| | Heights | | | Angles | | |
|---|---|---|---|---|---|---|
| Tooth | Top | Nascnt. | Bottom | Top | Nascnt. | Bottom |
| 27 | 2.325 | 2.075 | 1.742 | 42.8070 | 37.2414 | 29.8277 |
| 28 | | | | 30.3932 | 24.8276 | 17.4139 |
| 29 | | | | 17.9794 | 12.4138 | 5.0001 |

TABLE 29

Ring Two Nascention Coordinates and Boundaries

| | Heights | | | Angles | | |
|---|---|---|---|---|---|---|
| Tooth | Top | Nascnt. | Bottom | Top | Nascnt. | Bottom |
| 1 | 4.420 | 4.170 | 3.836 | 286.1573 | 278.2299 | 271.6663 |
| 2 | | | | 272.2482 | 267.3208 | 260.7572 |
| 3 | | | | 261.3391 | 256.4117 | 249.8481 |
| 4 | | | | 250.4300 | 245.5026 | 238.9391 |
| 5 | | | | 239.5209 | 234.5935 | 228.0300 |
| 6 | | | | 228.6118 | 223.6844 | 217.1209 |
| 7 | | | | 217.7028 | 212.7754 | 206.2118 |
| 8 | | | | 206.7937 | 201.8663 | 195.3027 |
| 9 | | | | 195.8846 | 190.9572 | 184.3936 |
| 10 | | | | 184.9755 | 180.0481 | 173.1845 |
| 11 | | | | 174.0664 | 169.1390 | 162.5754 |
| 12 | | | | 163.1573 | 158.2299 | 151.6663 |
| 13 | | | | 152.2482 | 147.3208 | 140.7572 |
| 14 | | | | 141.3391 | 136.4117 | 129.8481 |
| 15 | | | | 130.4300 | 125.5026 | 118.9391 |
| 16 | | | | 119.5209 | 114.5935 | 108.0300 |
| 17 | | | | 108.6118 | 103.6844 | 97.1209 |
| 18 | | | | 97.7028 | 92.7754 | 86.2118 |
| 19 | | | | 86.7937 | 81.8663 | 75.3027 |
| 20 | | | | 75.4195 | 70.9572 | 64.3936 |
| 21 | | | | 64.9755 | 60.0481 | 53.4845 |
| 22 | | | | 54.0664 | 49.1390 | 42.5754 |
| 23 | | | | 43.1573 | 38.2299 | 31.6663 |
| 24 | | 7501 | | 32.2482 | 27.3208 | 20.7572 |
| 25 | | | | 21.3391 | 16.4117 | 9.8481 |
| 26 | | | | 10.4300 | 5.5026 | −1.0609 |

TABLE 30

Ring Two Nascention Coordinates and Boundaries

| | Heights | | | Angles | | |
|---|---|---|---|---|---|---|
| Tooth | Top | Nascnt. | Bottom | Top | Nascnt. | Bottom |
| 27 | 4.420 | 4.170 | 3.836 | 359.5209 | 354.5935 | 348.0300 |
| 28 | | | | 348.6118 | 343.8644 | 337.1209 |
| 29 | | | | 337.7028 | 332.7754 | 326.2118 |
| 30 | | | | 326.7937 | 321.8663 | 315.3027 |
| 31 | | | | 315.8846 | 310.9572 | 304.3936 |
| 32 | | | | 304.9755 | 300.0481 | 293.4845 |
| 33 | | | | 294.0664 | 289.1390 | 282.5754 |

TABLE 31

Ring Three Nascention Coordinates and Boundaries Teeth 1–26

| | Heights | | | Angles | | |
|---|---|---|---|---|---|---|
| Tooth | Top | Nascnt. | Bottom | Top | Nascnt. | Bottom |
| 1 | 6.514 | 6.264 | 5.931 | 199.9710 | 195.5505 | 189.6621 |
| 2 | | | | 190.2413 | 185.8208 | 179.9324 |
| 3 | | | | 180.5116 | 176.0910 | 170.2027 |

TABLE 31-continued

Ring Three Nascention Coordinates and Boundaries Teeth 1–26

| | Heights | | | Angles | | |
|---|---|---|---|---|---|---|
| Tooth | Top | Nascnt. | Bottom | Top | Nascnt. | Bottom |
| 4 | | | | 170.7818 | 166.3613 | 160.4729 |
| 5 | | | | 161.0521 | 156.6316 | 150.7432 |
| 6 | | | | 151.3224 | 146.9019 | 141.0135 |
| 7 | | | | 141.5926 | 137.1721 | 131.2837 |
| 8 | | | | 131.8629 | 127.4424 | 141.5540 |
| 9 | | | | 122.1332 | 117.7127 | 111.8243 |
| 10 | | | | 112.4034 | 107.9829 | 102.0946 |
| 11 | | | | 102.6737 | 98.2532 | 92.3648 |
| 12 | | | | 92.9440 | 88.5235 | 82.6351 |
| 13 | | | | 83.2143 | 78.7937 | 72.9054 |
| 14 | | | | 73.4845 | 36.0640 | 63.1756 |
| 15 | | | | 63.7548 | 59.3343 | 53.4459 |
| 16 | | | | 54.0251 | 49.6046 | 43.7162 |
| 17 | | | | 44.2953 | 39.8748 | 33.9864 |
| 18 | | | | 34.5656 | 30.1451 | 24.2567 |
| 19 | | | | 24.8359 | 20.4154 | 14.5270 |
| 20 | | | | 15.1062 | 10.6856 | 4.7973 |
| 21 | | | | 5.3764 | 0.9559 | −4.9325 |
| 22 | | | | 355.6467 | 351.2262 | 345.3378 |
| 23 | | | | 345.9170 | 341.4964 | 335.6081 |
| 24 | | | | 336.1872 | 331.7667 | 325.8783 |
| 25 | | | | 326.4575 | 322.0370 | 316.1486 |
| 26 | | | | 316.7278 | 312.3073 | 306.4189 |

TABLE 32

Ring Three Nascention Coordinates and Boundaries Teeth 27–37

| | Nascention | | | Boundaries | | |
|---|---|---|---|---|---|---|
| Tooth | Top | Height | Bottom | Top | Angle | Bottom |
| 27 | 6.514 | 6.264 | 5.931 | 306.9980 | 302.5775 | 296.6892 |
| 28 | | | | 297.2683 | 292.8478 | 286.9594 |
| 29 | | | | 287.5386 | 283.1181 | 277.2297 |
| 30 | | | | 277.8089 | 273.3883 | 267.5000 |
| 31 | | | | 268.0791 | 263.6586 | 257.7702 |
| 32 | | | | 258.3494 | 253.9289 | 248.0405 |
| 33 | | | | 248.6197 | 244.1991 | 238.3108 |
| 34 | | | | 238.8899 | 234.4694 | 228.5810 |
| 35 | | | | 229.1602 | 224.7397 | 218.8513 |
| 36 | | | | 219.4305 | 215.0100 | 209.1216 |
| 37 | | | | 209.7007 | 205.2802 | 199.3918 |

TABLE 34

Ring Four Nascention Coordinates and Boundaries Teeth 27–41

| | Heights | | | Angles | | |
|---|---|---|---|---|---|---|
| Tooth | Top | Nascnt. | Bottom | Top | Nascnt. | Bottom |
| 27 | 8.608 | 8.358 | 8.025 | 247.8600 | 243.8518 | 238.5127 |
| 28 | | | | 239.0795 | 235.0713 | 229.7322 |
| 29 | | | | 230.2990 | 226.2908 | 220.9517 |
| 30 | | | | 221.5185 | 217.5104 | 212.1712 |
| 31 | | | | 212.7381 | 208.7299 | 203.3907 |
| 32 | | | | 203.9576 | 199.9494 | 194.6102 |
| 33 | | | | 195.1771 | 191.1689 | 185.8298 |
| 34 | | | | 186.3966 | 182.3884 | 177.0493 |
| 35 | | | | 177.6161 | 173.6079 | 186.2688 |
| 36 | | | | 168.8356 | 164.8274 | 159.4883 |
| 37 | | | | 160.0551 | 156.0469 | 150.7078 |
| 38 | | | | 151.2746 | 147.2665 | 141.9273 |
| 39 | | | | 142.4942 | 138.4860 | 133.1468 |
| 40 | | | | 133.7137 | 129.7055 | 124.3663 |
| 41 | | | | 124.9332 | 120.9250 | 115.5859 |

TABLE 33

Ring Four Nascention Coordinates and Boundaries Teeth 1–26

| Tooth | Heights | | | Angles | | |
|---|---|---|---|---|---|---|
| | Top | Nascnt. | Bottom | Top | Nascnt. | Bottom |
| 1 | 8.608 | 8.358 | 8.025 | 116.1527 | 112.1445 | 106.8054 |
| 2 | | | | 107.3722 | 103.3640 | 98.0249 |
| 3 | | | | 98.5917 | 94.5835 | 89.2444 |
| 4 | | | | 89.8112 | 85.8030 | 80.4639 |
| 5 | | | | 81.0307 | 77.0225 | 71.6834 |
| 6 | | | | 72.2503 | 68.2421 | 62.9029 |
| 7 | | | | 63.4698 | 59.4616 | 54.1224 |
| 8 | | | | 54.6893 | 50.6811 | 45.3419 |
| 9 | | | | 45.9088 | 41.9006 | 36.5615 |
| 10 | | | | 37.1283 | 33.1201 | 27.7810 |
| 11 | | | | 28.3478 | 24.3396 | 19.0005 |
| 12 | | | | 19.5673 | 15.5591 | 10.2200 |
| 13 | | | | 1.7868 | 6.7786 | 1.4395 |
| 14 | | | | 362.0064 | 357.9982 | 352.6590 |
| 15 | | | | 353.2259 | 349.2177 | 343.8785 |
| 16 | | | | 344.4454 | 340.4372 | 335.0980 |
| 17 | | | | 335.6649 | 331.6567 | 326.3176 |
| 18 | | | | 326.8844 | 322.8762 | 317.5371 |
| 19 | | | | 318.1039 | 314.0957 | 308.7566 |
| 20 | | | | 309.3234 | 305.3152 | 299.9761 |
| 21 | | | | 300.5429 | 296.5347 | 291.1956 |
| 22 | | | | 291.7624 | 287.7543 | 282.4151 |
| 23 | | | | 282.9820 | 278.9738 | 273.6346 |
| 24 | | | | 274.2015 | 270.1933 | 264.8541 |
| 25 | | | | 265.4210 | 261.4128 | 256.0737 |
| 26 | | | | 256.6405 | 252.6323 | 247.2932 |

These are all absolute coordinates. The acceleration channels start at the first tooth on their beginning ring. The return loop is the deceleration channels. The first deceleration channel ends on tooth 21, the second on teeth 24 and the third on tooth 27.

The footprint is a hypothetical box that the gear and cone teeth mesh with an extra amount of clearance. In the prototype, the footprint was made very large to allow errors in the moving the gear from one ring to another. The smaller the footprint, the more precise the motion control has to be.

The width of the footprint is 0.5 inches. The length used is 3.5 inches. This was to ensure that there was plenty of room in the channels. The purpose of the footprint is to find the corners that are used for plotting the channel boundaries. They encompass the space that the meshing teeth need plus clearance. On the first ring, the nascention circle has a circumference of 15.1844 inches. The 3.5-inch length of the footprint is an 83-degree displacement on ring one.

Figure 45:
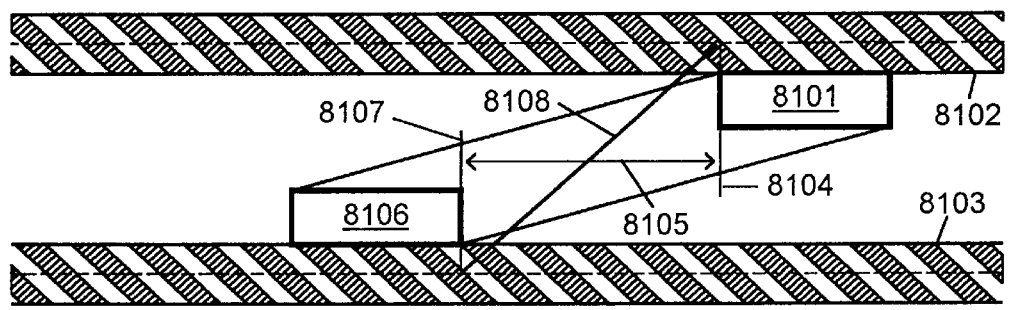
FIG. 45 is a diagrammatic view showing acceleration tube footprint positions.

The footprint path will form the walls of the channel tube. The pinion gear will be inside this path when moving from one ring to another. FIG. 45 shows the positions of the lower footprint 8106 and the upper footprint 8101. The lower footprint is against the lower rings' top boundary 8103. Its right side is aligned with the angular starting position 8107 of the nascention-offset line 8108. This is the beginning of the tubes' domain. The upper footprint 8101 is against the bottom boundary of the upper ring 8102. Its left side is aligned 8104 with the end of the nascention-offset line 8108. This is the end of the tubes' domain 8105. The angular position of the tube is where nascention-offset line 8108 begins and ends.

Figure 46:
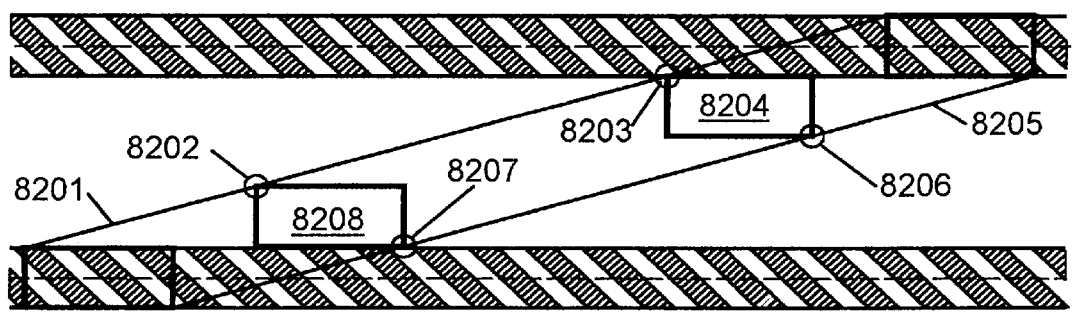
FIG. 46 is a diagrammatic view showing acceleration tube upper and lower boundaries.

As shown in FIG. 46, a line from the top left corner 8202 of the lower footprint 8208 to the intersection of the end of the tube on the bottom boundary 8203 establishes the upper boundary of the acceleration channel. A corresponding line from the bottom right corner 8207 of the lower footprint 8208 to the bottom right corner 8206 of the upper footprint 8204 establishes the bottom boundary of the acceleration channel.

The top boundary is extended 8201 to intercept the top of the lower ring completing the acceleration tube top boundary. This extension is the channel entrance. The corresponding extension 8205 of the acceleration tube bottom boundary is to the bottom of the upper ring. This is the channel exit.

This process establishes the conical coordinates of the scaling teeth pitchlines at the channel boundaries. These are extended from their nascention coordinates in ascending and descending spirals to the boundaries.

Figure 47:
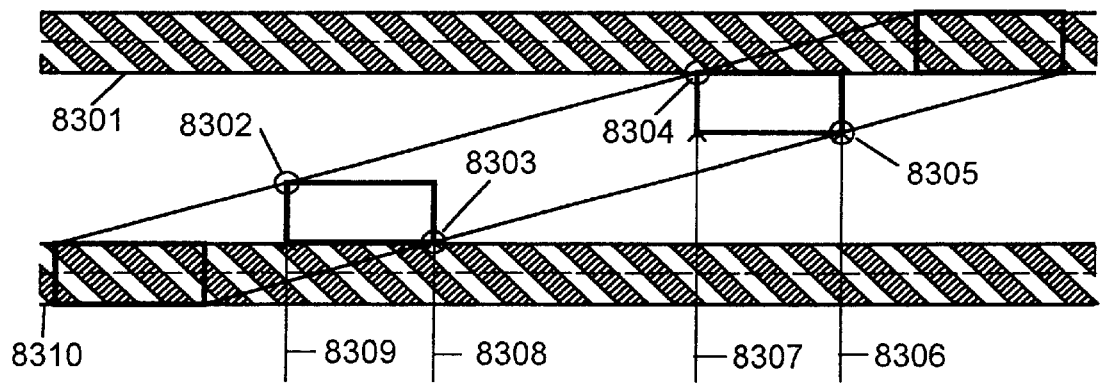
FIG. 47 is a diagrammatic view showing angular positions of acceleration tube upper and lower boundaries.

FIG. 47 is an illustration to explain the calculations for the channel boundaries angular positions. The angular components needed from the lower footprint are the top left corner 8302 and the bottom right corner 8303. The top left corner is the beginning of the acceleration tube 8308 plus the angular displacement of the footprint. The bottom right corner 8303 is the beginning of the acceleration tube 8308.

The angular components needed from the upper footprint are also the top left corner 8304 and the bottom right corner 8305. The top left corner is the end of the acceleration tube. The bottom right is the end of the acceleration tube minus the angular displacement of the footprint. It is subtracted because the direction is counter-clockwise, therefore negative.

Table 35 shows the Acceleration Channel Footprint Angular Specifications. These footprint specifications are based on the rings. The 3.5-inch footprint divided by the radius of each ring will yield a radian. That radian converted to degrees will be used as the angular width. The degrees are rounded to whole numbers. A more accurate way would have been using the radius of the rings' top boundary, but the footprint is being oversized to allow room for errors in its translocation path.

There is a lower footprint position and an upper footprint position. The lower position rests on the lower rings' top boundary 8303. The angular position of the right side is that it aligns with the beginning of the acceleration tube 8303. The left side 8302 of the footprint is in the clockwise direction from the right side 8303 so the angular displacement of the lower footprint is added to the beginning of the acceleration channel.

The upper footprint position is against the bottom boundary of the upper ring. The left side 8304 is the same angular position as the acceleration tubes ending coordinate. The right side is that angular position minus the angular width 8305 of the footprint. The angular width is subtracted because it is in a counter-clockwise direction to the right side.

TABLE 35

Acceleration Tube Footprint Angular Positions

Lower footprint position

| Ring | Radius | 3.5 inch footprint angle | Channel | Top left Beg Accel plus footprint | Bott. Right Begin Accel tube |
|---|---|---|---|---|---|
| 1 | 2.417 | 83 | 1 | 83.0000 | 0.0000 |
| 2 | 2.750 | 73 | 2 | 351.2299 | 278.2299 |
| 3 | 3.083 | 65 | 3 | 260.5505 | 195.5505 |
| 4 | 3.417 | 59 | | | |

TABLE 35-continued

Acceleration Tube Footprint Angular Positions

Upper footprint position

| Ring | Radius | 3.5 inch footprint angle | Channel | Top left End of accel tube | Bott. Right End minus footprint |
|---|---|---|---|---|---|
| 1 | 2.417 | 83 | | | |
| 2 | 2.750 | 73 | 1 | 278.2299 | 205.2299 |
| 3 | 3.083 | 65 | 2 | 195.5505 | 130.5505 |
| 4 | 3.417 | 59 | 3 | 112.1445 | 53.1445 |

For channel one, the lower ring uses the first ring for the footprint displacement of 83 degrees. The acceleration tube starts at 0.0 degrees 8308, so the 83 width is the angular position 8309. The upper position uses the second ring for an angular displacement of 73 degrees. The left side is the end of the acceleration tube 8307 which is 278.23 degrees. The angular width of the footprint of 73 degrees is subtracted from the left side of the footprint 8307 yielding 205.23 degrees 8306.

The channel tube top boundary calculations begins at the top left corner 8302 of the lower footprint and ends at the top left corner 8304 of the upper footprint. The change in height is the ring space of 1.5944 inches minus the tooth width of 0.5 inches equaling 1.0944 inches. This is the Rho value.

In actuality, for the cutting width of the ring, 0.5833 inches was used instead of 0.5 inches. The ring pitch of 2.0944 inches minus the ring width of 0.5833 inches is a ring space of 1.5111 inches. The footprint width was a 0.6 inches instead of 0.5 inches tooth width to make the footprint larger. The result is a space of 1.5111 inches minus the footprint width of 0.6 inches yielding a tube space of 0.9111 inches. This is the height the footprint has to travel.

The degrees of rotation of an upper boundary is the difference between the top left corner of the lower 8302 and upper 8304 positions. The lower left corner 8302 is 83 degrees and the upper left corner 8304 is 278.23 degrees. Since the direction is counter clockwise, it is negative, so from 83 degrees to 0 is −83 degrees. From 0 or 360 degrees to 278.23 is −81.7701 degrees for a total Theta of −164.7710 degrees. The coefficient for the upper boundary is the Rho of 0.911 inches divided by the Theta of −164.7701 degrees equals −0.005529 Face/Degree.

The bottom boundary calculations are from the bottom right corner of the lower footprint 8303 and the bottom right corner of the upper footprint 8305. The change in height, 0.911 inches is the same Rho. The change in the angle of rotation is between the lower right corners. On the first channel, the lower right corner 8303 is 0.0 and the upper right corner is 205.23 degrees. Since this is in a counter clockwise direction, it is negative. Subtracting 205.23 degrees from 360 degrees is −154.77 8306. The difference between the corners is −154.77 degrees.

Figure 48:
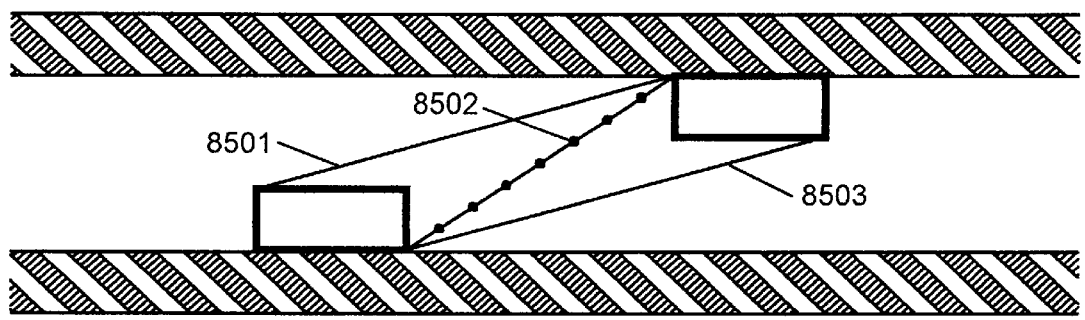
FIG. 48 is a diagrammatic view showing an acceleration tube boundary and a nascention offset line.
Figure 49:
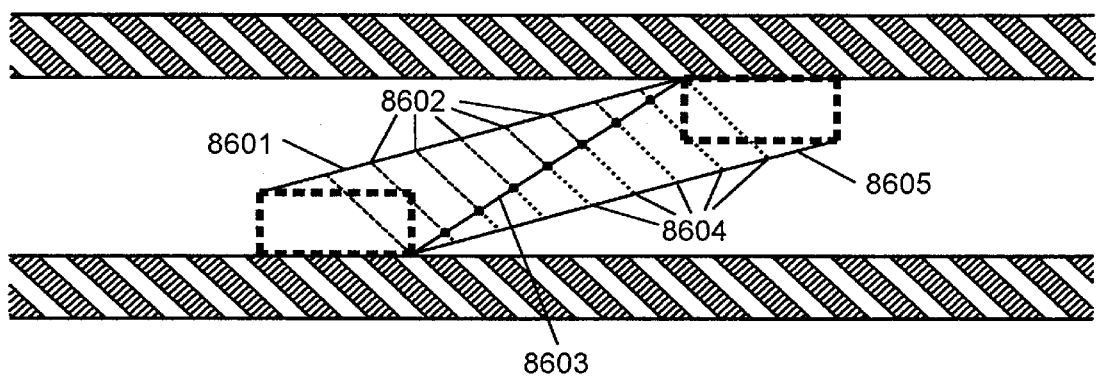
FIG. 49 is a diagrammatic view showing acceleration tube scaling teeth pitchlines.

FIG. 48 recaps what has been completed for the acceleration channel: The top 8501 and bottom 8503 channel boundaries have been determined and the Nascention-offset line 8502 with the scaling teeth nascention coordinates is in place. As shown in FIG. 49, the scaling teeth are extended to the boundaries. They are plotted from their nascention coordinates on the nascention-offset line 8603 to the upper 8601 and lower 8605 boundaries. The ascending spirals 8602 are extended to the upper channel boundary 8601 and the descending spirals 8604 are extended to the lower channel boundary 8605. These are the scaling teeth pitchlines.

Table 36 shows the Acceleration Channel Footprint Specifications. It has the coefficients and coordinates for the plotting the boundaries of the top and bottom acceleration channel tubes. It is divided into the top boundary and bottom boundary. The tubes top boundary has an angular position of the top left corners of the lower and upper positions. The difference is the tube theta, which is the angular displacement of the top boundary. The tube rho is 0.911 for all the boundaries. The tube rho divided by the tube theta is the boundary coefficient.

The next type of coordinate is the height from the base of the cone. The top left corner of the lower footprint position 8302 is the top of the lower ring plus the width of the footprint of 0.6 inches. The top left corner of the upper position 8304 is the bottom of the upper ring.

TABLE 36

Acceleration Tube Footprint Specifications

Top Boundary

| | top left corner | | | | | | Plus bottom 0.6 ring | |
|---|---|---|---|---|---|---|---|---|
| Channel | lower | upper | Tube Theta | Tube Rho | Boundary Coefficient | top ring | lower | upper |
| 1 | 83.0000 | 278.2299 | −164.7701 | 0.911 | −0.00552892 | 2.3251 | 2.9451 | 3.8364 |
| 2 | 351.2299 | 195.5505 | −155.6794 | 0.911 | −0.00585177 | 4.4195 | 5.0395 | 5.9309 |
| 3 | 260.5505 | 112.1445 | −148.4060 | 0.911 | −0.00613857 | 6.5139 | 7.1339 | 8.0250 |

Bottom Boundary

| | Bottom right corner | | | | | | top ring | bottom ring |
|---|---|---|---|---|---|---|---|---|
| Channel | lower | upper | Tube Theta | Tube Rho | Boundary Coefficient | | lower | bound. |
| 1 | 0.0000 | 205.2299 | −154.7701 | 0.911 | −0.00588615 | | 2.3251 | 3.8364 |
| 2 | 278.2299 | 130.5505 | −147.6794 | 0.911 | −0.00616877 | | 4.4195 | 5.9309 |
| 3 | 195.5505 | 53.1445 | −142.4060 | 0.911 | −0.00639720 | | 6.5139 | 8.0250 |

For the channels bottom boundary, there are the angular coordinates for the bottom right corners, the lower position 8303 and the upper position 8305. The difference between then is the tube theta angular displacement. The tube rho divided by the tube theta is the bottom boundary coefficient. The height coordinates for the lower position of the footprints' bottom right corner 8303 is the top of the lower ring. The upper position of the footprints' bottom right corner 8305 is the upper ring bottom boundary minus the 0.6-inch height of the footprint. With the beginning and ending coordinates and the boundary coefficients, the pitchlines of the scaling teeth can be plotted. The pitchlines are extended from their nascention coordinates with an ascending spiral to intercept the upper boundary and with a descending spiral to intercept the lower boundary. These interceptions were found with an iteration process.

TABLE 37

Top Boundary, Channel One, Acceleration Tube
Lower left to upper left: Co-efficient: −0.005529 F/D

| | Nascention | | Coeff. | Incrementation | Top Bound. | | |
|---|---|---|---|---|---|---|---|
| | Rho | Theta | F/D | Height | Angle | Rho | Theta |
| 1 | 2.273 | 352.276 | 0.04547 | 1.046 | 23.006 | 3.319 | 15.283 |
| 2 | 2.469 | 344.615 | 0.04601 | 0.910 | 19.778 | 3.379 | 4.393 |
| 3 | 2.664 | 337.014 | 0.04655 | 0.775 | 16.642 | 3.439 | 353.656 |
| 4 | 2.857 | 329.472 | 0.04709 | 0.640 | 13.594 | 3.497 | 343.067 |
| 5 | 3.049 | 321.988 | 0.04762 | 0.506 | 10.631 | 3.555 | 332.619 |
| 6 | 3.239 | 314.561 | 0.04815 | 0.373 | 7.748 | 3.612 | 322.309 |
| 7 | 3.428 | 307.189 | 0.04868 | 0.241 | 4.942 | 3.668 | 312.131 |
| 8 | 3.615 | 299.871 | 0.04920 | 0.109 | 2.209 | 3.724 | 302.081 |
| 9 | 3.801 | 292.606 | 0.04971 | −0.023 | −0.452 | 3.779 | 292.154 |
| 10 | 3.986 | 285.393 | 0.05023 | −0.153 | −3.046 | 3.833 | 282.347 |
| 11 | 4.170 | 278.230 | | First tooth in the next ring | | | |

TABLE 38

Top Boundary, Channel Two, Acceleration Tube
Lower Left to Upper Left: Co-efficient: −0.005852 F/D

| | Nasc. | | Coeff. | Incrementation | Top Boundary | | |
|---|---|---|---|---|---|---|---|
| | Rho | Theta | F/D | Height | Angle | Rho | Theta |
| 1 | 4.350 | 271.089 | 0.051239 | 1.039 | 20.276 | 5.389 | 291.365 |
| 2 | 4.530 | 263.998 | 0.051738 | 0.916 | 17.702 | 5.446 | 281.699 |
| 3 | 4.708 | 256.953 | 0.052234 | 0.793 | 15.189 | 5.502 | 272.142 |
| 4 | 4.886 | 249.956 | 0.052726 | 0.671 | 12.734 | 5.557 | 262.690 |
| 5 | 5.062 | 243.004 | 0.05322 | 0.550 | 10.337 | 5.612 | 253.340 |
| 6 | 5.237 | 236.097 | 0.05370 | 0.429 | 7.994 | 5.666 | 244.090 |
| 7 | 5.411 | 229.234 | 0.054184 | 0.309 | 5.703 | 5.720 | 234.936 |
| 8 | 5.583 | 222.414 | 0.054664 | 0.189 | 3.463 | 5.773 | 225.876 |
| 9 | 5.755 | 215.636 | 0.055141 | 0.070 | 1.271 | 5.825 | 216.908 |
| 10 | 5.926 | 208.900 | 0.055615 | −0.049 | −0.873 | 5.877 | 208.028 |
| 11 | 6.095 | 202.205 | 0.056086 | −0.167 | −2.971 | 5.929 | 199.234 |
| 12 | 6.264 | 195.550 | | First tooth in the next ring | | | |

TABLE 39

Top Boundary, Channel Three, Acceleration Tube
Lower left to upper left: Co-efficient: −0.006138 F/D

| | Nascention | | Coeff. | Incrementation | Top Boundary | | |
|---|---|---|---|---|---|---|---|
| | Rho | Theta | F/D | Height | Angle | Rho | Theta |
| 1 | 6.431 | 188.916 | 0.057017 | 1.031 | 18.091 | 7.462 | 207.008 |
| 2 | 6.596 | 182.321 | 0.057477 | 0.919 | 15.994 | 7.515 | 198.315 |
| 3 | 6.761 | 175.764 | 0.057935 | 0.808 | 13.938 | 7.568 | 189.702 |

TABLE 39-continued

Top Boundary, Channel Three, Acceleration Tube
Lower left to upper left: Co-efficient: −0.006138 F/D

| | Nascention | | Coeff. | Incrementation | Top Boundary | | |
|---|---|---|---|---|---|---|---|
| | Rho | Theta | F/D | Height | Angle | Rho | Theta |
| 4 | 6.925 | 169.243 | 0.058389 | 0.696 | 11.923 | 7.621 | 181.167 |
| 5 | 7.087 | 162.760 | 0.058842 | 0.585 | 9.948 | 7.673 | 172.708 |
| 6 | 7.249 | 156.313 | 0.059291 | 0.475 | 8.010 | 7.724 | 164.323 |
| 7 | 7.410 | 149.901 | 0.059739 | 0.365 | 6.109 | 7.775 | 156.010 |
| 8 | 7.570 | 143.524 | 0.060183 | 0.255 | 4.244 | 7.826 | 147.769 |
| 9 | 7.730 | 137.182 | 0.060626 | 0.146 | 2.414 | 7.876 | 139.596 |
| 10 | 7.888 | 130.873 | 0.061066 | 0.038 | 0.618 | 7.926 | 131.491 |
| 11 | 8.046 | 124.598 | 0.06150 | −0.070 | −1.146 | 7.975 | 123.451 |
| 12 | 8.202 | 118.355 | 0.061939 | −0.178 | −2.878 | 8.024 | 115.477 |
| 13 | 8.358 | 112.144 | | First tooth in the next ring | | | |

TABLE 40

Bottom Boundary, Channel 1, Acceleration Tube
Lower Right to Upper right: Co-efficient: −0.005886 F/D

| | Nascention | | Coeff. | Incrementation | Bottom Bound. | | |
|---|---|---|---|---|---|---|---|
| | Rho | Theta | F/D | Height | Angle | Rho | Theta |
| 1 | 2.273 | 352.276 | 0.045468 | 0.104 | 2.278 | 2.376 | 354.554 |
| 2 | 2.469 | 344.615 | 0.046014 | −0.030 | −0.658 | 2.439 | 343.957 |
| 3 | 2.664 | 337.014 | 0.046554 | −0.163 | −3.510 | 2.500 | 333.504 |
| 4 | 2.857 | 329.472 | 0.047091 | −0.296 | −6.282 | 2.561 | 323.190 |
| 5 | 3.049 | 321.988 | 0.047623 | −0.428 | −8.978 | 2.621 | 313.010 |
| 6 | 3.239 | 314.561 | 0.048152 | −0.559 | −11.601 | 2.680 | 302.960 |
| 7 | 3.428 | 307.189 | 0.048676 | −0.689 | −14.155 | 2.739 | 293.035 |
| 8 | 3.615 | 299.871 | 0.04920 | −0.819 | −16.641 | 2.796 | 283.230 |
| 9 | 3.801 | 292.606 | 0.049714 | −0.948 | −19.064 | 2.854 | 273.542 |
| 10 | 3.986 | 285.393 | 0.050227 | −1.076 | −21.425 | 2.910 | 263.968 |
| 11 | 4.170 | 278.230 | | First tooth in the next ring | | | |

TABLE 41

Bottom Boundary, Channel 2, Acceleration Tube
Lower Right to Upper Right: Co-efficient: −0.006169 F/D

| | Nascention | | Coeff. | Incrementation | Bottom Bound. | | |
|---|---|---|---|---|---|---|---|
| | Rho | Theta | F/D | Height | Angle | Rho | Theta |
| 1 | 4.350 | 271.089 | 0.051239 | 0.118 | 2.308 | 4.469 | 273.398 |
| 2 | 4.530 | 263.998 | 0.051738 | −0.003 | −0.058 | 4.527 | 263.939 |
| 3 | 4.708 | 256.953 | 0.052234 | −0.124 | −2.368 | 4.585 | 254.585 |
| 4 | 4.886 | 249.956 | 0.052726 | −0.244 | −4.625 | 4.642 | 245.330 |
| 5 | 5.062 | 243.004 | 0.053215 | −0.364 | −6.830 | 4.698 | 236.174 |
| 6 | 5.237 | 236.097 | 0.05370 | −0.483 | −8.985 | 4.754 | 227.112 |
| 7 | 5.411 | 229.234 | 0.054184 | −0.601 | −11.092 | 4.810 | 218.142 |
| 8 | 5.583 | 222.414 | 0.054664 | −0.719 | −13.152 | 4.864 | 209.262 |
| 9 | 5.755 | 215.636 | 0.055141 | −0.836 | −15.168 | 4.919 | 200.469 |
| 10 | 5.926 | 208.900 | 0.055615 | 2.047 | −17.140 | 7.972 | 191.760 |
| 11 | 6.095 | 202.205 | 0.056086 | −1.070 | −19.071 | 5.026 | 183.135 |
| 12 | 6.264 | 195.550 | | First tooth in the next ring | | | |

TABLE 42

Bottom Boundary, Channel 3, Acceleration Tube
Lower right to Upper right: Co-efficient: −0.006400 F/D

| | Nascention | | Coeff. | Incre-mentation | Bottom Bound. | | |
|---|---|---|---|---|---|---|---|
| | Rho | Theta | F/D | Height | Angle | Rho | Theta |
| 1 | 6.431 | 188.916 | 0.057017 | 0.131 | 2.290 | 6.561 | 191.206 |
| 2 | 6.596 | 182.321 | 0.057477 | 0.020 | 0.341 | 6.616 | 182.662 |
| 3 | 6.761 | 175.764 | 0.057935 | −0.091 | −1.569 | 6.670 | 174.195 |
| 4 | 6.925 | 169.243 | 0.058389 | −0.201 | −3.441 | 6.724 | 165.803 |
| 5 | 7.087 | 162.760 | 0.058842 | −0.311 | −5.276 | 6.777 | 157.484 |
| 6 | 7.249 | 156.313 | 0.059291 | −0.420 | −7.077 | 6.830 | 149.236 |
| 7 | 7.410 | 149.901 | 0.059739 | −0.528 | −8.843 | 6.882 | 141.058 |
| 8 | 7.570 | 143.524 | 0.060183 | −0.637 | −10.576 | 6.934 | 132.948 |
| 9 | 7.730 | 137.182 | 0.060626 | −0.744 | −12.277 | 6.985 | 124.905 |
| 10 | 7.888 | 130.873 | 0.061066 | −0.852 | −13.946 | 7.036 | 116.927 |
| 11 | 8.046 | 124.598 | 0.09150 | −0.959 | −15.586 | 7.087 | 109.012 |
| 12 | 8.202 | 118.355 | 0.061939 | −1.065 | −17.196 | 7.137 | 101.159 |
| 13 | 8.358 | 112.144 | | First tooth in the next ring | | | |

The boundary coefficients are rho divided by a theta. They are taken from the Acceleration Channel Footprint Specifications. The interception of the boundary and tooth's pitchline is an iteration process. The top boundaries have the ascending spirals up from the nascention coordinates. The iteration process will use the boundary coefficient and the scaling teeth nascention coefficient to find the relative height and angle. Theses are added to the nascention coordinates for the absolute coordinates of the boundary interception.

It should be noted that the incrementation used on the last teeth is negative because the boundary rho is below the nascention rho. The bottom boundaries extend descending spirals from the nascention coordinates downward in a negative direction. As a result, the relative incrementation height and angle are negative. The boundary rho and theta is less then the nascention rho and theta. However, there is one exception as the first tooth's incrementation is not negative because the bottom boundary rho is above the nascention coordinate rho.

The iteration process will find the interception of the tooth's pitchline and boundary line. The pitchline starts at the nascention coordinates height and angle. The boundary line for the channel is found in the Acceleration Channel Footprint Specifications with its starting heights. The pitchline is extended to these starting heights using the nascention coefficient to find the relative angle. This is the next starting point for the pitchline.

Once at the same height, the process becomes adding an incrementing height to a new relative rho, then calculating the relative theta for the pitchline and boundary. The relative thetas are added to their respective starting angles for absolute angular positions. This is compared. If they have passed, then the incrementing amount is reduced by a 10th and the sign changed so if it was adding 0.01 inches, it will be subtracting 0.001 inches. This continues until the difference in absolute heights is less the 0.001 inches, a tight machine tolerance. These relative incremented coordinates are added to the nascention coordinates for the absolute coordinates that is the end of the pitchline. The process is used for all the scaling teeth except the last one. On an acceleration channel, the last tooth is the first conic tooth on the next ring, not a scaling tooth. The conic teeth have their own boundaries.

Figure 50:
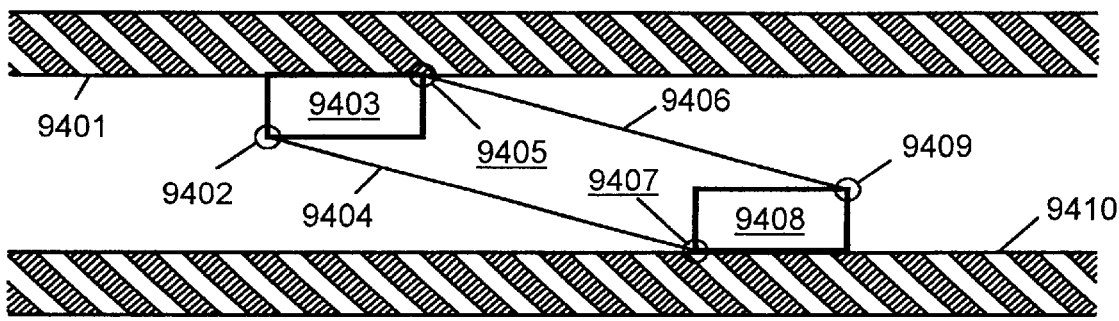
FIG. 50 is a diagrammatic view showing deceleration tube upper and lower boundaries.

The same process applies to the Deceleration Channel. FIG. 50 shows the upper 9403 and the lower footprint positions 9408 forming the top 9406 and bottom 9404 channel tube boundaries. The upper footprint position is against the upper rings' 9401 bottom boundary and the lower footprint position is against the lower rings' 9410 top boundary. The channel tubes top boundary 9406 starts on the top right corner 9405 of the footprints' upper position and ends on the top right corner 9409 of the footprints' lower position. The channel tubes bottom boundary 9404 starts on the bottom left corner 9402 of footprints' upper position and ends on the bottom left corner 9407 of the footprints' lower position.

Figure 51:
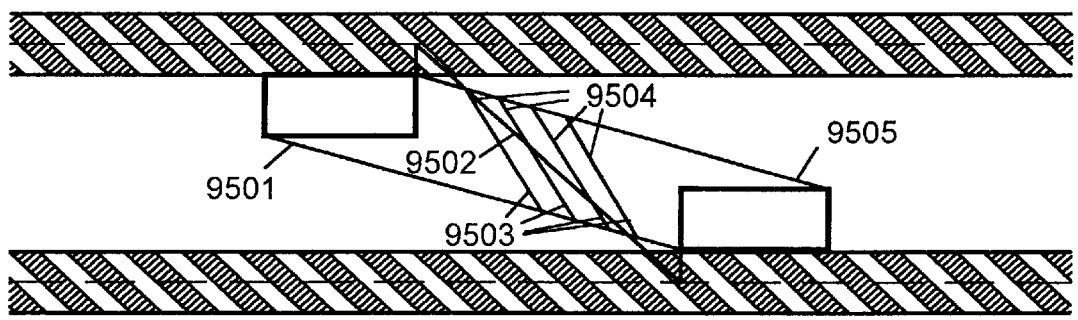
FIG. 51 is a diagrammatic view showing deceleration tube scaling teeth pitchlines.

As shown in FIG. 51, the nascention-offset line 9502 has ascending spirals 9504 that intercept the top channel tube boundary 9505 and descending spirals 9503 that intercept the bottom channel tube boundary 9501. There are fewer teeth in the deceleration channel because the teeth's descending spiral 9503 and the nascention-offset line 9502 slope in the same direction so their interception distances are much longer. It is important to note that the last tooth in the deceleration channel is the landing tooth on the lower ring. This makes it a conic tooth instead of a scaling tooth.

TABLE 43

Deceleration Channel Footprint Angular Positions

| Ring | Radius | 3.5 inch footprint angle | Channel | Bott. Left Beg Decel. plus footprint | Top Right Beg Decel |
|---|---|---|---|---|---|
| 1 | 2.417 | 83 | | | |
| 2 | 2.750 | 73 | 1 | 263.9572 | 190.9572 |
| 3 | 3.083 | 65 | 2 | 172.9829 | 107.9829 |
| 4 | 3.417 | 59 | 3 | 83.3397 | 24.3397 |

Lower footprint position

| Ring | Radius | 3.5 inch footprint angle | Channel | Bott. Left End of Decel tube | Top Right End minus footprint |
|---|---|---|---|---|---|
| 1 | 2.417 | 83 | 1 | 99.5356 | 16.5356 |
| 2 | 2.750 | 73 | 2 | 16.4608 | 303.4608 |
| 3 | 3.083 | 65 | 3 | 292.8161 | 227.8161 |
| 4 | 3.417 | 59 | | | |

Table 43 is a table showing the angular positions of the footprints in the upper and lower positions. Since these positions are from the top of one ring to the bottom of another ring, the angular displacement of the 3.5 inch footprint has to be calculated for each ring using the rings radius. The upper position for the channels footprint is the angular position of the beginning of the deceleration tube. Add the footprint displacement for the other side of the footprint at the upper ring. It is added because the direction is clockwise. The lower position of the footprint is on the lower ring. One side is the angular position of the end of the deceleration tube 9409. The other side is the width of the footprint 9408 subtract from the end of the deceleration tube. It is subtracted because it is in a counter-clockwise direction.

FIG. 52 is a table showing the Deceleration Channel Boundary Specifications for the top 9701 and bottom 9710 boundaries. The top boundary 9701 used the top right corners 9405,9409 of the two footprint positions. The channel number 9701,9710, angular position of the upper 9702, 9711 and lower 9703, 9712 sides of the footprint and the net theta 9704, 9713 are shown. The net theta 9704, 9713 is the total angular displacement. The Rho 9705, 9715 is the height of the channel tube boundary. The boundary coefficient 9705, 9714 is the Rho 9705, 9714 divided by the net theta 9706, 9715. The lower footprint is against the lower rings' top boundary, so the height of this ring boundary is needed 9707. The height of the footprint is 0.6 inches. This is added to the height of the lower rings' top boundary to get the height of the top right corner 9708. The other corner in the upper position of the footprint is the upper rings' bottom boundary 9709.

The bottom boundary 9711 uses the two lower left corners 9402. The angular position of the upper 9712 and lower 9713 footprint is used to determine the net theta 9714. The Rho divided by the net theta yields the boundary coefficient 9715. The bottom boundary starts on the intersection of the footprint and the lower rings' upper ring boundary 9716. The boundary finishes at the bottom of the upper rings' boundary 9717 minus the 0.6 inch 9718 width of the gear.

Tables 44–46 show the Top Boundaries of three of the Deceleration Tubes. Each is the result of an iteration process that starts at the nascention coordinate height and angle with the nascention coefficient. The relative height and angle are added to the nascention coordinates for an absolute height and angle of the boundary interception.

TABLE 44

Top Boundary, Channel 1, Deceleration Tube
Upper Right to lower right; Co-efficient: 0.005223 F/D

| Nascention | | Coeff. | Incrementation | Top Boundary | | |
|---|---|---|---|---|---|---|
| Rho | Theta | F/D | Height | Angle | Rho | Theta |
| 1 3.691 | 170.086 | 0.04941 | 0.062 | 1.254 | 3.753 | 171.340 |
| 2 3.186 | 148.048 | 0.04801 | 0.500 | 10.405 | 3.686 | 158.453 |
| 3 2.650 | 124.628 | 0.04652 | 0.968 | 20.811 | 3.618 | 145.439 |
| 4 2.075 | 99.5354 | | First tooth in next ring | | | |

TABLE 45

Top Boundary, Channel 2, Deceleration Tube
Upper Right to Lower Right; Co-efficient: 0055329 F/D

| Nascention | | Coeff. | Incrementation | Top Boundary | | |
|---|---|---|---|---|---|---|
| Rho | Theta | F/D | Height | Angle | Rho | Theta |
| 1 5.876 | 91.055 | 0.05548 | −0.023 | −0.402 | 5.854 | 90.653 |
| 2 5.475 | 73.516 | 0.05436 | 0.317 | 5.820 | 5.792 | 79.336 |
| 3 5.058 | 55.297 | 0.05320 | 0.670 | 12.591 | 5.728 | 67.888 |
| 4 4.624 | 36.313 | 0.05200 | 1.040 | 20.005 | 5.664 | 56.318 |
| 5 4.170 | 16.461 | | First tooth in next ring | | | |

TABLE 46

Top Boundary, Channel 3, Deceleration Tube
Upper Right to Lower Right; Co-efficient: 0058308 F/D

| Nascention | | Coeff. | Incrementation | Top Boundary | | |
|---|---|---|---|---|---|---|
| Rho | Theta | F/D | Height | Angle | Rho | Theta |
| 1 8.032 | 10.091 | 0.06147 | −0.078 | −1.270 | 7.954 | 8.822 |
| 2 7.698 | 355.483 | 0.06054 | 0.198 | 3.264 | 7.896 | 358.747 |
| 3 7.355 | 340.486 | 0.05958 | 0.482 | 8.081 | 7.836 | 348.567 |
| 4 7.002 | 325.069 | 0.05860 | 0.775 | 13.215 | 7.776 | 338.283 |
| 5 6.639 | 309.193 | 0.05760 | 1.077 | 18.704 | 7.716 | 327.897 |
| 6 6.264 | 292.816 | | First tooth in next ring | | | |

Tables 47–49 show the Bottom Boundaries of the three Deceleration Tubes. The difference is that this boundary is below the nascention-offset line so the relative height is negative. This makes the relative angle negative as well.

TABLE 47

Bottom Boundary, Channel 1, Deceleration Tube
Upper left to Lower left: Co-efficient: 0.0055407 F/D

| Nascention | | Coeff. | Incrementation | Bottom Bound. | | |
|---|---|---|---|---|---|---|
| Rho | Theta | F/D | Height | Angle | Rho | Theta |
| 1 3.691 | 170.086 | 0.04941 | −1.075 | −21.763 | 2.616 | 148.323 |
| 2 3.186 | 148.048 | 0.04801 | −0.647 | −13.477 | 2.540 | 134.571 |
| 3 2.650 | 124.628 | 0.04652 | −0.188 | −4.049 | 2.462 | 120.579 |
| 4 2.075 | 99.5354 | | First tooth in next ring | | | |

TABLE 48

Bottom Boundary, Channel 2, Deceleration Tube
Upper Left to Lower Right: Co-efficient: 0.0055407 F/D

| Nascention | | Coeff. | Incrementation | Botton Bound. | | |
|---|---|---|---|---|---|---|
| Rho | Theta | F/D | Height | Angle | Rho | Theta |
| 1 5.877 | 91.055 | 0.05548 | −1.121 | −20.206 | 4.755 | 70.849 |
| 2 5.475 | 73.516 | 0.05436 | −0.789 | −14.505 | 4.687 | 59.011 |
| 3 5.058 | 55.297 | 0.05321 | −0.442 | −8.300 | 4.617 | 46.997 |
| 4 4.624 | 36.313 | 0.05200 | −0.078 | −1.503 | 4.546 | 34.811 |
| 5 4.170 | 16.461 | | First tooth in next ring | | | |

TABLE 49

Bottom Boundary, Channel 3, Deceleration Tube
Upper left and Lower Right: Co-efficient: 0.0060520 F/D

| Nascention | | Coeff. | Incrementation | Bottom Bound. | | |
|---|---|---|---|---|---|---|
| Rho | Theta | F/D | Height | Angle | Rho | Theta |
| 1 8.032 | 10.091 | 0.06147 | −1.144 | −18.609 | 6.888 | 351.482 |
| 2 7.698 | 355.483 | 0.06054 | −0.873 | −14.414 | 6.825 | 341.069 |
| 3 7.355 | 340.486 | 0.05958 | −0.593 | −9.956 | 6.762 | 330.531 |
| 4 7.002 | 325.069 | 0.05860 | −0.305 | −5.204 | 6.697 | 319.865 |
| 5 6.639 | 309.193 | 0.05760 | −0.007 | −0.122 | 6.632 | 309.071 |
| 6 6.264 | 292.816 | | First tooth in next ring | | | |

The last tooth is not a scaling tooth; it is a conic tooth.

Figure 53:
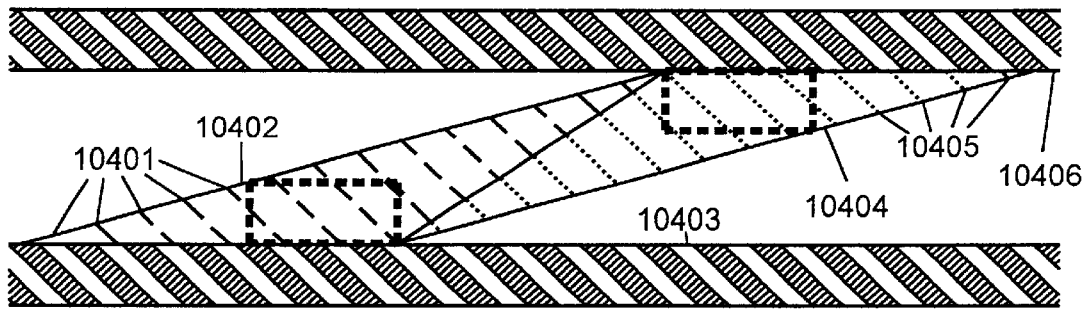
FIG. 53 is a diagrammatic view showing acceleration channel entrance and exit boundary.

The Channels entrances and exits are extensions of conic teeth to the top and bottom channel boundaries. FIG. 53 shows the extensions 10401, 10405 of the channel boundaries 10402, 10404 to the rings 10403, 10406. These extensions of the boundary complete the top of channel entrance 10402 and the bottom of its' exit 10404. The top of the channel 10402 has ascending conic teeth extended 10401 from the lower ring 10403 to form the entrance boundary. The bottom of the channel 10404 has descending conic teeth extended 10405 from the upper ring 10406 to the exit boundary.

Figure 54:
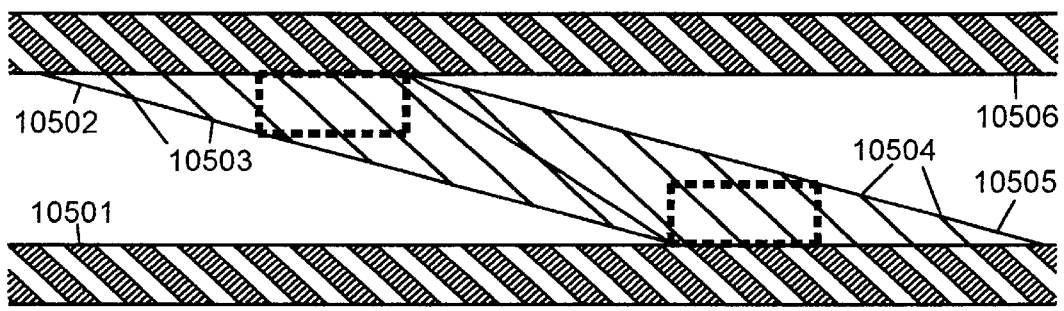
FIG. 54 is a diagrammatic view showing deceleration channel entrance and exit boundary.

FIG. 54 shows a deceleration channel with its extended channels for entrances and exits. It has a top entrance 10502 and a bottom exit 10505 to complete its' channel. The descending conic teeth are extended 10503 to the bottom boundary 10502 to form an entrance. The ascending conic teeth 10504 are extended to the top boundary 10505 to form an exit.

There are two ascending and two descending processes. The conic teeth have ascending spirals to the top channel boundary 10401, 10504. They also have descending spirals to the bottom channel boundary 10405, 10503. The ascending spirals are to the top of acceleration channel entrance and deceleration channel exit. The descending spirals are to the bottom of the acceleration exit and the deceleration entrance. They will be overlap between the channel entrance and exits.

In the Channel Tube Specifications of Table 19, there was a Bottom Landing Angle. This was the angular displacement for the acceleration channel entrance and deceleration exit.

The closely overlapping footprint is demonstrated in channel one with a bottom landing of 97.297 degrees and the footprint of 83 degrees. Two footprints have to fit inside of the bottom landing. In the prototype, the footprint is relatively huge, while the preferred footprint clearance is about half that size.

TABLE 50

Overlap Analysis

| Bottom Landing | | | | Deceleration End. | | | Acceleration Beg. | | |
|---|---|---|---|---|---|---|---|---|---|
| Channel No. | Bottom Landing | Ring No. | Footprint | Ending Tooth | Top boundary Angle | Height | Begin Tooth | Top boundary Angle | Height |
| 1 | 97.297 | 1 | 83.0 | 22 | 117.390 | 2.325 | 1 | 5.566 | 2.325 |
| 2 | 98.182 | 2 | 73.0 | 25 | 32.248 | 4.420 | 1 | 286.157 | 4.420 |
| 3 | 99.310 | 3 | 65.0 | 28 | 306.998 | 6.514 | 1 | 199.971 | 6.514 |

| Top Landing | | | | Acceleration End | | | Deceleration Beg. | | |
|---|---|---|---|---|---|---|---|---|---|
| Channel No. | Top Landing | Ring No. | Footprint | Begin Tooth | Top boundary Angle | Height | Ending Tooth | Top boundary Angle | Height |
| 1 | 87.273 | 2 | 73.0 | 1 | 148.323 | 2.616 | 9 | 263.554 | 2.910 |
| 2 | 87.568 | 3 | 65.0 | 1 | 70.849 | 4.755 | 10 | 183.135 | 5.028 |
| 3 | 87.805 | 4 | 59.0 | 1 | 351.482 | 6.888 | 11 | 101.159 | 7.137 |

The Top Landing angle is the angular displacement for the acceleration channel exit and deceleration channel entrance.

Figure 55:
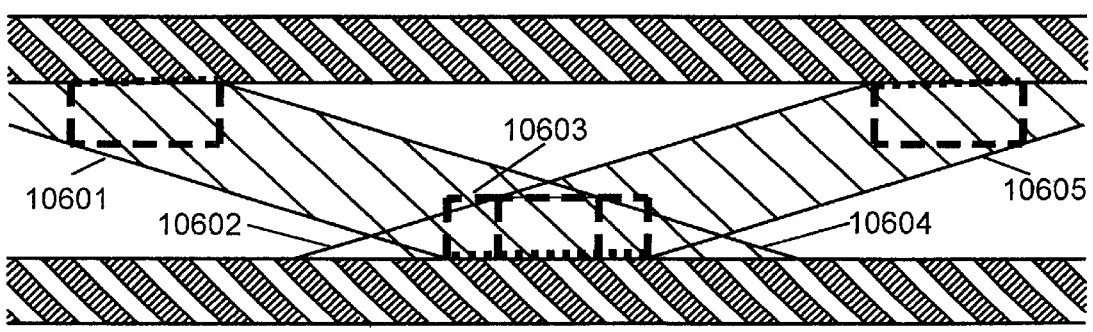
FIG. 55 is a diagrammatic view showing an overlap of deceleration exit and acceleration entrance.

FIG. 55 is an overlapped bottom landing. The box is two overlapped footprints. There is a problem demonstrated here. The acceleration channel entrance is outside of the deceleration channel. This can not be. The teeth inside the deceleration tube are not the same as the conic teeth in the entrance. The entrance has to stop at the deceleration channel tube. It can share the deceleration channel exit, but not the tube.

The deceleration channel exit is below the acceleration channel tube, with a similar problem. It has to stop at the acceleration channel tube. It can share the acceleration channel entrance but not the tube. The first tooth on a ring is the beginning of an acceleration channel tube calculation. The last tooth in a deceleration channel is a tooth on the lower ring. The bottom landing is the space between tooth number one and the deceleration channel tooth.

Table 50 shows an analysis of the angular displacements of the bottom and top landings. For the bottom landing, each channel has its angular displacement for the bottom landing, the ring that the footprint is on top of and the angular displacement of that footprint. The bottom landing is between the end of the deceleration channel tube and the beginning of the acceleration tube. The end of the deceleration tube is at a specific tooth with an angle and height. The beginning of the acceleration tube is the first tooth on the ring with a specific angle and height.

For the top landing, each channel has the angular displacement of the top landing, the ring that the footprint is underneath, and the footprint angular displacement. The top landing is between the end of acceleration tube and the beginning of the deceleration tube. The acceleration and deceleration tubes end on a specific tooth at a specific angle and height.

As the number of rings increase, the rotational displacement of the footprints decreases. The angular displacements of the top and bottom landings were designed to be similar.

Figure 56:
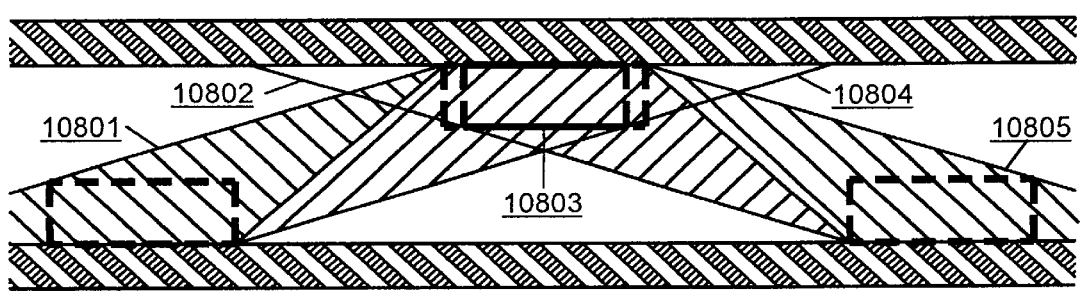
FIG. 56 is a diagrammatic view showing an overlap of acceleration exit and deceleration entrance.

The top landings have similar problems. As shown in FIG. 56, the deceleration channel entrance 10802 is past the acceleration tube 10801, and the acceleration channel exit 10804 is past the deceleration tube 10805. The exit has to stop at the tube as the pinion gear cannot share different types of teeth and, thus, cannot straddle the scaling teeth in the tube and the extended conic teeth in the entrance.

In the angular displacement comparison of Table 50, the top landings were designed to be close to 87 degrees for each channel with the footprint against bottom boundary of the upper ring. Note that the angular displacement of the footprint is getting smaller with more rings.

The Ascending Boundaries are conic teeth ascending to the extension of top boundary of the channel tube. There are two type of ascending conic teeth, one for the acceleration channel entrance and the other a deceleration channel exit.

TABLE 51

Top Boundary, Acceleration Entrance, Channel
Ascending Iteration Process of Tooth Boundary Interception
Acceleration Tube: Top Boundary Co-efficient: −0.00552892 F/D
Starting Rho: 2.9451    Starting Theta: 83.000

| Tooth No. | Top Boundary Theta | Rho | Co-efficient | Interception Theta | Rho | Channel & overlap |
|---|---|---|---|---|---|---|
| 22 | 104.8760 | 2.3251 | 0.04449 | 114.7538 | 2.7688 | D |
| 23 | 92.4621 | | | 103.7011 | 2.8299 | D |
| 24 | 80.0483 | | | 92.6483 | 2.8911 | D |
| 25 | 67.6345 | | | 81.5950 | 2.9522 | D |
| 26 | 55.2208 | | | 70.5423 | 3.0133 | D |
| 27 | 42.8070 | | | 59.4895 | 3.0744 | D |
| 28 | 30.3932 | | | 48.4368 | 3.1356 | A |
| 29 | 17.9794 | | | 37.3840 | 3.1967 | A |
| 1 | 5.5656 | | | 26.3313 | 3.2579 | A |

TABLE 52

Top Boundary, Acceleration Entrance, Channel 2 Ascending
Iteration Process of Tooth Boundary Interception Acceleration
Tube: 10901 & Top Boundary Co-efficient: −0.00585177 F/D
Starting Rho: 5.04    Starting Theta: 351.230

| Tooth No. | Top Boundary Theta | Rho | Co-efficient | Inter-ception Theta | Rho | Channel & overlap |
|---|---|---|---|---|---|---|
| 25 | 21.3391 | 4.420 | 0.050737 | 29.1596 | 4.8162 | D |
| 26 | 10.4300 | | | 19.3812 | 4.8736 | D |
| 27 | 359.5209 | | | 9.6029 | 4.9310 | D |
| 28 | 348.6118 | | | 359.8244 | 4.9884 | D |
| 29 | 337.7028 | | | 350.0463 | 5.0457 | D |
| 30 | 326.7937 | | | 340.2680 | 5.1031 | D |
| 31 | 315.8846 | | | 330.4896 | 5.1605 | D |
| 32 | 304.9755 | | | 320.7112 | 5.2178 | A |
| 33 | 294.0664 | | | 310.9328 | 5.2752 | A |
| 1  | 286.1573 | | | 301.1544 | 5.3326 | A |

TABLE 53

Top Boundary, Acceleration Entrance, Channel 3
Ascending Iteration Process of Tooth Boundary Interception
Top Boundary Co-efficient: −0.00552892 F/D
Starting Rho: 2.945    Starting Theta: 83.000

| Tooth No. | Top Boundary Theta | Rho | Co-efficient | Interception Theta | Rho | Channel & overlap |
|---|---|---|---|---|---|---|
| 28 | 297.2683 | 6.5140 | 0.0566 | 303.5958 | 6.8717 | D |
| 29 | 287.5386 | | | 294.8261 | 6.9260 | D |
| 30 | 277.8089 | | | 286.0563 | 6.9803 | D |
| 31 | 268.0791 | | | 277.2865 | 7.0346 | D |
| 32 | 258.3494 | | | 268.5167 | 7.0888 | D |
| 33 | 248.6197 | | | 259.6667 | 7.1386 | D |
| 34 | 238.8899 | | | 250.8899 | 7.1925 | D |
| 35 | 229.1602 | | | 242.1132 | 7.2464 | A |
| 36 | 219.4305 | | | 233.3364 | 7.3003 | A |
| 37 | 209.7007 | | | 224.5597 | 7.3542 | A |
| 38 | 199.9710 | | | 215.7829 | 7.4081 | A |

Tables 51–53 show the top boundaries of the acceleration channel entrances. This process has the conic teeth ascending from the top ring boundary to intercept the extension of the acceleration tube boundary. As explained previously with reference to Table 36, the extension of the boundary starts at the footprint lower position, with the top boundary coefficient, starting rho and the starting theta being taken from that table.

The top entrance boundary is between the end of the acceleration tube and the beginning of the deceleration tube. The calculations will be clockwise. The starting conic tooth is the last tooth that the deceleration tube lands on. The ending conic tooth is the first tooth that the acceleration tube begins on.

The first tooths' Rho and Theta are the beginning coordinates. From here the boundary is extended using the acceleration tube boundary coefficient.

The teeth listed intercept the top entrance boundary when extended. Each tooth starts at its' top boundary theta and rho and uses its' nascention coefficient. The rho and nascention coefficient are the same for all the conic teeth on the same ring.

The interception is theta and rho. These are the top boundary of the channel entrance. Only some of the coordinates will be used. When these teeth are compared with the top of the exit, the overlapping ones will be tested. Which ever tooth has the greatest height will meet the requirements of both. The entrance and exit will be marked in the Channel & Overlap column. If it is the acceleration channel, then the tooth will be flagged with an "A". If it is the deceleration channel, it will be flagged with a "D".

Tables 54–56 show the ascending spirals for the top of the deceleration channels exits. The starting coordinates for the boundary are from the Deceleration Channel Boundary Specifications of FIG. 52, the lower footprint position theta and Rho are used with the boundary coefficient.

TABLE 54

Top Boundary, Deceleration Exit, Channel 1
Ascending Iteration Process of Tooth Boundary Interception
Top Boundary Co-efficient: 0.00522298 F/D
Starting Rho: 2.945    Starting Theta: 16.536

| Tooth No. | Top Tooth Boundary Theta | Rho | Co-efficient | Inter-ception Theta | Rho | Channel & overlap |
|---|---|---|---|---|---|---|
| 22 | 104.5900 | 2.3250 | 0.044919 | 132.1075 | 3.5483 | D |
| 23 | 92.4621 | | | 118.0596 | 3.4749 | D |
| 24 | 80.0483 | | | 104.0116 | 3.4015 | D |
| 25 | 67.6345 | | | 89.9637 | 3.3281 | D |
| 26 | 55.2208 | | | 75.9157 | 3.2547 | D |
| 27 | 42.8070 | | | 61.8678 | 3.1813 | D |
| 28 | 30.3932 | | | 47.8199 | 3.1079 | A |
| 29 | 17.9794 | | | 33.7161 | 3.0320 | A |
| 1  | 5.5656 | | | 19.6632 | 2.9583 | A |

TABLE 55

Top Boundary, Deceleration Exit, Channel 2
Ascending Conic Teeth, Channel Exit Boundary Interception
Top Boundary Co-efficient: 0.00553725
Starting Rho: 5.0395    Starting Theta: 303.461

| Tooth No. | Top Boundary Theta | Rho | Co-efficient | Inter-ception Theta | Rho | Channel & overlap |
|---|---|---|---|---|---|---|
| 25 | 21.3391 | 4.420 | 0.050737 | 44.5873 | 5.5990 | D |
| 26 | 10.4300 | | | 32.3412 | 5.5312 | D |
| 27 | 359.5209 | | | 20.0950 | 5.4633 | D |
| 28 | 348.6118 | | | 7.8488 | 5.3955 | D |
| 29 | 337.7028 | | | 355.6026 | 5.3276 | D |
| 30 | 326.7937 | | | 343.3564 | 5.2598 | D |
| 31 | 315.8846 | | | 331.1102 | 5.1920 | D |
| 32 | 304.9755 | | | 318.8636 | 5.1241 | A |
| 33 | 294.0664 | | | 306.6173 | 5.0563 | A |
| 1  | 283.1573 | | | 294.3711 | 4.9884 | A |

TABLE 56

Top Boundary, Deceleration Exit, Channel 3
Ascending Iteration Process of Tooth Boundary Interception
Top Boundary Co-efficient: 0.00582021 F/D
Starting Rho: 7.1339    Starting Theta: 227.816

| Tooth No. | Top Boundary Theta | Rho | Co-efficient | Inter-ception Theta | Rho | Channel & overlap |
|---|---|---|---|---|---|---|
| 28 | 297.2683 | 6.5140 | 0.0566 | 317.4468 | 7.6551 | D |
| 29 | 287.5386 | | | 306.6004 | 7.5919 | D |
| 30 | 277.8089 | | | 295.7541 | 7.5288 | D |
| 31 | 268.0791 | | | 284.9077 | 7.4656 | D |
| 32 | 258.3494 | | | 274.0614 | 7.4025 | D |
| 33 | 248.6197 | | | 263.2150 | 7.3393 | D |
| 34 | 238.1602 | | | 252.3686 | 7.2762 | D |
| 35 | 229.1602 | | | 241.5226 | 7.2130 | A |
| 36 | 219.4305 | | | 230.6762 | 7.1499 | A |
| 37 | 209.7007 | | | 219.8299 | 7.0867 | A |
| 1  | 199.9710 | | | 208.9836 | 7.0236 | A |

Figure 57:
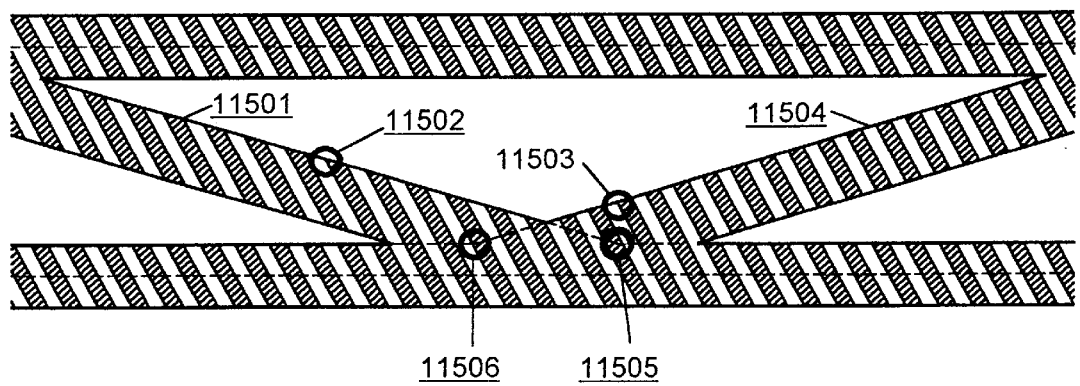
FIG. 57 is another diagrammatic view showing an overlap of deceleration exit and acceleration entrance.

FIG. 57 is a diagram showing overlapping ascending boundaries. The end of the deceleration channel 11501 is overlapping the beginning of the acceleration channel 11504. The ascending conic teeth have been calculated for the deceleration exit and the acceleration entrance of Tables 51–53. The overlap means that a conic tooth has the ending boundary coordinates of both the channel exit and channel entrance.

For the Ascending Boundaries that are on the same conic tooth, the boundary with the greater height is the one to use. A channel exit 11502 coordinate that is higher then the channel entrance 11506 is the desired one. That same exit channel can also have a coordinate 11505 that is lower then the channel entrance 11503 on the same conic tooth. The overlap is a shared space.

Table 57 shows all of the additions to the rings' top boundaries. For each channel, the specific tooth that has a new top boundary theta and rho is shown, with changes being due to either the acceleration channel entrance or deceleration channel exit.

As shown in FIGS. 56 & 57, the descending boundaries are in the acceleration channel 10801 entrance 10804 and the deceleration channel 10805 exit 11502. These are in the top landing and overlap 10803. Because of their proximity, the entrance and exit has to be between the channel entrance and exit. The acceleration channel calculations are shown in Tables 58–60, while the deceleration channels calculations are shown in Tables 61–63.

TABLE 57

Changes to the Rings Top Boundaries

| Ring | Tooth | Theta | Rho | Entrance | Exit |
|---|---|---|---|---|---|
| 1 | 22 | 132.1075 | 3.5483 |  | Decel |
|  | 23 | 118.0596 | 3.4749 |  | Decel |
|  | 24 | 104.0116 | 3.4015 |  | Decel |
|  | 25 | 89.9637 | 3.3281 |  | Decel |
|  | 26 | 75.9157 | 3.2547 |  | Decel |
|  | 27 | 61.8678 | 3.1813 |  | Decel |
|  | 28 | 48.4368 | 3.1356 | Accel. |  |
|  | 29 | 37.3840 | 3.1967 | Accel. |  |
|  | 1 | 26.3313 | 3.2579 | Accel. |  |
| 2 | 25 | 44.5873 | 5.5990 |  | Decel |
|  | 26 | 32.3412 | 5.5312 |  | Decel |
|  | 27 | 20.0950 | 5.4633 |  | Decel |
|  | 28 | 7.8488 | 5.3955 |  | Decel |
|  | 29 | 355.6026 | 5.3276 |  | Decel |
|  | 30 | 343.3564 | 5.2598 |  | Decel |
|  | 31 | 331.1102 | 5.1920 |  | Decel |
|  | 32 | 320.7112 | 5.2178 | Accel. |  |
|  | 33 | 310.9328 | 5.2752 | Accel. |  |
|  | 1 | 301.1544 | 5.3326 | Accel. |  |
| 3 | 28 | 317.4468 | 7.6551 |  | Decel |
|  | 29 | 306.6004 | 7.5919 |  | Decel |
|  | 30 | 295.7541 | 7.5288 |  | Decel |
|  | 31 | 284.9077 | 7.4656 |  | Decel |
|  | 32 | 274.0614 | 7.4025 |  | Decel |
|  | 33 | 263.2150 | 7.3393 |  | Decel |
|  | 34 | 252.3686 | 7.2762 |  | Decel |
|  | 35 | 242.1132 | 7.2464 | Accel. |  |
|  | 36 | 233.3364 | 7.3003 | Accel. |  |
|  | 37 | 224.5597 | 7.3542 | Accel. |  |
|  | 1 | 215.7829 | 7.4081 | Accel. |  |

TABLE 58

Bottom Boundary, Acceleration Exit, Channels 1
Descending Conic Teeth to Exit Channel Boundary Interception
Bottom Boundary Co-efficient: −0.00588615 F/D
Starting Rho: 3.2364   Starting Theta: 205.230

| Tooth No. | Top Boundary Theta | Rho | Co-efficient | Interception Theta | Rho | Channel & overlap |
|---|---|---|---|---|---|---|
| 1 | 271.6663 | 3.8370 | 0.050737 | 254.5007 | 2.9655 | A |
| 2 | 260.7572 |  |  | 244.7266 | 3.0231 | A |
| 3 | 249.8481 |  |  | 234.9524 | 3.0807 | A |
| 4 | 238.9391 |  |  | 225.1783 | 3.1383 | D |
| 5 | 228.0300 |  |  | 215.4023 | 3.1958 | D |
| 6 | 217.1209 |  |  | 205.6273 | 3.2533 | D |
| 7 | 206.2118 |  |  | 195.8522 | 3.3108 | D |
| 8 | 195.3027 |  |  | 186.0772 | 3.3684 | D |
| 9 | 184.3936 |  |  | 176.3021 | 3.4259 | D |

TABLE 59

Bottom Boundary, Acceleration Exit, Channels Two Descending
Conic Teeth to Exit Channel Boundary Interception Acceleration
Channel Bottom Boundary Co-efficient: −0.00616877 F/D
Starting Rho: 5.3109   Starting Theta: 130.550

| Tooth No. | Top Boundary Theta | Rho | Co-efficient | Interception Theta | Rho | Channel & overlap |
|---|---|---|---|---|---|---|
| 1 | 189.6621 | 5.9310 | 0.0566 | 174.5892 | 5.0784 | A |
| 2 | 179.9324 |  |  | 165.8168 | 5.1326 | A |
| 3 | 170.2027 |  |  | 157.0443 | 5.1867 | A |
| 4 | 160.4729 |  |  | 148.2719 | 5.2408 | D |
| 5 | 150.7432 |  |  | 139.4995 | 5.2950 | D |
| 6 | 141.0135 |  |  | 130.7270 | 5.3491 | D |
| 7 | 131.2837 |  |  | 121.9546 | 5.4033 | D |
| 8 | 141.5540 |  |  | 113.1791 | 5.4572 | D |
| 9 | 111.8243 |  |  | 104.4063 | 5.5113 | D |
| 10 | 102.0946 |  |  | 95.6335 | 5.5654 | D |

TABLE 60

Bottom Boundary, Acceleration Exit, Channel 3
Descending Conic Teeth to Exit Channel Boundary Interception
Acceleration Channel Bottom Boundary Coefficient: −0.00639720 F/D
Starting Rho: 7.4050   Starting Theta: 53.145

| Tooth No. | Top Boundary Theta | Rho | Co-efficient | Interception Theta | Rho | Channel & overlap |
|---|---|---|---|---|---|---|
| 1 | 106.8054 | 8.0250 | 0.0624 | 93.3676 | 7.1871 | A |
| 2 | 98.0249 |  |  | 85.4041 | 7.2381 | A |
| 3 | 89.2444 |  |  | 77.4407 | 7.2890 | A |
| 4 | 80.4639 |  |  | 69.4772 | 7.3400 | A |
| 5 | 71.6834 |  |  | 61.5138 | 7.3909 | D |
| 6 | 62.9029 |  |  | 53.5503 | 7.4419 | D |
| 7 | 54.1224 |  |  | 45.5869 | 7.4929 | D |
| 8 | 45.3419 |  |  | 37.6215 | 7.5437 | D |
| 9 | 36.5615 |  |  | 29.6578 | 7.5946 | D |
| 10 | 27.7810 |  |  | 21.6941 | 7.6456 | D |
| 11 | 19.0005 |  |  | 13.7304 | 7.6965 | D |

TABLE 61

Bottom Boundary, Deceleration Entrance, Channel 1
Descending Conic Teeth to Entrance Channel Boundary Interception

| | Starting Rho: Nascention Coord. Theta | Rho | 3.2364 Co-efficient | Starting Theta Interception Theta | Rho | 263.957 Channel & overlap |
|---|---|---|---|---|---|---|
| 1 | 271.6663 | 3.8370 | 0.0507 | 259.8511 | 3.2370 | A |
| 2 | 260.7572 | | | 247.5973 | 3.1688 | A |
| 3 | 249.8481 | | | 235.3435 | 3.1005 | A |
| 4 | 238.9391 | | | 223.0897 | 3.0323 | D |
| 5 | 228.0300 | | | 210.8359 | 2.9641 | D |
| 6 | 217.1209 | | | 198.5821 | 2.8959 | D |
| 7 | 206.2118 | | | 186.3283 | 2.8276 | D |
| 8 | 195.3027 | | | 174.0746 | 2.7594 | D |
| 9 | 184.3936 | | | 161.8208 | 2.6912 | D |

The descending boundaries in the acceleration channels use a boundary coefficient that was used for the tube boundaries. The boundary starting rho and theta are from the bottom boundary in the Acceleration Channel Footprint Specifications. The upper position theta and rho are used as the starting positions with the boundary coefficient for calculating the acceleration channel exit.

TABLE 62

Bottom Boundary, Deceleration Entrance, Channel 2
Descending Conic Teeth to Entrance Channel Boundary Interception
Bottom Boundary Coefficient: 0.00582026 F/D

| | Starting Rho: Bottom Boundary Theta | Rho | 5.3109 Coefficient | Starting Theta: Interception Theta | Rho | 172.983 Channel & overlap |
|---|---|---|---|---|---|---|
| 1 | 189.6621 | 5.9310 | 0.0566 | 174.5892 | 5.0784 | A |
| 2 | 179.9324 | | | 169.2844 | 5.3287 | A |
| 3 | 170.2027 | | | 158.4379 | 5.2655 | A |
| 4 | 160.4729 | | | 147.5914 | 5.2024 | D |
| 5 | 150.7432 | | | 136.7450 | 5.1392 | D |
| 6 | 141.0135 | | | 125.8985 | 5.0760 | D |
| 7 | 131.2837 | | | 115.0520 | 5.0129 | D |
| 8 | 141.5540 | | | 104.2055 | 4.9497 | D |
| 9 | 111.8243 | | | 93.3591 | 4.8866 | D |
| 10 | 102.0946 | | | 82.5126 | 4.8234 | D |

TABLE 63

Bottom Boundary, Deceleration Entrance, Channel 3Descending
Conic Teeth to Entrance
Channel Boundary Interception Deceleration Tube:
Bottom Boundary Coefficient: 0.006050221 F/D

| | Starting Rho: Bottom Boundary Theta | Rho | 7.4050 Coefficient | Starting Theta: Interception Theta | Rho | 83.340 Channel & overlap |
|---|---|---|---|---|---|---|
| 1 | 106.8054 | 8.0250 | 0.062372 | 84.4041 | 7.2381 | A |
| 2 | 98.0249 | | | 77.4407 | 7.2890 | A |
| 3 | 98.5917 | | | 79.5673 | 7.4217 | A |
| 4 | 89.8112 | | | 69.8429 | 7.3628 | A |
| 5 | 81.0307 | | | 60.1185 | 7.3039 | D |
| 6 | 72.2503 | | | 50.3941 | 7.2450 | D |
| 7 | 63.4698 | | | 40.6697 | 7.1862 | D |
| 8 | 54.6893 | | | 30.9453 | 7.1273 | D |
| 9 | 45.9088 | | | 21.2209 | 7.0684 | D |
| 10 | 37.1283 | | | 11.4965 | 7.0095 | D |
| 11 | 28.3478 | | | 1.7721 | 6.9507 | D |

Each tooth has its top boundary rho and theta to be used with its nascention coefficient. An iteration process extends the teeth up till they intercept the boundary at a specific theta and rho. Later, the channel and overlap will determine which deceleration entrance or acceleration exit coordinates will be used.

The descending boundaries for the deceleration channels use the bottom boundary section of the Deceleration Channel Footprint Specifications of FIG. 52. The upper position theta and rho are used as the starting rho and theta. This is where the boundary coefficient is found. When determining the overlap of descending boundaries, it is the one with the smaller Rho value, as this will be the lowest.

Figure 58:
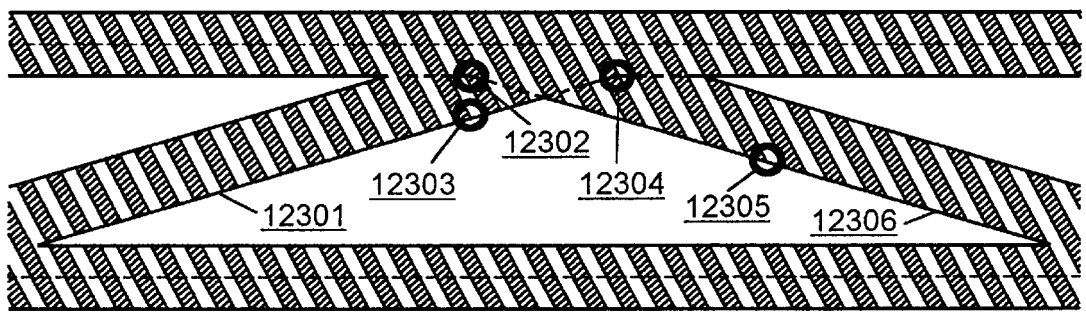
FIG. 58 is another diagrammatic view showing an overlap of acceleration exit and deceleration entrance.

Referring again to FIG. 58, an overlap of an acceleration channel 12301 exit and a deceleration channel 12306 entrance are shown. The conic teeth with both boundaries will use the lowest height. An example is the beginning of the deceleration entrance 12302 and an intersecting coordinate in the acceleration exit 12303. The exit 12303 coordinate has a lower height then the entrance 12302. The end of the exit 12304 is higher then the intersecting coordinate of the entrance 12305 on the same conic tooth, therefore the entrance values will be used.

TABLE 64

Changes to the Rings' Bottom Boundaries

| Ring | Tooth | Theta | Rho | Entrance | Exit |
|---|---|---|---|---|---|
| 2 | 1 | 254.5007 | 2.9655 | Accel. | |
| | 2 | 244.7266 | 3.0231 | Accel. | |
| | 3 | 234.9524 | 3.0807 | Accel. | |
| | 4 | 223.0897 | 3.0323 | | Decel |
| | 5 | 210.8359 | 2.9641 | | Decel |
| | 6 | 198.5821 | 2.8959 | | Decel |
| | 7 | 186.3283 | 2.8276 | | Decel |
| | 8 | 174.0746 | 2.7594 | | Decel |
| | 9 | 161.8208 | 2.6912 | | Decel |
| 3 | 1 | 174.5892 | 5.0784 | Accel. | |
| | 2 | 165.8168 | 5.1326 | Accel. | |
| | 3 | 157.0443 | 5.1867 | Accel. | |
| | 4 | 147.5914 | 5.2024 | | Decel |
| | 5 | 136.7450 | 5.1392 | | Decel |
| | 6 | 125.8985 | 5.0760 | | Decel |
| | 7 | 115.0520 | 5.0129 | | Decel |
| | 8 | 104.2055 | 4.9497 | | Decel |
| | 9 | 93.3591 | 4.8866 | | Decel |
| | 10 | 82.5126 | 4.8234 | | Decel |
| 4 | 1 | 93.3676 | 7.1871 | Accel. | |
| | 2 | 85.4041 | 7.2381 | Accel. | |
| | 3 | 77.4407 | 7.2890 | Accel. | |
| | 4 | 69.4772 | 7.3400 | Accel. | |
| | 5 | 69.1185 | 7.3039 | | Decel |
| | 6 | 50.3941 | 7.2450 | | Decel |
| | 7 | 40.6697 | 7.1862 | | Decel |
| | 8 | 30.9453 | 7.1273 | | Decel |
| | 9 | 21.2209 | 7.0684 | | Decel |

TABLE 64-continued

Changes to the Rings' Bottom Boundaries

| Ring | Tooth | Theta | Rho | Entrance | Exit |
|---|---|---|---|---|---|
| | 10 | 11.4965 | 7.0095 | | Decel |
| | 11 | 1.7721 | 6.9507 | | Decel |

Table 64 shows the additions to the rings' bottom boundaries. For each channel, it is the specific teeth that has a new top boundary theta and rho. The changes are due to either the acceleration channel entrance or deceleration channel exit.

TABLE 65

Ring One Boundaries, Conic Teeth 1–24

| Tooth | Tooth Top Rho | Theta | Tooth Bottom Rho | Theta |
|---|---|---|---|---|
| 1 | 3.2579 | 28.0430 | 1.7421 | −7.8953 |
| 2 | 2.3251 | 353.5134 | 1.7421 | 339.6909 |
| 3 | 2.3251 | 341.0996 | 1.7421 | 327.2771 |
| 4 | 2.3251 | 328.6858 | 1.7421 | 314.8633 |
| 5 | 2.3251 | 316.2720 | 1.7421 | 302.4495 |
| 6 | 2.3251 | 303.8582 | 1.7421 | 290.0357 |
| 7 | 2.3251 | 291.4444 | 1.7421 | 277.6219 |
| 8 | 2.3251 | 279.0306 | 1.7421 | 265.2082 |
| 9 | 2.3251 | 266.6168 | 1.7421 | 252.7944 |
| 10 | 2.3251 | 254.2030 | 1.7421 | 240.3806 |
| 11 | 2.3251 | 241.7892 | 1.7421 | 227.9668 |
| 12 | 2.3251 | 229.3754 | 1.7421 | 215.5530 |
| 13 | 2.3251 | 216.9616 | 1.7421 | 203.1392 |
| 14 | 2.3251 | 204.5478 | 1.7421 | 190.7254 |
| 15 | 2.3251 | 192.1340 | 1.7421 | 178.3116 |
| 16 | 2.3251 | 179.7203 | 1.7421 | 165.8978 |
| 17 | 2.3251 | 167.3065 | 1.7421 | 153.4840 |
| 18 | 2.3251 | 154.8927 | 1.7421 | 141.0702 |
| 19 | 2.3251 | 142.4789 | 1.7421 | 128.6564 |
| 20 | 2.3251 | 130.0651 | 1.7421 | 116.2426 |
| 21 | 2.3251 | 117.6513 | 1.7421 | 103.8288 |
| 22 | 3.5483 | 134.2382 | 1.7421 | 91.4151 |
| 23 | 3.4749 | 120.0841 | 1.7421 | 79.0013 |
| 24 | 3.4015 | 105.9300 | 1.7421 | 66.5875 |

With the conic teeth extensions determined, they have to be added to the ring teeth. Tables 65–72 show the ring and ring teeth; the rho and theta of the bottom coordinates; and the rho and theta of the top coordinates. The values in bold print are the extensions of the conic teeth due to the channel entrances and exits.

TABLE 66

Ring One Boundaries, Conic Teeth 25–29

| Tooth | Tooth Top Rho | Theta | Tooth Bottom Rho | Theta |
|---|---|---|---|---|
| 25 | 3.3281 | 91.7759 | 1.7421 | 54.1737 |
| 26 | 3.2547 | 77.6218 | 1.7421 | 41.7599 |
| 27 | 3.1813 | 63.4677 | 1.7421 | 29.3461 |
| 28 | 3.1356 | 49.9706 | 1.7421 | 16.9323 |
| 29 | 3.1967 | 39.0063 | 1.7421 | 4.5185 |

TABLE 67

Ring Two Boundaries, Conic Teeth 1–24

| Tooth | Tooth Top Rho | Theta | Tooth Bottom Rho | Theta |
|---|---|---|---|---|
| 1 | 5.3326 | 302.4631 | 2.9655 | 253.1460 |
| 2 | 4.4195 | 272.5295 | 3.0231 | 243.4367 |
| 3 | 4.4195 | 261.6204 | 3.0807 | 233.7273 |
| 4 | 4.4195 | 250.7113 | 3.0323 | 221.8101 |
| 5 | 4.4195 | 239.8022 | 2.9641 | 209.4796 |
| 6 | 4.4195 | 228.8932 | 2.8959 | 197.1490 |
| 7 | 4.4195 | 217.9841 | 2.8276 | 184.8185 |
| 8 | 4.4195 | 207.0750 | 2.7594 | 172.4879 |
| 9 | 4.4195 | 196.1659 | 2.6912 | 160.1574 |
| 10 | 4.4195 | 185.2568 | 3.8365 | 173.1098 |
| 11 | 4.4195 | 174.3477 | 3.8365 | 162.2007 |
| 12 | 4.4195 | 163.4386 | 3.8365 | 151.2916 |
| 13 | 4.4195 | 152.5295 | 3.8365 | 140.3825 |
| 14 | 4.4195 | 141.6204 | 3.8365 | 129.4734 |
| 15 | 4.4195 | 130.7113 | 3.8365 | 118.5643 |
| 16 | 4.4195 | 119.8022 | 3.8365 | 107.6552 |
| 17 | 4.4195 | 108.8932 | 3.8365 | 96.7462 |
| 18 | 4.4195 | 97.9841 | 3.8365 | 85.8371 |
| 19 | 4.4195 | 87.0750 | 3.8365 | 74.9280 |
| 20 | 4.4195 | 76.1659 | 3.8365 | 64.0189 |
| 21 | 4.4195 | 65.2568 | 3.8365 | 53.1098 |
| 22 | 4.4195 | 54.3477 | 3.8365 | 42.2007 |
| 23 | 4.4195 | 43.4386 | 3.8365 | 31.2916 |
| 24 | 4.4195 | 32.5295 | 3.8365 | 20.3825 |

TABLE 68

Ring Two Boundaries, Conic Teeth 25–33

| Tooth | Tooth Top Rho | Theta | Tooth Bottom Rho | Theta |
|---|---|---|---|---|
| 25 | 5.5990 | 46.1959 | 3.8365 | 9.4734 |
| 26 | 5.5312 | 33.8734 | 3.8365 | −1.4357 |
| 27 | 5.4633 | 381.5509 | 3.8365 | 347.6552 |
| 28 | 5.3955 | 369.2283 | 3.8365 | 336.7462 |
| 29 | 5.3276 | 356.9058 | 3.8365 | 325.8371 |
| 30 | 5.2598 | 344.5833 | 3.8365 | 314.9280 |
| 31 | 5.1920 | 332.2608 | 3.8365 | 304.0189 |
| 32 | 5.2178 | 321.8908 | 3.8365 | 293.1098 |
| 33 | 5.2752 | 312.1770 | 3.8365 | 282.2007 |

TABLE 70

Ring Three Boundaries, Conic Teeth 25–37

| Tooth | Tooth Top Rho | Theta | Tooth Bottom Rho | Theta |
|---|---|---|---|---|
| 25 | 6.5139 | 326.6826 | 5.9309 | 315.8488 |
| 26 | 6.5139 | 316.9529 | 5.9309 | 306.1191 |
| 27 | 6.5139 | 307.2231 | 5.9309 | 296.3893 |
| 28 | 7.6551 | 318.6993 | 5.9309 | 286.6596 |
| 29 | 7.5919 | 307.7961 | 5.9309 | 276.9299 |
| 30 | 7.5288 | 296.8929 | 5.9309 | 267.2001 |
| 31 | 7.4656 | 285.9897 | 5.9309 | 257.4704 |
| 32 | 7.4025 | 275.0865 | 5.9309 | 247.7407 |
| 33 | 7.3393 | 264.1833 | 5.9309 | 238.0109 |
| 34 | 7.2762 | 253.2801 | 5.9309 | 228.2812 |
| 35 | 7.2464 | 242.9978 | 5.9309 | 218.5515 |
| 36 | 7.3003 | 234.2696 | 5.9309 | 208.8218 |
| 37 | 7.3542 | 225.5414 | 5.9309 | 199.0920 |

TABLE 69

Ring Three Boundaries, Conic Teeth 1–24

| Tooth | Tooth Top Rho | Theta | Tooth Bottom Rho | Theta |
|---|---|---|---|---|
| 1 | 7.4081 | 216.8132 | 5.0784 | 173.5219 |
| 2 | 6.5139 | 190.4664 | 5.1326 | 164.7982 |
| 3 | 6.5139 | 180.7366 | 5.1867 | 156.0745 |
| 4 | 6.5139 | 171.0069 | 5.2024 | 146.6357 |
| 5 | 6.5139 | 161.2772 | 5.1392 | 135.7324 |
| 6 | 6.5139 | 151.5475 | 5.0760 | 124.8290 |
| 7 | 6.5139 | 141.8177 | 5.0129 | 113.9257 |
| 8 | 6.5139 | 132.0880 | 4.9497 | 103.0223 |
| 9 | 6.5139 | 122.3583 | 4.8866 | 92.1190 |
| 10 | 6.5139 | 112.6285 | 4.8234 | 81.2157 |
| 11 | 6.5139 | 112.8988 | 5.9309 | 92.0650 |
| 12 | 6.5139 | 93.1691 | 5.9309 | 82.3353 |
| 13 | 6.5139 | 83.4393 | 5.9309 | 72.6055 |
| 14 | 6.5139 | 73.7096 | 5.9309 | 62.8758 |
| 15 | 6.5139 | 63.9799 | 5.9309 | 53.1461 |
| 16 | 6.5139 | 54.2502 | 5.9309 | 43.4164 |
| 17 | 6.5139 | 44.5204 | 5.9309 | 33.6866 |
| 18 | 6.5139 | 34.7907 | 5.9309 | 23.9569 |
| 19 | 6.5139 | 25.0610 | 5.9309 | 14.2272 |
| 20 | 6.5139 | 15.3312 | 5.9309 | 4.4974 |
| 21 | 6.5139 | 5.6015 | 5.9309 | −5.2323 |
| 22 | 6.5139 | 355.8718 | 5.9309 | 345.0380 |
| 23 | 6.5139 | 346.1421 | 5.9309 | 335.3082 |
| 24 | 6.5139 | 336.4123 | 5.9309 | 325.5785 |

TABLE 71

Ring Four Boundaries, Conic Teeth 1–24

| Tooth | Tooth Top Rho | Theta | Tooth Bottom Rho | Theta |
|---|---|---|---|---|
| 1 | 8.6083 | 116.3369 | 7.1871 | 92.5047 |
| 2 | 8.6083 | 107.5564 | 7.2381 | 84.5788 |
| 3 | 8.6083 | 98.7759 | 7.2890 | 76.6529 |
| 4 | 8.6083 | 89.9954 | 7.3400 | 68.7270 |
| 5 | 8.6083 | 81.2149 | 7.3039 | 59.3417 |
| 6 | 8.6083 | 72.4344 | 7.2450 | 49.5739 |
| 7 | 8.6083 | 63.6539 | 7.1862 | 39.8062 |
| 8 | 8.6083 | 54.8735 | 7.1273 | 30.0384 |
| 9 | 8.6083 | 46.0930 | 7.0684 | 20.2706 |
| 10 | 8.6083 | 37.3125 | 7.0095 | 10.5029 |
| 11 | 8.6083 | 28.5320 | 6.9507 | 0.7351 |
| 12 | 8.6083 | 19.7515 | 8.0252 | 9.9747 |
| 13 | 8.6083 | 10.9710 | 8.0252 | 1.1942 |
| 14 | 8.6083 | 362.1905 | 8.0252 | 352.4137 |
| 15 | 8.6083 | 353.4100 | 8.0252 | 343.6332 |
| 16 | 8.6083 | 344.6296 | 8.0252 | 334.8527 |
| 17 | 8.6083 | 335.8491 | 8.0252 | 326.0722 |
| 18 | 8.6083 | 327.0686 | 8.0252 | 317.2917 |
| 19 | 8.6083 | 318.2881 | 8.0252 | 308.5112 |
| 20 | 8.6083 | 309.5076 | 8.0252 | 299.7308 |
| 21 | 8.6083 | 300.7271 | 8.0252 | 290.9503 |
| 22 | 8.6083 | 291.9466 | 8.0252 | 282.1698 |
| 23 | 8.6083 | 283.1661 | 8.0252 | 273.3893 |
| 24 | 8.6083 | 274.3857 | 8.0252 | 264.6088 |

TABLE 72

Ring Four Boundaries, Conic Teeth 25–41

| Tooth | Tooth Bottom Rho | Theta | Tooth Top Rho | Theta |
|---|---|---|---|---|
| 25 | 8.6083 | 265.6052 | 8.0252 | 255.8283 |
| 26 | 8.6083 | 256.8247 | 8.0252 | 247.0478 |
| 25 | 8.6083 | 248.0442 | 8.0252 | 238.2673 |
| 27 | 8.6083 | 239.2637 | 8.0252 | 229.4869 |
| 28 | 8.6083 | 230.4832 | 8.0252 | 220.7064 |
| 29 | 8.6083 | 221.7027 | 8.0252 | 211.9259 |
| 30 | 8.6083 | 212.9222 | 8.0252 | 203.1454 |
| 31 | 8.6083 | 204.1418 | 8.0252 | 194.3649 |
| 32 | 8.6083 | 195.3613 | 8.0252 | 185.5844 |
| 33 | 8.6083 | 186.5808 | 8.0252 | 176.8039 |
| 34 | 8.6083 | 177.8003 | 8.0252 | 168.0234 |
| 34 | 8.6083 | 169.0198 | 8.0252 | 159.2430 |
| 35 | 8.6083 | 160.2393 | 8.0252 | 150.4625 |
| 36 | 8.6083 | 151.4588 | 8.0252 | 141.6820 |
| 37 | 8.6083 | 142.6783 | 8.0252 | 132.9015 |
| 38 | 8.6083 | 133.8979 | 8.0252 | 124.1210 |
| 39 | 8.6083 | 125.1174 | 8.0252 | 115.3405 |
| 40 | 8.0252 | 124.3663 | 8.6083 | 133.7137 |
| 41 | 8.0252 | 115.5859 | 8.6083 | 124.9332 |

The conic teeth on the rings are identical, just the rotational positions change. The scaling teeth have nascention coordinates that are not on the same plane as the conic teeth are. As a result, the ascending and descending spirals do not maintain a constant width between them as the conic teeth do. This has to be corrected for the teeth to mesh. When a conic tooth is cut, it forms the front side of the tooth being cut and the backside of the next tooth. For the scaling teeth, when one is milled based on its nascention coordinate, the tooth is too wide. The previous tooth space does not correspond with the current tooth's backside, so a second milling pass is necessary. This second pass is based on the same nascention coordinate but is offset the width of the tooth. The top and bottom boundary of the previous tooth is used for the backside. Only the current tooth is cut slightly narrower. The result is a slightly taped tooth space.

To summarize, the back of every scaling tooth has to be cut so the tooth is the proper width. This is done using the nascention coordinate offset by the angular displacement of the circular pitch. That takes the cutting tool on the front and places it on the backside. That is the starting point and it ends at the top and bottom channel boundaries of the previous tooth's space. Another way to look at this is the conic teeth. Each conic tooth is offset the width of the circular pitch, therefore the cutting of back of the teeth is with an offset from the front of the tooth. This process gives the scaling teeth the same shape, as the conic teeth would have.

Figure 59:
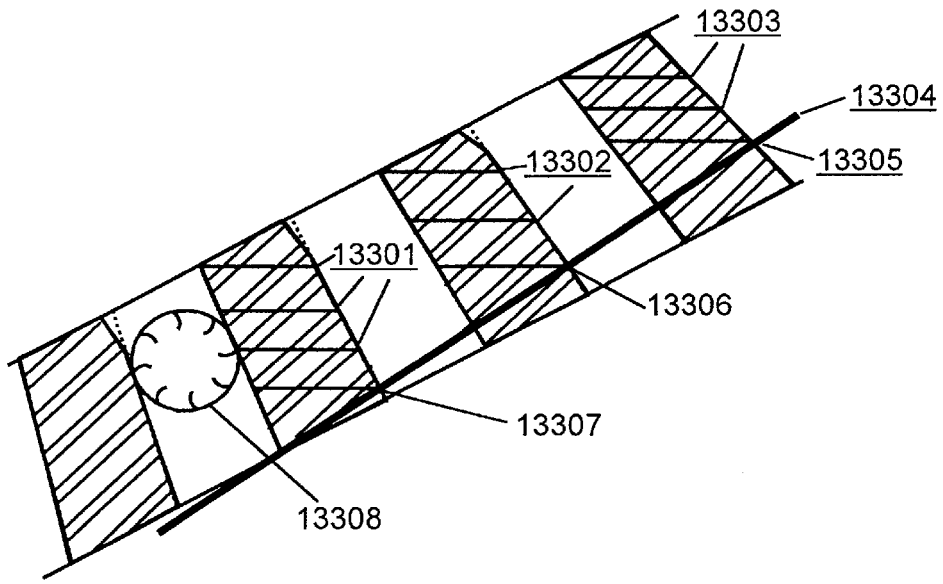
FIG. 59 is another diagrammatic view showing an acceleration tube scaling teeth offset.

FIG. 59 shows an acceleration channel. The intersections 13305, 13306, 13307 on the nascention-offset line 13304 represent the width of the tooth at each tooth's nascention coordinate. The lines above them 13301, 13302, 13303 are representing the width of the offset. In empirical terms, the ascending and descending spirals make the tooth narrower above and below the nascention coordinate, but very slightly. The point is the lines above representing the offset are not equal, but they do match the path of the front of the tooth. The milling tool 13308 follows the backside edge in the tooth space. This gives the tooth space a slight taper. For this process, the rho of the previous tooth top and bottom boundaries is used with the current tooth nascention coefficient to determine the theta.

Tables 73–75 show the acceleration tube offset analysis. To calculate the offset, the boundary coordinates and the nascention coordinates are needed with the nascention coefficient. For each scaling tooth, there is the top boundary rho and theta and the bottom boundary rho and theta. The rho values are used in the next tooth's offset. The boundaries have not moved even though the boundary interception will off a negligible amount.

TABLE 73

Acceleration Tube Offset Boundaries; Channel 1

| | Scaling Teeth | | | | | | Offset of Scaling Teeth | | | |
| | Top | | Bottom | | Nascention | | Coeff. | Top | | Bottom | |
| # | Rho | Theta | Rho | Theta | Rho | Theta | Face/Deg | Rho | Theta | Rho | Theta |
|---|---|---|---|---|---|---|---|---|---|---|---|
| 1 | 3.32 | 375.28 | 2.38 | 354.55 | 2.27 | 352.28 | 0.045468 | 3.26 | 386.19 | 2.33 | 365.68 |
| 2 | 3.38 | 364.39 | 2.44 | 343.99 | 2.47 | 344.61 | 0.046014 | 3.32 | 375.18 | 2.38 | 354.70 |
| 3 | 3.44 | 353.66 | 2.50 | 333.50 | 2.66 | 337.01 | 0.046554 | 3.38 | 364.33 | 2.44 | 344.13 |
| 4 | 3.50 | 343.07 | 2.56 | 323.19 | 2.86 | 329.47 | 0.047091 | 3.44 | 353.63 | 2.50 | 333.71 |
| 5 | 3.55 | 332.62 | 2.62 | 313.01 | 3.05 | 321.99 | 0.047623 | 3.50 | 343.07 | 2.56 | 323.42 |
| 6 | 3.61 | 322.31 | 2.68 | 302.96 | 3.24 | 314.56 | 0.048152 | 3.56 | 332.66 | 2.62 | 313.26 |
| 7 | 3.67 | 312.13 | 2.74 | 293.03 | 3.43 | 307.19 | 0.048676 | 3.61 | 322.37 | 2.68 | 303.25 |
| 8 | 3.72 | 302.08 | 2.80 | 283.23 | 3.62 | 299.87 | 0.049197 | 3.67 | 312.22 | 2.74 | 293.33 |
| 9 | 3.78 | 292.15 | 2.85 | 273.54 | 3.80 | 292.61 | 0.049714 | 3.72 | 302.20 | 2.80 | 283.54 |
| 10 | 3.83 | 282.35 | 2.91 | 263.97 | 3.99 | 285.39 | 0.050227 | 3.78 | 292.29 | 2.85 | 273.87 |
| 11 | | | | | 4.17 | 278.23 | | | | | |

TABLE 74

Acceleration Tube Offset Boundaries; Channel 2

| | Scaling Teeth | | | | | | Offset of Scaling Teeth | | | |
| | Top | | Bottom | | Nascention | | Coeff. | Top | | Bottom | |
| # | Rho | Theta | Rho | Theta | Rho | Theta | Face/Deg | Rho | Theta | Rho | Theta |
|---|---|---|---|---|---|---|---|---|---|---|---|
| 1 | 5.39 | 291.37 | 4.47 | 273.40 | 4.35 | 271.09 | 0.051239 | 5.33 | 301.06 | 4.42 | 283.24 |
| 2 | 5.45 | 281.70 | 4.53 | 263.94 | 4.53 | 264.00 | 0.051738 | 5.39 | 291.29 | 4.69 | 277.70 |
| 3 | 5.50 | 272.14 | 4.58 | 254.58 | 4.71 | 256.95 | 0.052234 | 5.45 | 281.65 | 4.53 | 264.06 |
| 4 | 5.56 | 262.69 | 4.64 | 245.33 | 4.89 | 249.96 | 0.052726 | 5.50 | 272.12 | 4.58 | 254.72 |
| 5 | 5.61 | 253.34 | 4.70 | 236.17 | 5.06 | 243.00 | 0.053215 | 5.56 | 262.68 | 4.64 | 245.48 |
| 6 | 5.67 | 244.09 | 4.75 | 227.11 | 5.24 | 236.10 | 0.053701 | 5.61 | 253.36 | 4.70 | 236.34 |
| 7 | 5.72 | 234.94 | 4.81 | 218.14 | 5.41 | 229.23 | 0.054184 | 5.67 | 244.12 | 4.75 | 227.30 |
| 8 | 2.77 | 225.88 | 4.86 | 209.26 | 5.58 | 222.41 | 0.054664 | 5.72 | 234.99 | 4.81 | 218.34 |
| 9 | 5.83 | 216.91 | 4.92 | 200.47 | 5.76 | 215.64 | 0.055141 | 5.77 | 225.95 | 4.86 | 209.48 |
| 10 | 5.88 | 208.03 | 4.97 | 191.76 | 5.93 | 208.90 | 0.055615 | 5.83 | 217.00 | 4.92 | 200.70 |
| 11 | 5.93 | 199.23 | 5.03 | 183.1345 | 6.10 | 202.21 | 0.056086 | 5.88 | 208.132 | 4.97 | 192.00 |
| 12 | | | | | 6.26 | 195.55 | | | | | |

TABLE 75

Acceleration Tube Offset Boundaries; Channel 3

| | Scaling Teeth | | | | | | | Offset of Scaling | | | |
| | Top | | Bottom | | | | Coeff. | Top | | Bottom | |
| # | Rho | Theta | Rho | Theta | Rho | Theta | Face/Deg | Rho | Theta | Rho | Theta |
|---|---|---|---|---|---|---|---|---|---|---|---|
| 1 | 7.46 | 207.01 | 6.56 | 191.21 | 6.43 | 188.92 | 0.057017 | 7.41 | 215.71 | 6.51 | 200.03 |
| 2 | 7.52 | 198.31 | 6.62 | 182.66 | 6.60 | 182.32 | 0.057477 | 7.46 | 206.95 | 6.56 | 191.28 |
| 3 | 7.57 | 189.70 | 6.67 | 174.19 | 6.76 | 175.76 | 0.057935 | 7.52 | 198.28 | 6.62 | 182.75 |
| 4 | 7.62 | 181.17 | 6.72 | 165.80 | 6.92 | 169.24 | 0.058389 | 7.57 | 189.68 | 6.67 | 174.29 |
| 5 | 7.67 | 172.71 | 3.78 | 157.48 | 7.09 | 162.76 | 0.058842 | 7.62 | 181.16 | 6.72 | 165.91 |
| 6 | 7.72 | 164.32 | 6.83 | 149.24 | 7.25 | 156.31 | 0.059291 | 7.67 | 172.71 | 6.78 | 157.60 |
| 7 | 7.78 | 156.01 | 6.88 | 141.06 | 7.41 | 149.90 | 0.059739 | 7.72 | 164.34 | 6.83 | 149.37 |
| 8 | 7.53 | 147.77 | 6.93 | 132.95 | 7.57 | 143.52 | 0.060183 | 7.78 | 156.04 | 6.88 | 141.20 |
| 9 | 7.88 | 139.60 | 6.99 | 124.90 | 7.73 | 137.18 | 0.060626 | 7.83 | 147.81 | 6.93 | 133.10 |
| 10 | 7.93 | 131.49 | 7.04 | 116.93 | 7.89 | 130.87 | 0.061066 | 7.88 | 139.65 | 6.99 | 125.07 |
| 11 | 7.98 | 123.45 | 7.09 | 109.0119 | 8.05 | 124.60 | 0.061504 | 7.93 | 131.5589 | 7.04 | 117.10 |
| 12 | 8.02 | 115.4765 | 7.14 | 101.1592 | 8.20 | 118.35 | 0.061939 | 7.98 | 123.5311 | 7.09 | 109.19 |
| 13 | | | | | 8.36 | 112.14 | 0.062372 | | | | |

The offset starts at the nascention coordinate of the current tooth. The angular width of the tooth is subtracted for the angular component of the offset nascention coordinate. The difference between the offset nascention rho from the previous tooth's top rho is divided by the nascention coefficient to get the amount of angular displacement. This displacement has to be added to the nascention coordinate to arrive at the offset top boundary.

The difference between the bottom rho and the offset nascention coordinate rho is divided by the nascention coefficient for the angular displacement. This displacement is subtracted from the nascention coordinate theta for the angular position of the offset bottom boundary. The first tooth in the acceleration channel will use the boundary of the channel entrance for the offset. The top is the top of the acceleration entrance boundary. The bottom is the top ring boundary. The other teeth in the acceleration channel will use the previous tooth's top and bottom boundary rhos for the offset rhos. For scaling tooth number three, the offset uses the top and bottom rhos from tooth number two.

Figure 60:
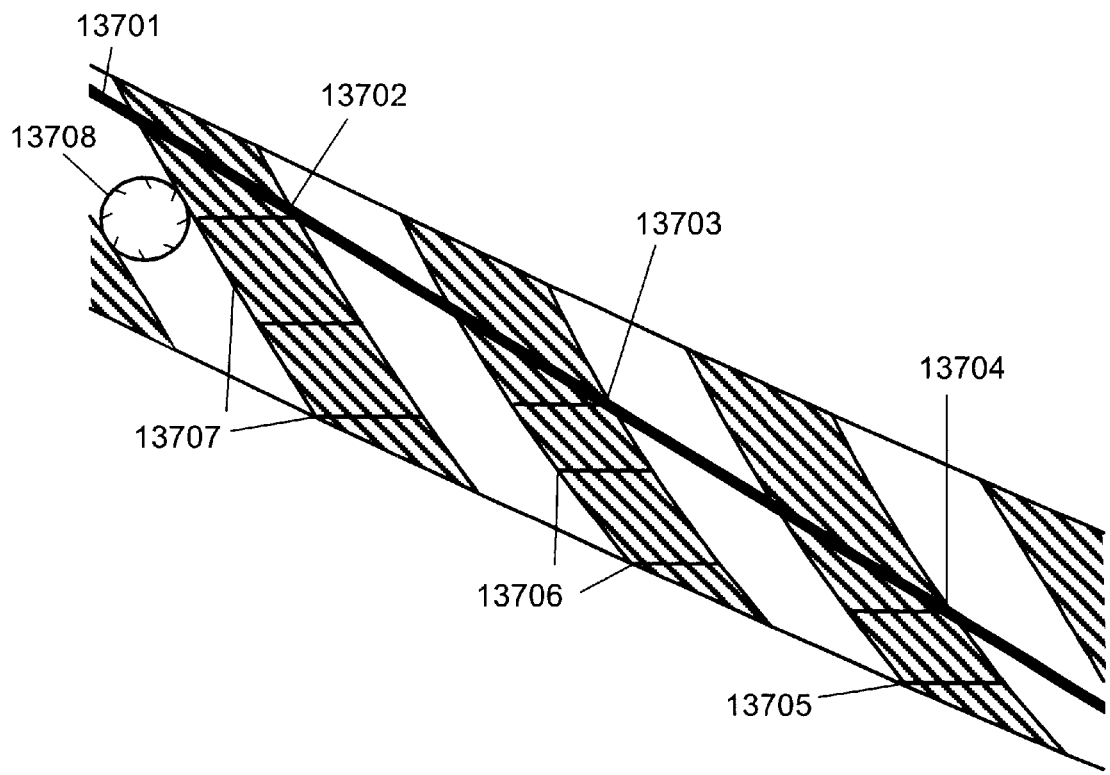
FIG. 60 is an another diagrammatic view showing an tool center offset.

FIG. 60 shows a deceleration channel. The intersecting lines 13702, 13703, and 13704 are the nascention coordinates on the nascention-offset line 13701. These mark the circular pitch width of the tooth. The lines below them 13705, 13706, 13708 represent the width that the milling tool 13708 has to cut to give the scaling tooth the proper circular pitch width.

Tables 76–78 show the analysis of the scaling tooth offset for the deceleration tube. The process is the same as the acceleration channel. The boundary for the first tooth offset is from the acceleration channel entrance. The top is the bottom of the ring boundary. The bottom is the extended conic tooth boundary.

All nascention coordinates and top and bottom boundary coordinates have been on the edge of the teeth. To mill that edge, all coordinates have to be converted to a tool center.

Figure 61:
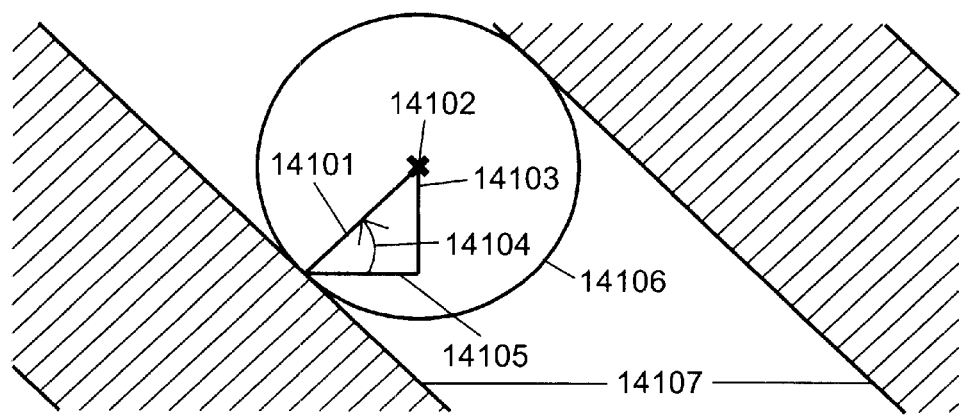
FIG. 61 is an another diagrammatic view showing an tool center offset.

FIG. 61 shows a circular tool 14106 within a tooth space 14107. This tooth space is on a helical pinion gear. The helix angle is fixed and the center of the tool 14102 has a specific X 14105 and Y 14103 Cartesian component relative to the position of the edge of the tooth. The angle of this vector 14101 is 90 degrees minus the helix of 45-degrees which is a negative 45 degrees. The negative sign is significant for absolute values. The 45 degrees will be used as positive for calculating relative values. The diameter of the cutting tool is the width of the tooth space of 0.2718 inches 14107 and a radius of 0.1359 inches. The X component 14105 is the cosine of the vector angle 14104 of 0.7071 times the tool radius of 0.1359 inches equaling 0.0961 inches. The Y component 14103 is the sine of the vector angle 14104 of 0.7071 times 0.1359 inches, which equals 0.1359 inches. The X component has to be converted into an angular rotation of the cone. For an absolute position, this angular component is negative, thus subtracted from the nascention

TABLE 76

Deceleration Tube Offset Boundaries; Channel 1

| | Scaling Teeth | | | | | Offset of Scaling Teeth | | | | |
|---|---|---|---|---|---|---|---|---|---|---|
| | Top | | Bottom | | Nascention | | Coeff. | Top | | Bottom | |
| | Rho | Theta | Rho | Theta | Rho | Theta | Face/Deg | Rho | Theta | Rho | Theta |
| 1 | 3.75 | 171.34 | 2.62 | 148.32 | 3.69 | 170.09 | 0.049409 | 3.84 | 184.24 | 2.69 | 161.06 |
| 2 | 3.69 | 158.45 | 2.54 | 134.57 | 3.19 | 148.05 | 0.048006 | 3.75 | 171.42 | 2.62 | 147.73 |
| 3 | 3.62 | 145.44 | 2.46 | 120.58 | 2.65 | 124.63 | 0.046516 | 3.69 | 158.86 | 2.54 | 134.22 |
| 4 | | | | | 2.08 | 99.54 | 0.044919 | | | | |

TABLE 77

Deceleration Tube Offset Boundaries; Channel 2

| | Scaling Teeth | | | | | Offset of Scaling Teeth | | | | |
|---|---|---|---|---|---|---|---|---|---|---|
| | Top | | Bottom | | Nascention | | Coeff. | Top | | Bottom | |
| | Rho | Theta | Rho | Theta | Rho | Theta | Face/Deg | Rho | Theta | Rho | Theta |
| 1 | 5.85 | 90.65 | 4.76 | 70.85 | 5.88 | 91.05 | 0.055478 | 5.93 | 101.93 | 4.82 | 82.00 |
| 2 | 5.79 | 79.34 | 4.69 | 59.01 | 5.48 | 73.52 | 0.054364 | 5.85 | 90.63 | 4.76 | 70.42 |
| 3 | 5.73 | 67.89 | 4.62 | 47.00 | 5.06 | 55.30 | 0.053205 | 5.79 | 79.45 | 4.69 | 58.69 |
| 4 | 5.66 | 56.32 | 4.55 | 34.81 | 4.62 | 36.31 | 0.051999 | 5.73 | 68.18 | 4.62 | 46.80 |
| 5 | | | | | 4.17 | 16.46 | 0.050737 | | | | |

TABLE 78

Deceleration Tube Offset Boundaries; Channel 3

| | Scaling Teeth | | | | | Offset of Scaling Teeth | | | | |
|---|---|---|---|---|---|---|---|---|---|---|
| | Top | | Bottom | | Nascention | | Coeff. | Top | | Bottom | |
| | Rho | Theta | Rho | Theta | Rho | Theta | Face/Deg | Rho | Theta | Rho | Theta |
| 1 | 7.95 | 8.82 | 6.89 | −8.52 | 8.03 | 10.09 | 0.061467 | 8.03 | 18.89 | 6.95 | 1.41 |
| 2 | 7.90 | 358.75 | 6.83 | 341.07 | 7.70 | 355.48 | 0.060538 | 7.95 | 368.78 | 6.89 | 351.17 |
| 3 | 7.84 | 348.57 | 6.76 | 330.53 | 7.35 | 340.49 | 0.059585 | 7.90 | 358.77 | 6.83 | 340.81 |
| 4 | 7.78 | 338.28 | 6.70 | 319.86 | 7.00 | 325.07 | 0.058605 | 7.84 | 348.68 | 6.76 | 330.34 |
| 5 | 7.72 | 327.90 | 6.63 | 309.07 | 6.64 | 309.19 | 0.057595 | 7.78 | 338.49 | 6.70 | 319.75 |
| 6 | | | | | 6.26 | 292.82 | | | | | | theta coordinate for the absolute tool center. The Y component is the height that the tool is offset above the tooth edge. This has to be added to the nascention rho coordinate for the absolute rho of the tool center.

The Y component is called the tool center rho and is a fixed amount to be added to all teeth. The X component is the tool center theta and has to be calculated for each ring and scaling tooth then subtracted from the theta coordinates of the boundaries and nascention coordinates of all teeth. This will position the cutting tool to produce the desired pitchline.

In the prototype, the original X and Y tool center offset was actually 0.0830 inches and not 0.0961 inches. The tool theta is not a problem since all teeth were effected equally. The tool rho has an error of 0.0131 inches. The cutting tool should have been positioned 0.0131 inches further up the face of the cone for all teeth. The pitch circle of the pinion gear is not on the pitch surface of the cone by a few thousandths of an inch.

Tables 79–86 shows the Tool Center Conical Coordinates for rings one through four. These are the conical coordinates of the top and bottom boundaries of the conic teeth in ring one. These are the coordinates from Ring One Boundaries, Conic Teeth 1–24 with the tool center components added. The tool center rho is a fixed 0.0961 inches. The tool center theta is the angular displacement that 0.0961 inches has on the each rings nascention circle.

TABLE 79

Conic Tooth Tool Center Coordinates, Ring 1, Teeth 1–24

| Tool Rho: | 0.0961 Inches | | Ring One Tool Theta: 2.2783 Deg. | |
|---|---|---|---|---|
| | Top of the Ring | | Bottom of the Ring | |
| Tooth | Rho | Theta | Rho | Theta |
| 1 | 3.3540 | 25.7647 | 1.8382 | −10.1736 |
| 2 | 2.4212 | 351.2351 | 1.8382 | 337.4126 |
| 3 | 2.4212 | 338.8213 | 1.8382 | 324.9988 |
| 4 | 2.4212 | 326.4075 | 1.8382 | 312.5850 |
| 5 | 2.4212 | 313.9937 | 1.8382 | 300.1712 |
| 6 | 2.4212 | 301.5799 | 1.8382 | 287.7574 |
| 7 | 2.4212 | 289.1661 | 1.8382 | 275.3436 |
| 8 | 2.4212 | 276.7523 | 1.8382 | 262.9299 |
| 9 | 2.4212 | 264.3385 | 1.8382 | 250.5161 |
| 10 | 2.4212 | 251.9247 | 1.8382 | 238.1023 |
| 11 | 2.4212 | 239.5109 | 1.8382 | 225.6885 |
| 12 | 2.4212 | 227.0971 | 1.8382 | 213.2747 |
| 13 | 2.4212 | 214.6833 | 1.8382 | 200.8609 |
| 14 | 2.4212 | 202.2695 | 1.8382 | 188.4471 |
| 15 | 2.4212 | 189.8557 | 1.8382 | 176.0333 |
| 16 | 2.4212 | 177.4420 | 1.8382 | 163.6195 |
| 17 | 2.4212 | 165.0282 | 1.8382 | 151.2057 |
| 18 | 2.4212 | 152.6144 | 1.8382 | 138.7919 |
| 19 | 2.4212 | 140.2006 | 1.8382 | 126.3781 |
| 20 | 2.4212 | 127.7868 | 1.8382 | 113.9643 |
| 21 | 2.4212 | 115.3730 | 1.8382 | 101.5505 |
| 22 | 3.6444 | 131.9599 | 1.8382 | 89.1368 |
| 23 | 3.5710 | 117.8058 | 1.8382 | 76.7230 |
| 24 | 3.4976 | 103.6517 | 1.8382 | 64.3092 |

TABLE 80

Conic Tooth Tool Center Coordinates, Ring One, Teeth 25–29

| | TOP of the Ring | | Bottom of the Ring | |
|---|---|---|---|---|
| Tooth | Rho | Theta | Rho | Theta |
| 25 | 3.4242 | 89.4976 | 1.8382 | 51.8954 |
| 26 | 3.3508 | 75.3435 | 1.8382 | 39.4816 |
| 27 | 3.2774 | 61.1894 | 1.8382 | 27.0678 |

TABLE 80-continued

Conic Tooth Tool Center Coordinates, Ring One, Teeth 25–29

| | TOP of the Ring | | Bottom of the Ring | |
|---|---|---|---|---|
| Tooth | Rho | Theta | Rho | Theta |
| 28 | 3.2317 | 47.6923 | 1.8382 | 14.6540 |
| 29 | 3.2928 | 36.7280 | 1.8382 | 2.2402 |

TABLE 81

Conic Tooth Tool Center Coordinates, Ring Two, Teeth 1–24

Tool Rho: 0.0961 Inches    Ring Two Tool Theta: 2.002 Deg.

| | TOP of the Ring | | Bottom of the Ring | |
|---|---|---|---|---|
| Tooth | Rho | Theta | Rho | Theta |
| 1 | 5.4287 | 300.4610 | 3.0616 | 251.1439 |
| 2 | 4.5156 | 270.5274 | 3.1192 | 241.4345 |
| 3 | 4.5156 | 259.6183 | 3.1768 | 231.7251 |
| 4 | 4.5156 | 248.7092 | 3.1284 | 219.8080 |
| 5 | 4.5156 | 237.8001 | 3.0602 | 207.4774 |
| 6 | 4.5156 | 226.8910 | 2.9920 | 195.1469 |
| 7 | 4.5156 | 215.9819 | 2.9237 | 182.8163 |
| 8 | 4.5156 | 205.0728 | 2.8555 | 170.4858 |
| 9 | 4.5156 | 194.1637 | 2.7873 | 158.1552 |
| 10 | 4.5156 | 183.2546 | 3.9326 | 171.1077 |
| 11 | 4.5156 | 172.3456 | 3.9326 | 160.1986 |
| 12 | 4.5156 | 161.4365 | 3.9326 | 149.2895 |
| 13 | 4.5156 | 150.5274 | 3.9326 | 138.3804 |
| 14 | 4.5156 | 139.6183 | 3.9326 | 127.4713 |
| 15 | 4.5156 | 128.7092 | 3.9326 | 116.5622 |
| 16 | 4.5156 | 117.8001 | 3.9326 | 105.6531 |
| 17 | 4.5156 | 106.8910 | 3.9326 | 94.7440 |
| 18 | 4.5156 | 95.9819 | 3.9326 | 83.8349 |
| 19 | 4.5156 | 85.0728 | 3.9326 | 72.9258 |
| 20 | 4.5156 | 74.1637 | 3.9326 | 62.0167 |
| 21 | 4.5156 | 63.2546 | 39326 | 51.1077 |
| 22 | 4.5156 | 52.3456 | 3.9326 | 40.1986 |
| 23 | 4.5156 | 41.4365 | 3.9326 | 29.2895 |
| 24 | 4.5156 | 30.5274 | 3.9326 | 18.3804 |

TABLE 82

Conic Tooth Tool center Coordinates, Ring 2, Teeth 25–33

| Tool Rho: | 0.0961 Inches TOP of the Ring | | Ring One Tool Theta: 2.002 Deg. Bottom of the Ring | |
|---|---|---|---|---|
| Tooth | Rho | Theta | Rho | Theta |
| 25 | 5.6951 | 44.1938 | 3.9326 | 7.4713 |
| 26 | 5.6273 | 31.8713 | 3.9326 | −3.4378 |
| 27 | 5.5594 | 379.5487 | 3.9326 | 345.6531 |
| 28 | 5.4916 | 367.2262 | 3.9326 | 334.7440 |
| 29 | 5.4237 | 354.9037 | 3.9326 | 323.8349 |
| 30 | 5.3559 | 342.5812 | 3.9326 | 312.9258 |
| 31 | 5.2881 | 330.2586 | 3.9326 | 302.0167 |
| 32 | 5.3139 | 319.8887 | 3.9326 | 291.1077 |
| 33 | 5.3713 | 310.1748 | 3.9326 | 280.1986 |

TABLE 84

Conic Tooth Tool Center Coordinates, Ring 3, Teeth 25–37

Tool Tho: 0.0961 Inches  Ring Three

TOP of the Ring / Tool Theta: 1.7858 Deg / Bottom of the Ring

| Tooth | Rho | Theta | Rho | Theta |
|---|---|---|---|---|
| 25 | 6.6100 | 324.8969 | 6.0270 | 314.0631 |
| 26 | 6.6100 | 315.1672 | 6.0270 | 304.3334 |
| 27 | 6.6100 | 305.4374 | 6.0270 | 294.6036 |
| 28 | 7.7511 | 316.9136 | 6.0270 | 284.8739 |
| 29 | 7.6880 | 306.0104 | 6.0270 | 275.1442 |
| 30 | 7.6248 | 295.1072 | 6.0270 | 265.4144 |
| 31 | 7.5617 | 284.2040 | 6.0270 | 255.6847 |
| 32 | 7.4985 | 273.3008 | 6.0270 | 245.9550 |
| 33 | 7.4354 | 262.3976 | 6.0270 | 236.2253 |
| 34 | 7.3722 | 251.4944 | 6.0270 | 226.4955 |
| 35 | 7.3425 | 241.2121 | 6.0270 | 216.7658 |
| 36 | 7.3964 | 232.4839 | 6.0270 | 207.0361 |
| 37 | 7.4503 | 223.7557 | 6.0270 | 197.3063 |

TABLE 83

Conic Tooth Center Coordinates, Ring 3, Teeth 1–24

Tool Rho: 0.0961 Inches

TOP of the Ring / Ring Three Tool Theta: 1.7858 Deg / Bottom of the Ring

| Tooth | Rho | Theta | Rho | Theta |
|---|---|---|---|---|
| 1 | 7.5042 | 215.0275 | 5.1745 | 171.7362 |
| 2 | 6.6100 | 188.6807 | 5.2287 | 163.0125 |
| 3 | 6.6100 | 178.9510 | 5.2828 | 154.2888 |
| 4 | 6.6100 | 169.2212 | 5.2984 | 144.8500 |
| 5 | 6.6100 | 159.4915 | 5.2353 | 133.9467 |
| 6 | 6.6100 | 149.7618 | 5.1721 | 123.0433 |
| 7 | 6.6100 | 140.0320 | 5.1090 | 112.1400 |
| 8 | 6.6100 | 130.3023 | 5.0458 | 101.2367 |
| 9 | 6.6100 | 120.5726 | 4.9827 | 90.3333 |
| 10 | 6.6100 | 110.8428 | 4.9195 | 79.4300 |
| 11 | 6.6100 | 101.1131 | 6.0270 | 90.2793 |
| 12 | 6.6100 | 91.3834 | 6.0270 | 80.5496 |
| 13 | 6.6100 | 81.6537 | 6.0270 | 70.8198 |
| 14 | 6.6100 | 71.9239 | 6.0270 | 61.0901 |
| 15 | 6.6100 | 62.1942 | 6.0270 | 51.3604 |
| 16 | 6.6100 | 52.4645 | 6.0270 | 41.6307 |
| 17 | 6.6100 | 42.7347 | 6.0270 | 31.9009 |
| 18 | 6.6100 | 33.0050 | 6.0270 | 22.1712 |
| 19 | 6.6100 | 23.2753 | 6.0270 | 12.4415 |
| 20 | 6.6100 | 13.5455 | 6.0270 | 2.7117 |
| 21 | 6.6100 | 3.8158 | 6.0270 | −7.0180 |
| 22 | 6.6100 | 354.0861 | 6.0270 | 343.2523 |
| 23 | 6.6100 | 344.3564 | 6.0270 | 333.5225 |
| 24 | 6.6100 | 334.6266 | 6.0270 | 323.7928 |

TABLE 85

Conic Tooth Tool Center Coordinates, Ring 4, Teeth 1–24

Tool Rho: 0.0961 Inches

TOP of the Ring / Ring Four Tool Theta: 1.6115 Deg. / Bottom of the Ring

| Tooth | Rho | Theta | Rho | Theta |
|---|---|---|---|---|
| 1 | 8.7044 | 114.7254 | 7.2832 | 90.8933 |
| 2 | 8.7044 | 105.9449 | 7.3342 | 82.9674 |
| 3 | 8.7044 | 97.1644 | 7.3851 | 75.0414 |
| 4 | 8.7044 | 88.3839 | 7.4361 | 67.1155 |
| 5 | 8.7044 | 79.6034 | 7.4000 | 57.7302 |
| 6 | 8.7044 | 70.8230 | 7.3411 | 47.9625 |
| 7 | 8.7044 | 62.0425 | 7.2823 | 38.1947 |
| 8 | 8.7044 | 53.2620 | 7.2234 | 28.4269 |
| 9 | 8.7044 | 44.4815 | 7.1645 | 18.6592 |
| 10 | 8.7044 | 35.7010 | 7.1056 | 8.8914 |
| 11 | 8.7044 | 26.9205 | 7.0468 | −0.8764 |
| 12 | 8;7044 | 18.1400 | 8.1213 | 8.3632 |
| 13 | 8.7044 | 9.3595 | 8.1213 | −0.4173 |
| 14 | 8.7044 | 360.5791 | 8.1213 | 350.8022 |
| 15 | 8.7044 | 351.7986 | 8.1213 | 342.0217 |
| 16 | 8.7044 | 343.0181 | 8.1213 | 333.2412 |
| 17 | 8.7044 | 334.2376 | 8.1213 | 324.4607 |
| 18 | 8.7044 | 325.4571 | 8.1213 | 315.6803 |
| 19 | 8.7044 | 316.6766 | 8.1213 | 306.8998 |
| 20 | 8.7044 | 307.8961 | 8.1213 | 298.1193 |
| 21 | 8.7044 | 299.1156 | 8.1213 | 289.3388 |
| 22 | 8.7044 | 290.3352 | 8.1213 | 280.5583 |
| 23 | 8.7044 | 281.5547 | 8.1213 | 271.7778 |
| 24 | 8.7044 | 272.7742 | 8.1213 | 262.9973 |

TABLE 86

Conic Tooth Tool Center Coordinates, Ring 4, Teeth 25–41
14201

Tool Rho: 0.0961 Inches  Ring Four Tool Theta: 1.6115 Deg.

TOP of the Ring / Bottom of the Ring

| Tooth | Rho | Theta | Rho | Theta |
|---|---|---|---|---|
| 25 | 8.7044 | 263.9937 | 8.1213 | 254.2168 |
| 26 | 8.7044 | 255.2132 | 8.1213 | 245.4363 |
| 27 | 8.7044 | 246.4327 | 8.1213 | 236.6559 |
| 28 | 8.7044 | 237.6522 | 8.1213 | 227.8754 |
| 29 | 8.7044 | 228.8717 | 8.1213 | 219.0949 |
| 30 | 8.7044 | 220.0912 | 8.1213 | 210.3144 |
| 31 | 8.7044 | 211.3108 | 8.1213 | 201.5339 |
| 32 | 8.7044 | 202.5303 | 8.1213 | 192.7534 |
| 33 | 8.7044 | 193.7498 | 8.1213 | 183.9729 |
| 34 | 8.7044 | 184.9693 | 8.1213 | 175.1924 |
| 35 | 8.7044 | 176.1888 | 8.1213 | 166.4120 |
| 36 | 8.7044 | 167.4083 | 8.1213 | 157.6315 |
| 37 | 8.7044 | 158.6278 | 8.1213 | 148.8510 |
| 38 | 8.7044 | 149.8473 | 8.1213 | 140.0705 |
| 39 | 8.7044 | 141.0669 | 8.1213 | 131.2900 |
| 40 | 8.7044 | 132.2864 | 8.1213 | 122.5095 |
| 41 | 8.7044 | 123.5059 | 8.1213 | 113.7290 |

The angular displacement is 0.0961 inches divided by the nascention circle times 360 degrees. For the first ring, 0.0961 inches divided by the 15.18437 inches is a ratio of 0.006328876. This ratio times 360 degrees is 2.2783 degrees. This angle is added to the top rho and the bottom rho to get the tool centers top rho and bottom rho. This is applied to the twenty-nine teeth on the first ring.

The second ring tool theta: 0.0961/17.27876×360 is 2.002. The third ring tool theta: 0.961/19.37315×360 is 1.7858. The forth ring tool theta: 0.961/21.46755×360 is 1.6115. These are added to their top and bottom boundary thetas to get the tools top and bottom thetas.

The conic teeth are in the acceleration and deceleration tubes. The acceleration and deceleration channel entrance and exits are part of the conic teeth boundaries and have already been accounted for.

The placement of the tool center is the same as the conic teeth. From the tooth boundaries, the tool center rho is added to the boundary rho. The tool center theta is calculated from the nascention circle that the nascention coordinate is on. The position of each scaling tooth's nascention coordinate is unique and will require a separate tool center theta calculation.

Tables 87–89 show the conical coordinates of the tool center in the first, second and third acceleration tube. The tool rho is 0.0961 inches for all three. Each tooth has its' radius at the nascention coordinate. This radius times two pi will produce a circumference. The tool rho is divided by the circumference will yield a ratio. This ratio times 360 degrees is the tool theta. For example, the first tooth has a radius of 2.44815 inches. Its circumference is 15.38218011 inches. The tool rho of 0.0961 divided by the circumference is a ratio equaling 0.006247489. The ratio times 360 degrees is 2.2490 degrees as shown in Tool Theta column.

TABLE 87

Tool Center Coordinates for Acceleration Tube One

Tool Rho: 0.0961 inches

| Tooth | Radius | Tool Theta | Top Boundary Theta | Rho | Bottom Boundary Theta | Rho |
|---|---|---|---|---|---|---|
| 1 | 2.44815 | 2.24900 | 373.034 | 3.415 | 352.305 | 2.473 |
| 2 | 2.47938 | 2.22067 | 362.172 | 3.475 | 341.736 | 2.535 |
| 3 | 2.51037 | 2.19326 | 351.463 | 3.535 | 331.311 | 2.597 |
| 4 | 2.54111 | 2.16672 | 340.900 | 3.593 | 321.024 | 2.657 |
| 5 | 2.57162 | 2.14102 | 330.478 | 3.651 | 310.869 | 2.717 |
| 6 | 2.60190 | 2.11610 | 320.193 | 3.708 | 300.844 | 2.776 |
| 7 | 2.63195 | 2.09194 | 310.039 | 3.764 | 290943 | 2.835 |
| 8 | 2.66178 | 2.06850 | 300.012 | 3.820 | 281.161 | 2.893 |
| 9 | 2.69140 | 2.04574 | 290.108 | 3.875 | 271.497 | 2.950 |
| 10 | 2.72080 | 2.02363 | 280.323 | 3.929 | 261.944 | 3.006 |

TABLE 88

Tool Center Coordinates For Acceleration Tube Two

Tool Rho: 0.0961 inches

| Tooth | Radius | Tool Theta | Top Boundary Theta | Rho | Bottom Boundary Theta | Rho |
|---|---|---|---|---|---|---|
| 1 | 2.779 | 1.981 | 289.384 | 5.485 | 271.416 | 4.565 |
| 2 | 2.807 | 1.961 | 279.738 | 5.542 | 261.978 | 4.623 |
| 3 | 2.836 | 1.942 | 270.200 | 5.598 | 252.643 | 4.681 |
| 4 | 2.864 | 1.922 | 260.768 | 5.653 | 243.408 | 4.738 |
| 5 | 2.892 | 1.904 | 251.437 | 5.708 | 234.270 | 4.794 |
| 7 | 2.948 | 1.868 | 233.069 | 5.816 | 216.274 | 4.906 |
| 6 | 2.920 | 1.886 | 242.205 | 5.762 | 225.226 | 4.850 |
| 8 | 2.975 | 1.851 | 224.026 | 5.869 | 207.411 | 4.961 |
| 9 | 3.002 | 1.834 | 215.074 | 5.921 | 198.635 | 5.015 |
| 10 | 3.030 | 1.817 | 206.210 | 5.973 | 189.943 | 5.069 |
| 11 | 3.057 | 1.801 | 197.433 | 6.025 | 181.333 | 5.122 |
| 12 | 3.083 | 1.786 | 0.000 | 0.000 | 0.000 | 0.000 |

TABLE 89

Tool Center Coordinates for Acceleration Tube 3

| Tooth | Radius | Tool Theta | Top Boundary Theta | Rho | Bottom Boundary Theta | Rho |
|---|---|---|---|---|---|---|
| 1 | 3.110 | 1.770 | 205.237 | 7.558 | 189.435 | 6.657 |
| 2 | 3.136 | 1.756 | 196.559 | 7.611 | 180.906 | 6.712 |
| 3 | 3.162 | 1.741 | 187.961 | 7.664 | 172.454 | 6.766 |
| 4 | 3.188 | 1.727 | 179.440 | 7.717 | 164.076 | 6.820 |
| 5 | 3.214 | 1.713 | 170.995 | 7.769 | 155.771 | 6.873 |
| 6 | 3.240 | 1.699 | 162.624 | 7.820 | 147.537 | 6.926 |
| 7 | 3.266 | 1.686 | 154.324 | 7.871 | 139.372 | 6.978 |
| 8 | 3.291 | 1.673 | 146.096 | 7.922 | 131.275 | 7.030 |
| 9 | 3.317 | 1.660 | 137.936 | 7.972 | 123.245 | 7.081 |
| 10 | 3.342 | 1.648 | 129.843 | 8.022 | 115.279 | 7.132 |
| 11 | 3.367 | 1.635 | 121.816 | 8.071 | 107.377 | 7.183 |
| 12 | 3.392 | 1.623 | 113.853 | 8.120 | 99.536 | 7.233 |

Using the acceleration tube top boundary, the tool theta is subtracted from the top boundary theta to get the tool center top boundary theta. It is subtracted because the direction of the tool center is counter-clockwise from the tooth coordinate. The Tool Rho is added to the boundary height to get the tool center top boundary rho.

Using the acceleration tube bottom boundary is the same process. The tool theta is subtracted from the bottom boundary theta to get the tool center bottom boundary theta. The tool rho is added to the boundary rho to get the tool center bottom boundary rho. This process is done for all the teeth in the acceleration tubes.

As shown in Tables 90–92, the tooth coordinates in the top boundary deceleration tube use the boundary rho and theta coordinates. The tool rho is added to the tooth top boundary rho for the tool center top boundary rho. The tool theta is subtracted from tooth top boundary theta for the tool center top theta.

The deceleration bottom boundary uses the tooth coordinates in the bottom boundary deceleration tube. The tool rho is added to the tooth bottom boundary rho for the tool center top boundary rho. The tool theta is subtracted from the tooth boundary theta for the tool center theta.

TABLE 90

Tool Center Coordinates for Deceleration Tube One

Tool Rho: 0.0961 inches

| Tooth | Radius | Tool Theta | Top Boundary Theta | Rho | Bottom Boundary Theta | Rho |
|---|---|---|---|---|---|---|
| 1 | 2.674 | 2.059 | 169.281 | 3.849 | 146.264 | 2.712 |
| 2 | 2.594 | 2.123 | 156.330 | 3.782 | 132.448 | 2.636 |
| 3 | 2.508 | 2.195 | 143.244 | 3.714 | 118.384 | 2.558 |
| 4 | 2.417 | 2.278 | 0.000 | 0.000 | 0.000 | 0.000 |

TABLE 91

Tool Center Coordinates for Deceleration Tube Two

Tool Rho: 0.0961 inches

| Tooth | Radius | Tool Theta | Top Boundary Theta | Rho | Bottom Boundary Theta | Rho |
|---|---|---|---|---|---|---|
| 1 | 3.0217 | 1.8221 | 88.8308 | 5.9503 | 69.0266 | 4.8516 |
| 2 | 2.9578 | 1.8615 | 77.4742 | 5.8876 | 57.1491 | 4.7827 |

TABLE 91-continued

Tool Center Coordinates for Deceleration Tube Two

Tool Rho: 0.0961 inches

| Tooth | Radius | Tool Theta | Top Boundary Theta | Rho | Bottom Boundary Theta | Rho |
|---|---|---|---|---|---|---|
| 3 | 2.8914 | 1.9042 | 65.9834 | 5.8242 | 45.0931 | 4.7127 |
| 4 | 2.8223 | 1.9508 | 54.3670 | 5.7601 | 32.8599 | 46417 |

TABLE 92

Tool Center Coordinates for Deceleration Tube Three

Tool Rho: 0.0961 inches

| Tooth | Radius | Tool Theta | Top Boundary Theta | Rho | Bottom Boundary Theta | Rho |
|---|---|---|---|---|---|---|
| 1 | 3.365 | 1.636 | 7.185 | 8.050 | −10.154 | 6.984 |
| 2 | 3.312 | 1.663 | 357.084 | 7.992 | 339.407 | 6.921 |
| 3 | 3.257 | 1.691 | 346.877 | 7.932 | 328.840 | 6.858 |
| 4 | 3.201 | 1.720 | 336.563 | 7.872 | 318.145 | 6.793 |
| 5 | 3.143 | 1.752 | 326.145 | 7.812 | 307.319 | 6.728 |

Tables 93–95 show the tool centers for the scaling tooth offsets, which are the back of the scaling teeth. The scaling tooth offsets coordinates are from the Acceleration Tube Offset coordinates. Being on the back of the scaling tooth, the direction of the tool center is clockwise and the tool theta will be added to the offset teeth theta.

The Offset of Scaling Teeth top boundary theta has the tool theta subtracted to yield the tool center top boundary. The scaling tooth bottom boundary theta has the tool theta subtracted from the tool center bottom boundary theta. The tool rho is added to the offset of scaling teeth top rho and bottom rho to get the respective tool center top and bottom boundary rhos.

TABLE 93

Tool Center Conical Coordinates for Acceleration Tube One Offset

Tool Rho: 0.0961 inches

| Tooth | Radius | Tool Theta | Top Boundary Theta | Rho | Bottom Boundary Theta | Rho |
|---|---|---|---|---|---|---|
| 1 | 2.448 | 2.249 | 383.945 | 3.354 | 363.429 | 2.421 |
| 2 | 2.479 | 2.221 | 372.964 | 3.415 | 352.481 | 2.473 |
| 3 | 2.510 | 2.193 | 362.138 | 3.475 | 341.940 | 2.535 |
| 4 | 2.541 | 2.167 | 351.462 | 3.535 | 331.539 | 2.596 |
| 5 | 2.572 | 2.141 | 340.931 | 3.593 | 321.277 | 2.657 |
| 6 | 2.602 | 2.116 | 330.540 | 3.651 | 311.145 | 2.717 |
| 7 | 2.632 | 2.092 | 320.281 | 3.708 | 301.161 | 2.777 |
| 8 | 2.662 | 2.068 | 310.153 | 3.764 | 291.258 | 2.835 |
| 9 | 2.691 | 2.046 | 300.151 | 3.820 | 281.496 | 2.893 |
| 10 | 2.721 | 2.024 | 290.270 | 3.875 | 271.847 | 2.950 |
| 11 | 2.750 | 2.002 | 281.490 | 3.979 | 262.311 | 3.006 |

TABLE 94

Tool Center Conical Coordinates for Acceleration Tube 2 Offset

Tool Rho: 0.0961 inches

| Tooth | Radius | Tool Theta | Top Boundary Theta | Rho | Bottom Boundary Theta | Rho |
|---|---|---|---|---|---|---|
| 1 | 2.779 | 1.981 | 299.074 | 5.429 | 281.254 | 4.516 |
| 2 | 2.807 | 1.961 | 289.331 | 5.485 | 275.738 | 4.782 |
| 3 | 2.836 | 1.942 | 279.709 | 5.542 | 262.117 | 4.623 |
| 4 | 2.864 | 1.922 | 270.193 | 5.598 | 252.799 | 4.681 |
| 5 | 2.892 | 1.904 | 260.781 | 5.653 | 243.581 | 4.738 |
| 6 | 2.920 | 1.886 | 251.471 | 5.708 | 234.458 | 4.794 |
| 7 | 2.948 | 1.868 | 242.257 | 5.762 | 225.431 | 4.850 |
| 8 | 2.975 | 1.851 | 233.139 | 5.816 | 216.492 | 4.906 |
| 9 | 3.002 | 1.834 | 224.115 | 5.869 | 207.642 | 4.960 |
| 10 | 3.030 | 1.817 | 215.179 | 5.921 | 198.879 | 5.015 |
| 11 | 3.057 | 1.801 | 206.331 | 5.973 | 190.198 | 5.068 |
| 12 | 3.083 | 1.786 | 197.566 | 6.025 | 181.601 | 5.122 |

TABLE 95

Tool Center Conical Coordinates for Acceleration Tube 3 Offset

Tool Rho: 0.0961 inches

| Tooth | Radius | Tool Theta | Top Boundary Theta | Rho | Bottom Boundary Theta | Rho |
|---|---|---|---|---|---|---|
| 1 | 3.110 | 1.770 | 213.939 | 7.504 | 198.256 | 6.610 |
| 2 | 3.136 | 1.756 | 205.197 | 7.558 | 189.521 | 6.657 |
| 3 | 3.162 | 1.741 | 196.535 | 7.611 | 181.005 | 6.712 |
| 4 | 3.188 | 1.727 | 187.952 | 7.664 | 172.566 | 6.766 |
| 5 | 3.214 | 1.713 | 179.446 | 7.717 | 164.200 | 6.820 |
| 6 | 3.240 | 1.699 | 171.014 | 7.769 | 155.905 | 6.873 |
| 7 | 3.266 | 1.686 | 162.656 | 7.820 | 147.683 | 6.926 |
| 8 | 3.291 | 1.673 | 154.369 | 7.871 | 139.528 | 6.978 |
| 9 | 3.317 | 1.660 | 146.153 | 7.922 | 131.441 | 7.030 |
| 10 | 3.342 | 1.648 | 138.005 | 7.972 | 123.420 | 7.081 |
| 11 | 3.367 | 1.635 | 129.924 | 8.022 | 115.463 | 7.132 |
| 12 | 3.392 | 1.623 | 121.908 | 8.071 | 107.570 | 7.183 |
|  | 3.417 | 1.611 | 113.954 | 8.120 | 99.736 | 7.233 |

Tables 96–98 are the scaling tooth offset tool centers coordinates for the deceleration channel. They are based on the deceleration tube scaling tooth offsets. The top and bottom theta boundaries have the tool theta subtracted from the tool center top and bottom. It is subtracted because its direction from the tool edge to the tool center is counter-clockwise.

TABLE 96

Tool Center Conical Coordinates for Deceleration Tube One Offset

Tool Rho: 0.0961 inches

| Tooth | Radius | Tool Theta | Top Boundary Theta | Rho | Bottom Boundary Theta | Rho |
|---|---|---|---|---|---|---|
| 1 | 2.674 | 2.059 | 182.184 | 3.933 | 159.004 | 2.787 |
| 2 | 2.594 | 2.123 | 169.300 | 3.849 | 145.610 | 2.712 |
| 3 | 2.508 | 2.195 | 156.668 | 3.782 | 132.020 | 2.636 |
| 4 | 2.417 | 2.278 | 144.020 | 3.714 | 118.276 | 2.558 |

TABLE 97

Tool Center Conical Coordinates for Deceleration Tube 2 Offset

Tool Rho:
0.0961 inches

| Tooth | Radius | Tool Theta | Top Boundary Theta | Rho | Bottom Boundary Theta | Rho |
|---|---|---|---|---|---|---|
| 1 | 3.022 | 1.822 | 100.141 | 6.027 | 80.179 | 4.852 |
| 2 | 2.958 | 1.861 | 88.770 | 5.950 | 68.560 | 4.920 |
| 3 | 2.891 | 1.904 | 77.551 | 5.888 | 56.784 | 4.783 |
| 4 | 2.822 | 1.951 | 66.230 | 5.824 | 44.854 | 4.713 |
| 5 | 2.750 | 2.002 | 54.824 | 5.760 | 32.781 | 4.642 |

TABLE 98

Tool Center Conical Coordinates for Deceleration Tube Three Offset

Tool Rho:
0.0961 inches

| Tooth | Radius | Tool Theta | Top Boundary Theta | Rho | Bottom Boundary Theta | Rho |
|---|---|---|---|---|---|---|
| 1 | 3.365 | 1.636 | 17.258 | 8.121 | −0.225 | 7.047 |
| 2 | 3.312 | 1.663 | 367.113 | 8.050 | 349.508 | 6.984 |
| 3 | 3.257 | 1.691 | 357.083 | 7.992 | 339.122 | 6.921 |
| 4 | 3.201 | 1.720 | 346.957 | 7.932 | 328.619 | 6.858 |
| 5 | 3.143 | 1.752 | 336.741 | 7.872 | 318.000 | 6.793 |
| 6 | 3.083 | 1.786 | 326.435 | 7.812 | 307.262 | 6.728 |

The tool rho is added to the offset top rho and offset bottom rho. The result is the tool center top rho and bottom rho.

The angular displacement of the milling tool was based on the circumference at the nascention coordinate but is preferably the circumference at its boundaries as this would enhance accuracy.

One aspect about the design of a VCT is that all the teeth have beginning and ending rho and theta based on a conix coefficient. These are lines across a conic surface. For CNC interpolation, the difference between the theta values are an angular rotation of the cone and the lateral movement is the difference between the rhos. This is very easy to program.

The CNC Specification is the mating of the data with the machining process. In the prototype, tool control was achieved through the generation of G-Code. G-Code generation is the process by which the G-Code is produced from the raw tool center data. The G-Code is very precise instructions to a milling machine to achieve the desired results. The specifications provide the location of the desired results.

Finally, it should be noted that this is the dividing point between an external cone such as the prototype 100 and an internal cone. The milling of the tool centers will be on the outside of the cone thus making it an external cone. The same tool centers could be on the inside of a cone with different tooling and milling instructions to achieve internal teeth. The tool centers are on the pitch surface. The milling is from the outside surface above the pitch surface. An inside surface would be below the pitch surface.

C. Motion Control

To change gear ratios, the pinion gear has to move from one ring to another with a motion control device. This movement of the gear is called Translocation. This purpose of this term is to differentiate this movement from all the other movements.

Translocation makes the Van Cor Transmission a transmission. The channels are designed for this lateral movement of the gear that changes the gear ratios. The motion controls convert the command to change into action.

Figure 62:
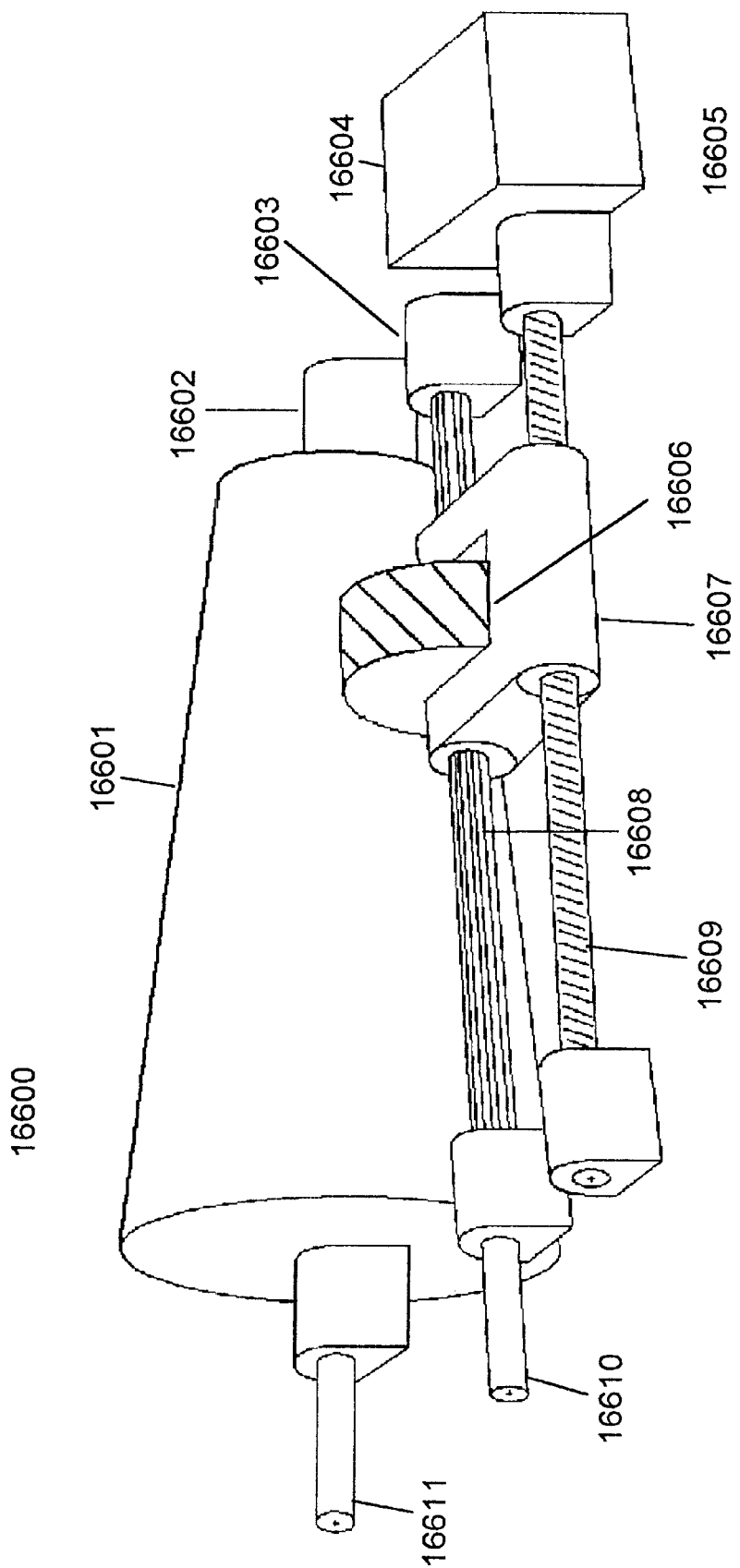
FIG. 62 is an isometric view of one embodiment of the present invention including a cone, pinion gear and motion control.

FIG. 62 is an illustration of components of one embodiment of the Van Cor Transmission. It has a cone 16601 with bearing blocks 16602. The power-input 16611 is the cone shaft. The helical pinion gear 16607 is against the cone 16601. The pinion gear 16606 is mounted on a splined shaft 16608 with its' bearing blocks 16603. The end of the shaft 16610 is the power output. The pinion gear 16606 is held in position with a control yoke 16607. The control yoke 16607 is moved and held in position with a threaded shaft 16609. This threaded shaft 16609 has bearing blocks 16605 and a control motor 16604.

The pinion gear has to change gear ratios on the cone by moving from a ring on the cone, through a channel to another ring. This motion is guided by the control yoke 16606. Because it is on a threaded shaft 16609, the rotation of threaded shaft will move the yoke and the gear that it holds to a new position. The speed and direction of the control motor 16604 control the rotation of the threaded shaft. Different speeds will produce different rates of lateral movement of the yoke.

The Programming of the movement of the control yoke is relative to the rotation of the cone. The distance the gear travels is always the same since the ring pitch or distance between the rings is equal. The channels angular displacement is the degree of rotation of the cone for the gears' translocation relative to the channel. The speed of the cones' rotation determines the timing necessary for the translocation. Since the translocation distance is fixed, the timing determines the needed lateral velocity.

TABLE 100

Component Rate of Change Per Channel

| | Acceleration Channel | | | | | | | |
|---|---|---|---|---|---|---|---|---|
| | Entrance Angle | 0.5" Divided By Angle | Tube Angle | 1.0944" Divided By Angle | Exit Angle | 0.5" Divided By Angle | Total Angle | 2.0944" Divided By Angle |
| 1 | 99.310 | 0.005035 | 81.770 | 0.013384 | 87.273 | 0.005729 | 268.353 | 0.007805 |
| 2 | 98.182 | 0.005093 | 82.679 | 0.013237 | 87.568 | 0.005710 | 268.429 | 0.007802 |
| 3 | 97.297 | 0.005139 | 83.406 | 0.013121 | 87.805 | 0.005694 | 268.508 | 0.007800 |

TABLE 100-continued

Deceleration Channel | Component Rate of Change Per Channel

| | Entrance Angle | 0.5" Divided By Angle | Tube Angle | 1.0944" Divided By Angle | Exit Angle | 0.5" Divided By Angle | Net Displacement Angle | 2.0944" Divided By Angle |
|---|---|---|---|---|---|---|---|---|
| 1 | 87.273 | 0.005729 | 91.422 | 0.011971 | 99.310 | 0.005035 | 278.005 | 0.007534 |
| 2 | 87.568 | 0.005710 | 91.522 | 0.011958 | 98.182 | 0.005093 | 277.272 | 0.007554 |
| 3 | 87.805 | 0.005694 | 91.524 | 0.011958 | 97.297 | 0.005139 | 276.626 | 0.007571 |

Table 100 is used to calculate the movement of the pinion gear through the channels. This table is called the Component Rate of Change per Channel. The channels components are the entrance, tube and exit angular displacements. The Net angular displacement is the entire channel. Each component has a different rate of change. The top and bottom landings were not large enough for the exits and entrances to have the same rate as the tubes.

The rate of change is the angle divided by the distance the pinion gear has to be moved through that component. The entrance and exits are the width of the pinion gear or 0.5 inches. The tube is the distance between the rings minus the entrance and exit or 2.0944–0.5–0.5 for a total of 1.0944 inches.

The pinion gear has to move out of the rings and through a channel entrance, tube, and exit and to translocate to another ring. The lateral distance the gear has to travel is 2.0944 inches. The Acceleration Channel angular displacements and the Deceleration Channel angular displacements are the angular rotation of the cone while the gear is moving from one ring to another. The speed of the cone determines the amount of time the cone takes to rotate through these angular displacements. That is the time it has to move the pinion gear through a channel. The faster the cone rotates, the faster the lateral movement has to be.

For each of the three components of the channel: the entrance is 99.310 degrees or 0.0165 seconds; the tube is 82.679 degrees or 0.0137 seconds; and the exit is 87.568 or 0.0146 seconds. With the translocation time, the system synchronizes with the starting position to the channel entrance. When the rotation of the cone comes to that position, the pinion gear is moved laterally at the three rates. Through the entrance, tube and exit. It should be noted that the width of channel footprint was made large for extra room to give the motion control mechanism additional margin.

Table 101 shows the angular locations for the acceleration and deceleration channels. Most of this information comes form the Channel Tube Specifications table. The lengths of the entrance and exit lengths are the top and bottom landings. The direction of the channel is counter-clockwise. From the start of the entrance, the entrance length is subtracted to yield the start of the tube. Subtracting the tube length yields the start of the exit. Subtracting the exit length results in the end of the exit.

With the translocation times programmed, the start of the entrance is needed to start the process.

To translocate the gear, three types of sensors needed. A rotational encoder to determine the degree of rotation of the cone from a zero point. A lateral sensor to encode the lateral location of the pinion gear. A load sensor to read the amount of torque on the system.

TABLE 101

Channel Orientation in Degrees of Rotation

Acceleration Channel

| | Start of Entrance | Entrance Length | Start of Tube | Tube Length | Start of Exit | Exit Length | End of Exit | Total length |
|---|---|---|---|---|---|---|---|---|
| 1 | 99.310 | 99.310 | 0.000 | 81.770 | 278.230 | 87.273 | 190.957 | 268.353 |
| 2 | 16.412 | 98.182 | 278.230 | 82.679 | 195.551 | 87.568 | 107.983 | 268.429 |
| 3 | 292.848 | 97.297 | 195.551 | 83.406 | 112.145 | 87.805 | 24.340 | 268.508 |

Deceleration Channel

| | Start of Entrance | Entrance Length | Start of Tube | Tube Length | Start of Exit | Exit Length | End of Exit | Total length |
|---|---|---|---|---|---|---|---|---|
| 1 | 278.230 | 87.273 | 190.957 | 91.422 | 99.535 | 91.422 | 8.113 | 270.117 |
| 2 | 195.563 | 87.568 | 107.983 | 91.522 | 16.461 | 91.522 | 284.939 | 270.612 |
| 3 | 112.145 | 87.805 | 24.340 | 91.524 | 292.816 | 91.524 | 201.292 | 270.853 |

The prototype cone is rotating 1000 RPMs and it is desired to move the pinion gear form the second ring to the third ring. The angular displacement of acceleration channel is 268.353 degrees. The angular speed is 360,000 degrees per minute or 6,000 degrees per second. The 268.429 degrees divided by 6,000 degrees per second is 0.0447 seconds to translocate the gear through the channel.

With the timing determined, an algorithm calculates the force requirements and interval requirements to program the control motor. The forces include loading variables such as the moment of inertia for the gear to start moving.

Using the rotational sensor input, the initiation time is determined. When activated, the control motor drives the threaded rod that in turn moves the control yoke and gear.

Because computation and translocation speeds are so fast, this whole process will be exceptionally fast in fractions of a second.

The following is a summary of one embodiment of a program sequence for changing gears:
a. Command gear change
b. Determine direction, to a higher ratio or a lower ratio
c. Determine load
d. Determine lateral force requirements based on direction and load
e. Encode lateral motion device for desired force requirements and length of travel.
f. Start Initiation program
g. Load timing delay from initiation to start of motion
h. Load program from rotational sensor to initiation
i. Initiate program that waits for the sensor to activate motion control device.
j. Program moves pinion gear from start to stop.
k. Program stops at the end The movements up the acceleration or down the deceleration channels modify stress and the lateral force may need to be adjusted to insure the desired rate of change.

If the speed of the cone changes on non-continuous basis, then the gear has to change relative to the rotation of the cone. If it is not a continuous change then the timing and force requirements of the lateral motion device has to be compensated for.

It is recognized that, in some embodiments, the lateral motion of the gear across the face of the cone could be accomplished with other linear motion devices such as a linear motor, hydraulic piston, pneumatic piston, as well as the threaded screw. Further, the pinion gear could be fixed to its shaft and the motion control would be outside of the translocation area; i.e. the shaft itself would be moved. Finally, it is also recognized that the sensors may be incorporated into the motors themselves, providing fewer parts and lowering the overall cost of the system.

In still other embodiments, the lateral motion of the gear across the face of the cone is controlled by a passive control system. In such a system, the pinion gear is held in the center of the ring for normal operations, and moves from the center to one of the sides to where it engages a control slot that will guide it to a different ring. This movement can be either commanded or the result of vector loading.

When the location of the teeth on the cone is determined, they are cut as tooth slots into the cone. Because the milling tool is round, the end of the conic teeth has a rounded extension. The effect is that the gear teeth can grind against this extension unless the gear is designed to fit in that rounded area. The preferred solution is to include bumpers that separate the gear teeth from the rounded end of the conic teeth, which insures that the gear is translocating the channels in a precise manner.

Figure 63:
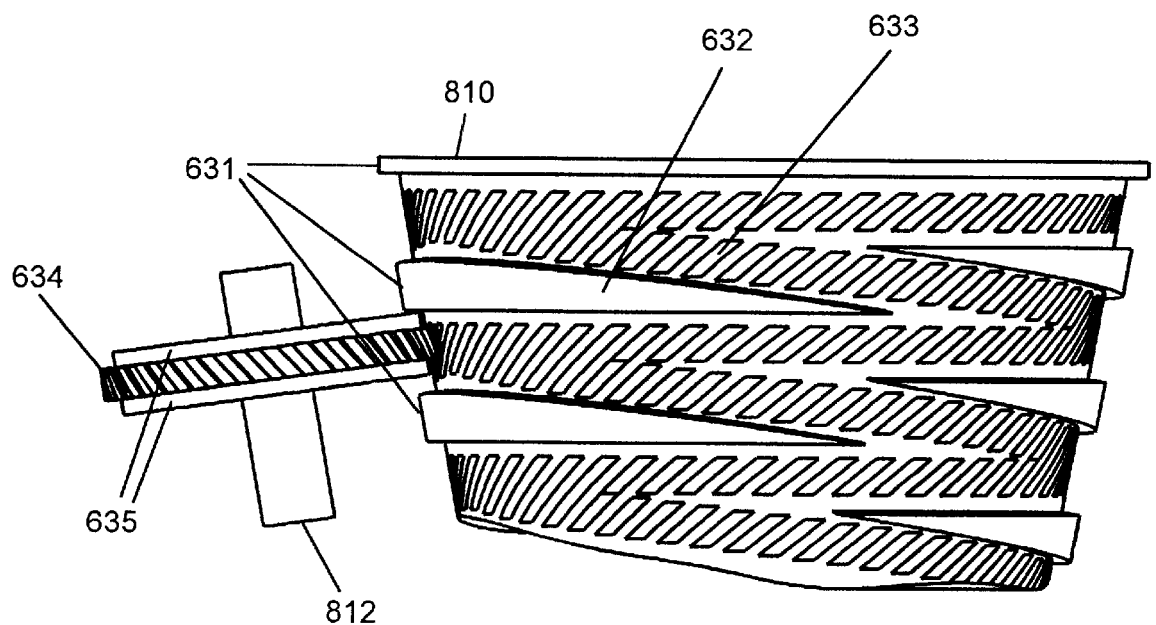
FIG. 63 is an isometric view of one embodiment of the present invention in which the cone includes alignment surfaces and the gear system includes bumpers.

As shown in FIG. 63 a cone 810 and gear assembly 812 utilizing such a bumper system is shown. The cone 810 includes a plurality of alignment surfaces 631 disposed in the ring space 632 opposite each channel 633. The alignment surfaces 631 are designed to hold the gear 634 in proper alignment as it is translocating the channels 633. This is achieved by disks 635 on each side of the gear 634, called bumpers 635. The purpose of the bumpers 635 is to protect the teeth of the gear 634 from the edges of the conic and scaling teeth by rolling against the alignment surface 631. The radius of each bumper 635 can extend to the top surface of the cone 810. The thickness of these bumpers 635 is determined by the need of the footprint and, in some embodiments, may make the footprint wider.

It is noted that, in milling the teeth, the edge of the tool can go up to the edge of the alignment surface 631 as the surface extends above the top surface of the cone. It is designated as the "top surface" because it is the top of the conic teeth. The boundaries of the alignment surface 631 can be straight on the ring side and curved in the channels 633, and will be determined based on how the bumper 635 will roll against the alignment surface 631.

Figure 64:
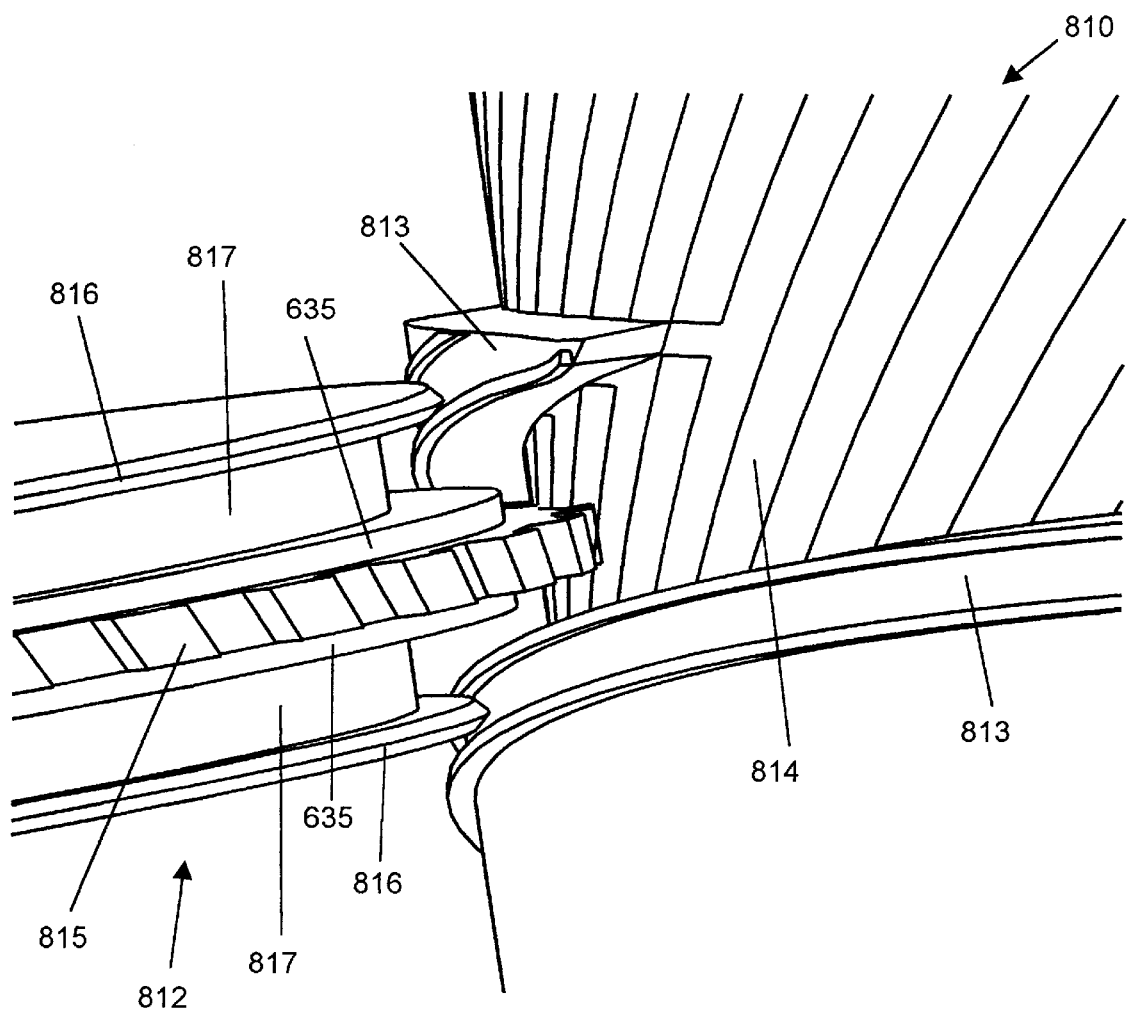
FIG. 64 is an isometric view of one embodiment of the present invention in which the cone includes control slots and the gear system includes control wheels.

Referring now to FIG. 64, a variation of the cone 810 and gear assembly 812 of FIG. 63 is shown. In this embodiment, the cone 810 includes a pair of raised slots 813, called control slots 813, which is disposed at the boundary of each channel 814 upon the cone 810. The gear assembly 812 includes a gear 815, a pair of bumpers 635, a neck 817, and a pair of control wheels 816 that are dimensioned to ride within the control slots 813. The control wheels 816 act to protect the teeth of the gear 815 from colliding with the edge of the conic teeth when moving into an acceleration or deceleration channel 814, and insure that the gear 815 is precisely translocating the channels 814.

The control slots 813 are cut on the surface of the cone 810 and can be as deep as to the surface of the teeth in the channel 814. In the embodiment of FIG. 64, the control slots 813 are cut into the alignment surfaces 631, which are disposed upon the surface of the cone 810. In such an embodiment, the control slots 813 may be as deep as the alignment surface 631.

FIG. 64 shows the gear 815 in a channel 814, with a control wheel 816 engaged in a slot 813 disposed upon the top of an alignment surface 631 on both sides of the channel 814. However, these slots 813 do not have to be on the edge of the channel 814. As shown in FIG. 64, the upper slot 813 ends and the lower slot 813 continues. In such an arrangement, the lower control wheel 816 will push the gear 815 out of the channel exit and into the conic ring.

Figure 65:
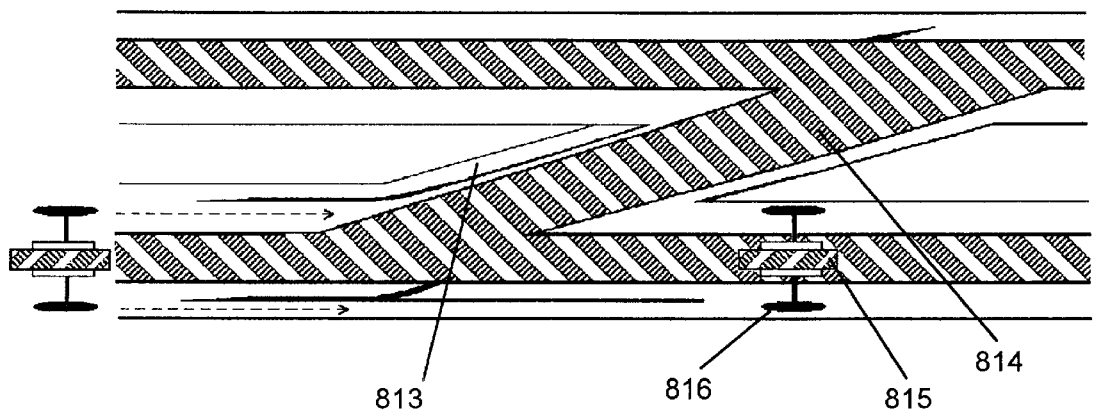
FIG. 65 is a diagrammatic view showing the embodiment of FIG. 64 in which the bumpers do not engage the control slots and remains in the ring.
Figure 66:
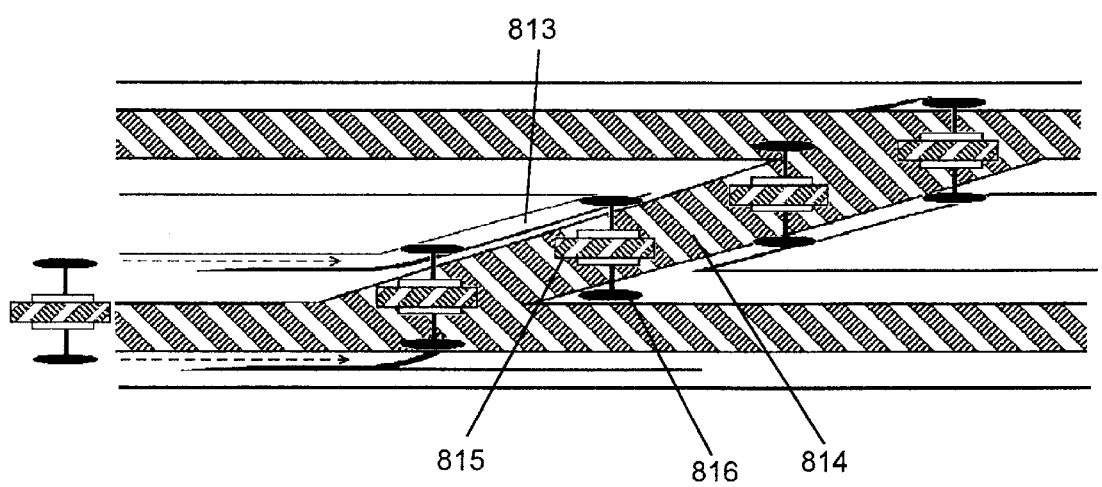
FIG. 66 is a diagrammatic view showing the embodiment of FIG. 64 in which the bumpers move into the acceleration channel.

The system of FIG. 64 is demonstrated in FIGS. 65 and 66. In FIG. 65, the gear 815 is centered on the teeth in the ring and the wheels roll over the intersection between the ring and the channel. In FIG. 66, the gear 815 is pushed upwards and engages the control slots 813 on the top and bottom. The bottom slots changed the direction in conjunction with the top slot, then end at the edge of the control surface. The top control slot ends at the control surface boundary and the bottom control slot continues to guide the gear into the upper ring. The strategy of using the overlapping channel exits and entrances will shorten the effective area of the control surface.

As noted above, the movement of the gear from the ring into a channel may be accomplished by vector loading. Vector loading is a change in the vectoral force on the gear teeth due to increased or decreased torque. For example, when a moving truck starts up a hill, the result on the transmission teeth is vector loading with an increase in resistance to be overcome. Without a balancing increase in engine power, the vector loading will push the helical teeth out of the center of the ring into the control slot of a deceleration channel.

Figure 67:
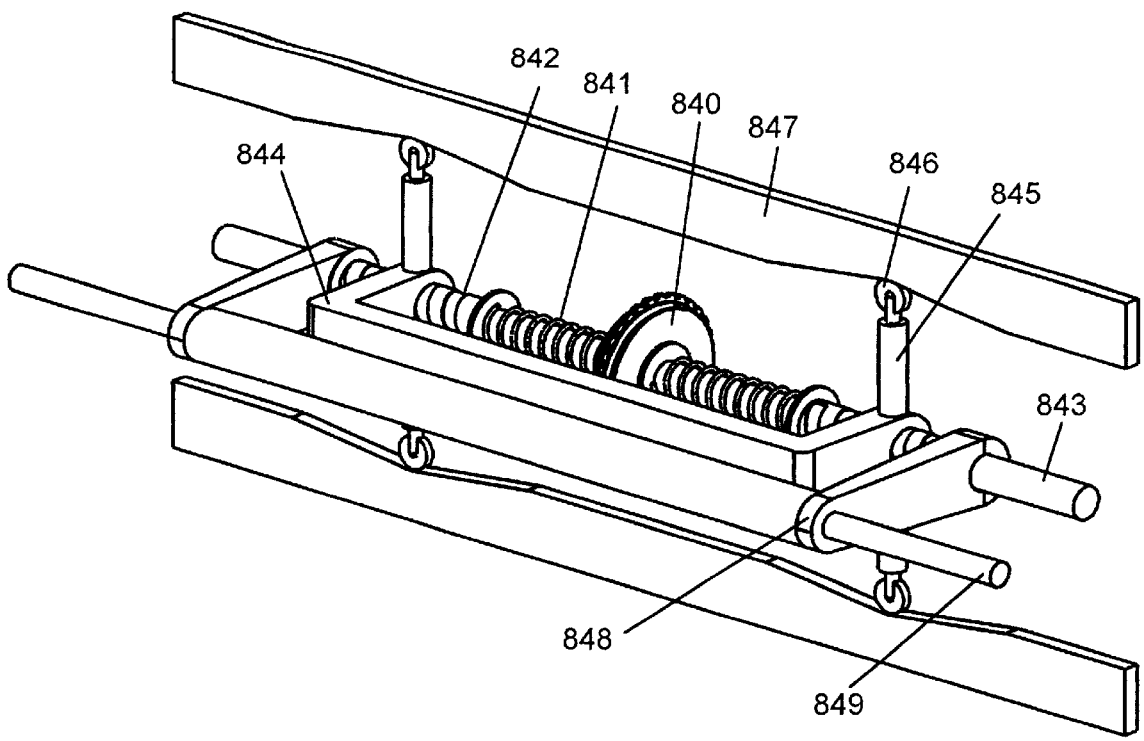
FIG. 67 is an isometric view of a mechanical control for the gear system of the embodiments of FIGS. 63 and 64.

Commanding the movement of the gear requires additional hardware in order to maintain a resistance so that the sensitivity of the changing speeds can be reduced. FIG. 67 shows one embodiment of this hardware. The helical gear 840 has heavy springs 841 on both sides, a threaded tube 842 on both sides, and a splined shaft 843. The threaded tube 842 is fed into a mounting bracket 844, which includes four spring-loaded posts 845. Two of these posts 845 extend from the top of the bracket 844 and two extend from the bottom, with each having resistance wheels 846 at their ends. These wheels 846 follow a resistance track 847. The threaded tubes 842 are attached to the speed control arm 848, and the movement of this arm 848 turns the threaded tube 842. The speed control arm 848 has a guide shaft 849 that is raised or lowered to operate the arm 848.

Figure 68:
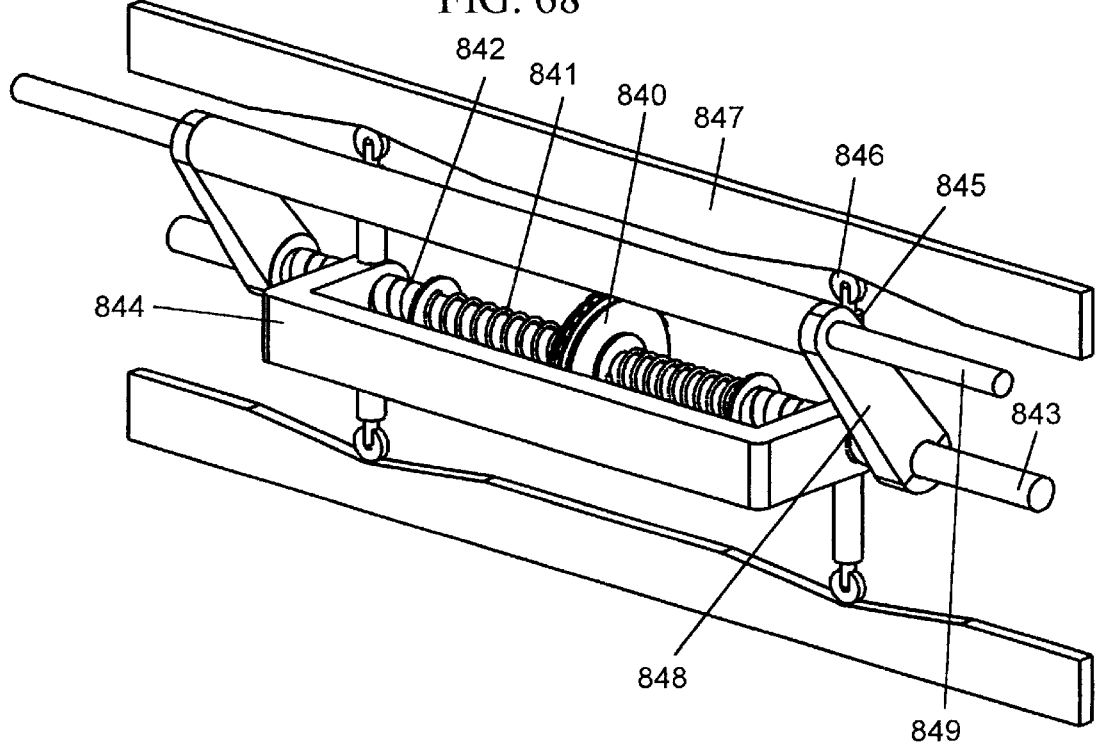
FIG. 68 is an isometric view of the mechanical control of FIG. 67 with the control arm in an up position.

The springs 841 on each side of the gear 840 allow the gear 840 to move independently due to vectoral loading and must be heavy enough to provide a resistance to be overcome. As shown in FIG. 68, when the speed control arm 848 is raised, the threaded tube 842 causes the control springs 841 to be compressed on one side and relieved on the other, moving the gear 840 sideways inside the mounting bracket 844. This movement is effectively reversed when the control arm 848 is lowered, as the threaded tube 842 will rotate in an opposite direction. When integrated with the gear system 812 and cone 810 of FIG. 64, this movement of the gear 840 will cause the gear 840 to move to the side of the ring (not shown) and allow the control wheels 816 to engage the slots 813. When the gear 840 moves through the channel 814, it pushes the mounting bracket 847 along with it causing the resistance wheels 846, which normally hold the bracket 847 and the gear 840 in the center of the ring, to roll to the next position along the bracket 847.

In some such mechanical embodiments, the mounting bracket 847 and control arm 848 are replaced with a linear motor. Such a linear motor configuration would preferably maintain a constant resistance to hold the gear in the middle of the ring, but could be overcome with the vectoral force, eliminating the need for the springs 841.

Figure 69:
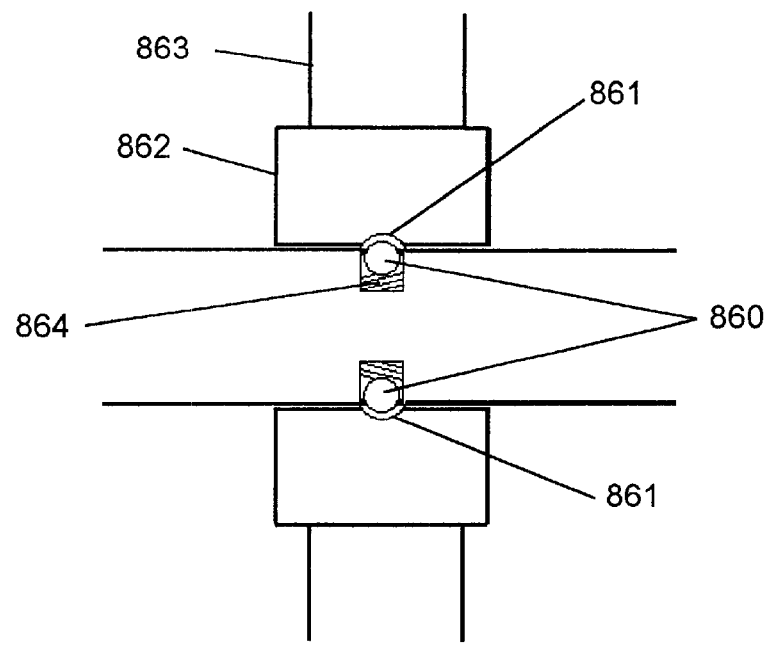
FIG. 69 is a cut away view of a mechanical control using a spring loaded ball.

In still other embodiments, the resistance control is a detent within the inside hub of the gear and a ball extending partially from the surface of said output shaft. As shown in FIG. 69, the ball 860 is dimensioned to mate with the detent 861 within the inside hub 862 of the gear 863 and includes a spring 864 that exerts a force upon the gear such that a sufficient amount of lateral force is required to push the ball 860 down before the gear 863 can move. In some embodiments the force upon the balls is exerted by compressible substance, such as neoprene, which creates a cushion that can be compressed under a load.

Figure 70:
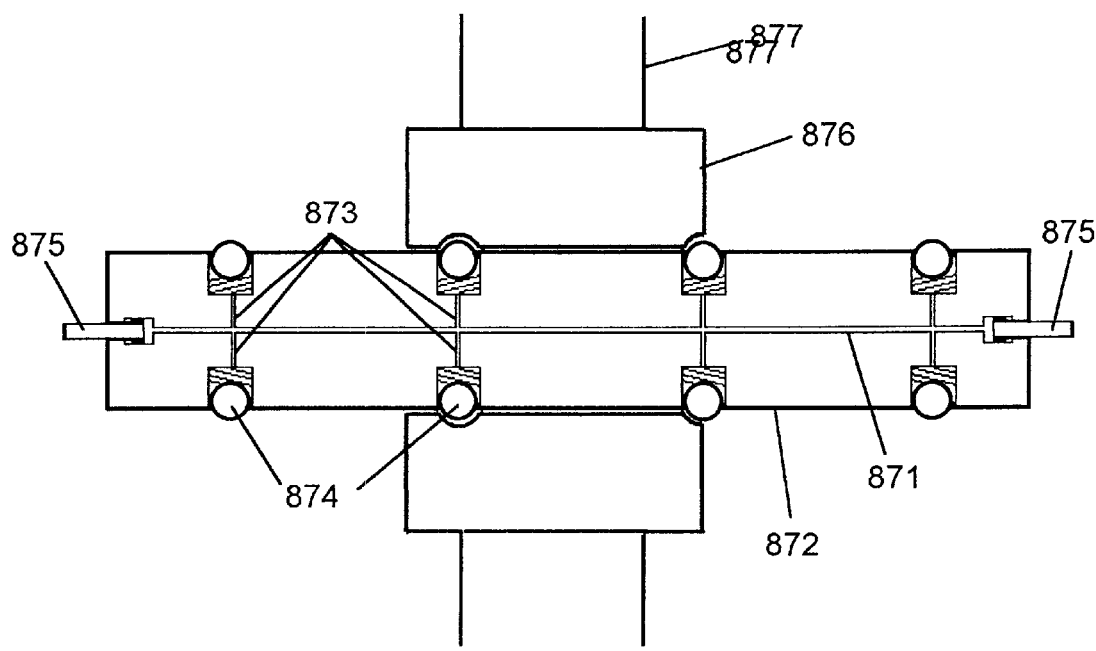
FIG. 70 is a cut away view of a mechanical control using a piston and fluid in communication with a ball.

In some embodiments, the force applied by the ball is generated by a piston in fluid communication the ball and allows the force to be varied by controlling the pressure against the ball. As shown in FIG. 70, it is preferred that such an embodiment include a hydraulic line 871 running through the center of the shaft 872 with connecting tubes 873 in communication with a plurality of balls 874. The connecting tubes 873 have a piston 875 at each end. When these pistons 875 experience a quick sharp strike, the pressure on the balls 874 is momentarily increased and lateral motion is transmitted to the gear hub 876. When the objective is to move the hub 876 the fraction of an inch required to move the gear into the control slot (not shown), the force has to be very short-lived and, once the gear 877 is moving, the struck piston is allowed to return to its starting position. However, it is recognized that holding the pistons 875 firmly would prevent the gear 877 from changing speeds. In this manner, the system could work like a "Jake Brake" on a truck.

The above system could be incorporated in either a smooth shaft and a spline shaft and is advantageous as putting the controlling components on, or in, the shaft frees the pinion gear of "overhead" mass. The lighter the mass, the greater the upper limit that it can change speeds.

Figure 71:
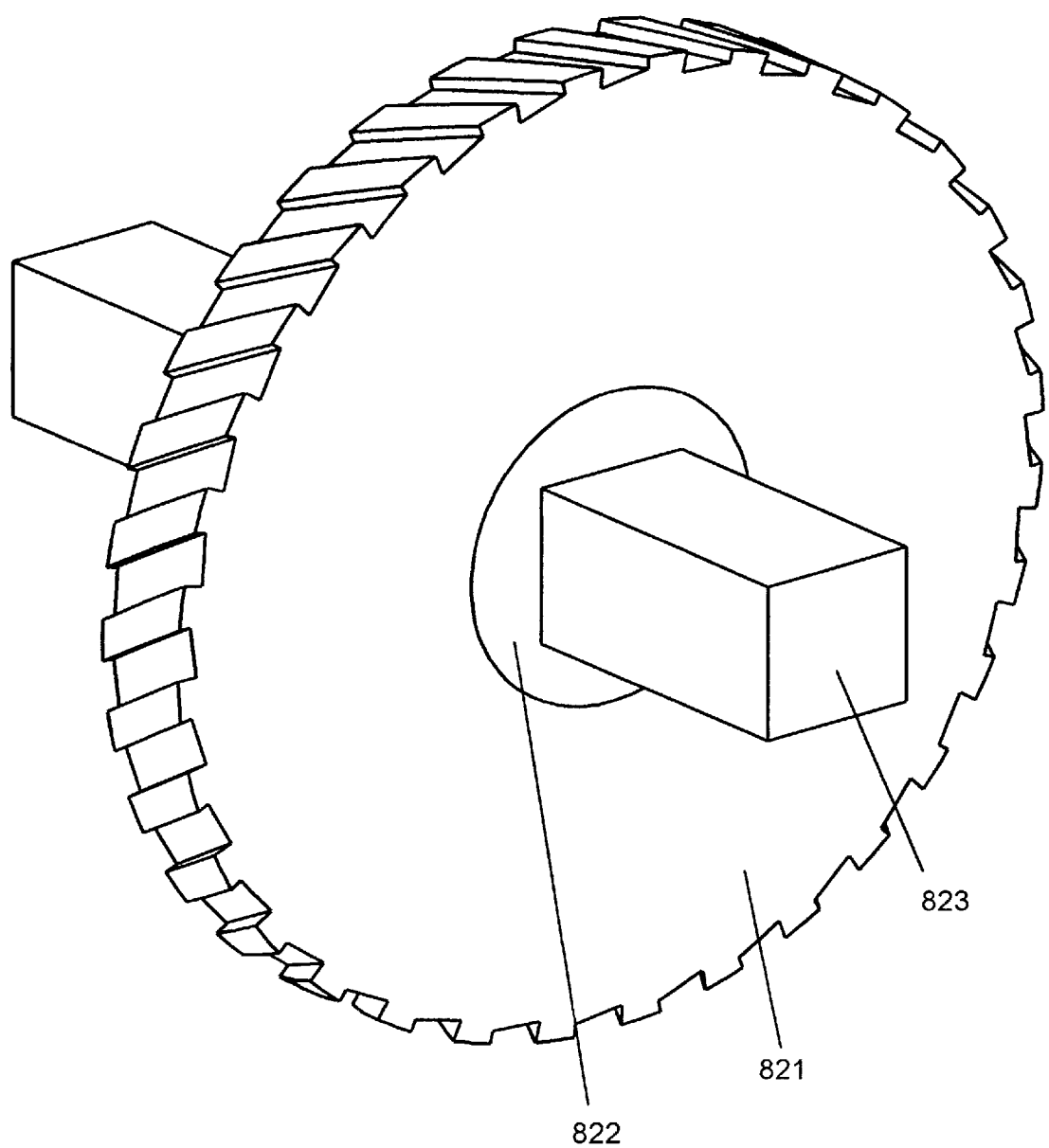
FIG. 71 is an isometric view of a gear mounted to a bearing block that moves along a rectangular rail.

Finally, as discussed below, the Graham Cascading Cone design and the Ashbey Planetary, the Tatham Planetary and the VCT differentials that use these planetary designs all utilize idler gears. Between the cascading cones is one idler gear that transmits its energy through the surface of the gear from one cone to another. The importance of this is that an idler gear does not transmit torsion through its shaft, so a splined shaft is not the only possible component. A type of rail, for example, like an H-beam, I-beam, square or a triangular beam could be used. As shown in FIG. 71, in these embodiments, the gear 821 is mounted within a bearing block 822 that mates with whatever rail 823 is used, and other conventional mechanical controls are used to nudge and hold the gear 821 and bearing block 822 in its desired location, allowing changing, or holding, speeds when the transmission would go in a different direction.

D. Different Embodiments of the Invention

Although the invention has heretofore been described with referent to a single cone and gear, the present invention may be adapted to take many forms. Each form utilizes one of three types of surface interface, which refers to the manner in which the tooth surfaces roll and/or slide together These interfaces are shown in FIGS. 72–74 and are described herein as "Tatham", "Anair" and "Ashbey", respectively.

Each surface interfaces has conventions that are followed. The lower member is a conic gear 671, 681, 691, which represents a conic ring of teeth sliced out of a cone whose shaft 673, 683, 693 is horizontal. For purposes of demonstration, the conix angle of the conic gear 671, 681, 691 is assumed to be 9.1578 degrees.

Figure 72:
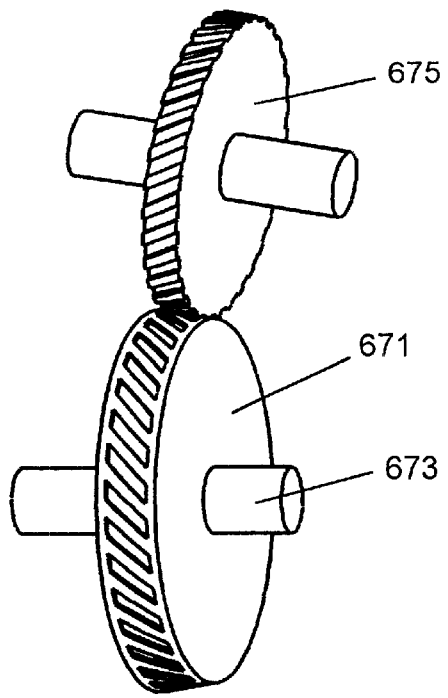
FIG. 72 is an isometric view of a pair of gears utilizing a Tatham surface interface.

As shown in FIG. 72, the Tatham surface interface is a helical gear 675 that meshes with the conic gear 671. The helical teeth of the helical gear 675 are constant, while the conic teeth on the conic gear 671 are based on a spiral, with the number of contact points increasing with distance from the nascention coordinate. Helical gears have a rolling contact point when they mesh. The teeth on the cone can also be described as having rolling contact points. When engaged with a helical gear 675, the number of contact points upon the conic gear 671 varies. This variance results in a small amount of sliding, which is analogous to the sliding utilized in a worm drive. As shown in FIG. 72, the shaft of the helical gear 675 has a helix angle of forty five degrees and is tilted 9.1578 degrees relative to the horizontal. This is due to the fact that the helical gear 675 is positioned on the surface of the cone and the surface is 9.1578 degrees.

Figure 73:
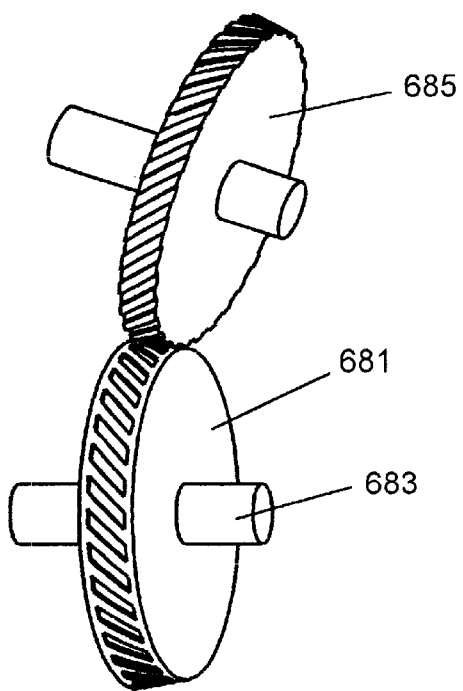
FIG. 73 is an isometric view of a pair of gears utilizing a Anair surface interface.
Figure 74:
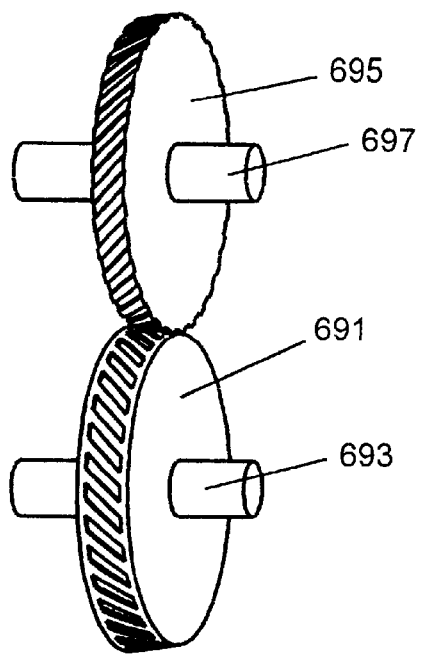
FIG. 74 is an isometric view of a pair of gears utilizing a Ashbey surface interface.

As shown in FIG. 73, the Anair surface interface is two conic gears 681, 685 positioned such that they have matching surfaces, meaning that the spiral-based teeth on both conic gears 681, 685 are increasing their contact points at the same time. As the surfaces in these embodiments are matching, there is little or no sliding associated with this interface. In the embodiment shown in FIG. 73, the conic gear 681 on the bottom and the conic gear 685 on top combine their angle of 9.1578 degrees for a net angle of the top shaft equal to 18.3156 degrees.

As shown in FIG. 74, the Ashbey surface interface also utilizes two conic gears 691, 695. The top conic gear 691 is turned in the opposite direction as the bottom conic gear 695 but, instead of combining their angles as was the case with the Anair surface interface, their angles cancel each other out resulting in the top shaft 697 being horizontal. As the variance of the surface contact points is doubled, the net sliding between the conic gears 691, 695 is also doubled.

There is a characteristic unique to the Van Cor Transmission involving the angle of the tooth profile. The profile of a tooth is normally assumed to be perpendicular to the axis of the gear. The action of two gears meshing can be described two-dimensionally. The action of the VCT teeth meshing is three-dimensional.

On the last prototype, the VCT teeth were cut into the cone perpendicular to the face of the cone, not the axis. The teeth could have been cut perpendicular to the cones axis. Either way, the difference in the angle from the perpendicular would be the conix angle, 9.1587 degrees for the last prototype. The preferred method is that this difference is averaged, both the gear teeth and the cone teeth have the profile at half this angle of 4.5789 degrees. This tilt of the tooth profile would make the teeth slightly shorter. This averaged angle would put the meshing of the teeth on the same plane.

The preferred tooth profile is an involute. The conjugate action describing the meshing of involute profiles is on a plane.

Figure 75:
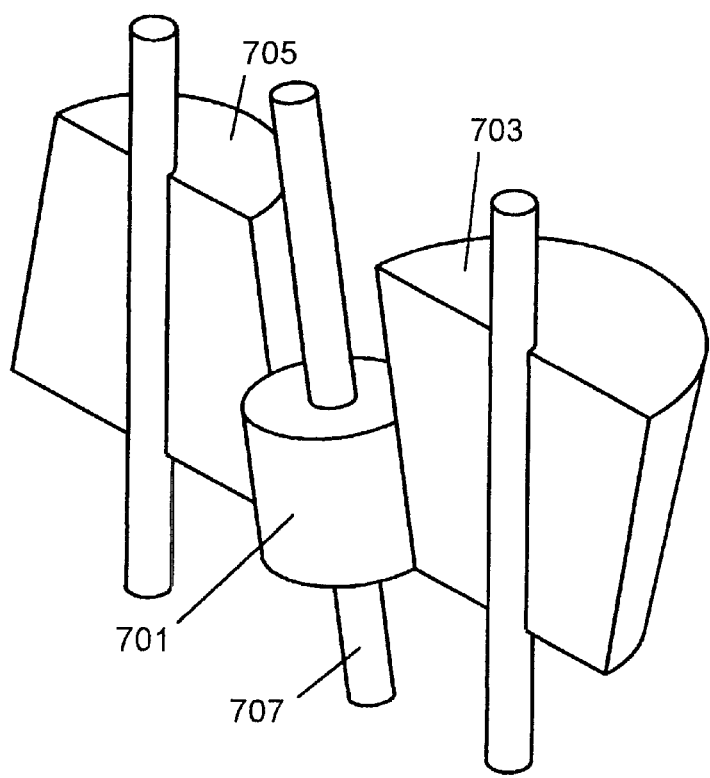
FIG. 75 is an isometric view of a Graham cascading configuration with a gear in a bottom position.
Figure 76:
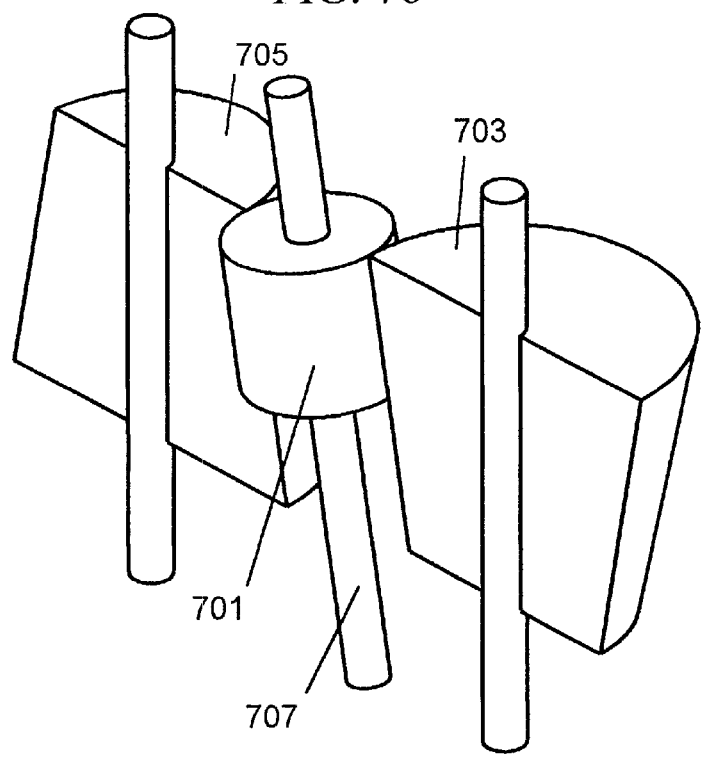
FIG. 76 is an isometric view of a Graham cascading configuration with a gear in a top position.

In some embodiments of the invention, the gear train is utilized in a cascading configurations, in which energy is cascaded from one cone. These configurations imply energy transmitted from one component to another as opposed to groups of components as in planetary systems. Two such cascading configurations are shown in FIGS. 75 and 76, which are referred to as "Graham" configurations, and FIGS. 77 and 78, which are referred to as "Felch" configurations. As shown in FIGS. 75 and 76, the simplest Graham configuration is a gear 701 between two external cones 703, 705. This is actually a combination of two Ashbey surface interfaces and is literally two synchronized transmissions in one. Since the external cones 703, 705 share the same gear, the synchronization is inherent, with the effect being that differences in speed are multiplied. The greatest advantage of this configuration has is that the gear 701 transmits energy between the cones 703, 705 along its surface instead of through its hub. This gives the configuration a higher torque capacity.

FIGS. 75 shows the gear 701 at a bottom position between the two cones 703, 705, while FIG. 76 shows the gear 701 at a top position. It is noted that the Graham configuration may be designed with a splined input shaft 707 to the gear 701 to allow movement up and down the shaft. Some embodiments also include separate controls for each cone 703, 705 so they could move laterally independent of the each other. Finally, although any of the three surface interfaces may be utilized in these configurations, the Tatham is the simplest to implement and, therefore, is preferred.

Figure 77:
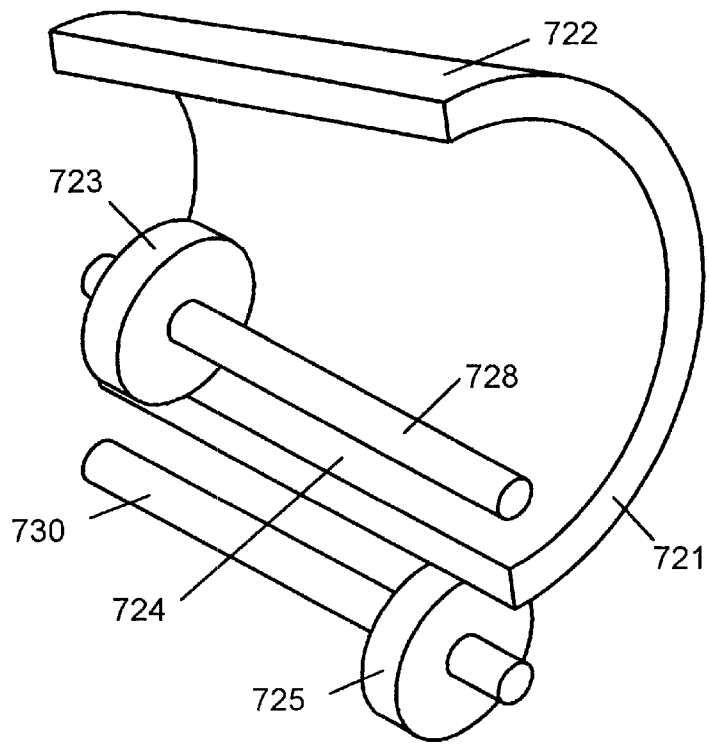
FIG. 77 is an isometric view of a Felch cascading configuration with each gear located at a first limit.
Figure 78:
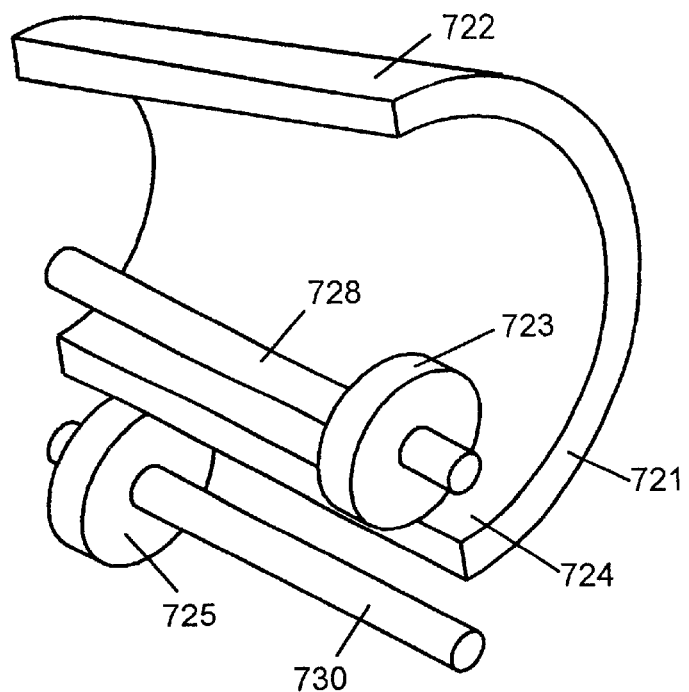
FIG. 78 is an isometric view of the Felch cascading configuration of FIG. 72 with each gear located at a second limit.

FIGS. 77 and 78 show a simple Felch configuration in which a cone 721 is disposed between two helical gears 723, 725, with energy being transmitted through the shafts 728, 730 of the gears 723, 725 The cone has an external surface 722 and an internal surface 724, each of which include the rings and channels of the other cones described herein. Accordingly, this configuration provides two transmissions in one. The advantage of the Felch configuration is its compactness and its amplification of the gear ratios.

In the Felch configuration, the Tatham surface interface provides the simplest motion and is preferred, as it allows the shafts 728, 730 to be fixed, while gear ratios are changed by moving a single pinion gear (not shown) attached to the cone 721. The Anair and Ashbey interfaces require more complex motion because the cone 721 and/or the shafts 728, 730 have to move in order to change speeds. However, it is recognized that any combination of the three may be utilized. The Felch configuration requires two control systems (not shown), one for the interal gear 723 and one for the external gear 725.

Finally, it is recognized that the Graham and Felch configurations may be combined in many ways to provide multiple internal and external cones and gears with multiple inputs, outputs and motion controls.

In some embodiments of the invention, the gear train is utilized as part of a planetary system. A planetary system implies a sun gear, planetary gears in orbit around the sun gear and a ring gear holding the planets on the sun gear. A planet carrier holds the planets in position. The sun gear, ring gear and planet carrier can be inputs, outputs or combinations thereof and one of the components may be locked in place.

FIGS. 79–83 show two types of planetary systems utilizing the cones and gears of the present invention. The advantage of a planetary system is its compactness and ability to transmit more torque through multiple planetary gears. It is noted that, although each of the planetary systems are described herein as having only two planetary gears, more than two planetary gears may be utilized. Regardless of the number of planetary gears, however, the effect of such a planetary system is that the teeth on the gears may be smaller and the system may be faster.

Figure 79:
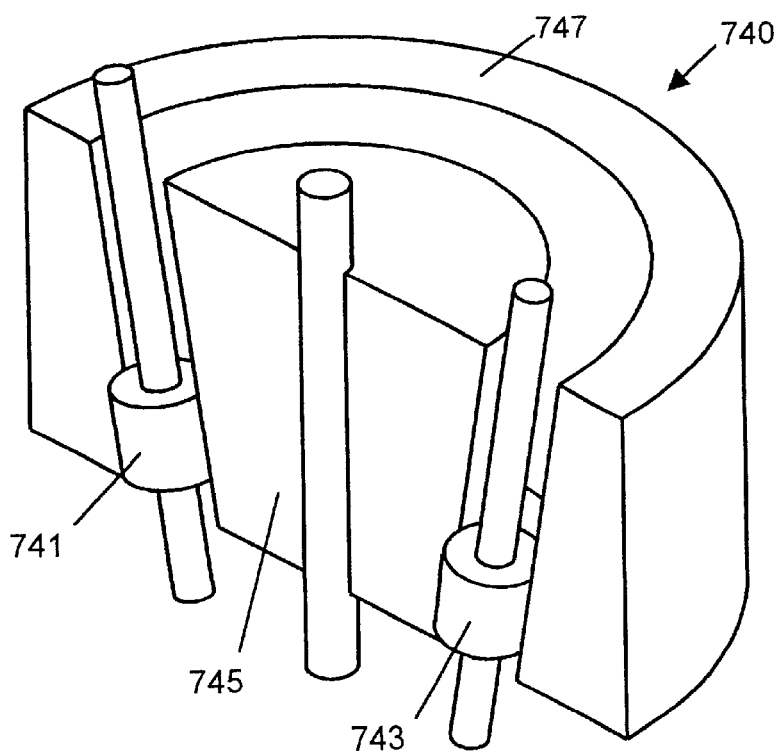
FIG. 79 is an isometric view of a Tatham planetary system with planet gears at the bottom of the cones.
Figure 80:
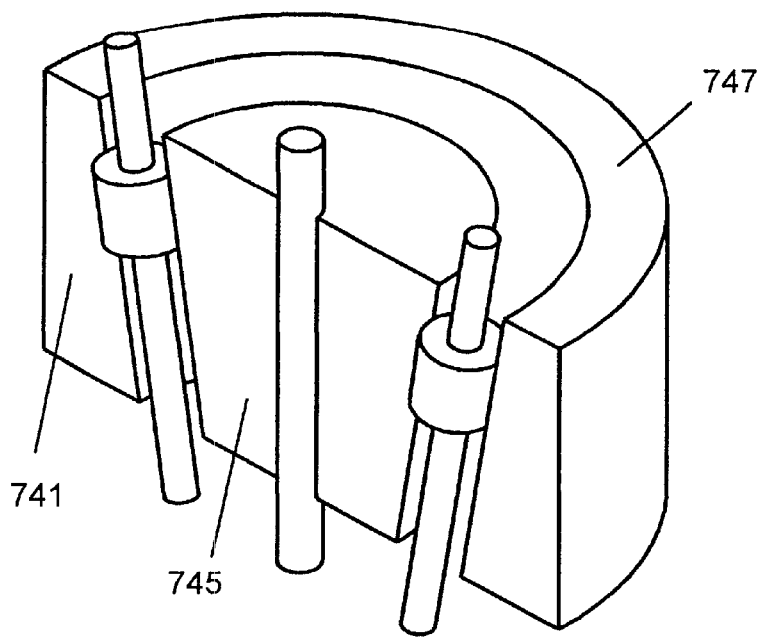
FIG. 80 is an isometric view of a Tatham planetary system with planet gears at the top of the cones.
Figure 81:
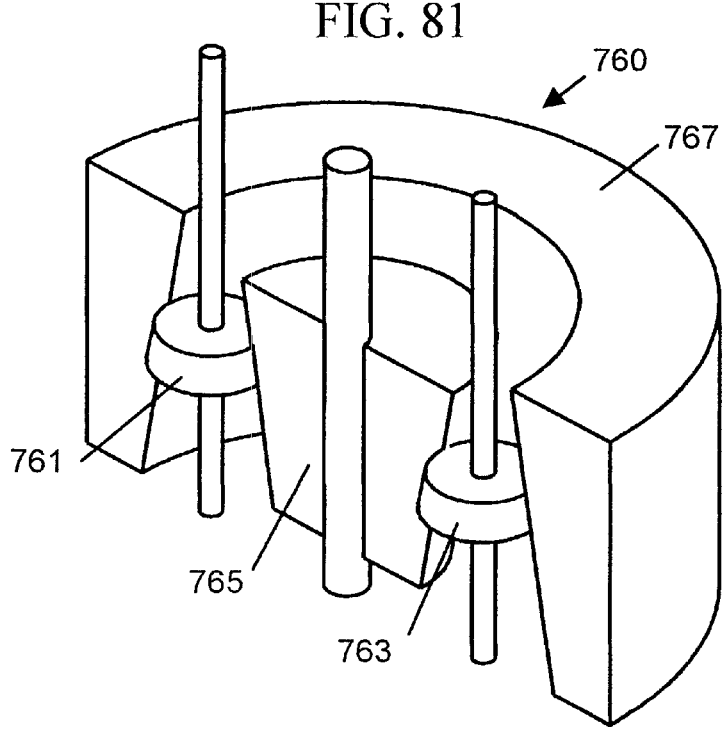
FIG. 81 is an isometric view of an Ashbey planetary system with planet gears at the bottom of the sun cones.
Figure 82:
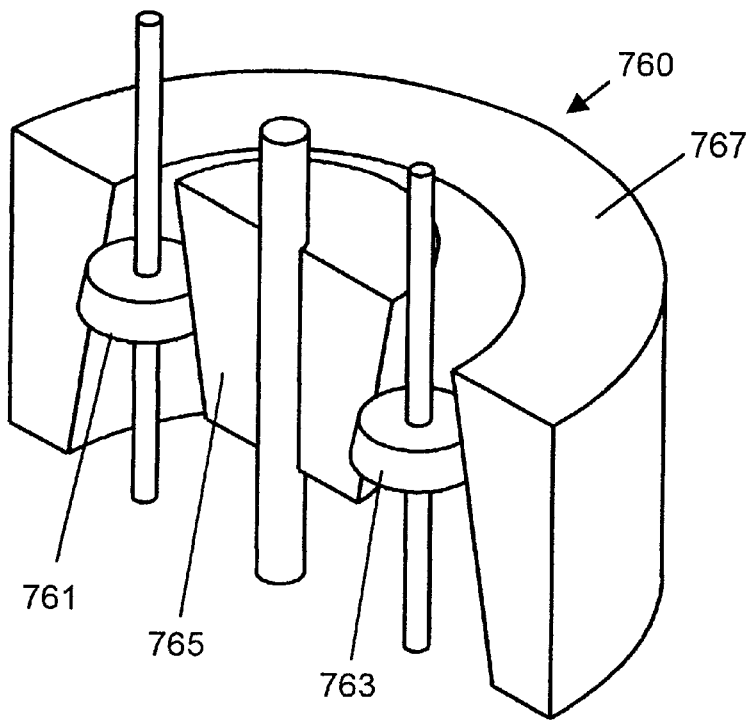
FIG. 82 is an isometric view of an Ashbey planetary system with planet gears at the middle of the sun cone.
Figure 83:
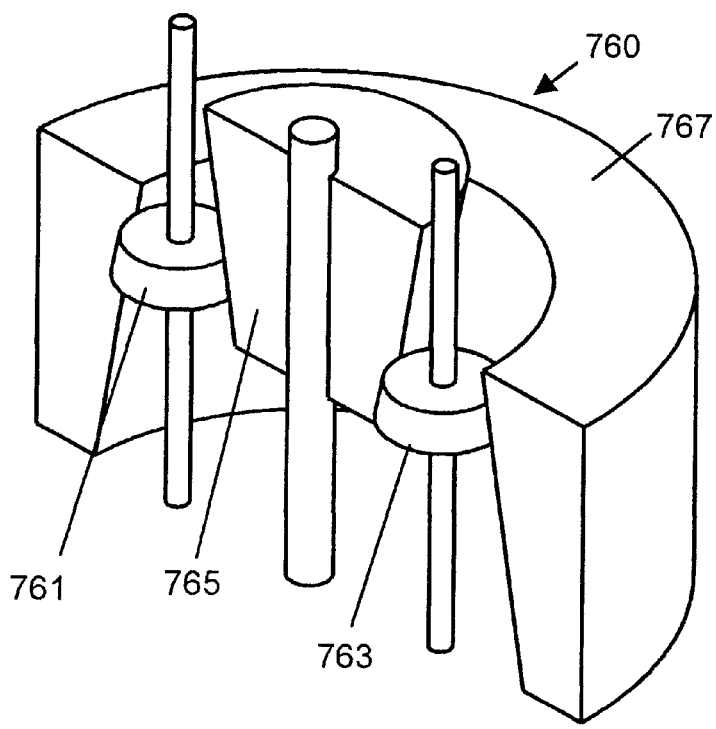
FIG. 83 is an isometric view of an Ashbey planetary system with planet gears at the top of the sun cone.

FIGS. 79 and 80 show a planetary system 740 utilizing a Tatham surface interface and FIGS. 81–83 show a planetary system 760 utilizing an Ashbey surface interface. Each system 740, 760 may be differentiated by the relative controlling motion of the planet gears 741, 743 & 761, 763. In the Tatham, the planet gears 741, 743 move and the cone 745, 747 are stationary. In the Ashbey, two of the components have to move: the ring cone 767 and sun cone 765, the ring cone 767 and planet gears 761, 763 or the sun cone 765 and conic gears 761, 763.

As shown in FIGS. 81–83, the Ashbey planetary system includes an internal ring cone 767 that is the planetary ring, an external sun cone 765 that is the planetary sun, and a pair of conic planet gears 761, 763 that are the planets. The position of the ring cone 767 and sun cone 765 is such that the angular faces of the cones 765, 767 are inverted relative to each other. FIG. 81 shows the planet gears 761, 763 in the middle if each cone 765, 767. FIG. 82 shows the planet gears 761, 763 moved up the ring cone 767. To obtain such a position, the ring cone 767 must move downward relative to the sun cone 765. FIG. 83 shows the planet gears 761, 763 moved to the top of the ring cone 767 and to the top of the sun cone 765. To obtain such a position, the ring cone 767 and planet gears 761, 763 must move downward relative to the sun cone 765.

As shown in FIGS. 79 and 80, the Tatham planetary system 740 has helical planet gears 741, 743 between an internal ring cone 747 and external sun cone 745. The angular faces of these cones 745, 747 are aligned with each other. FIG. 79 shows the planet gears at the bottom of the cones 745, 747, while FIG. 80 shows the planet gears at the top of the cones 745, 747.

As can be seen from FIGS. 81–83, the Ashbey planetary system 760 has a wider range of gear ratios then the Tatham planetary system 740, but the Tatham planetary system 740 is much simpler to control since only the planet gears 741, 743 are allowed to move.

In still other embodiments, the present invention is used as a differential, which may be used to control a gear train. A differential is a device that works against itself and has an output that is a measure of efficiency; i.e. zero output is zero efficiency. The differential of the present invention combines the cone and gear of the present invention with a common prior art planetary system.

Figure 84:
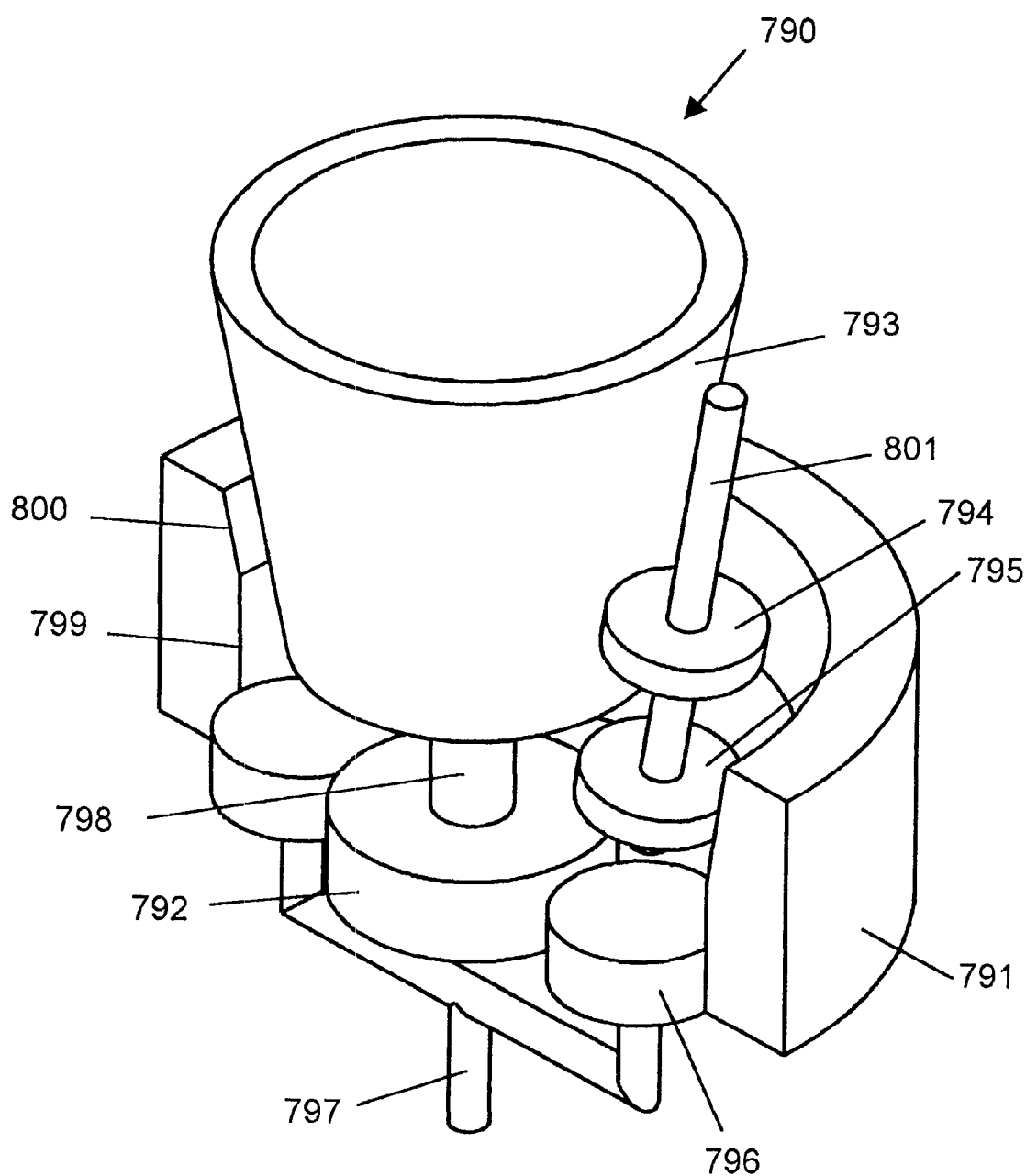
FIG. 84 is an isometric view of an differential utilizing a planetary system in accordance with the present invention.

As shown in the embodiment of FIG. 84, the differential 790 shares the ring gear 791. The ring gear 791 has a substantially beveled portion 800 and a substantially cylindrical portion 799. At least one planet gear 796 is attached to a planet carrier 797 and is in contact with a sun gear 792 and an inside surface of the cylindrical portion 799 of the ring gear 791. An idler gear 795 is attached to an end of a splined shaft 801 and in contact with an inside surface of the beveled portion 800 of the ring. The sun gear 792 and cone 793 are on the same shaft 798. The normal planetary system has a planet carrier 797 that includes an output shaft. The gear 794 in this configuration does not orbit, but does move up and down the cone 793.

The system of the present invention controls the rotation of the ring gear 791 relative to the input shaft 798 of the cone 793. If the cone 793 is at a constant speed, moving the gears 794 up and down the cone 793 will change the speed of the ring cone 79 1. The impact of changing the speed of the ring cone 791 relative to the cone 793 is on the normal planetary gears 796. They can be balanced so they do not orbit or there orbit can be in the same direction or in a counter direction as the sun gear 792.

Figure 85:
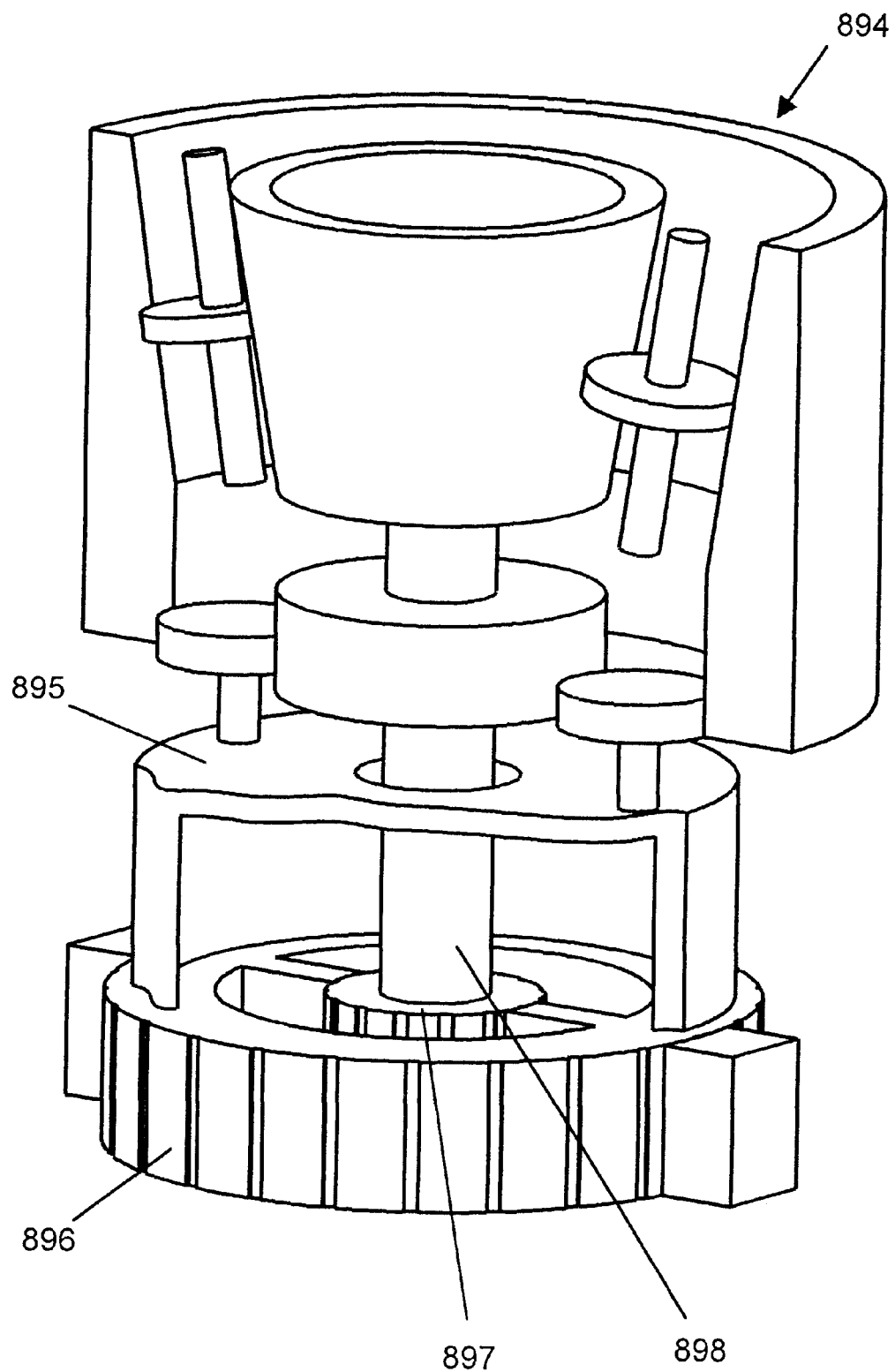
FIG. 85 is an isometric view of a differential of the present invention utilized to control an electric generator or motor.

As shown in FIG. 85, another embodiment of a differential 894 in accordance with the present invention is shown. In this embodiment, a planetary system of the present invention is coupled with a prior art planetary system and utilized as a controlling device. Here, the differential 894 is designed to have the planet carrier 895 as the device output, allowing it to be at a stop, forward or backward relative to the device input 898.

In some embodiments, this differential 894 is utilized to control electric motors or generators, which have a commutator in contact with brushes that conduct the electricity to the armature coils. In such an embodiment, a second external commutator and brush system is added to create an internal 897 and external 896 commutator design in which the differential controls the external commutator and the internal commutator is the motor/generator's normal commutator and power input shaft 898 for the differential 894.

By arranging the differential 894 in this manner, a user is able to slow a generator input shaft from 1800 rpm to 1200 rpm and rotate the external commutator 600 rpm in the opposite direction to obtain 1800 rpm total on the commutator that controls the cycle output. Similarly there may be multiple commutator-brush configurations for specific speeds on the same external unit.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A gear train apparatus comprising:
a gear comprising a plurality of teeth; and
a cone disposed in contact with said gear, said cone comprising a plurality of conic teeth and a plurality of scaling teeth, and wherein a first plurality of spaces are disposed between said conic teeth and a second plurality of spaces are disposed between said scaling teeth;
wherein said conic teeth are arranged about said cone to form a plurality of conic rings disposed about a plurality of nascention circles of said cone and are dimensioned to mate with said teeth of said gear such that said conic teeth neutralize a change in surface speed of said cone along said conic teeth; and
wherein said scaling teeth form at least one acceleration channel and at least one deceleration channel extending from each of said conic rings and intercepting an adjacent conic ring, each of said at least one acceleration channel and said at least one deceleration channel being disposed along a nascention offset line between nascention circles of adjacent conic rings.

2. The gear train apparatus as claimed in claim 1:
wherein said at least one acceleration channel comprises an acceleration channel entrance, an acceleration tube, and an acceleration channel exit; and
wherein said at least one deceleration channel comprises a deceleration channel entrance, a deceleration tube, and a deceleration channel exit.

3. The gear train apparatus as claimed in claim 2 wherein said acceleration channel entrance of one acceleration channel and said deceleration channel exit of one deceleration channel overlap along a bottom landing, said bottom landing comprising conic teeth of one of said rings.

4. The gear train apparatus as claimed in claim 2 wherein said deceleration channel entrance of one deceleration channel and said acceleration channel exit of one acceleration channel overlap along a top landing, said top landing comprising conic teeth of another of said rings.

5. The gear train apparatus as claimed in claim 1 wherein said first plurality of spaces disposed between said conic teeth are substantially uniform and wherein second plurality of spaces disposed between said scaling teeth are tapered and are substantially non-uniform.

6. The gear train apparatus as claimed in claim 5 wherein said scaling teeth are stepped such that a pitch line of each scaling tooth is varied dependent upon a migration of said nascention coordinates of said scaling teeth on said nascention-offset line.

7. The gear train apparatus as claimed in claim 5 wherein said scaling teeth are substantially continuous such that a pitch line between said conic rings is based upon a migration of said nascention coefficients between said conic rings.

8. The gear train apparatus as claimed in claim 1 wherein said gear is a helical gear.

9. The gear train apparatus as claimed in claim 1 wherein said gear is a conic gear having an first end of a first diameter, and a second end having and a second diameter, wherein said second diameter is larger than said first diameter and wherein said conic gear is positioned relative to said cone such said second end is in contact with a portion of said cone having a smaller diameter.

10. The gear train apparatus as claimed in claim 1 wherein said gear is a conic gear having an first end of a first diameter, and a second end having and a second diameter, wherein said second diameter is larger than said first diameter, and wherein said conic gear is positioned relative to said cone such said first end is in contact with a portion of said cone having a smaller diameter.

11. A transmission system comprising:
a gear shaft;
a gear mounted to said gear shaft, said gear comprising a plurality of teeth;
a cone shaft;
a cone fixedly attached to said cone shaft and disposed in contact with said gear, said cone comprising a plurality of conic teeth and a plurality of scaling teeth, wherein a first plurality of spaces are disposed between said conic teeth and a second plurality of spaces are disposed between said scaling teeth; and
control means for controlling a position of said gear relative to said cone;
wherein said conic teeth are arranged about said cone to form a plurality of conic rings disposed about a plurality of nascention circles of said cone and are dimensioned to mate with said helical teeth of said pinion gear such that said conic teeth neutralize a change in surface speed of said cone along said conic teeth; and wherein said scaling teeth form at least one acceleration channel and at least one deceleration channel extending from each of said conic rings and intercepting an adjacent conic ring, each of said at least one acceleration channel and said at least one deceleration channel being disposed along a nascention offset line between nascention circles of adjacent conic rings.

12. The transmission system as claimed in claim 11 wherein said at least one acceleration channel comprises an acceleration channel entrance, an acceleration tube, and an acceleration channel exit; and wherein said at least one deceleration channel comprises a deceleration channel entrance, a deceleration tube, and a deceleration channel exit.

13. The transmission system as claimed in claim 12 wherein said acceleration channel entrance of one acceleration channel and said deceleration channel exit of one deceleration channel overlap along a bottom landing, said bottom landing comprising conic teeth of one of said rings.

14. The transmission system as claimed in claim 12 wherein said deceleration channel entrance of one deceleration channel and said acceleration channel exit of one acceleration channel overlap along a top landing, said top landing comprising conic teeth of another of said rings.

15. The transmission system as claimed in claim 11 wherein said first plurality of spaces disposed between said conic teeth are substantially uniform and wherein second plurality of spaces disposed between said scaling teeth are tapered and are substantially non-uniform.

16. The transmission system as claimed in claim 15 wherein said scaling teeth are stepped such that a pitch line of each scaling tooth is varied dependent upon a migration of said nascention coordinates of said scaling teeth on said nascention-offset line.

17. The transmission system as claimed in claim 15 wherein said scaling teeth are substantially continuous such that a pitch line between said conic rings is based upon a migration of said nascention coefficients between said conic rings.

18. The transmission system as claimed in claim 11 wherein said control means comprises a threaded shaft, a control yoke movably attached to said threaded shaft, a control motor for rotating said threaded shaft, and a microprocessor for controlling said control motor.

19. The transmission system as claimed in claim 18 wherein said control means further comprises at least one sensor chosen from a group consisting of a rotational encoder, a lateral sensor and a load sensor.

20. The transmission system as claimed in claim 19 wherein said control means comprises a rotational encoder to determine a degree of rotation of said cone from a zero point, a lateral sensor to encode a lateral location of said pinion gear, and a load sensor for sensing an amount of torque on said system.

21. The transmission system as claimed in claim 19 wherein said sensor comprises a rotational encoder and wherein said microprocessor comprises an algorithm for accepting an input from said rotational encoder and for calculating a translocation speed and rotational position based upon said input.

22. The transmission system as claimed in claim 11 wherein said control means comprises at least one alignment surface extending from a surface of said cone and a pair of bumpers disposed upon said gear shaft adjacent to said gear, wherein said bumpers are dimensioned to prevent said plurality of teeth of said gear from contacting a boundary of said rings and a boundary of said channels.

23. The transmission system as claimed in claim 11 wherein said control means comprises at least one control surface extending from a surface of said cone and at least one control wheel disposed upon said gear shaft proximate to said gear, said at least one control wheel being dimensioned to engage and guide said gear through one of said acceleration channel and said deceleration channel.

24. The transmission system as claimed in claim 22 wherein said control means further comprises at least one control surface extending from said alignment surface and at least one control wheel disposed upon said gear shaft proximate to said gear, said at least one control wheel being dimensioned to engage and guide said gear through one of said acceleration channel and said deceleration channel.

25. The transmission system as claimed in claim 24 wherein said control means comprises two control wheels, wherein one of said control wheels is disposed upon said gear shaft on one side of said gear and wherein another of said control wheels is disposed upon said gear shaft on another side of said gear.

26. The transmission system as claimed in claim 11 wherein said control means comprises a resistance control for controlling a movement of said gear.

27. The transmission system as claimed in claim 26 wherein said resistance control comprises:

a pair of springs disposed upon opposite sides of said gear;

a pair of threaded tubes, wherein one of said tubes is disposed against each of said springs; and a rotatable speed control arm fixedly attached to said threaded tubes;

wherein rotating said speed control arm causes one of said threaded tubes to compress one of said springs and the other of said threaded tubes to relieve the other of said springs so as to alter a resistance against said gear sufficiently to cause said gear to move toward the spring that has been relieved.

28. The transmission system as claimed in claim 26 wherein said resistance control comprises at least one detent disposed within an inside hub of said gear and at least one ball extending partially from a surface of said output shaft, said ball being dimensioned to mate with said detent within said inside hub of said gear and to exert a force upon said gear.

29. The transmission system as claimed in claim 28 further comprising a piston in fluid communication with said at least one ball for varying said force upon said gear by controlling a pressure against said ball.

30. The transmission system as claimed in claim 28 further comprising at least one spring in communication with said ball.

31. The transmission system as claimed in claim 11 further comprising a second gear and a second gear shaft to which said second gear is attached, wherein said gear is disposed upon an outside surface of said cone and said second gear is disposed upon an inside surface of said cone.

32. The transmission system as claimed in claim 11 further comprising a second cone and a second cone shaft, wherein said gear is disposed between, and in contact with, said cone and said second cone.

33. The transmission system as claimed in claim 32 wherein said gear is disposed between, and in contact with, an outside surface of said cone and an outside surface of said second cone.

34. The transmission system as claimed in claim 32 wherein said gear is disposed between, and in contact with, an outside surface of said cone and an inside surface of said second cone.

35. The transmission system as claimed in claim 34 further comprising a second gear attached to a second gear shaft, wherein said second gear is disposed between, in contact with, an outside surface of said cone and an inside surface of said second cone.

36. The transmission system as claimed in claim 35 further comprising a planet carrier and wherein said first gear shaft and said second gear shaft are attached to said planet carrier.

37. The transmission system as claimed in claim 36 wherein said gear and said second gear are helical gears.

38. The transmission system as claimed in claim 36 wherein said gear and said second gear are conic gears.

39. The transmission system as claimed in claim 35 wherein said second cone further comprises a cylindrical ring portion attached to, and extending from, one end of said second cone, and wherein said system further comprises:

a sun gear fixedly attached to said cone shaft;

at least one planet gear in contact with said sun gear and an inside surface of said cylindrical ring portion of said second cone; and a planet carrier rotatably attached to said at least one planet gear.

40. The transmission system as claimed in claim 39 further comprising an external commutator and an internal commutator, wherein said planet carrier is attached to said external commutator and said cone shaft is attached to said internal commutator.

41. The transmission system as claimed in claim 11 further comprising:

a sun gear fixedly attached to said cone shaft;

a ring having a substantially beveled portion and a substantially cylindrical portion;

at least one planet gear in contact with said sun gear and an inside surface of said substantially cylindrical portion of said ring;

a planet carrier rotatably attached to said at least one planet gear; and an idler gear attached to an end of said gear shaft and in contact with an inside surface of said beveled portion of said ring.

42. A transmission system comprising:

a rotatable gear comprising a plurality of teeth;

a cone shaft;

a cone fixedly attached to said cone shaft and disposed in contact with said gear, said cone comprising a plurality of conic teeth and a plurality of scaling teeth, wherein a first plurality of spaces are disposed between said conic teeth and a second plurality of spaces are disposed between said scaling teeth; and control means for controlling a position of said gear relative to said cone;

wherein said conic teeth are arranged about said cone to form a plurality of conic rings disposed about a plurality of nascention circles of said cone and are dimensioned to mate with said helical teeth of said pinion gear such that said conic teeth neutralize a change in surface speed of said cone along said conic teeth; and wherein said scaling teeth form at least one acceleration channel and at least one deceleration channel extending from each of said conic rings and intercepting an adjacent conic ring, each of said at least one acceleration channel and said at least one deceleration channel being disposed along a nascention offset line between nascention circles of adjacent conic rings.

43. The transmission system as claimed in claim 42 wherein said control means comprises a rail and a bearing block attached to said rail and to said rotatable gear.

* * * * *